(12) United States Patent
Tets et al.

(10) Patent No.: US 12,535,491 B2
(45) Date of Patent: Jan. 27, 2026

(54) VACCINE COMPRISING PROTEIN-TARGETED (PT) EXTRACELLULAR DNA ISOLATED FROM BACTERIAL MATRIX

(71) Applicants: Viktor Veniaminovich Tets, New York, NY (US); Georgy Viktorovich Tets, New York, NY (US)

(72) Inventors: Viktor Veniaminovich Tets, New York, NY (US); Georgy Viktorovich Tets, New York, NY (US)

(73) Assignees: Viktor Veniaminovich Tets, New York, NY (US); Georgy Viktorovich Tets, New York, NY (US)

( * ) Notice: Subject to any disclaimer, the term of this patent is extended or adjusted under 35 U.S.C. 154(b) by 917 days.

(21) Appl. No.: 17/051,598

(22) PCT Filed: Apr. 8, 2019

(86) PCT No.: PCT/US2019/026272
§ 371 (c)(1),
(2) Date: Oct. 29, 2020

(87) PCT Pub. No.: WO2019/212694
PCT Pub. Date: Nov. 7, 2019

(65) Prior Publication Data
US 2021/0247408 A1 Aug. 12, 2021

Related U.S. Application Data

(60) Provisional application No. 62/664,670, filed on Apr. 30, 2018.

(51) Int. Cl.
| | |
|---|---|
| *A61K 35/74* | (2015.01) |
| *A61K 31/436* | (2006.01) |
| *A61K 31/473* | (2006.01) |
| *A61K 31/702* | (2006.01) |
| *A61P 25/28* | (2006.01) |
| *A61P 31/04* | (2006.01) |
| *A61P 31/22* | (2006.01) |
| *A61P 35/00* | (2006.01) |
| *C07K 16/08* | (2006.01) |
| *C07K 16/28* | (2006.01) |
| *C07K 16/40* | (2006.01) |
| *G01N 1/40* | (2006.01) |
| *G01N 33/569* | (2006.01) |
| *G01N 33/574* | (2006.01) |
| *G01N 33/68* | (2006.01) |

(52) U.S. Cl.
CPC ....... *G01N 33/6896* (2013.01); *A61K 31/436* (2013.01); *A61K 31/473* (2013.01); *A61K 31/702* (2013.01); *A61P 25/28* (2018.01); *A61P 31/04* (2018.01); *A61P 31/22* (2018.01); *A61P 35/00* (2018.01); *C07K 16/087* (2013.01); *C07K 16/2872* (2013.01); *C07K 16/40* (2013.01); *G01N 1/4022* (2013.01); *G01N 1/4044* (2013.01); *G01N 33/56983* (2013.01); *G01N 33/574* (2013.01); *G01N 33/6893* (2013.01); *C07K 2317/24* (2013.01); *G01N 2550/00* (2013.01); *G01N 2560/00* (2013.01); *G01N 2800/26* (2013.01); *G01N 2800/2835* (2013.01); *G01N 2800/52* (2013.01); *G01N 2800/56* (2013.01); *G01N 2800/7028* (2013.01)

(58) Field of Classification Search
CPC ............ G01N 33/6896; G01N 1/4044; G01N 33/574; G01N 33/6893; G01N 2800/26; G01N 2800/52; G01N 2800/56; A61K 31/436; A61K 31/473; A61K 31/702; A61P 25/28; A61P 31/04; A61P 31/22; A61P 35/00; C07K 16/087; C07K 16/2872; C07K 16/40; C07K 2317/24
See application file for complete search history.

(56) References Cited

U.S. PATENT DOCUMENTS

| | | | |
|---|---|---|---|
| 4,255,383 | A | 3/1981 | Schenck |
| 5,955,287 | A | 9/1999 | Fernandez-Pol |
| 6,201,104 | B1 | 3/2001 | MacDonald et al. |
| 6,528,269 | B1 | 3/2003 | Sy et al. |
| 9,063,141 | B2 | 6/2015 | Grallert et al. |
| 2002/0012927 | A1 | 1/2002 | Burmer et al. |
| 2005/0124794 | A1 | 6/2005 | McCrae et al. |
| 2006/0233780 | A1 | 10/2006 | Genkin et al. |
| 2006/0263767 | A1 | 11/2006 | Castrillon et al. |
| 2007/0221559 | A1 | 9/2007 | Wang |
| 2013/0183284 | A1 | 7/2013 | Genkin et al. |
| 2013/0203849 | A1 | 8/2013 | Ben Yehuda |
| 2014/0234260 | A1 | 8/2014 | Borody |
| 2014/0271701 | A1 | 9/2014 | Sechi et al. |
| 2017/0020937 | A1 | 1/2017 | Mattey |

FOREIGN PATENT DOCUMENTS

| | | |
|---|---|---|
| CA | 2628552 A1 | 5/2007 |
| HU | 0100159 A2 | 5/2001 |
| WO | 2016190780 A1 | 12/2016 |
| WO | 2017042831 A2 | 3/2017 |
| WO | 2017118924 A1 | 7/2017 |
| WO | 2019028456 A1 | 2/2019 |

OTHER PUBLICATIONS

Matsumoto T, et al. (1998) J. Med. Microbiol. 47:303-308.*
Leitner WW, et al. (Dec. 10, 1999) Vaccine. 18(9-10): 765-777.*
Meemon K and Sabhon P (2015) Parasitol Res. 114:2807-2813. (DOI 10.1007/s00436-015-4589-6).*
Office Action issued Jun. 29, 2023 in connection with U.S. Appl. No. 17/257,389.

(Continued)

*Primary Examiner* — Robert S Landsman
(74) *Attorney, Agent, or Firm* — Troutman Pepper Locke LLP

(57) ABSTRACT

The invention relates to diagnosis, prevention, and treatment of diseases and conditions associated with the functions of prion-like or Tetz-proteins.

4 Claims, 40 Drawing Sheets

Specification includes a Sequence Listing.

(56) References Cited

OTHER PUBLICATIONS

Palma et al., "Dietary water affects human skin hydration and biomechanics", Clinical Cosmetic and Investigational Dermatology, 2015, 413-421.
Office Action issued Jul. 13, 2022 in connection with U.S. Appl. No. 16/616,231.
M. Dupon, et al., "Plasma levels of piperacillin and vancomycin used as prophylaxis in liver transplant patients", Eur J Clin Pharmacol (1993) 45:529-534.
Office Action issued Mar. 30, 2023 in connection with U.S. Appl. No. 17/256,428.
Google patent translation of HU0100159A2 (Year: 2001).
Office Action mailed Apr. 24, 2023 in connection with U.S. Appl. No. 16/616,231.
Anderson et al., "Enumeration of bacteriophage particles" Bacteriophage 1(2):86-93 (2011).
Bille, E. et al., "Association of a Bactriophage with Meningococcal Disease in Young Adults," PLoS One (2008) vol. 3, Issue 12, 6 pages total.
De Paepe, M. et al., "Bacteriophages: An Underestimated Role in Human and Animal Health?" Frontiers in Cellular and Infection Microbiology (2014) vol. 4, Article 39, 11 pages total.
European Communication (Extended European Search Report) issued by the European Patent Office in European Application No. 18805942.2 dated Apr. 22, 2021, 13 pages total.
European Communication (pursuant to Rule 164(1) EPC) issued by the European Patent Office in European Application No. 18805942.2 dated Jan. 22, 2021, 9 pages total. Verify Total Page Numbers.
Lepage, P. et al., "Dysbiosis in Inflammatory Bowel Disease: A Role for Bacteriophages?" Gut Microbiota (2008) vol. 57, No. 3, pp. 424-425.
Santiago-Rodriguez, T.M. et al., "Transcriptome Analysis of Bacteriophage Communities in Periodontal Health and Disease," BMC Genomics (2015) vol. 16, No. 549, 9 pages total.
Tetz, G. et al., "Bacteriophages as Potential New Mammalian Pathogens," Scientific Reports (2017) vol. 7, No. 7043, 9 pages total.
Tetz, G. et al., "Parkinson's Disease and Bacteriophages as its Overlooked Contributors," Scientific Reports (2018) vol. 8, No. 10812, 11 pages total.
Wagner, J. et al., "Bacteriophages in Gut Samples from Pediatric Crohn's Disease Patients: Metagenomic Analysis Using 454 Pyrosequencing" HHS Public Access Author Manuscript (2013) vol. 19, No. 8, pp. 1598-1608.
Aviv, O. et al., "Poly(hexamethylene guanidine)-poly(ethylene glycol) Solid Blend for Water Microbial Deactivation" Polymer Degradation and Stability (2016) vol. 129, pp. 1-21.
Communication (International Preliminary Report on Patentability) issued by the International Searching Authority in International Application No. PCT/US2018/028640 dated Nov. 26, 2019, 19 pages total.
Communication (International Preliminary Report on Patentability) mailed in International Application No. PCT/US19/39732 mailed Dec. 29, 2020, 10 pages total.
Elena Biagi et al, "Gut Microbiota and Extreme Longevity", Current Biology, GB, (Jun. 1, 2016), vol. 26, No. 11, doi:10.1016/j.cub.2016.04.016, ISSN 0960-9822, pp. 1480-1485, XP055683144.
Communication (International Search Report) issued by the International Searching Authority in International Application No. PCT/US2018/028640 dated Sep. 4, 2018, 8 pages total.
Communication (International Search Report) mailed in International Application No. PCT/US19/39732 mailed Nov. 6, 2019, 5 pages total.
Communication (Written Opinion) issued by the International Searching Authority in International Application No. PCT/US2018/028640 dated Sep. 4, 2018, 18 pages total.
Communication (Written Opinion) mailed in International Application No. PCT/US19/39732 mailed Nov. 6, 2019, 9 pages total.
Costa, L. et al., "Photodynamic Inactivation of Mammalian Viruses and Bacteriophages" Viruses (2012) vol. 4, pp. 1034-1075.
De Haard, H.J.W. et al., "Llama Antibodies Against a Lactococcal Protein Located at the Tip of the Phage Tail Prevent Phage Infection" Journal of Bacteriology (2005) vol. 187, No. 13, pp. 4531-4541.
Findley, K. et al., "The Skin Microbiome: A Focus on Pathogens and Their Association with Skin Disease" PLoS One (2014) vol. 10, No. 10, pp. 1-3.
Gallo, P.M. et al., "Amyloid-DNA Composites of Bacterial Biofilms Stimulate Autoimmunity" Immunity (2015) vol. 42, No. 6, pp. 1171-1184.
Galtier, M. et al., "Bacteriophages to Reduce Gut Carriage of Antibiotic Resistant Uropathogens with Low Impact on Microbiota Composition" Environmental Microbiology (2016) vol. 18, No. 7, pp. 2237-2245.
Garneau, JE et al., "The CRISPR/Cas Bacterial immune System Cleaves Bacteriophage and Plasmid DNA" Nature (2010) vol. 468, No. 7320, pp. 67-71.
Horwich, A et al., "Protein aggregation in disease: a role for folding intermediates forming specific multimeric interactions" Journal of Clinical Investigation, Nov. 2002, vol. 110, No. 9, pp. 1221-1232.
Mirzaei, MK et al., "Isolation of Phages for Phage Therapy: A Comparison of Spot Tests and Efficiency of Plating Analyses for Determination of Host Range and Efficacy" PLoS One (2015) vol. 10, No. 3, pp. 1-13.
Newby, B.N., "Type 1 Inteferons Promote a Diabetogenic Microenvironment in Type 1 Diabetes" (2017) University of Florida, 150 pages total.
Shukla, G.S. et al., "Intravenous Infusion of Phage-Displayed Antibody Library in Human Cancer Patients: Enrichment and Cancer-Specificity of Tumor-Homing Phage-Antibodies" Cancer Immunology, Immunotherapy (2013) vol. 62, No. 8, pp. 1-14.
Tetz, G. et al., "Bacteriophage Infections of Microbiota can Lead to Leaky Gut in an Experimental Rodent Model" Gut Pathogens (2016) vol. 8, No. 33, pp. 1-4.
Tetz, G. et al., "Bacteriophages as New Human Viral Pathogens" Microrganisms (2018) vol. 6, No. 2, 12 pages total.
Tetz, G. et al., "Type 1 Diabetes: an Association Between Autoimmunity, the Dynamics of Gut Amyloid-producing *E. coli* and Their Phages" bioRxiv (2018) 433110, doi: https://doi.org/10.1101/433110, 31 pages total.
Tetz, G. et al., "Type 1 Diabetes: an Association Between Autoimmunity, the Dynamics of Gut Amyloid-producing *E. coli* and Their Phages" Scientific Reports (2019) vol. 9, No. 9685, 11 pages total.
Tursi, S.A. et al., "Bacterial Amyloid Curli Acts as a Carrier for DNA to Elicit an Autoimmune Response via TLR2 and TLR9" PLOS Pathogens (2017) vol. 13, No. 4, 25 pages total.
Zaccone, P. et al., "*Salmonella typhirnurium* Infection Halts Developmen of Type 1 Diabetes in NOD Mice, Inflammation and Innate Immunity" Eur. J. Immunol. (2004) vol. 34, No. 11, pp. 3246-3256.
Zaczek, M. et al., "Antibody Production in Response to Staphylococcal MS-1 Phage Cocktail in Patients Undergoing Phage Therapy" Frontiers in Microbiology (2016) vol. 7, No. 1681, pp. 1-14.
Supplementary European Search Report issued Feb. 9, 2022 in connection with EP Application No. 19826448.
Gianchecchi E. et al., "On the pathogenesis of insulin-dependent diabetes mellitus: the role of microbiota", Immunologic Research, Humana Press, Inc. US, vol. 65, No. 1, Jul. 16, 2016, pp. 242-256.
Vaarala O. et al., "The Perfect Storm" for Type 1 Diabetes: The Complex Interplay Between Intestinal Microbiota, Gut Permeability, and Mucosal Immunity, Diabetes, vol. 57, No. 10, Sep. 26, 2008, pp. 2555-2562.
Kosiewicz M. et al., "Relationship between gut microbiota and development of T cell associated disease", Febs Letters, Elsevier Amsterdam, NL, vol. 588, No. 22, Mar. 26, 2014, pp. 4195-4206.
Communication (International Preliminary Report on Patentability) mailed in International Application No. PCT/US19/40524 mailed Jan. 14, 2021, 12 pages total.
Biagi, E. et al., "Through Ageing and Beyond: Gut Microbiota and Inflammatory Status in Seniors and Centenarians" (2010) PLoS One vol. 5, Issue 5, pp. 1-14.

(56) References Cited

OTHER PUBLICATIONS

Claesson, M.J. et al., "Gut Microbiota Composition Correlates with Diet and Health in the Elderly" Nature (2012) vol. 488, No. 7410, pp. 178-184.
Communication (International Search Report) mailed in International Application No. PCT/US19/40524 mailed Nov. 18, 2019, 9 pages total.
Communication (Written Opinion) mailed in International Application No. PCT/US19/40524 mailed Nov. 18, 2019, 10 pages total.
Juge, R. et al., "Shift in Skin Microbiota of Western European Women Across Aging" Journal of Applied Microbiology (2018) vol. 125, No. 3, pp. 907-916.
Jylhava, J. et al., "Biological Age Predictors" EBioMedicine (2017) vol. 21, pp. 29-36.
O'Toole, P.W. et al., "Gut Microbiota and Aging" Science (2015) vol. 350, No. 6265, pp. 1214-1215, XP055669176.
Petrascheck, M. et al., "Computational Analysis of Lifespan Experiment Reproducibility" Frontiers in Genetics (2017) vol. 8, No. 92, pp. 1-11, XP055669171.
Tetz, G. et al., "Tet's Theory and Law of Longevity" Theory in Biosciences (2018) vol. 137, No. 2, pp. 145-154.
European Communication (Extended European Search Report) issued by the European Patent Office in European Application No. 19830501.3 dated Mar. 10, 2022, 11 pages total.
Jonas Zierer et al., "Integration of "omics"data in aging research: from biomarkers to systems biology", Aging Cell, vol. 14, No. 6, Aug. 30, 2015, pp. 933-944, XP055766774, gb issn: 1474-9718, DOI: 10.1111/acel.12386.
Castilla et al., "In Vitro Generation of Infectious Scrapie Prions," Cell, Apr. 22, 2005, vol. 121, pp. 195-206.
Cordeiro et al., "DNA Converts Cellular Prion Protein in the β-Sheet Conformation and Inhibits Prion Peptide Aggregation," The Journal of Biological Chemistry, Dec. 28, 2001, vol. 276, No. 52, pp. 49400-49409.
Prusiner, S. "Biology and Genetics of Prions Causing Neurodegeneration," Annual Review of Genetics, Nov. 23, 2013, vol. 47, pp. 601-623.
Kipkorir et al., "Highly Infectious CJD Particles Lack Prion Protein but Contain Many Viral-Linked Peptides by LC-MS/MS," Journal of Cellular Biochemistry, Jun. 16, 2014, vol. 115, No. 11, pp. 2012-2221.
Tetz et al., "Prion-like Domains in Eukaryotic Viruses," Scientific Reports, Jun. 12, 2018, vol. 8, pp. 1-10.
Tetz et al., "Bacterial DNA Induces the Formation of Heat-Resistant Disease-Associated 'Tezt-Proteins' in Human Plasma," bioRxiv, Apr. 9, 2019, pp. 1-24.
Tetz et al., "Effect of Deoxyribonuclease I Treatment for Dementia in End-Stage Alzheimer's Disease: a Case Report," Journal of Medical Case Reports, May 28, 2016, vol. 10, No. 1, pp. 1-3.
Written Opinion dated Jul. 23, 2019, issued in connection with international Application No. PCT/US2019/026272, 18 pages total.
International Search Report dated Jul. 23, 2019, issued in connection with international Application No. PCT/US2019/026272, 6 pages total.
Garagnani P. et al., "The Three Genetics (Nuclear DNA, Mitochondrial DNA, and Gut Microbiome) of Longevity in Humans Considered as Metaorganisms", Biomed Research Int, vol. 2014, (Jan. 1, 2014), pp. 1-14, XP055896304, ISSN: 2314-6133, DOI: 10.1155/2014/560340.
Dato Serena et al., "The genetics of human longevity: an intricacy of genes, environment, culture and microbiome", Mechanisms of Ageing and Development, (Jul. 1, 2017), vol. 165, doi:10.1016/J.MAD.2017.03.011, ISSN 0047-6374, pp. 147-155, XP085162845.
Xian Xia et al., "Molecular and phenotypic biomarkers of aging", F1000Research, (Jan. 1, 2017), vol. 6, doi:10.12688/f1000research.10692.1, p. 860, XP055388474.
Santoro Aurelia et al., "Gut microbiota changes in the extreme decades of human life: a focus on centenarians", CMLS Cellular and Molecular Life Sciences, Birkhauser Verlag, Heidelberg, DE, vol. 75, No. 1, doi:10.1007/S00018-017-2674-Y, ISSN 1420-682X, (Oct. 14, 2017), pp. 129-148, (Oct. 14, 2017), XP036389430.
Pitchaimani, M. et al., "Maximum Life Span Predictions Using the Gompertz Tumour Growth Model" IOSR Journal of Mathematics (2014) vol. 10, Issue 6, pp. 55-62, XP055669182.
International Report on Patentability dated Nov. 3, 2020, issued in connection with international Application No. PCT/US2019/026272, 19 pages total.
Supplementary Partial European Search Report issued Feb. 2, 2022 in connection with EP Application No. 19796997.
March Z. M. et al., "Prion-like domains as epigenetic regulators, scaffolds for subcellular organization, and drivers of neurodegenerative disease", Brain Research, Elsevier, Amsterdam, NL, vol. 1647, Mar. 19, 2016, pp. 9-18.
Stefanov K. P. et al., "Distinct modulatory role of RNA in the aggregation of the tumor suppressor protein p53 core domain", Journal of Biological Chemistry, vol. 292, No. 22, Apr. 18, 2017, pp. 9345-9357.
Janeway C. A. et al., "The complement system and innate immunity—Immunology—NCBI Bookshelf" In: "Immunobiology: The Immune System in Health and Disease", Jan. 1, 2001, Garland Science, New York, pp. 1-14.
Sim et al., "Nucleophilic compounds acting on C3 and C4", Activators and Inhibitors of Complement, Springer Netherlands, Dordrecht, pp. 107-125, Oct. 31, 1992.
Fernandez-Pol Alberto J. et al., "Genomics, Proteomics and Cancer: Specific Ribosomal, Mitochondrial, and Tumor Reactive Proteins Can Be Used as Biomarkers for Early Detection of Breast Cancer in Serum", Cancer Genomics & Proteomics, vol. 2, No. 1, Jan. 1, 2005, pp. 1-24.
Kumari V. S. et al., "Complement C5a Receptor Facilitates Cancer Metastasis by Altering T-Cell Responses in the Metastatic Niche", Cancer Research, vol. 74, No. 13, Jul. 1, 2014, pp. 3454-3465 and Kumari V. S., "Supplemental Figure Legends for "Complement C5a Receptor Facilitates Cancer Metastasis by Altering T-Cell Responses in the Metastatic Niche" Cancer Research, Jul. 1, 2014, pp. 1-3, and Kumari V. S., "Supplemental Figures for "Complement C5a Receptor Faciliates Cancer Metastasis by Altering T-Cell Responses in the Metastatic Niche", Cancer Research, Jul. 1, 2014, pp. 1-5.
Office Action issued Feb. 2, 2024 in connection with U.S. Appl. No. 16/616,231.
Billie et al., LoS ONE: 3(12):e3885 (2008).

* cited by examiner

1: Complement C3

>sp|P01024|CO3_HUMAN Complement C3 OS=Homo sapiens GN=C3 PE=1 SV=2
MGPTSGPSLLLLLLTHLPIALGSPMYSIITPNILRLESEETMVLEAHDAQGDVPVTVTVH
DFPGKKLVLSSEKTVLTPATNHMGNVTFTIPANREFKSEKGRNKFVTVQATFGTQVVEKV
VLVSLQSGYLFIQTDKTIYTPGSTVLYRIFTVNHKLLPVGRTVMVNIENPEGIPVKQDSL
SSQNQLGVLPLSWDIPELVNMGQWKIRAYYENSPQQVFSTEFEVKEYVLPSFEVIVEPTE
KFYYIYNEKGLEVTITARFLYGKKVEGTAFVIFGIQDGEQRISLPESLKRIPIEDGSGEV
VLSRKVLLDGVQNPRAEDLVGKSLYVSATVILHSGSDMVQAERSGIPIVTSPYQIHFTKT
PKYFKPGMPFDLMVFVTNPDGSPAYRVPVAVQGEDTVQSLTQGDGVAKLSINTHPSQKPL
SITVRTKKQELSEAEQATRTMQALPYSTVGNSNNYLHLSVLRTELRPGETLNVNFLLRMD
RAHEAKIRYYTYLIMNKGRLLKAGRQVREPGQDLVVLPLSITTDFIPSFRLVAYYTLIGA
SGQREVVADSVWVDVKDSCVGSLVVKSGQSEDRQPVPGQQMTLKIEGDHGARVLVAVDK
GVFVLNKNLIQSKIWDVEKADIGCTPGSGKDYAGVFSDAGLTFTSSSGQTAQRAEL
QCPQPAARRRSVQLTEKRMDKVGKYPKELRCCEDGMRENPMRFSCQRRTRFISLGEAC
KKVFLDCCNYITELRRQHARASHLGLARSNLDEDIIAEENIVSRSEFPESWLWNVEDLKE
PPKNGISTKLMNIFLKDSITTWEILAVSMSDKKGICVADPFEVTVMQDFFIDLRLPYSVV
RNEQVEIRAVLYNYRQNQELKVRVELLHNPAFCSLATTKRRHQTVTIPPKSSLSVPYVI
VPLKTGLQEVEVKAAVYHHFISDGVRKSLKVVPEGIRMNKTVAVRTLDPERLGREGVQKE
DIPPADLSDQVPDTESETRILLQGTPVAQMTEDAVDAERLKHLIVTPSGCGEQNMIGMTP
TVIAVHVLDTETQWEKFGLEKRQGALELIKKGYTQQLAFRQPSSAFAAFVKRAPSTWLTA
YVVKVFSLAVNLIAIDSQVLCGAVKWLILEKQKPDGVFQEDAPVIHQEMIGGLRNNNEKD
MALTAFVLISLQEAKDICEEQVNSLPGSITKAGDFLEANYMNLQRSYTVAIAGYALAQMG
RLKGPLLNKFLTTAKDKNRWEDPGKQLYNVEATSYALLALLQLKDFDEVPPVRWLNEQR
YYGGGYGSTQATFMVFQALAQYQKDAPDHQELNLDVSLQLPSRSSKITHRIHWESASLLR
SEETKENEGFTVTAEGKGQGTLSVVTMYHAKAKDQLTCNKFDLKVTIKPAPETEKRPQDA
KNTMILEICTRYRGDQDATMSILDISMMTGFAPDTDDLKQLANGVDRYISKYELDKAFSD
RNTLIIYLDKVSHSEDDCLAFKVHQYFNVELIQPGAVKVIAYYNLEESCTRFYHPEKEDG
KLNKLCRDELCRCAEENCFIQKSDDKVTLEERLDKACEPGVDYVYKTRLVKVQLSNDFDE
YIMAIEQTIKSGSDEVQVGQQRTFISPIKCREALKLEEKKHYLMWGLSSDFWGEKPNLSY
IIGKDTWVEHWPEEDECQDEENQKQCQDLGAFTESMVFGCPN (SEQ ID NO: 6)

Fig. 6A

```
   1 MGPTSGPSLLLLITHLPIALGSPMYSIITPNILRLESEETMVLEAHDAQGDVPVTVTVHDFPGKKLVLSSEKTVLTPATNHMGNVTFTIPANREFKSEK
 101 GRNKFVTVQATEGTQVEKVIVSLQSGYLFIQIDKTIYTPGSTVLYRIFTVNHKLPVGRTVMVNIENPEGIPVKQDSLSSQNQLGVLPLSWDIPELVN
 201 MGQWKIRAYENSPQQVFSTEFEVKEYVLPSFEVIVEPTEKFYIYNEKGLEVITARFLYGKKVEGTAFVIFGIQDGEQRISLPESLKRIPIEDGSGEV
 301 VLSRKVLLDGVQNPRAEDLVGKSLYVSATVILHSGSDMVQAERSGIPIVTSPYQIHFTKTPKYFKPGMPFDLMFVTNPDGSPAYRVPVAVQGEDTVQSL
 401 TQGDGVAKLSINTHPSQRPLSITVRTKKQELSEAEQATRMQALPYSTVGNSMNYLHLSVLRTELRPGETLNVNELLRMDRAHEAKIRYYTYLIMNKGRL
 501 LKAGRQVREPGQDLVVLPLSITTDFIPSFRLVAYYTLIGASGQREVADSVNVDVKDSCVGSLVVKSGQSEDRQPVPGQQMTLKIEGDHGARVLVAVDK
 601 GVFVLNKKNKLTQSKINDVVEKADIGCTPGSGKDYAGVFSDAGLTFTSSSCCQTAQRAELQCPQPAARRRSVQLTEKRMDKVGKYPKELRKCCEDGMRE
 701 NPMRFSCQRRTRFISLGEACKVFLDCCNYITELRQHARASHGLARSNLDEDITAEENIVSRSEFPESWLMNVEDLKEPPKNGISTKLMNIFLKDSIT
 801 TWEITAVSMSDKKGICVADPFEVIVMQDFFIDLRLPYSVRNEQVEIRAVLYNYRQNQELKVVELLHNPAFCSLATTKRRHQQTVTIPPKSSLSVPYVI
 901 VPLKIGLQFEVEVKAAVYHHFISDGVRKSLKVVPEGIRMNKTVAVRTLDPERLGREGVQKEDIPPADLSDQVPDTESETRILLQGTPVAQMTEDAVDAERL
1001 KHLIVTPSGCGEQNMIGMTPTVIAVHYLDETEQWEKFGLEKRQGALELIKKGYTQQLAFRQPSSAFAAFVKRAPSTWLTAYVKVFSLAVNLIAIDSQVL
1101 CGAVKWLILEKQKPDGVFQEHDAPVIHQEMIGGLRNNEKDMALTAFVLISLQEAKDICEEQVNSLPGSITKAGDFLEANYMNLQRSYITVAIAGYALAQMG
1201 RLKGPLNKEITTAKDNRWEDPGKQLYNVEATSYALLALALIQLKDFEVPPVVRWLNEQRYIGGYGSTQATFMVFQALAQYQKDAPDHQELNLDVSLQL
1301 PSRSSKITHRIHWESASLLRSEETKENEGEIVTAEGKGQGTLSVIMYHAKAKDQLTCNKFDLKVTIKPAPETEKRPQDAKNTMILEICTRYGDQDATM
1401 SILDISMTGFAPDTDDLKQLANGVDRYISKYELDKAFSDRNTLIIYLDKVSHSEDDCLAFKVHQYFNVELIQPGAVKVYAYNLEESCTREYHPEKEDG
1501 KLNKLCRDELCRCAEENCFIQKSDDKVILEERLDKACEPGVDYVYKTRLVKVQLSNDFDEYIMAIEQTIKSGSDEVQGGQQRTFISPIKCREALKEKK
1601 HYLMWGLSSDTWGEKPNLSYIIGKDTMVEHWPEEDECQDEENQKCQDLGAFTESMVVFGCPN
                                                                                          (SEQ ID NO: 6)
```

Fig. 6A (cont.)

Inter-alpha-trypsin inhibitor heavy chain H

>sp|Q14624|ITIH4_HUMAN Inter-alpha-trypsin inhibitor heavy chain H4 OS=Homo sapiens GN=ITIH4 PE=1 SV=4
MKPPRPVRTCSKVLVLLSLLAIHQTTAEKNGIDIYSLTVDSRVSSRFAHTVVTSRVVNR
ANTVQEATFQMELPKKAFITNFSMIIDGMTYPGIIKEKAEAQAQYSAAVAKGKSAGLVKA
TGRNMEQFQVSVSVAPNAKITFELVYEELLKRRLGVYELLLKVRPQQLVKHLQMDIHIFE
PQGISFLETESTFMTNQLVDALTTWQNKTKAHIRFKPTLSQQKSPEQQETVLDGNLIIR
YDVDRAISGGSIQIENGYFVHYFAPEGLTTMPKNVVFVIDKSGSMSGRKIQQTREALIKI
LDDLSPRDQFNLIVFSTEATQWRPSLVPASAENVNKARSFAAGIQALGGTNINDAMLMAV
QLLDSSNQEERLPEGSVSLIILLTDGDPTVGETNPRSIQNNVREAVSGRYSLFCLGFGFD
VSYAFLEKLALDNGGLARRIHEDSDSALQLQDFYQEVANPLLTAVTFEYPSNAVEEVTQN
NFRLLFKGSEMVVAGKLQDRGPDVLTATVSGKLPTQNITFQTESSVAEQEAEFQSPKYIF
HNFMERLWAYLTIQQLLEQTVSASDADQQALRNQALNLSLAYSFVTPLTSMVTKPDDQE
QSQVAEKPMEGESRNRNVHSGSTFFKYLQGAKIPKPEASFSPRRGWNRQAGAAGSRMNF
RPGVLSSRQLGLPGPPDVPDHAAYHPFRRLAILPASAPPATSNPDPAVSRVMNMKIEETT
MTTQTPAPIQAPSAILPLPGQSVERLCVDPRHRQGPVNLLSDPEQGVEVTGQYEREKAGF
SMIEVTEKNPLVWHASPEHVVTRNRRSSAYKWKETLFSVMPGLKMTMDKTGLLLLSDP
DKVTIGLLFWDGRGEGLRLLRDTDRFSSHVGGTIGQFYQEVLWGSPAASDDGRRTLRVQ
GNDHSATRERRLDYQEGPPGVEISCWSVEL (SEQ ID NO: 7)

Fig. 6B

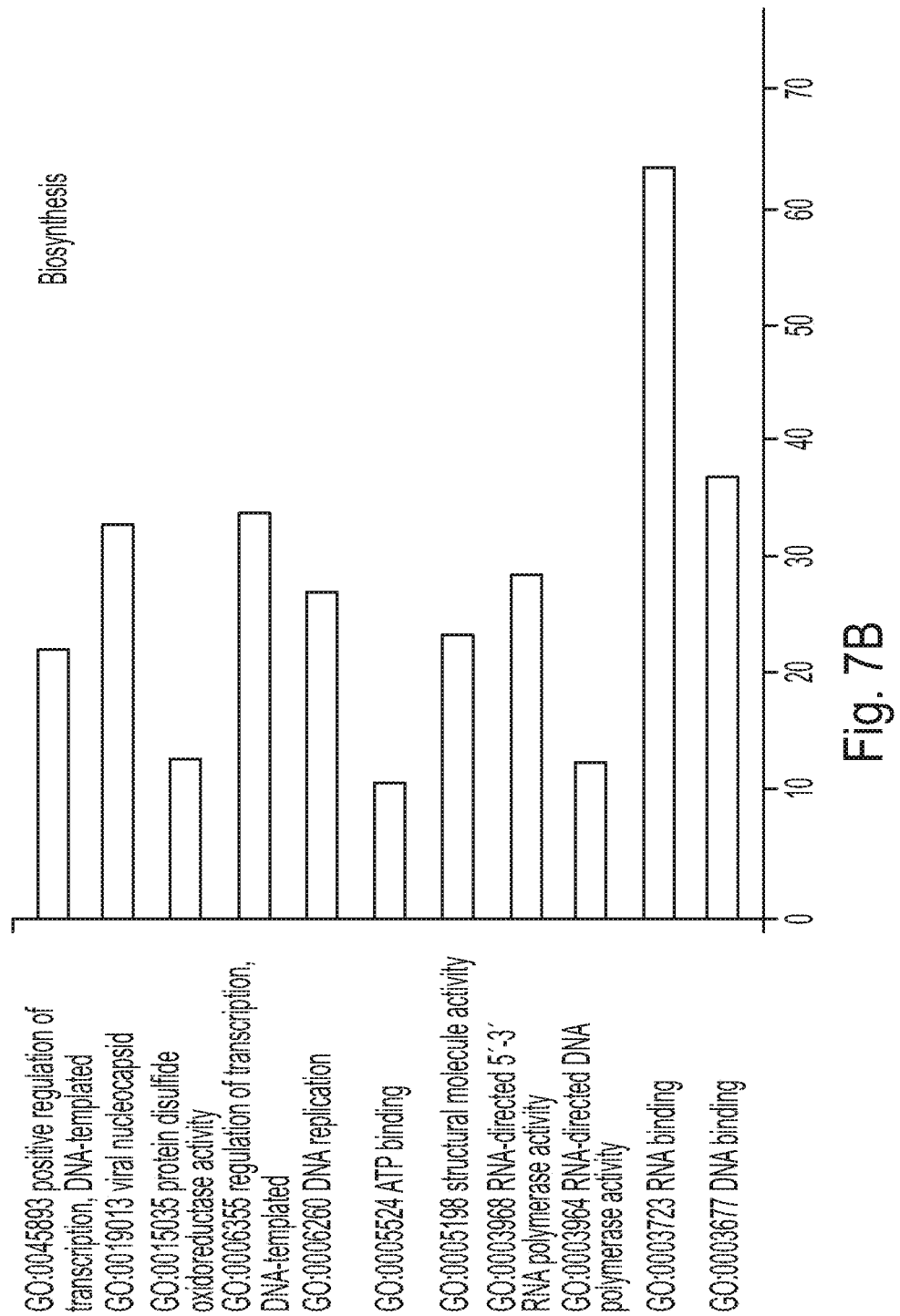

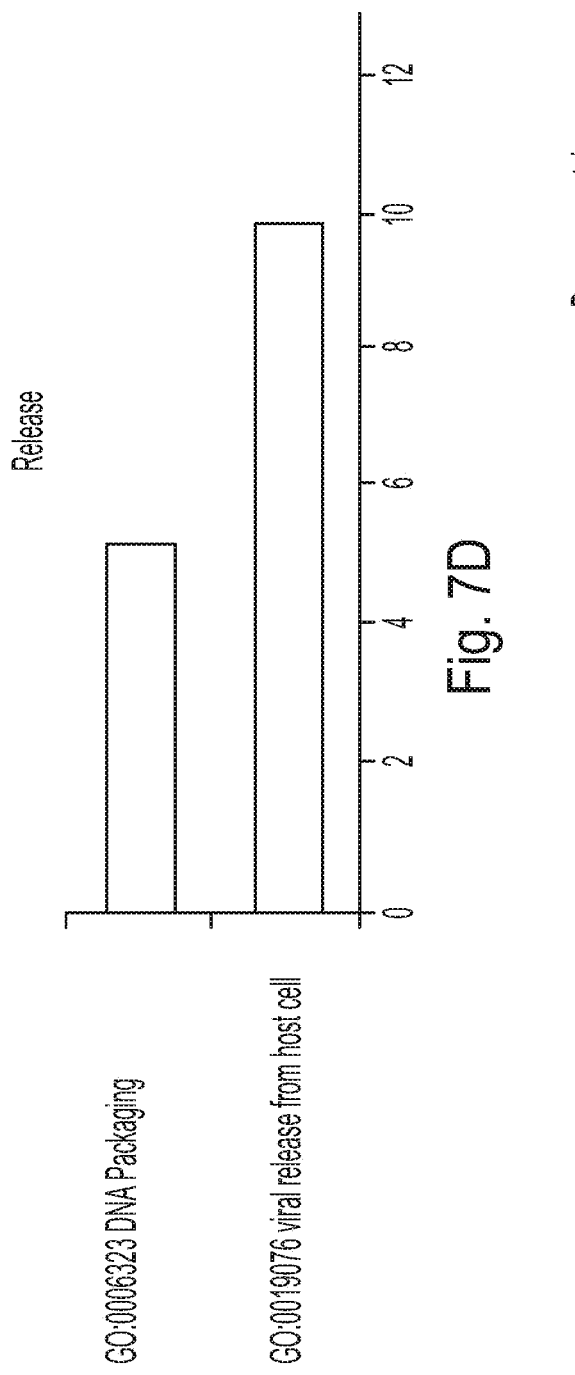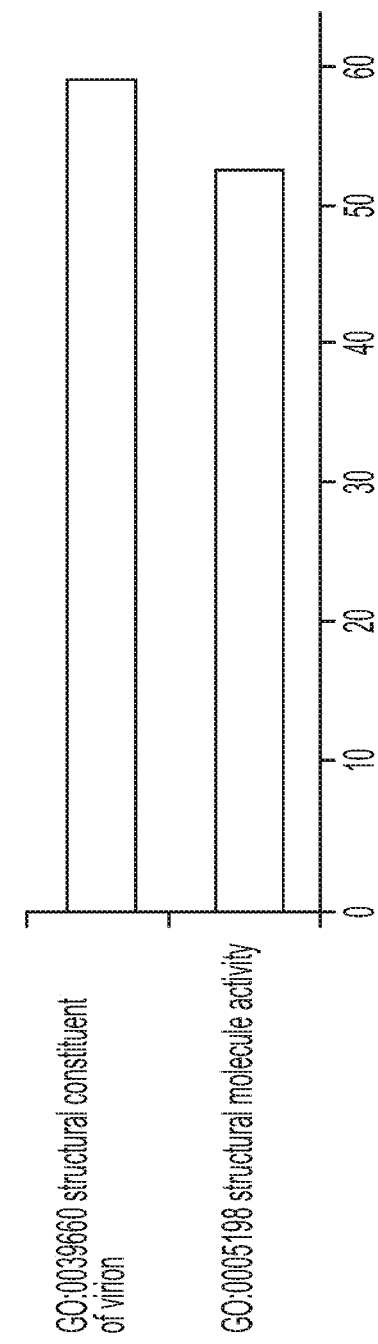

1. Alpha-1-antitrypsin

>sp|P01009|A1AT_HUMAN Alpha-1-antitrypsin OS=Homo sapiens GN=SERPINA1 PE=1 SV=3
MPSSVSWGILLLAGLCCLVPVSLAEDPQGDAAQKTDTSHHDQDHPTFNKITPNLAEFAFS
LYRQLAHQSNSTNIFFSPVSIATAFAMLSLGTKADTHDEILEGLNFNLTEIPEAQIHEGF
QELLRTLNQPDSQLQLTTGNGLFLSEGLKLVDKFLEDVKKLYHSEAFTVNFGDTEEAKKQ
INDYVEKGTQGKIVDLVKELDRDTVFALVNYIFFKGKWERPFEVKDTEEEDFHVDQVTTV
KVPMMKRLGMFNIQHCKKLSSWVLLMKYLGNATAIFFLPDEGKLQHLENELTHDIITKFL
ENEDRRSASLHLPKLSITGTYDLKSVLGQLGITKVFSNGADLSGVTEEAPLKLSKAVHKA
VLTIDEKGTEAAGAMFLEAIPMSIPPEVKFNKPFVFLMIEQNTKSPLFMGKVVNPTQK (SEQ ID NO: 8)

Fig. 9A

Fibrinogen gamma chain OS

>sp|P02679|FIBG_HUMAN Fibrinogen gamma chain OS=Homo sapiens GN=FGG PE=1 SV=3
MSWSLHPRNLILYFYALLFLSSTCVAVVATRDNCCILDERFGSYCPTTCGIADFLSTYQT
KVDKDLQSLEDILHQVENKTSEVKQLIKAIQLTYNPDESSKPNMIDAATLKSRKMLEEIM
KYEASILTHDSSIRYLQEIYNSNNQKIVNLKEKVAQLEAQCQEPCKDTVQIHDITGKDCQ
DIANKGAKQSGLYFIKPLKANQQFLVCEIDGSGNGWTVFQKRLDGSVDFKKNWIQYKEG
FGHLSPTGTTEFWLGNEKIHLISTQSAIPYALRVELEDWNGRTSTADYAMFKVGPEADKY
RLTYAYFAGGDAGDAFDGFDDPSDKFFTSHNGMQFSTWDNDNDKFEGNCAEQDGSGW
WMNKCHAGHLNGVYYQGGTYSKASTPNGYDNGIIWATWKTRWYSMKKTTMKIIPFNRLTI
GEGQQHLGGAKQVRPEHPAETEYDSLYPEDDL (SEQ ID NO: 9)

Fig. 9B

VACCINE COMPRISING PROTEIN-TARGETED (PT) EXTRACELLULAR DNA ISOLATED FROM BACTERIAL MATRIX

CROSS-REFERENCE TO RELATED APPLICATIONS

This application is a U.S. National Phase of International Patent Application No. PCT/US2019/026272, filed on Apr. 8, 2019, which published as WO 2019/212694 A1 on Nov. 7, 2019, and claims priority to U.S. Provisional Application Ser. No. 62/664,670, filed on Apr. 30, 2018, the contents of which are incorporated herein by reference in its entirety.

SEQUENCE LISTING

The instant application contains a Sequence Listing which has been submitted electronically in ASCII format and is hereby incorporated by reference in its entirety. Said ASCII copy, created on Apr. 8, 2019, is named SequenceListing_ST25.txt and is 19,727 bytes in size.

FIELD OF THE INVENTION

The invention relates to diagnosis, prevention, and treatment of diseases and conditions associated with the functions of prion-like or Tetz-proteins.

BACKGROUND OF THE INVENTION

Prions are molecules characterized by self-propagation, which can undergo a conformational switch leading to the creation of new prions. Prion proteins have originally been associated with the development of mammalian pathologies; however, recently they have been shown to contribute to the environmental adaptation in a variety of prokaryotic and eukaryotic organisms. Prions lead to the misfolding of proteins. Together with the previously demonstrated pathogenic roles of prions during the development of different mammalian diseases, including neurodegenerative disease, prions have recently been shown to represent an important functional component in many prokaryotic and eukaryotic organisms and bacteriophages.

It is known that there are prion proteins capable of acquiring a specific molecule configuration denoted as beta-structure. Prions with a beta structure have special physico-chemical and functional biological characteristics and possess thermal stability. Prions play a role in the emergence of various human and animal diseases. Prion diseases are characterized by one or more symptoms of dementia and/or cognitive impairments, that include, for example, Creutzfeldt-Jakob Disease, variant Creuzfeldt-Jakob Disease, Gerstmann-Sträussler-Scheinker disease, fatal familial insomnia, and kuru. Simultaneously, there are thermostable proteins that do not have prion-like sequences of amino acids in their structure. Some thermostable proteins are formed under external effects, including proteases. The unique characteristics of prions allow them to actively participate in changing the properties of other proteins, and in some cases, cause severe, incurable diseases of humans and animals.

The previously unknown widespread occurrence of prion-like proteins and proteins with prion-like domains among animals, humans, bacteria, archaea, fungi and viruses makes their detection relevant for diagnostic purposes, and more-over might be an important approach for the therapy and prevention of various diseases.

Recently, prions and their infectious forms have attracted a lot of research attention (Eisenberg and Jucker, 2012; Morales, 2017). The infectious prion forms (PrPSc) represent the misfolded normal proteins (PrPC) and were shown to be infectious, since they can self-propagate and interact with the endogenous PrPC, catalyzing their conversion into pathological PrPScs (Prusiner 1998; Ma, 2002; Stefani, 2004; Cobb and Surewicz, 2009). PrPSc had been primarily known as inducers of transmissible spongiform encephalopathies, however, today they have been shown to be involved in the development of a variety of neurodegenerative diseases (Goedert et al., 2010; Furukawa and Nukina, 2013; Prusiner, 2013).

Prion proteins (PrPs) are characterized by self-propagation, undergoing a conformational switch from one conformational state to another which leads to the creation of new prions. Pathologically, prions are characterized by a process in which the infectious form of prion (PrPSc) interacts with the endogenous PrPs, catalyzing the transformation of the endogenous molecule into misfolded PrPSc aggregates.

Many PrPs contain prioniogenic domains (PrDs), whose functionalities and distribution in different viral families and species have not be determined to date.

SUMMARY OF THE INVENTION

In one aspect is provided a method of diagnosing a disease in a subject, which method comprises: a) heating a sample collected from the subject for 10 seconds to 48 hours at a temperature from 43° C. to 200° C., b) isolating a soluble protein fraction in the sample after the completion of the heating, c) determining the level of one or more polypeptides in the soluble protein fraction isolated in step (b), d) comparing the level of the one or more polypeptides identified in step (c) with a control level(s) of said polypeptide(s), and e) (i) identifying the subject as being afflicted with the disease when the level(s) of said one or more polypeptides is different by 10% or more from the control level(s), or (ii) identifying that the subject is not afflicted with the disease if the level(s) of said one or more polypeptides differs from the control level(s) by less than 10%.

In another aspect is provided a method of monitoring changes in development of a disease in a subject, which method comprises: a) heating a first sample collected from the subject for 10 seconds to 48 hours at a temperature from 43° C. to 200° C., b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject at later time points than the first sample, e) comparing the levels of the one or more polypeptides identified in step (c) with the level(s) of said polypeptide(s) identified in step (d), and f) (i) determining that the disease has progressed when the level(s) of the one or more polypeptides identified in step (d) is higher than the level(s) of said polypeptide(s) identified in step (c), or (ii) determining that the disease has not progressed when the level(s) of the one or more polypeptides identified in step (d) is not higher than the level(s) of said polypeptide(s) identified in step (c).

In another aspect is provided a method of monitoring the effect of a treatment on development of a disease in a subject who had been previously diagnosed with the disease, which method comprises: a) heating a first sample collected from the subject for 10 seconds to 48 hours at a temperature from 43° C. to 200° C., wherein said first sample has been collected from the subject prior to initiation of the treatment, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject after initiation of the treatment, e) comparing the levels of the one or more polypeptides identified in step (c) with the level(s) of said polypeptide(s) identified in step (d), and f) (i) determining that the treatment is effective when the level(s) of the one or more polypeptides identified in step (d) is the same or lower than the level(s) of said polypeptide(s) identified in step (c), or (ii) determining that treatment is not effective when the level(s) of the one or more polypeptides identified in step (d) is higher than the level(s) of said polypeptide(s) identified in step (c).

In another aspect is provided a method for identifying a compound useful for slowing down the progression or treating a disease in a subject who had been previously diagnosed with the disease, which method comprises: a) heating a first sample collected from the subject for 10 seconds to 48 hours at a temperature from 43° C. to 200° C., wherein said first sample has been collected from the subject prior to administration of a test compound, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject after administration of the test compound, e) comparing the levels of the one or more polypeptides identified in step (c) with the level(s) of said polypeptide(s) identified in step (d), and f) (i) determining that the test compound is useful for slowing down the progression or treating the disease when the level(s) of the one or more polypeptides identified in step (d) is the same or lower than the level(s) of said polypeptide(s) identified in step (c), or (ii) determining that the test compound is not useful for slowing down the progression or treating the disease when the level(s) of the one or more polypeptides identified in step (d) is higher than the level(s) of said polypeptide(s) identified in step (c).

In some embodiments of any of the above methods, the sample is heated for 5 seconds to 15 minutes at 80-120° C. In one embodiment, the sample is heated for 5 seconds to 15 minutes at about 100° C. In one embodiment, the sample is heated for about 30 minutes at about 50° C. In one embodiment, the method further comprises adding a polynucleotide molecule to the sample. In one embodiment, the polynucleotide molecule is added to the sample after step (a) and before step (b). In one embodiment, the polynucleotide molecule is added to the sample before step (a). In one embodiment, the polynucleotide molecule is DNA. In one embodiment, the polynucleotide molecule is RNA. In one embodiment, the sample is incubated in the presence of the polynucleotide molecule for 1 minute to 72 hours at 20-60° C. In one embodiment, the sample is incubated in the presence of the polynucleotide molecule for 30 minutes to 5 hours at 30-40° C. In one embodiment, the sample is incubated in the presence of the polynucleotide molecule for about 10 to 120 minutes at about 37° C.

In one embodiment, the polynucleotide molecule is added at the final concentration of 0.1 ng/ml to 2000 µg/ml. In one embodiment, the polynucleotide molecule is added at the final concentration of 100-10000 ng/ml. In one embodiment, the method further comprises adding a protease.

In one embodiment, the protease is added after step (a) and before step (b). In one embodiment, the protease is added before step (a). In one embodiment, the sample is incubated in the presence of the protease for 30 seconds to 5 days at 20-200° C. In one embodiment, the sample is incubated in the presence of the protease for about 30 minutes to 5 hours at 30-40° C. In one embodiment, the sample is incubated in the presence of the protease for about 10 to 120 minutes at about 37° C.

In various embodiments of the above methods, the protease is proteinase K.

In various embodiments of the above methods, the protein fraction is a soluble protein fraction. In various embodiments of the above methods, the protein fraction is an insoluble protein fraction.

In another aspect is provided a method of diagnosing a disease in a subject, which method comprises: a) adding to a sample collected from the subject a polynucleotide molecule and incubating the sample with said polynucleotide molecule, b) isolating a protein fraction in the sample, c) determining the level of one or more polypeptides in the soluble protein fraction isolated in step (b), d) comparing the level of the one or more polypeptides identified in step (c) with a control level(s) of said polypeptide(s), and e) (i) identifying the subject as being afflicted with the disease when the level of said one or more polypeptides is different by 10% or more from the control level, or (ii) identifying that the subject is not afflicted with the disease if the level of said one or more polypeptides differs from the control level by less than 10%.

In another aspect is provided a method of monitoring changes in development of a disease in a subject, which method comprises: a) adding to a first sample collected from the subject a polynucleotide molecule and incubating the sample with said polynucleotide molecule, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject at later time points than the first sample, e) comparing the levels of the one or more polypeptides identified in step (c) with the level(s) of said polypeptide(s) identified in step (d), and f) (i) determining that the disease has progressed when the level(s) of the one or more polypeptides identified in step (d) is higher than the level(s) of said polypeptide(s) identified in step (c), or (ii) determining that the disease has not progressed when the level(s) of the one or more polypeptides identified in step (d) is not higher than the level(s) of said polypeptide(s) identified in step (c).

In another aspect is provided a method of monitoring the effect of a treatment on development of a disease in a subject who had been previously diagnosed with the disease, which method comprises: a) adding to a first sample collected from the subject a polynucleotide molecule and incubating the sample with said polynucleotide molecule, wherein said first sample has been collected from the subject prior to initiation of the treatment, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject after initiation of the treatment, e) comparing the levels of the one or more polypeptides identified in step (c) with the level(s) of said polypeptide(s) identified in step (d), and f) (i) determining that the treatment is effective when the level(s) of the one or more polypeptides identified in step (d) is the same or lower than the level(s) of said polypeptide(s) identified in step (c), or (ii) determining that treatment is not effective when the level(s) of the one or more polypeptides identified in step (d) is higher than the level(s) of said polypeptide(s) identified in step (c).

In another aspect is provided a method for identifying a compound useful for slowing down the progression or treating a disease in a subject who had been previously diagnosed with the disease, which method comprises: a) adding to a first sample collected from the subject a polynucleotide molecule and incubating the sample with said polynucleotide molecule, wherein said first sample has been collected from the subject prior to administration of a test compound, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject after administration of the test compound, e) comparing the levels of the one or more polypeptides identified in step (c) with the level(s) of said polypeptide(s) identified in step (d), and f) (i) determining that the test compound is useful for slowing down the progression or treating the disease when the level(s) of the one or more polypeptides identified in step (d) is the same or lower than the level(s) of said polypeptide(s) identified in step (c), or (ii) determining that the test compound is not useful for slowing down the progression or treating the disease when the level(s) of the one or more polypeptides identified in step (d) is higher than the level(s) of said polypeptide(s) identified in step (c).

In some embodiments, the polynucleotide molecule is DNA. In some embodiments, the polynucleotide molecule is RNA. In some embodiments, the sample is incubated in the presence of the polynucleotide molecule for 1 minute to 72 hours at 20-60° C. In some embodiments, the sample is incubated in the presence of the polynucleotide molecule for 30 minutes to 5 hours at 30-40° C. In some embodiments, the sample is incubated in the presence of the polynucleotide molecule for about 1 minute to 24 hours at about 37° C. In some embodiments, the polynucleotide molecule is added at the final concentration of 0.1 ng/ml to 2000 µg/ml. In some embodiments, the polynucleotide molecule is added at the final concentration of 100-10000 ng/ml.

In another aspect is provided a method of diagnosing a disease in a subject, which method comprises: a) adding to a sample collected from the subject a protease and incubating the sample with said protease, b) isolating a soluble protein fraction in the sample, c) determining the level of one or more polypeptides in the soluble protein fraction isolated in step (b), d) comparing the level of the one or more polypeptides identified in step (c) with a control level(s) of said polypeptide(s), and e) (i) identifying the subject as being afflicted with the disease when the level of said one or more polypeptides is different by 10% or more from the control level, or (ii) identifying that the subject is not afflicted with the disease if the level of said one or more polypeptides differs from the control level by less than 10%.

In another aspect is provided a method of monitoring changes in development of a disease in a subject, which method comprises: a) adding to a first sample collected from the subject a protease and incubating the sample with said protease, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject at later time points than the first sample, e) comparing the levels of the one or more polypeptides identified in step (c) with the level(s) of said polypeptide(s) identified in step (d), and f) (i) determining that the disease has progressed when the level(s) of the one or more polypeptides identified in step (d) is higher than the level(s) of said polypeptide(s) identified in step (c), or (ii) determining that the disease has not progressed when the level(s) of the one or more polypeptides identified in step (d) is not higher than the level(s) of said polypeptide(s) identified in step (c).

In another aspect is provided a method of monitoring the effect of a treatment on development of a disease in a subject who had been previously diagnosed with the disease, which method comprises: a) adding to a first sample collected from the subject a protease and incubating the sample with said protease, wherein said first sample has been collected from the subject prior to initiation of the treatment, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject after initiation of the treatment, e) comparing the levels of the one or more polypeptides identified in step (c) with the level(s) of said polypeptide(s) identified in step (d), and f) (i) determining that the treatment is effective when the level(s) of the one or more polypeptides identified in step (d) is the same or lower than the level(s) of said polypeptide(s) identified in step (c), or (ii) determining that treatment is not effective when the level(s) of the one or more polypeptides identified in step (d) is higher than the level(s) of said polypeptide(s) identified in step (c).

In another aspect is provided a method for identifying a compound useful for slowing down the progression or treating a disease in a subject who had been previously diagnosed with the disease, which method comprises: a) adding to a first sample collected from the subject a protease and incubating the sample with said protease, wherein said first sample has been collected from the subject prior to administration of a test compound, b) isolating a soluble protein fraction in the first sample after the completion of the heating, c) determining the level of one or more polypeptides in the soluble protein fraction isolated in step (b), d) repeating steps (a)-(c) for one or more additional samples, wherein said additional samples have been collected from the subject after administration of the test compound, e) comparing the levels of the one or more polypeptides identified in step (c) with the level(s) of said polypeptide(s) identified in step (d), and f) (i) determining that the test compound is useful for slowing down the progression or treating the disease when the level(s) of the one or more polypeptides identified in step (d) is the same or lower than the level(s) of said polypeptide(s) identified in step (c), or (ii) determining that the test compound is not useful for slowing down the progression or treating the disease when the level(s) of the one or more polypeptides identified in step (d) is higher than the level(s) of said polypeptide(s) identified in step (c).

In some embodiments, the sample is incubated in the presence of the protease for 30 seconds to 5 days at 20-200° C. In some embodiments, the sample is incubated in the presence of the protease for about 30 minutes to 5 hours at 30-40° C. In some embodiments, the sample is incubated in the presence of the protease for about 1 minute to 24 hours at about 37° C. In some embodiments, the protease is proteinase K. In some embodiments, the polypeptide is a full-length protein or a full-length subunit of a protein complex. In some embodiments, the polypeptide is a fragment of a full-length protein.

In some embodiments, the fragment of a full-length protein is a domain of said full-length protein.

In various embodiments of the above methods, the control level is a predetermined value. In some embodiments, the control level is the level of said polypeptide in a similarly processed bodily fluid sample of one or more age-matched healthy subjects. In some embodiments, control level is the level of said polypeptide in a similarly processed bodily fluid sample from the same subject collected in the past.

In various embodiments of the above methods, the soluble protein fraction is isolated by one or more of the methods selected from centrifugation, filtering, treatment with a detergent, rehydration, protein extraction, and treatment with a chaotropic buffer. In some embodiments, the detergent is SDS.

In various embodiments of the above methods, the polynucleotide comprises from 2 to 1,000,000 nucleotides or base pairs. In various embodiments of the above methods, the polynucleotide is from 10 base pairs to 1,000,000 nucleotides or base pairs. In various embodiments of the above methods, the polynucleotide molecule is of human, viral or bacterial origin.

In various embodiments of the above methods, the one or more of the polypeptides are selected from the proteins listed in Table 4, 5, 6, 7, 8, 10, 11, 19, 23, 24, or 27.

In various embodiments of the above methods, the levels of two or more polypeptides are measured. In some embodiments, the levels of five or more polypeptides are measured. In some embodiments, the levels of twenty or more polypeptides are measured.

In various embodiments of the above methods, the polypeptide level is calculated as the sum of each of the measured polypeptide levels. In some embodiments, the sum of each of the measured polypeptide levels is weighted.

In various embodiments of the above methods, the sample is selected from a bodily fluid sample, cells, cell lysate, tissue sample, tumor sample, and a microbial biofilm matrix. In some embodiments, the bodily fluid sample is selected from whole blood, plasma, serum, cerebrospinal fluid, amniotic fluid, urine, and saliva.

In various embodiments of the above methods, the subject is human.

In various embodiments of the above methods, the disease is selected from a cancer, an infection, a neurodegenerative disease, a neurodevelopmental disease, an abnormal pregnancy, aging, and an autoimmune disease.

In various embodiments of the above methods, the one or more of the polypeptides does not comprise prion-like domains.

In various embodiments of the above methods, the one or more of the polypeptides is a Tetz-protein or a fragment thereof. In some embodiments, the Tetz-protein is a thermostable Tetz-protein. In some embodiments, the Tetz-protein is a non-thermostable Tetz-protein. In some embodiments, the Tetz-protein is a bacterial, archaeal, fungal, or viral protein. In some embodiments, the virus is a bacteriophage or an animal virus.

In various embodiments of the above methods, the one or more of the polypeptides is a prion-like protein or a fragment thereof. In some embodiments, the prion-like protein is a bacterial, archaeal, fungal, or viral protein. In some embodiments, the virus is a bacteriophage or an animal virus.

In various embodiments of the above methods, the one or more of the polypeptides comprises a prion-like domain (PrD). In some embodiments, the polypeptide is a bacterial, archaeal, fungal, or viral protein. In some embodiments, the virus is a bacteriophage or an animal virus.

In various embodiments of the above methods, the level of one or more polypeptides is determined using one or more methods selected from electrophoresis, chromatography, an immunoassay, mass spectrometry, and methods involving dyes.

In various embodiments of the above methods, the disease is cancer and the method comprises measuring the level of one or more proteins listed in Table 4, 5, 6, 7, 8, 9, 10, 11, 19, 23, or 24. In some embodiments, the method comprises determining the level of one or more proteins listed in Tables 5, 7, 8, or 9.

In various embodiments of the above methods, the disease is cancer and the method comprises measuring the level of one or more proteins selected from serum albumin, Fibronectin, Complement factor B, Vitamin D-binding protein, Immunoglobulin heavy constant gamma 2, Plasminogen, Inter-alpha-trypsin inhibitor heavy chain H4, Inter-alpha-trypsin inhibitor heavy chain H2, Apolipoprotein B-100, Apolipoprotein L1, Alpha-1-acid glycoprotein 2, C4b-binding protein beta chain, Immunoglobulin heavy constant gamma 1, Apolipoprotein A-II, Alpha-1-acid glycoprotein 2, Apolipoprotein B-100, Hemoglobin subunit alpha, CD5 antigen-like, Selenoprotein P, Immunoglobulin lambda constant 3, Eukaryotic translation initiation factor 5A-1, Cluster of Keratin, type II cytoskeletal 1, Keratin, type I cytoskeletal 9, Keratin, type I cytoskeletal 10, Immunoglobulin kappa variable 1-27, Chromodomain-helicase-DNA-binding protein 7, Fetuin-B, Immunoglobulin heavy constant gamma 1, Immunoglobulin heavy constant gamma 4, Immunoglobulin lambda variable 3-27, Kallikrein-2, N-lysine methyltransferase SETD6, Protein SON, Reversion-inducing cysteine-rich protein with Kazal motifs, CON_Q2UVX4, Serotransferrin, Gelsolin, Complement C2, Complement factor H-related protein 1, Pigment epithelium-derived factor, Hemoglobin subunit alpha, Complement C5, Complement C1q, Immunoglobulin lambda constant 7, Actin, cytoplasmic 1, Coagulation factor XII, Complement component C6, Calmodulin-1, Tropomyosin alpha-4, Tropomyosin beta Epididymis luminal protein 189, Tropomyosin alpha-1, and Tropomyosin alpha-3.

In various embodiments of the above methods, the disease is cancer and the method comprises measuring the level of one or more proteins selected from CON_Q2UVX4, Serotransferrin, Complement factor H-related protein 1, Pigment epithelium-derived factor, Cluster of Hemoglobin subunit alpha, Hemoglobin subunit alpha, CON_P01966, Complement C5, and Immunoglobulin lambda constant 7.

In various embodiments of the above methods, the disease is cancer and the method comprises measuring the level of one or more proteins selected from Complement C3, CON_Q2UVX4, Serotransferrin, Gelsolin, Immunoglobulin lambda constant 7, and Inter-alpha-trypsin inhibitor heavy chain H3.

In various embodiments of the above methods, the disease is a neurodegenerative, neurodevelopmental or congenital disease.

In various embodiments of the above methods, the method further comprises administering a treatment to the subject. In some embodiments, the treatment involves inhibiting expression or activity of the said one or more polypeptides. In some embodiments, the treatment involves exposure to polypeptide-specific antibodies and/or highly-specific protease treatment. In some embodiments, the one or more polypeptides comprises a prion-like domain (PrD) and the antibodies interact with said PrD. In some embodiments, the treatment involves destruction of extracellular DNA. In some embodiments, the destruction of extracellular DNA involves treatment with a DNase. In some embodiments, the treatment involves administering said one or more polypeptides to the subject.

In some embodiments, the one or more polypeptides comprises a prion-like domain (PrD) and the treatment comprises administering an effective amount of an anti-PrD drug to the subject. In one embodiment, the disease is an infection selected from a viral infection, a bacterial infection, a fungal infection, and a protozoal infection. In one embodiment, the disease is a neurodegenerative disorder. In one embodiment, the disease is selected from scrapie, Creutzfeldt-Jakob disease, Alzheimer's disease, Parkinson's disease, amyloidosis, Huntington's disease, fatal familial insomnia, ataxias, a dementia, amyotrophic lateral sclerosis, CADASIL, and diabetes.

In some embodiments, the anti-PrD drug is selected from tacrolimus, pentosan polysulfate, quinacrine, an antibody against an amyloid protein, an antibody against a nuclease, an antibody against a protease, and rituximab. In one embodiment, the antibody against an amyloid protein is an antibody against beta amyloid. In one embodiment, the antibody against a nuclease is an antibody against a DNase. In one embodiment, the antibody against a protease is an antibody against proteinase K.

In another aspect is provided a method of diagnosing a viral infection in a subject, which method comprises: a) treating a sample collected from the subject with an antibody against a prion-like domain (PrD) or a protein comprising a PrD, wherein said PrD or protein is present in said virus, and b) identifying the subject as being afflicted with the viral infection when an increased reactivity of the antibody to the PrD or the protein comprising the PrD is detected in the sample collected from the subject as compared to the antibody reactivity in a control. In some embodiments, the protein comprising the PrD is selected from the proteins recited in Table 15.

In another aspect is provided a method of treating a disease in a subject in need thereof, comprising administering to the subject an effective amount of a compound which inhibits expression or activity of one or more polypeptides selected from thermostable Tetz-proteins, non-thermostable disease-associated Tetz-proteins, proteins comprising PrDs, prion-like proteins, and fragments thereof. In some embodiments, the thermostable Tetz-proteins are heat-resistant Tetz-proteins. In some embodiments, the disease is selected from a cancer, an infection, a neurodegenerative disease, a neurodevelopmental disease, an abnormal pregnancy, aging, and an autoimmune disease. In some embodiments, the infection is selected from a viral infection, a bacterial infection, a fungal infection, and a protozoal infection. In some embodiments, the disease is selected from scrapie, Creutzfeldt-Jakob disease, Alzheimer's disease, Parkinson's disease, amyloidosis, Huntington's disease, fatal familial insomnia, ataxias, and diabetes.

In another aspect is provided a method of treating a cancer in a subject in need thereof, comprising administering to the subject an effective amount of a compound which inhibits expression or activity of one or more proteins listed in Table 4, 5, 6, 7, 8, 9, 10, 11, 19, 23, or 24. In some embodiments, the compound inhibits expression or activity of one or more proteins listed in Tables 5, 7, 8, or 9.

In another aspect is provided a method of treating a cancer in a subject in need thereof, comprising administering to the subject an effective amount of a compound which inhibits expression or activity of one or more proteins selected from serum albumin, Fibronectin, Complement factor B, Vitamin D-binding protein, Immunoglobulin heavy constant gamma 2, Plasminogen, Inter-alpha-trypsin inhibitor heavy chain H4, Inter-alpha-trypsin inhibitor heavy chain H2, Apolipoprotein B-100, Apolipoprotein L1, Alpha-1-acid glycoprotein A-II, Alpha-1-acid glycoprotein 2, Apolipoprotein B-100, Hemoglobin subunit alpha, CD5 antigen-like, Selenoprotein P, Immunoglobulin lambda constant 3, Eukaryotic translation initiation factor 5A-1, Cluster of Keratin, type II cytoskeletal 1, Keratin, type I cytoskeletal 9, Keratin, type I cytoskeletal 10, Immunoglobulin kappa variable 1-27, Chromodomain-helicase-DNA-binding protein 7, Fetuin-B, Immunoglobulin heavy constant gamma 1, Immunoglobulin heavy constant gamma 4, Immunoglobulin lambda variable 3-27, Kallikrein-2, N-lysine methyltransferase SETD6, Protein SON, Reversion-inducing cysteine-rich protein with Kazal motifs, CON_Q2UVX4, Serotransferrin, Gelsolin, Complement C2, Complement factor H-related protein 1, Pigment epithelium-derived factor, Hemoglobin subunit alpha, Complement C5, Complement C1q, Immunoglobulin lambda constant 7, Actin, cytoplasmic 1, Coagulation factor XII, Complement component C6, Calmodulin-1, Tropomyosin alpha-4, Tropomyosin beta Epididymis luminal protein 189, Tropomyosin alpha-1, and Tropomyosin alpha-3.

In another aspect is provided a method of treating a cancer in a subject in need thereof, comprising administering to the subject an effective amount of a compound which inhibits expression or activity of one or more proteins selected from serum albumin, Fibronectin, Complement factor B, Vitamin D-binding protein, Immunoglobulin heavy constant gamma 2, Plasminogen, Inter-alpha-trypsin inhibitor heavy chain H4, Inter-alpha-trypsin inhibitor heavy chain H2, Apolipoprotein B-100, Apolipoprotein L1, Alpha-1-acid glycoprotein 2, C4b-binding protein beta chain, Immunoglobulin heavy constant gamma 1, Apolipoprotein A-II, Alpha-1-acid glycoprotein 2, Apolipoprotein B-100, Hemoglobin subunit alpha, CD5 antigen-like, Selenoprotein P, Immunoglobulin lambda constant 3, Eukaryotic translation initiation factor 5A-1, Cluster of Keratin, type II cytoskeletal 1, Keratin, type I cytoskeletal 9, Keratin, type I cytoskeletal 10, Immunoglobulin kappa variable 1-27, Chromodomain-helicase-DNA-binding protein 7, Fetuin-B, Immunoglobulin heavy constant gamma 1, Immunoglobulin heavy constant gamma 4, Immunoglobulin lambda variable 3-27, Kallikrein-2, N-lysine methyltransferase SETD6, Protein SON, Reversion-inducing cysteine-rich protein with Kazal motifs, CON_Q2UVX4, Serotransferrin, Complement factor H-related protein 1, Pigment epithelium-derived factor, Cluster of Hemoglobin subunit alpha, Hemoglobin subunit alpha, CON_P01966, Complement C5, and Immunoglobulin lambda constant 7.

In another aspect is provided a method of treating a cancer in a subject in need thereof, comprising administering to the subject an effective amount of a compound which inhibits expression or activity of one or more proteins selected from serum albumin, Fibronectin, Complement factor B, Vitamin D-binding protein, Immunoglobulin heavy constant gamma 2, Plasminogen, Inter-alpha-trypsin inhibitor heavy chain H4, Inter-alpha-trypsin inhibitor heavy chain H2, Apolipoprotein B-100, Apolipoprotein L1, Alpha-1-acid glycoprotein A-II, Alpha-1-acid glycoprotein 2, Apolipoprotein B-100, Hemoglobin subunit alpha, CD5 antigen-like, Selenoprotein P, Immunoglobulin lambda constant 3, Eukaryotic translation initiation factor 5A-1, Cluster of Keratin, type II cytoskeletal 1, Keratin, type I cytoskeletal 9, Keratin, type I cytoskeletal 10, Immunoglobulin kappa variable 1-27, Chromodomain-helicase-DNA-binding protein 7, Fetuin-B, Immunoglobulin heavy constant gamma 1, Immunoglobulin heavy constant gamma 4, Immunoglobulin lambda variable 3-27, Kallikrein-2, N-lysine methyltransferase SETD6, Protein SON, Reversion-inducing cysteine-rich protein with Kazal motifs, Complement C3, CON_Q2UVX4, Serotransferrin, Gelsolin, Immunoglobulin lambda constant 7, and Inter-alpha-trypsin inhibitor heavy chain H3.

In some embodiments of the above aspects on methods of treating, the treatment involves exposure to polypeptide-specific antibodies and/or highly-specific protease treatment. In some embodiments, the one or more polypeptides comprises a prion-like domain (PrD) and the antibodies interact with said PrD. In some embodiments, the treatment involves destruction of extracellular DNA. In some embodiments, the destruction of extracellular DNA involves treatment with a DNase. In some embodiments, the treatment involves administering to the subject an effective amount of an anti-PrD drug. In some embodiments, the anti-PrD drug is selected from tacrolimus, pentosan polysulfate, quinacrine, an antibody against an amyloid protein, an antibody against a nuclease, an antibody against a protease, and rituximab. In some embodiments, the antibody against an amyloid protein is an antibody against beta amyloid. In some embodiments, the antibody against a nuclease is an antibody against a DNase. In some embodiments, the antibody against a protease is an antibody against proteinase K.

In another aspect is provided a method of treating a disease in a human subject comprising administering to the subject an effective amount of a compound that inhibits a human cell or a human protein from interacting with a viral protein comprising a prion-like domain. In another aspect is provided method of treating a disease in a human subject comprising administering to the subject an effective amount of a compound that prevents a human cell or a human protein from interacting with a viral protein comprising a prion-like domain.

In some embodiments of the above aspects on methods of treating a disease in a human subject, the disease is a cancer or a neurodegenerative disease. In some embodiments, the viral protein comprising a prion-like domain is a viral protein from HIV, HHV-1, HHV-5, HHV-6, or HIV-8. In some embodiments, the viral protein comprising a prion-like domain is HIV-1 envelope glycoprotein gp160 (E5RVW7), Gag protein (C1JH95), Pol protein (Q3S7Q7), Envelope glycoprotein gp120 (Q2ME99), Human herpes simplex virus 8 RF1 (U5NM22); Human herpes simplex virus 8 LANA (E5LC01), Human herpes simplex virus 8 ORF 73 (A0A0N9S3L8), Human herpes simplex virus 6 (U95 protein), Human herpes simplex virus 1 large tegument protein deneddylase, Human herpes simplex virus 1 envelope glycoprotein I, Human herpes simplex virus 1 envelope glycoprotein 2, or Varicella zoster small capsomere-interacting protein. In some embodiments, the viral protein comprising the prion-like domain is capable of altering a prionogenic-like protein. In some embodiments, the viral protein comprising the prion-like domain is capable of misfolding a prionogenic-like protein. In some embodiments, the prionogenic-like protein is Tau proterin, betta-amyloid, P53, SOD1, TDP43, or alpha-synuclein.

BRIEF DESCRIPTION OF DRAWINGS

FIG. 6A shows an analysis of thermostable Tetz-proteins, whose amount decreased following proteinase K treatment. FIG. 6B shows an analysis of thermostable Tetz-proteins, whose amount increased following proteinase K treatment. As it is seen, neither of these proteins possess a prion-like domain. Thus, their unexpected thermostability and resistance to proteinases are not attributed to the prion-nature.

FIGS. 7A-7H show enrichment and clustering of viral PrD-containing proteins according to their GO terms.

In FIG. 13, lane 1 is the molecular weight marker, lane 2 is control plasma, and lane 3 is plasma of patient with breast cancer (stage 3). In FIG. 14, lane 1 is the molecular weight marker, lane 2 is control plasma+proteinase K, and lane 3 is plasma of patient with breast cancer (stage 3)+proteinase K (stage 3).

In FIG. 15, lane 1 is the molecular weight marker, lane 2 is control plasma, lane 3 is cancer plasma, lane 4 is control plasma+DNA, and lane 5 is cancer plasma+DNA. In FIG. 16, lane 1 is the molecular weight marker, lane 2 is control plasma, and lane 3 is cancer plasma.

Figure 1:
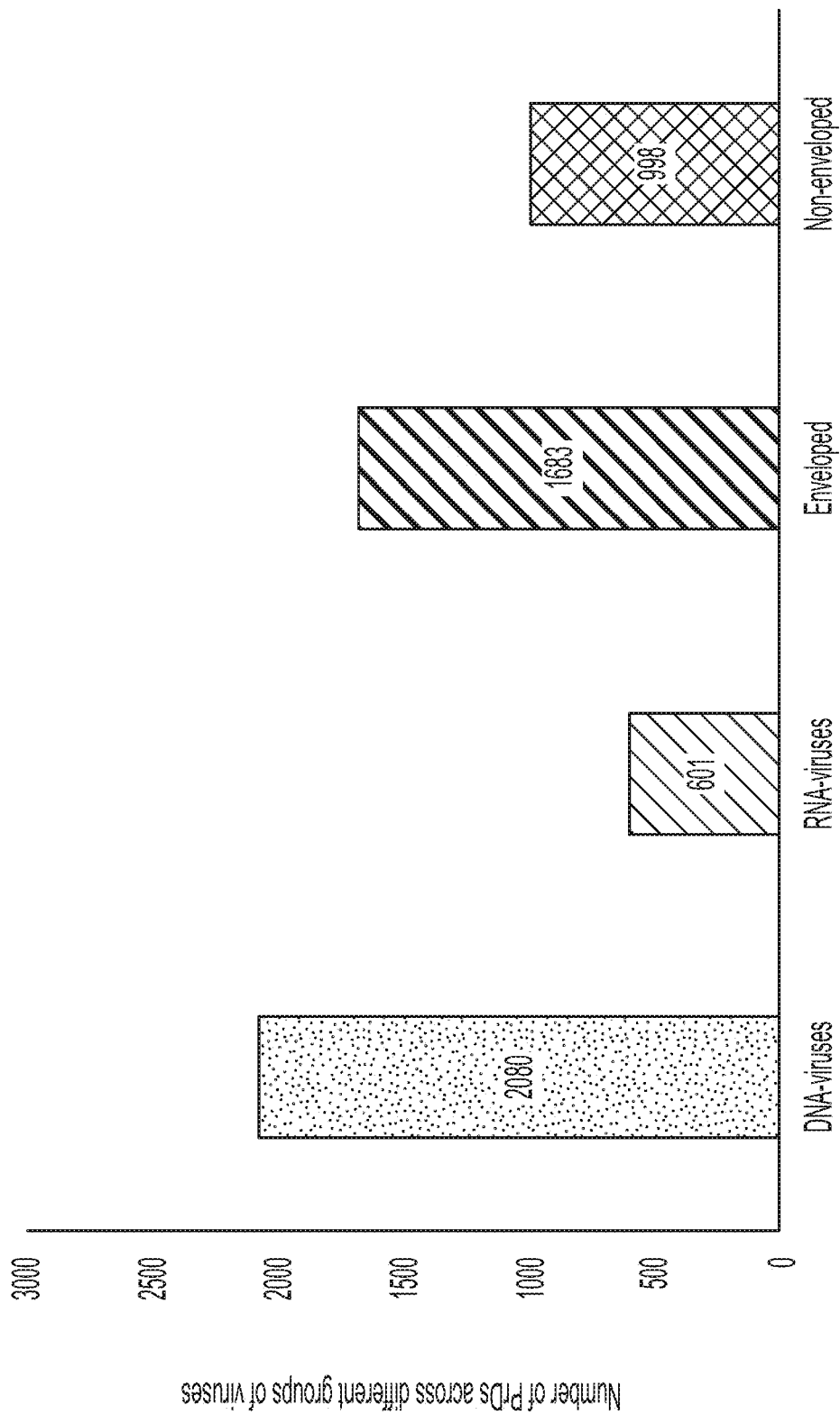
FIG. 1 shows PrD enrichment in the proteome of different viruses. The values inside the bars represent the total numbers of PrDs identified in each group.
Figure 2:
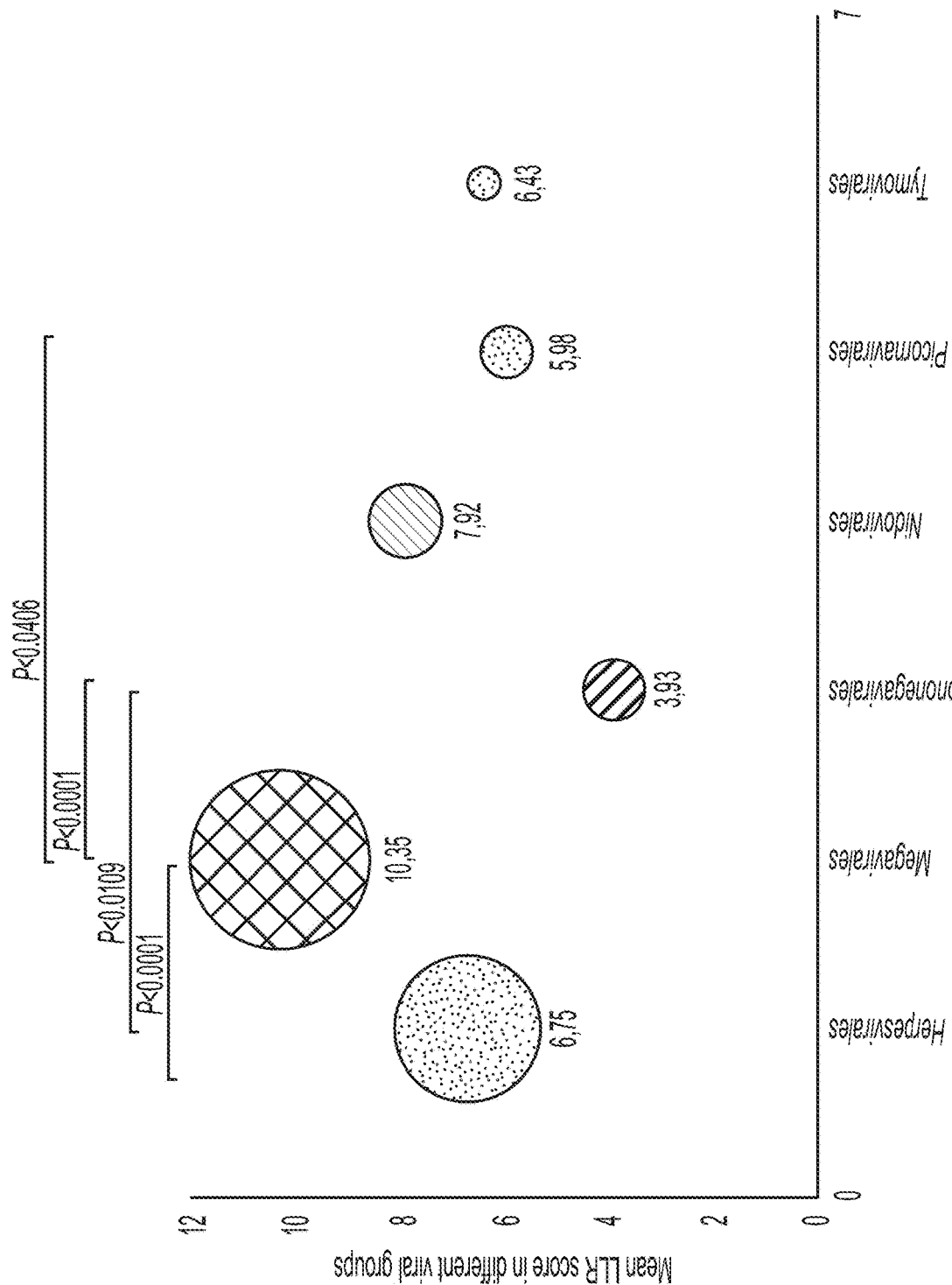
FIG. 2 shows PrD enrichment in viral proteomes and the LLR scores. The ratio between PrD-containing proteins in each group and the total number of viral proteins is presented. Numerical values are medial LLR scores of the PrDs, and the circle size indicates the number of identified PrDs. Data were analyzed using one-way ANOVA.

FIG. 24 shows a heatmap of proteins of normal plasma samples that altered their heat resistant characteristics following the treatment with different DNA. The heat map represents the relative effects of DNA from different sources on the proportion of heat-resistant proteins in normal plasma. The colour intensity is a function of protein spectrum counts, with light gray and black indicating maximal counts and lack of detection, respectively.

FIGS. 25A and 25B show a principal component analysis (PCA) and heat map of proteome data. In FIG. 25A, the principal component analysis reflects the similarities between the heat-resistant proteome of pancreatic cancer plasma and that of plasma from healthy controls following treatment with different DNAs (eby LC/MS). The strongest similarity trend between the plasma of cancer patients and that of healthy subjects after exposure to the eDNA of *P. aeruginosa* are shown. FIG. 25B is a heat map showing the mean spectrum counts of heat-resistant proteins in normal plasma samples following DNA treatment, and in the plasma of patients with pancreatic cancer. Black colour and light gray colours represent low and high spectral counts, respectively.

FIG. 26 is a graph showing the effect of various HHV-8 modifications on P53 aggregation.

DETAILED DESCRIPTION

Definitions

Unless defined otherwise, technical and scientific terms used herein have the same meaning as commonly understood by one of ordinary skill in the art to which this invention belongs.

The terms "prion-like domain (PrD)" or "prionogenic domain" are used herein to refer to parts of a protein that can become a Prion protein (PrP). PrPs are characterized by self-propagation, and undergo a conformational switch from one conformational state to another, which leads to the creation of new prions.

As used herein, the term "Tetz-proteins" encompasses: (i) thermostable proteins, (ii) fragments or domains of thermostable proteins, (iii) thermostable fragments or domains of non-thermostable proteins, and (iv) thermostable protein subunits of non-thermostable protein complexes, wherein said proteins, protein subunits, fragments and domains are not prions, do not comprise prion-like domains, and remain in a soluble protein fraction after heating a sample containing such proteins, protein subunits, fragments and domains (e.g., a bodily fluid sample collected from a subject) for, e.g., about 10 minutes to 8 hours at about 50° C., or about 30 seconds to 8 hours at about 100° C., or 5 minutes to 8 hours at 80-120° C. In addition to the above thermostable proteins, protein subunits, fragments and domains, the term "Tetz-proteins" also encompasses (v) non-thermostable proteins, (vi) fragments or domains of non-thermostable proteins, and (vii) proteins having a structure (e.g., tertiary or quaternary structure) found in mesophilic or psychrophilic organisms, wherein said proteins, fragments or domains (v)-(vii) are associated with a pathology, are not prions, do not comprise prion-like domains, and are formed or their amount is increased in the presence of nucleic acids (e.g., DNA or RNA, e.g., ranging in size from 10 bp to 1,000,000 bp) and/or a protease (e.g., proteinase K). Thermostable Tetz-proteins, protein subunits, fragments and domains (i)-(iv) also can be (but do not have to be) formed or their amount can be increased in the presence of nucleic acids (e.g., DNA or RNA, e.g., ranging in size from 10 bp to 1,000,000 bp) and/or a protease (e.g., proteinase K).

Tetz-proteins can be found in and identified in bodily fluids (e.g., whole blood, plasma, serum, cerebrospinal fluid, amniotic fluid, urine, or saliva), cells, cell lysates, and microbial biofilm matrices.

"Targets" are molecules with which prion-like and/or Tetz-proteins can interact and/or bind. Protein targeted DNA (ptDNA) includes DNA forming a complex with extracellular proteins and DNA that changes the properties of extracellular proteins. Protein targeted RNA (ptRNA) includes RNA forming a complex with extracellular proteins and RNA that changes the properties of extracellular proteins.

As used herein, the term "therapeutically effective amount" refers to the amount of a compound, composition, particle, organism (e.g., a probiotic or a microbiota transplant), etc. that, when administered to a subject for treating (e.g., preventing or ameliorating) a state, disorder or condition, is sufficient to effect such treatment. The "therapeutically effective amount" will vary depending, e.g., on the agent being administered as well as the disease severity, age, weight, and physical conditions and responsiveness of the subject to be treated.

As used herein, the phrase "pharmaceutically acceptable" refers to molecular entities and compositions that are generally regarded as physiologically tolerable.

The terms "patient", "individual", "subject", "mammal", and "animal" are used interchangeably herein and refer to mammals, including, without limitation, human and veterinary animals (e.g., cats, dogs, cows, horses, sheep, pigs, etc.) and experimental animal models. In a preferred embodiment, the subject is a human.

The terms "treat" or "treatment" of a state, disorder or condition include: (1) preventing, delaying, or reducing the incidence and/or likelihood of the appearance of at least one clinical or sub-clinical symptom of the state, disorder or condition developing in a subject that may be afflicted with or predisposed to the state, disorder or condition but does not yet experience or display clinical or subclinical symptoms of the state, disorder or condition; or (2) inhibiting the state, disorder or condition, i.e., arresting, reducing or delaying the development of the disease or a relapse thereof (in case of maintenance treatment) or at least one clinical or sub-clinical symptom thereof; or (3) relieving the disease, i.e., causing regression of the state, disorder or condition or at least one of its clinical or sub-clinical symptoms. The benefit to a subject to be treated is either statistically significant or at least perceptible to the patient or to the physician.

The term "about" or "approximately" means within a statistically meaningful range of a value. Such a range can be within an order of magnitude, preferably within 50%, more preferably within 20%, still more preferably within 10%, and even more preferably within 5% of a given value or range. The allowable variation encompassed by the term "about" or "approximately" depends on the particular system under study, and can be readily appreciated by one of ordinary skill in the art.

The terms "a," "an," and "the" do not denote a limitation of quantity, but rather denote the presence of "at least one" of the referenced item.

The practice of the present invention employs, unless otherwise indicated, conventional techniques of statistical analysis, molecular biology (including recombinant techniques), microbiology, cell biology, and biochemistry, which are within the skill of the art. Such tools and techniques are described in detail in e.g., Sambrook et al. (2001) Molecular Cloning: A Laboratory Manual. 3rd ed. Cold Spring Harbor Laboratory Press: Cold Spring Harbor, New York; Ausubel et al. eds. (2005) Current Protocols in Molecular Biology. John Wiley and Sons, Inc.: Hoboken, NJ; Bonifacino et al. eds. (2005) Current Protocols in Cell Biology. John Wiley and Sons, Inc.: Hoboken, NJ; Coligan et al. eds. (2005) Current Protocols in Immunology, John Wiley and Sons, Inc.: Hoboken, NJ; Coico et al. eds. (2005) Current Protocols in Microbiology, John Wiley and Sons, Inc.: Hoboken, NJ; Coligan et al. eds. (2005) Current Protocols in Protein Science, John Wiley and Sons, Inc.: Hoboken, NJ; and Enna et al. eds. (2005) Current Protocols in Pharmacology, John Wiley and Sons, Inc.: Hoboken, NJ. Additional techniques are explained, e.g., in U.S. Pat. No. 7,912,698 and U.S. Patent Appl. Pub. Nos. 2011/0202322 and 2011/0307437. In some embodiments, proteins comprising PrDs comprise glutamine/asparagine (Q/N) enriched PrDs. In some embodiments, PrDs are determined using protein analysis (e.g., Western blot, ELISA) and/or algorithms (e.g., PLAAC algorithm, a web and command-line application to identify proteins with Prion-Like Amino Acid Composition Bioinformatics, and an algorithm using an experimentally-derived prion propensity score combined with explicit consideration of the intrinsic disorder so as to bioinformatically predict prion domains, such as PAPA and PrionW).

The studies described herein are the most complete evaluation of PrDs among viruses except for the bacteriophages. The results highlight some previously overlooked viral characteristics that may play important roles in viral infections.

PrDs were identified in functionally distinct proteins of different viral orders, indicating that these PrDs are conserved in different viruses. However, the PrDs were not identified in all viral families and species. The above analyses demonstrate that only approximately 23% of all analyzed viral proteomes available in public databases contain at least one PrD. PrDs were identified in many human viral pathogens, but other viruses affecting human health were shown to have a few or no PrDs in their proteomes, such as hepatitis A, E, and D viruses, papillomaviruses, some members of Orthomyxoviridae, and others.

At the order level, PrDs are more frequent among Megavirales and Herpesvirales, while at the species level, the highest number of PrDs was found in *Acanthamoeba polyphaga* mimivirus, Paramecium *bursaria Chlorella* virus NY2A, *Acanthamoeba castellanii* mamavirus (Megavirales), and *Heliothis zea* nudivirus (unassigned order). Among human pathogens, the highest prevalence of PrD was found in cytomegalovirus and Epstein-Barr virus (Herpesvirales) and HIV1 (Retroviridae family, unassigned order).

In an analysis of the top 100 scoring PrDs with the highest number of QN-rich domains, such top scoring PrDs were found to be most common among Mimiviridae, which infect *Acanthamoeba*, and Phycodnaviridae, which infect algae and belong to the Megavirales. Of these, only some proteins were Herpesvirales proteins, while the majority of them was shown to be identified in the viruses of the unassigned order. No human viruses were shown to have log-likelihood ratio (LLR) scores over 31 and none were represented in the top 100 LLR-scoring group. (The LLR score reflects the similarity between the examined interaction sets, with an LLR near zero suggesting a comparison of sets of random interactions.) The majority of these proteins has not been characterized.

The order Megavirales is a recently established order that comprises of diverse group of the DNA-viruses infecting eukaryotic hosts, which are characterized by large genomes. Here, DNA-viruses were found to harbor more high-scoring prions, as expected, but the high LLR scores obtained for these viruses is not due to the longer amino-acid sequences, but to the increased presence of QN-residues.

Furthermore, the inventors aimed to determine the correlation between the PrD-containing protein functions and the frequency of PrDs in the viral proteomes found in different viral families. Adhesion and entry of viral nucleic acids represent crucial steps in the viral-host interactions and the viral PrD-containing proteins showed to be involved in these processes represented the second largest group. PrDs in the viral surface proteins were identified that are involved in the direct contact and fusion of viruses with the host cell membrane, indicating that PrDs may be functionally implicated in these processes as well.

Of 543 PrDs found to be associated with the viral interaction with the host cells, only four proteins were identified in the plant viruses (potato mop-top virus, Dasheen mosaic virus, only Syngen Nebraska virus 5, and Fiji disease virus). Plant viruses are known to have no specific mechanisms of entry, but instead they take advantage of the plant injury, vectors such as insects, or through a cell-to-cell movement of viral progeny in the infected plant (Wolf et al., 1989; Dasgupta et al., 2017; Ackermann, 2017). PrDs present in the proteins of animal viruses that interact with cell membranes may be associated with adhesion and entry, and may have important functional roles.

Taken together, numerous putative PrD-containing proteins were identified in viruses. Consistent PrD distribution patterns were observed in different viral families and species, and these domains were identified in a variety of proteins. Without wishing to be bound by theory, the majority of viruses were shown to lack the PrDs, which shows that the presence of PrDs is beneficial, but not obligatory, and which agrees with the results obtained for the PrDs found in bacteria and bacteriophages. The predictive approach employed in this study revealed for the first time a large set of putative PrPs in numerous proteins of the emerging human viral pathogens, including those associated with persistent viral infections, oncogenic processes, hemorrhagic fevers, and others. Further analyses of these PrD-containing proteins may contribute to the better understanding of viral infections. Also, gene editing may be used as a technology that could allow for development of viruses with an advanced prion-like domain profile on their surfaces.

Without wishing to be bound by theory, PrDs in viral proteins may be important for assembly and growth of viral capsids. PrDs may be involved in liquid-liquid phase separation (LLPS), and in turn the nucleation and growth of protein crystals. Further, LLPS may play a role in the first steps of viral capsid growth. PrD-containing proteins may promote or enhance LLPS, and thus promote assembly of the viral capsid by scaffolding proteins.

Tetz-proteins may be identified by obtaining a bodily fluid sample from a patient, such as blood plasma. The blood plasma may be untreated, treated with a nucleotide (e.g., 0.01-10000 mcg/ml DNA), treated with a protease (e.g., 0.01-10000 mcg/ml proteinase K), or treated with both the nucleotide and the protease. The blood plasma may be heated at a temperature from 43 to 200° C. for 20 seconds minute to 5 hours.

Subsequently, the bodily fluid sample may be subjected to abundant protein depletion so as to remove abundant proteins from serum or plasma samples. A kit may be used, such as the ProteoSpin™ Abundant Serum Protein Depletion Kit available from Norgen Biotek and the Seppro® Protein Depletion kit available from Sigma-Aldrich.

Proteins may then be separated by gel electrophoresis or liquid chromatography, and then analyzed by mass spectrometry. Isobaric labeling at the peptide level for multiplexed relative quantification may be undertaken. SELDI-TOF mass spectrometry may be used. Also, ultra-high performance liquid chromatography may be coupled to accurate-mass high resolution tandem mass spectrometry analysis of peptides fractionated off-line by basic pH reversed-phase (bRP) chromatography.

In one embodiment of the various aspects and embodiments described in the application, the disease is a neurodegenerative disorder.

In one embodiment of the various aspects and embodiments described in the application, the disease is scrapie, Creutzfeldt-Jakob disease, Alzheimer's disease, Parkinson's disease, amyloidosis, bipolar disorder, depressive disorder, schizophrenia, Huntington's disease, fatal familial insomnia, Chronic Fatigue Syndrome, a dementia, generalized anxiety disorder (GAD), major depressive disorder (MDD), multiple sclerosis, CADASIL Syndrome, an ataxia, a Lewy body disease, social anxiety disorder (SAD), attention-deficit/hyperactivity disorder (ADHD), autism and autism spectrum disorder, amyotrophic lateral sclerosis, α-Synucleinopathies and diabetes, a renal disorder (e.g., primary membranoproliferative glomerulonephritis, immunoglobulin-mediated membranoproliferative glomerulonephritis, non-immunoglobulin-mediated membranoproliferative glomerulonephritis, fibronectin glomerulopathy, primary glomerular disease, dense deposit disease), one or more eye disorders; one or more hematologic diseases; an intestinal disorder, a heart disorder, one or more nervous system disorders; hyperthyroxinemia, glioma, schizophrenia, Ehlers-Danlos syndrome, otopalatodigital syndrome, Noonan syndrome, Erythroderma desquamativum, cancer, aging, an age-related change of the skin, rheumatoid arthritis, atopic dermatitis, ankylosing spondylitis, psoriasis, systemic lupus erythematosus (SLE), scleroderma, liver failure, liver cirrhosis, chronic heart failure, atherosclerosis, myocardial infarction, thrombosis, gout, one or more cancers, cancer cachexia, graft-versus-host reactions, rhythm and conduction disturbances, primary biliary cirrhosis, primary sclerosing cholangitis, and asthma.

In one embodiment, the renal disorder is atypical hemolytic-uremic syndrome.

In one embodiment, the eye disorder is retinal dystrophy, age-related macular degeneration, corneal dystrophy, familial drusen, or ligneous conjunctivitis.

In one embodiment, the hematologic disease is congenital atransferrinemia, hypochromic anemia, α-thalassemia, Hb Bart's hydrops fetalis, lymphedema, an immunodeficiency due to a complement cascade protein anomaly, a hypoplasminogenemia, AL amyloidosis, familial amyloidosis Finnish type, or a gamma 1 chain deposition disease.

In one embodiment, the intestinal disorder is congenital sodium diarrhea, chronic intestinal pseudoobstruction, or congenital short bowel syndrome.

In one embodiment, the heart disorder is dilated cardiomyopathy, coronary artery disease, or hypertrophic cardiomyopathy.

In one embodiment, the cancer is lung cancer, ovarian cancer, astrocytoma, non-cell small lung cancer, pancreatic cancer, thyroid carcinoma, or lung carcinoma.

In one embodiment, the nervous system disorder is neurodegeneration with brain iron accumulation, nodular neuronal heterotopia, or aceruloplasminemia.

In one embodiment, the disease is an infection selected from a viral infection, a bacterial infection, a fungal infection, and a protozoal infection.

Additional Embodiments

1. A method for producing vectors, vaccines, diagnosis, treatment and prevention of diseases, characterized in that the prion-like and Tetz-proteins or the molecules involved in their formation and/or alteration of their properties and/or interaction with these proteins, are the object of detection and the target of the preventive and treatment preparations.

2. The method of embodiment 1, wherein the prion-like and/or Tetz-proteins are in the blood plasma.

3. The method of embodiment 1, wherein the prion-like and/or Tetz-proteins are in the blood plasma of humans.

4. The method of embodiment 1, wherein the prion-like and/or Tetz-proteins are in the blood plasma of animals.

5. The method of embodiment 1, wherein the prion-like and/or Tetz-proteins are in the cells.

6. The method of embodiment 1, wherein the prion-like and/or Tetz-proteins are inside human cells.

7. The method of embodiment 1, wherein the prion-like and/or Tetz-proteins are inside animal cells.

8. The method of embodiment 1, wherein the prion-like and/or Tetz-proteins are in the cerebrospinal fluid.

9. The method of embodiment 1, wherein the prion-like and/or Tetz-proteins are in the human cerebrospinal fluid.

10. The method of embodiment 1, wherein the prion-like and/or Tetz-proteins are in the cerebrospinal fluid of animals.

11. Diagnosis of neurodegenerative and neurodevelopmental diseases by identification of viral prion-like and/or Tetz-proteins in the CSF.

12. Diagnosis of neurodegenerative and neurodevelopmental diseases by identification of bacterial prion-like and/or Tetz-proteins in the CSF.

13. Diagnosis of neurodegenerative and neurodevelopmental diseases by identification of human prion-like and/or Tetz-proteins in the CSF.

14. Diagnosis of oncological diseases by identification of for viral prion-like and/or Tetz-proteins in the CSF.

15. Diagnosis of oncological diseases by identification of for bacterial prion-like and/or Tetz-proteins in the CSF.

16. Diagnosis of oncological diseases by identification of for human prion-like and/or Tetz-proteins in the CSF.

17. The method of embodiment 1, wherein prion-like and/or Tetz-proteins are synthesized by bacteria and are within a biofilm matrix.

18. The method of embodiment 1, wherein prion-like and/or Tetz-proteins are synthesized by bacteria and are within the structure of bacterial cells.

19. The method of embodiment 1, wherein prion-like and/or Tetz-proteins are synthesized by archaea and are in biofilm matrix.

20. The method of embodiment 1, wherein prion-like and/or Tetz-proteins are synthesized by archaea and are within archaea cells.

21. The method of embodiment 1, wherein prion-like and/or Tetz-proteins are synthesized by fungi and are in fungal biofilm matrix.

22. The method of embodiment 1, wherein prion-like and/or Tetz-proteins are synthesized by fungi and are within fungal cells.

23. The method of embodiment 1, wherein prion-like and/or Tetz-proteins belong to bacteriophages.

24. The method of embodiment 1, wherein prion-like and/or Tetz-proteins belong to human or animal viruses.

25. The method of embodiment 1, wherein for diagnosis, prion-like and/or Tetz-proteins are detected by protein-detecting methods.

26. The method of embodiment 1, wherein for diagnosis, prion-like and/or Tetz-proteins are detected by electrophoresis.

27. The method of embodiment 1, wherein for diagnosis, prion-like and/or Tetz-proteins are detected by chromatographic methods.

28. The method of embodiment 1, wherein for diagnosis, prion-like and/or Tetz-proteins are detected by Western blot.

29. The method of embodiment 1, wherein for diagnosis, prion-like and/or Tetz-proteins are detected by mass spectrometry.

30. The method of claim 29, wherein the detection by mass spectrometry is by SELDI-TOF mass spectrometry.

31. The method of embodiment 1, wherein for diagnosis, prion-like and/or Tetz-proteins are detected by antibodies.

32. The method of embodiment 1, wherein for diagnosis, prion-like and/or Tetz-proteins are detected by means of dyes.

33. The method of embodiment 1, wherein the composition of thermostable proteins is evaluated for diagnosis of the disease.

34. The method of embodiment 1, wherein for diagnosis of the disease the composition of Tetz-proteins is evaluated, which are detected by heating to temperatures in the range of 50° C. to 250° C.

35. The method of embodiment 1, wherein for diagnosis of the disease the composition of prion-like and/or Tetz-proteins is detected by treatment with proteases.

36. The method of embodiment 1, wherein for diagnosis of the disease the composition of prion-like and/or Tetz-proteins is detected by treatment with a DNA or an RNA, wherein optionally the detection is qualitative or quantitative.

37. The method of embodiment 1, wherein for diagnosis of the disease the composition of prion-like and/or Tetz-proteins, is detected by treatment with bacterial DNA, bacterial RNA, viral DNA, or viral RNA.

38. The method of embodiment 1, wherein for diagnosis of the disease the composition of prion-like and/or Tetz-protein, is detected by treatment with a DNA or an RNA of healthy humans.

39. The method of embodiment 1, wherein for diagnosis of the disease the composition of prion-like and/or Tetz-proteins, which are detected by treatment with a DNA or an RNA of patients with the diagnosed pathology.

40. The method of embodiments 36-39, wherein the disease that is diagnosed is an oncological or neurodegenerative or neurodevelopmental disease.

41. The method of embodiments 36-39, wherein for diagnosis of the disease the is done using the analysis of blood, plasma, serum CSF, amniotic fluid.

42. The method of embodiment 1, wherein prion-like and/or Tetz-proteins found in structures of viruses are detected for the diagnosis of viral infections.

43. The method of embodiment 1, wherein prion-like and/or Tetz-proteins found in structures of bacteria are detected for the diagnosis of viral infections.

44. The method of embodiment 1, wherein prion-like and/or Tetz-proteins found in structures of fungi are detected for the diagnosis of fungal infections.

45. The method of embodiment 1, wherein in order to treat viral infections, prion-like and/or Tetz-proteins and/or their targets are inactivated.

46. The method of embodiment 1, wherein in order to treat viral infections, prion-like and/or Tetz-proteins are inactivated using specific antibodies against these proteins.

47. The method of embodiment 1, wherein in order to treat viral infections, adjuvants are used that stimulate production of their own specific antibodies inactivating prion-like and/or Tetz-proteins.

48. The method of embodiment 1, wherein in order to treat viral infections, prion-like and/or Tetz-proteins are inactivated using molecules that block their interaction with the target.

49. The method of embodiment 1, wherein in order to treat viral infections, prion-like and/or Tetz-proteins are inactivated using molecules that block their interaction with the target, while interacting with the target.

50. The method of embodiment 1, wherein the formation of prion-like and/or Tetz-proteins is blocked for the treatment of viral infections.

51. The method of embodiment 1, wherein in order to treat viral infections, the formation of prion-like and/or Tetz-proteins is blocked by inactivating the proteases that lead to their appearance.

52. The method of embodiment 1, wherein in order to treat viral infections, the formation of prion-like and/or Tetz-proteins is blocked by inactivating the extracellular DNA that leads to their appearance alteration of their properties.

53. The method of embodiment 1, wherein in order to treat viral infections, the formation of prion-like and/or Tetz-proteins is blocked by inactivating the ptDNA or ptRNA that leads to their appearance alteration of their properties.

54. The method of embodiment 1, wherein prevention of development of a viral infection is achieved by inactivating the prion-like domains and/or Tetz-proteins on the surface of the viral particles, including those involved in the adsorption and entry.

55. The method of embodiment 1, wherein prevention of development of a viral infection is achieved by inactivating viral prion-like domains and/or Tetz-proteins, including those involved in the biosynthesis, assembly and release of viral particles, as well as those involved in their maturation, inhibition of the virus-induced change in the morphological, biochemical, or growth parameters of a cell, suppression by virus of host complement activation 56. The method of embodiment 1, comprising diagnosis of viral prion proteins and their seeding potential to lead to the formation of misfolded proteins (including, but not limited to protein misfolding cyclic amplification; usage of stains Congo-red, Thioflavin).

57. The method of embodiment 1, comprising diagnosis of Misfolded Aggregates in human biological fluids due to the viral prion proteins (including, but not limited to protein misfolding cyclic amplification; usage of stains Congo-red, Thioflavin).

58. The method of embodiment 1, wherein the evaluation of a presence of viral prion-like domains in microbiota, bodily fluid(s) and/or tissue(s) of the mammal is used as the clinical endpoints in Clinical Trials.

59. The method of embodiment 1, wherein the evaluation of a presence of prion-like and Tetz-proteins and/or the molecules involved in their formation, in microbiota, bodily fluid(s) and/or tissue(s) of the mammal is used as a clinical endpoint in a clinical trial to evaluate treatment efficacy.

60. The method of embodiment 1, comprising diagnostics of the presence of prion-like and Tetz viral proteins and/or component(s) in the blood, plasma or serum of donor and/or recipient during blood during transfusion.

61. The method of embodiment 1, comprising diagnostics of the presence of human host or bacterial host proteins that appear as a result of prion-like and Tetz viral proteins and/or component(s) presence in the blood, plasma or serum of donor and/or recipient during blood during transfusion.

62. The method of embodiment 1, wherein in order to treat bacterial infections, prion-like and/or Tetz-proteins and/or their targets are inactivated.

63. The method of embodiment 1, wherein in order to treat bacterial infections, prion-like and/or Tetz-proteins are inactivated using specific antibodies.

64. The method of embodiment 1, wherein in order to treat bacterial infections, adjuvants are used that stimulate production of their own specific antibodies to inactivate prion-like and/or Tetz-proteins.

65. The method of embodiment 1, wherein in order to treat bacterial infections, prion-like and/or Tetz-proteins are inactivated using molecules that block their interaction with the target.

66. The method of embodiment 1, wherein in order to treat bacterial infections, prion-like and/or Tetz-proteins are inactivated using molecules that block their interaction with the target, while interacting with the target.

67. The method of embodiment 1, wherein the formation of prion-like and/or Tetz-proteins is blocked in order to treat bacterial infections.

68. The method of embodiment 1, wherein in order to treat bacterial infections, the formation of prion-like and/or Tetz-proteins is blocked by inactivating the proteases that lead to their formation.

69. The method of embodiment 1, wherein in order to treat bacterial infections, the formation of prion-like and/or Tetz-proteins is blocked by inactivating the extracellular DNA that leads to their formation or their properties alterations.

70. The method of embodiment 1, wherein the bacteria producing these prion-like and/or Tetz-proteins are selectively killed for the treatment of bacterial infections.

71. The method of embodiment 1, wherein in order to treat bacterial infections, the formation of prion-like and/or Tetz-proteins is blocked by inactivating the ptDNA or ptRNA that leads to their formation or their properties alterations.

72. The method of embodiment 1, wherein in order to treat infections caused by fungi, prion-like and/or, Tetz-proteins and/or their targets are inactivated.

73. The method of embodiment 1, wherein in order to treat infections caused by fungi, prion-like and/or Tetz-proteins are inactivated using specific antibodies.

74. The method of embodiment 1, wherein in order to treat infections caused by fungi, adjuvants are used that stimulate production of their own specific antibodies inactivating prion-like and/or Tetz-proteins.

75. The method of embodiment 1, wherein in order to treat viral infections caused by fungi, prion-like and/or Tetz-proteins are inactivated using molecules that block their interaction with the target.

76. The method of embodiment 1, wherein in order to treat infections caused by fungi, prion-like and/or Tetz-proteins are inactivated using molecules that block their interaction with the target, while interacting with the target.

77. The method of embodiment 1, wherein the formation of prion-like and/or Tetz-proteins is blocked in order to treat infections caused by fungi.

78. The method of embodiment 1, wherein in order to treat infections caused by fungi, the formation of prion-like and/or Tetz-proteins is blocked by inactivating the proteases that lead to their appearance.

79. The method of embodiment 1, wherein in order to treat infections caused by fungi, the formation of prion-like and/or Tetz-proteins is blocked by inactivating the extracellular DNA that leads to their appearance alteration of their properties.

80. The method of embodiment 1, wherein the bacteria producing the prion-like and/or Tetz-proteins are selectively killed for the treatment of infections caused by fungi.

81. The method of embodiment 1, wherein in order to treat infections caused by fungi, the formation of prion-like and/or Tetz-proteins is blocked by inactivating the ptDNA or ptRNA that leads to their appearance or alteration of their properties.

82. The method of embodiment 1, wherein in order to treat oncological diseases, prion-like and/or Tetz-proteins are inactivated.

83. The method of embodiment 1, wherein in order to treat oncological diseases, prion-like and/or Tetz-proteins are inactivated using specific antibodies.

84. The method of embodiment 1, wherein in order to treat oncological diseases, adjuvants are used that stimulate production of their own specific antibodies inactivating prion-like and/or Tetz-proteins.

85. The method of embodiment 1, wherein in order to treat oncological diseases, prion-like and/or Tetz-proteins are inactivated using molecules that block their interaction with the target.

86. The method of embodiment 1, wherein in order to treat oncological diseases, prion-like and/or Tetz-proteins are inactivated using molecules that block their interaction with the target, while interacting with the target.

87. The method of embodiment 1, wherein oncological diseases are treated by prevention of prion-like and/or Tetz-proteins formation.

88. The method of embodiment 1, wherein in order to treat oncological diseases, the formation of prion-like and/or Tetz-proteins is blocked by inactivating the proteases that lead to their appearance.

89. The method of embodiment 1, wherein in order to treat oncological diseases, the formation of prion-like and/or Tetz-proteins is blocked by inactivating the DNA that leads to their appearance alteration of their properties.

90. The method of embodiment 1, wherein in order to treat oncological diseases, the formation of prion-like and/or Tetz-proteins is blocked by inactivating the extracellular DNA that leads to their appearance alteration of their properties.

91. The method of embodiment 1, wherein in order to treat oncological diseases, the formation of prion-like and/or Tetz-proteins is blocked by inactivating the ptDNA or ptRNA that leads to their appearance or alteration of their properties.

92. The method of embodiment 1, wherein in order to treat neurodegenerative and neurodevelopmental diseases, prion-like and/or Tetz-proteins are inactivated using molecules that block their interaction with the target.

93. The method of embodiment 1, wherein in order to treat neurodegenerative and neurodevelopmental diseases, prion-like and/or Tetz-proteins are inactivated using molecules that block their interaction with the target, while interacting with the target.

94. The method of embodiment 1, wherein the formation of prion-like and/or Tetz-proteins is blocked for the treatment of neurodegenerative and neurodevelopmental diseases.

95. The method of embodiment 1, wherein in order to treat neurodegenerative and neurodevelopmental diseases, the formation of prion-like and/or Tetz-proteins is blocked by inactivating the proteases that lead to their appearance.

96. The method of embodiment 1, wherein in order to treat neurodegenerative diseases, the formation of prion-like and/or Tetz-proteins is blocked by inactivating the extracellular DNA that leads to their appearance or alteration of their properties.

97. The method of embodiment 1, wherein in order to treat neurodegenerative diseases, the formation of prion-like and/or Tetz-proteins is blocked by inactivating the ptDNA or ptRNA that leads to their appearance or alteration of their properties.

98. The method of embodiment 1, wherein in order to treat neurodegenerative and neurodevelopmental diseases, the effect of viral prion-like domains and/or Tetz-proteins as seed aggregation misfolding proteins is prevented.

99. The method of embodiment 1, wherein in order to generate new synthetic vectors used for gene therapy and gene engineering the number of prion-like domains in viral structures is increased or decreased.

100. The method of embodiment 1, wherein a modified or increased amount of prion-like domains on human cells receptors is used in immunooncology.

101. The method of embodiment 1, wherein modified T-cell ligands with an increased amount of prion-like domains are developed.

102. The method of embodiment 1, wherein modified T-cell ligands with an increased amount of prion-like domains are used for the treatment of mammals.

103. The method of embodiment 1, wherein T-cells with modified ligands containing prion-like domains are used for the treatment of mammals.

104. The method of embodiment 1, wherein T-cells with modified PD1, PD-L1 and CTLA4 containing prion-like domains are used for the treatment of mammals.

105. The method of embodiment 1, wherein modified CAR T-cell technologies with an increased number of prion-like domains to chimeric antigen receptor are used for the treatment of mammals.

106. The method of embodiment 1, wherein modified CAR T-cell technologies with an increased number of prion-like domains to chimeric antigen receptor are used for the treatment of mammals.

107. The method of embodiment 1, wherein the ligand expressed on B cells, plasma cells or plasmablasts in humans is selected from the group consisting of CD10, CD19, CD20, CD22, CD24, CD27, CD38, CD45R, CD138, CD319, and BCMA CD28, and a binding element for specific interaction with a selected target.

108. The method of embodiment 1, wherein modified CAR T-cell technologies with an increased number of prion-like domains to chimeric antigen receptor is used for the preparation of CAR-T cells with CRISPR/Cas9, and wherein CRISPR/Cas9 CAR is used.

109. The method of embodiment 1, wherein modified CAR T-cell technologies with an increased number of prion-like domains are used to prepare any of the components of an antigen binding domain derived from a bispecific antibody, a transmembrane domain, and a CD3 zeta signaling domain, further wherein the antigen binding domain is selected from the group consisting of a human antibody, a humanized antibody, an antigen binding fragment thereof, and any combination thereof.

110. The method of embodiment 1, wherein modified CAR T-cell technologies with increased number of prion-like domains are used to prepare any of the components of antigen-binding domain, a transmembrane domain, and an intracellular signaling domain or a cytoplasmic co-stimulatory signaling domain.

111. The method of embodiment 1, wherein modified CAR T-cell technologies with increased number of prion-like domains are used to prepare any of the components of antigen-binding domain, a transmembrane domain, and an intracellular signaling domain or a cytoplasmic co-stimulatory signaling domain are used.

112. The method of embodiment 1, wherein modified CAR T-cell technologies with increased number of prion-like domains are developed by an in vitro transcribed RNA or synthetic RNA comprising of a nucleic acid sequence encoding an extracellular domain, a transmembrane domain, a costimulatory signaling region, and/or a signaling domain containing PrD.

113. The method of embodiment 1, wherein synthetic vectors containing an altered amount prion-like and/or Tetz-proteins are used to increase immunogenicity of vaccines.

114. The method of embodiment 1, wherein synthetic vectors containing an altered amount prion-like and/or Tetz-proteins are used to make vaccines.

115. The method of embodiment 1, wherein synthetic vectors containing an altered amount prion-like and/or Tetz-proteins are used to make synthetic vaccines.

116. The method of embodiment 1, wherein synthetic vectors containing an altered amount prion-like and/or Tetz-proteins are used to make recombinant vaccines.

117. The method of embodiment 1, wherein for increasing the activity of vaccines, adjuvants of the vaccines containing increased amount of prion-like and/or Tetz-proteins are used.

118. The method of embodiment 1, wherein for increasing the activity of anticancer vaccines, vaccines containing increased amount of prion-like and/or Tetz-proteins are used.

119. The method of embodiment 1, wherein in order to treat and prevent diseases in mammals, the entry of viruses and prokaryotes with prion-like and/or Tetz-proteins into the amniotic fluid is prevented.

120. The method of embodiment 1, wherein in order to treat and prevent diseases in mammals, viral and prokaryotic prion-like and/or Tetz-proteins in the amniotic fluid are inactivated.

121. The method of embodiment 1, wherein in order to treat and prevent diseases in mammals, viral and prokaryotic prion-like and/or Tetz-proteins in the amniotic fluid which formed under the influence of viral or prokaryotic prion-like and/or proteins Tetz-proteins are inactivated.

122. The method of embodiment 1, wherein in order to treat and prevent congenital mutations and embryogenesis disorders in mammals, entry of viruses and prokaryotes with prion-like and/or Tetz-proteins into the amniotic fluid is prevented.

123. The method of embodiment 1, wherein in order to treat and prevent congenital mutations and embryogenesis disorders in mammals, viral and prokaryotic prion-like and/or Tetz-proteins in the amniotic fluid are inactivated (including by means of antibodies).

124. The method of embodiment 1, wherein in order to treat and prevent congenital mutations and embryogenesis disorders in mammals, viral and prokaryotic prion-like and/or Tetz-proteins in the amniotic fluid which appeared under the influence of viral or prokaryotic prion-like and/or proteins Tetz-proteins are inactivated (including by means of antibodies).

125. The method of embodiment 1, wherein in order to treat and prevent neurodegenerative and neurodevelopmental diseases, the entry of viruses and prokaryotes with prion-like and/or Tetz-proteins into the CSF is prevented.

126. The method of embodiment 1, wherein in order to diagnose diseases in mammals, presence of viral and prokaryotic prion-like and/or Tetz-proteins are detected in CSF.

127. The method of embodiment 1, wherein in order to treat and prevent diseases in mammals, viral and prokaryotic prion-like and/or Tetz-proteins are removed or inactivated in the CSF.

128. The method of embodiment 1, wherein in order to treat and prevent diseases in mammals, prion-like and/or Tetz-proteins of a mammal which occur under influence of viral and prokaryotic prion-like and/or Tetz-proteins are removed or inactivated in the CSF.

129. The method of embodiment 1, wherein in order to treat and prevent neurodegenerative diseases, viral and prokaryotic prion-like and/or Tetz-proteins are removed or inactivated in the CSF.

130. The method of embodiment 1, wherein in order to treat and prevent diseases in mammals, antibodies are used against viral or prokaryotic prion-like and/or Tetz-proteins, and these antibodies are administered to mammals for the purpose of entering the body fluids, including blood and the CSF.

131. The method of embodiment 1, wherein in order to treat and prevent diseases in mammals, antibodies are used against prion-like and/or Tetz-proteins of mammals that are formed under influence of viral and prokaryotic prion-like and/or Tetz-proteins are administered to mammals for the purpose of entering the body fluids, including blood and the CSF.

132. The method of embodiment 1, wherein in order to treat and prevent neurodegenerative and neurodevelopmental diseases, antibodies are used against viral or prokaryotic prion-like and/or Tetz-proteins, which are administered to mammals for the purpose of entering the body fluids, including blood and the CSF.

133. The method of embodiment 1, wherein in order to treat and prevent diseases in mammals, antibodies are used against viral or prokaryotic prion-like and/or Tetz-proteins, which are administered to mammals for the purpose of entering the body fluids, including blood and the CSF.

134. The method of embodiment 1, wherein in order to treat and prevent neurodegenerative diseases, antibodies are used against viral or prokaryotic prion-like and/or Tetz-proteins, which are administered to mammals for the purpose of entering the body fluids, including blood and the CSF.

135. The method of embodiment 1, wherein in order to treat and prevent diseases in humans, prion-like and/or Tetz-proteins in the biological fluids are inactivated, which occur as a result of entry of viral and prion-like prokaryotic and/or Tetz-proteins into the human body.

136. The method of embodiment 1, wherein in order to treat and prevent diseases in humans, antibodies against the prion-like and/or Tetz-proteins formed as a result of entry of viral and prion-like prokaryotic and/or Tetz-proteins into the human body are used.

137. The method of embodiment 1, wherein in order to diagnose human diseases, an identification of prion-like domains and viruses carrying prion-like domains is done within biological fluids or mammalian cells.

138. The method of embodiment 1, wherein in order to treat and prevent human diseases, the antiviral action is performed by disrupting the interaction of prion-like domains at the stages of adhesion, entry, biosynthesis, assembly or release, and maturation of viruses.

139. The method of embodiment 1, wherein for preventing and treating viral diseases, in which the prevention of development of a viral infection is achieved by inactivating prion-like domains on the surface of viral particles, including those involved in the adhesion and entry.

140. The method of embodiment 1, wherein for preventing and treating viral diseases, in which the prevention of development of a viral infection is achieved by inactivating viral prion-like domains, including those involved in the biosynthesis, the assembly and release of viral particles, as well as those involved in their maturation, inhibition of virus-induced change in the morphological, biochemical, or growth parameters of a cell, suppression by virus of host complement activation.

141. The method of embodiment 1, wherein for treating and preventing neurodegenerative diseases by preventing effects of viruses as seed aggregation misfolding proteins in the cerebrospinal fluid.

142. The method of embodiment 1, wherein for treating and preventing human diseases by diagnosis of presence of Tetz-proteins and prion-like proteins and PrDs of mammals, prokaryotes and viruses during blood transfusions.

143. The method of embodiment 1, wherein for treating viral infections in mammals by affecting prion-like domains of viruses.

144. The method of embodiment 1, wherein for treating viral infections in mammals by means of antibodies to prion-like domains of viruses.

145. The method of embodiment 1, wherein of treating viral infections of mammals, by means of shared use of antibodies to prion-like domains of viruses together with other drugs.

146. The method of embodiment 1, wherein for increasing the efficiency of antitumoral antibodies by adding prion-like sequences into their amino acid composition.

147. The method of embodiment 1, comprising preparing an antitumoral antibody comprising an amino acid composition of which includes prion-like sequences, wherein the prion-like sequences increase the efficiency of antitumoral antibodies by selection of antibodies to epitopes, antitumoral antibodies.

148. The method of embodiment 1, wherein for increasing the efficiency of oncolytic viruses, viruses are developed with an increased number of prion-like domains or Tetz-proteins on their surfaces.

149. The method of embodiment 1, comprising making synthetic oncolytic viruses by development of viruses with increased number of prion-like domains or Tetz-proteins on their surfaces.

150. The method of embodiment 1, wherein selection of patients entering clinical trials by determining a presence of (i) the prion-like and Tetz-proteins or the molecules involved in their formation present in microbiota, bodily fluid(s) and/or tissue(s) of the mammal. (Monitoring of the prion-like and Tetz-proteins or the molecules involved in their formation, components composition in human body for the Selection of Patients Entering Clinical Trials).

151. A method for diagnosing human diseases by measuring the qualitative and/or quantitative composition of Tetz-proteins prion-like thermostable proteins and mammalian proteins as diagnostic markers.

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

Example 1: Identification of PrDs in Viral Proteomes

To identify the PrDs present in viral proteomes, protein sequences were obtained from the UniProt KnowledgeBase (Swiss-Prot and TrEMBL). Protein functions were predicted using the GO terms and manually curated using the information from the UniProt database (UniProt Consortium, "Reorganizing the protein space at the Universal Protein Resource (UniProt)" Nucleic Acids Res., 2012, 40 (Database issue): D71-75), the National Center for Biotechnology Information (NCBI), and the literature data (Ashburner et al., 2000).

The presence of PrDs in viral proteomes was analyzed in the known viruses, excluding bacteriophages, using the PLAAC prion prediction algorithm, based on the HMM, and the identification of PrDs was based on the compositional bias towards asparagine and glutamine aminoacyls, an average residue hydrophobicity, and the net charge of sequences. For the analysis the total number of viral proteins contained in the UniProt database was adjusted, since in the proteomes of different viruses, multiple fragments of the same proteins had multiple representation. Therefore, multiple copies of the same sequences were removed in Excel (Windows 10) using the 'remove duplicates' function. With the LLR cutoff of 0.003, 2,681 PrDs were identified. The regularities in the likelihood of the identified PrDs to be prions, and their distribution among different viral orders and families were analyzed. The functions of proteins with the identified PrDs were classified using the manually-curated GO categories and were based on the major steps of viral replication. A heatmap was generated using R-statistical computing (see www.r-project.org) with the "levelplot" package. The values in the heatmap range between the lowest and the highest LLR values.

All statistical analyses were conducted using package Statistica for Windows (version 5.0) (StatSoft, Inc.). Data were compared between the viral orders, families, and species by using a $\chi 2$ test or the Fisher's exact test. To detect differences in multiple comparisons, one-way analysis of variance (ANOVA) was fitted with the standard confidence interval of 95%. All results were considered statistically significant for $p<0.05$.

Using the prion-prediction PLAAC algorithm described above, 2,679 PrPs in proteins from 735 different viruses were identified. In total, the inventors analyzed 2,742,160 proteins derived from the UniProtKB database from over 3000 viral species according to the International Committee on Taxonomy of Viruses (ICTV) (Adams et al., 2017).

The average numbers of LLRs varied between the DNA and RNA containing viruses as well as between the enveloped and non-enveloped ones. PrDs were more frequently found in the DNA-containing viruses. Enveloped viruses were also more frequently found to harbor PrD compared with the non-enveloped ones (FIG. 1).

High levels of PrDs were found in Herpesvirales, Megavirales, Mononegavirales, Nidovirales, Picornavirales, and Tymovirales (FIG. 2) (the members of the unassigned viral orders, represented by different unrelated families) are presented in Table 1. The distribution of PrDs was shown to vary, with the highest prevalence found in Herpesvirales (LLC=6.54).

TABLE 1

Summary of the LLR score of prion predictions across viral orders.

| virus order | N Obs | Mean | Std Dev | Minimum | Maximum | Median | Dunn test | | | | |
| --- | --- | --- | --- | --- | --- | --- | --- | --- | --- | --- | --- |
| | | | | | | | Herpesvirales | Megavirales | Mononegavirales | Picornavirales | Tymovirales |
| Herpesvirales | 500 | 6.74 | 7.73 | 0.02 | 63.80 | 4.24 | | | | | |
| Megavirales | 694 | 10.35 | 11.27 | 0.02 | 74.68 | 6.42 | <.0001 | | | | |
| Mononegavirales | 75 | 3.93 | 5.66 | 0.16 | 41.38 | 2.39 | 0.0109 | <.0001 | | | |
| Nidoviralles | 114 | 7.92 | 9.14 | 0.07 | 42.95 | 5.06 | 0.8978 | 0.1157 | 0.0059 | | |
| Picornavirales | 60 | 5.98 | 5.71 | 0.10 | 26.98 | 3.53 | 1 | 0.0406 | 0.2115 | 0.9579 | |
| Tymovirales | 23 | 6.43 | 5.17 | 0.07 | 16.83 | 5.91 | 0.9944 | 0.8398 | 0.2216 | 1 | .9926 |
| Unassigned | 1204 | 6.91 | 8.03 | 0.00 | 51.14 | 4.11 | | | | | |

Nonparametric analysis of variances $F_{5,296} = 27.63$; $p < .0001$
Pairwise comparison Dunn test To analyze the presence of PrDs in different viral orders, the inventors evaluated the ratio between the species identified in this study to possess at least one PrD and the total number of different viral species within that order (Table 1) (Adams et al., 2017).

TABLE 2

PrD enrichment in the proteomes of different viral orders

| Order | Number of PrD-containing species within one order | Total number of species within an order | PrD-containing species as the percentage of the total species number | P-value |
| --- | --- | --- | --- | --- |
| Herpesvirales | 74 | 103 | 71.84% | <0.0001 |
| Megavirales | 78 | ND | ND | ND |
| Mononegavirales | 35 | 212 | 16.51% | <0.0001 |
| Nidovirales | 60 | 64 | 93.75% | <0.0001 |
| Picornavirales | 44 | 138 | 31.88% | 0.7579 |
| Tymovirales | 16 | 179 | 8.94% | 0.948 |
| Unassigned | 427 | 2467 | 17.31% | <0.0001 |

The highest number of PrD-containing species are found among Nidovirales and Herpesvirales, with over 93.75% and 71.84% of species, respectively, containing PrDs, while the lowest numbers were found in Tymovirales, with only 8.94% of species with identified PrDs. The inventors have not included the results of Megavirales analysis due to the lack of classification data for this novel viral order (Colson et al., 2013).

Furthermore, the mean number of PrDs per species was calculated as the ratio of the total number of PrDs identified in viral proteomes attributed to an order to the total number of PrD-bearing species identified in this order. The highest average numbers of PrDs per species were identified in Megavirales and Herpesvirales species (Table 3).

TABLE 3

Mean PrD numbers per species in the same viral order

| Order | Number of PrD-carrying viral species | Total number of PrDs identified in the order | Mean number of PrDs per species |
| --- | --- | --- | --- |
| Herpesvirales | 74 | 500 | 6.75 |
| Megavirales | 78 | 694 | 8.86 |
| Mononegavirales | 35 | 85 | 2.42 |
| Nidovirales | 60 | 114 | 1.90 |
| Picornavirales | 44 | 60 | 1.36 |
| Tymovirales | 16 | 23 | 1.43 |
| Unassigned | 427 | 1204 | 2.83 |

Next, the LLRs in the viral orders and families were evaluated. The largest number of viruses with the highest LLR scores, over 50 and 40, were identified in the order Megavirales (families Mimiviridae, Phycodnaviridae, and Poxviridae), while only a few were obtained in Herpesviridae. (Tables 25 and 26). By analyzing top 100 scoring PrDs of the viruses with the greatest prion-forming potential, the inventors evaluated the highest LLR scores predominantly among Megavirales, Herpesviridae, and in viruses of unassigned orders. Twenty seven percent of these top 100 PrDs were identified in the Mimiviridae species, order Megavirales, of *Acanthamoeba*, with the mean LLR score of 48.68.

Additionally, the PrD enrichment in the proteomes of different viral species was analyzed. The highest enrichment rate was found for the members of the Megavirales order, with at least five PrDs per proteome in the viruses belonging to the Mimiviridae and Phycodnaviridae families. The highest number of different viral species with over 10 PrDs per proteome was found in the Herpesviridae family.

Example 2: Association of Viral PrDs with the Functional Domains

Figure 3:
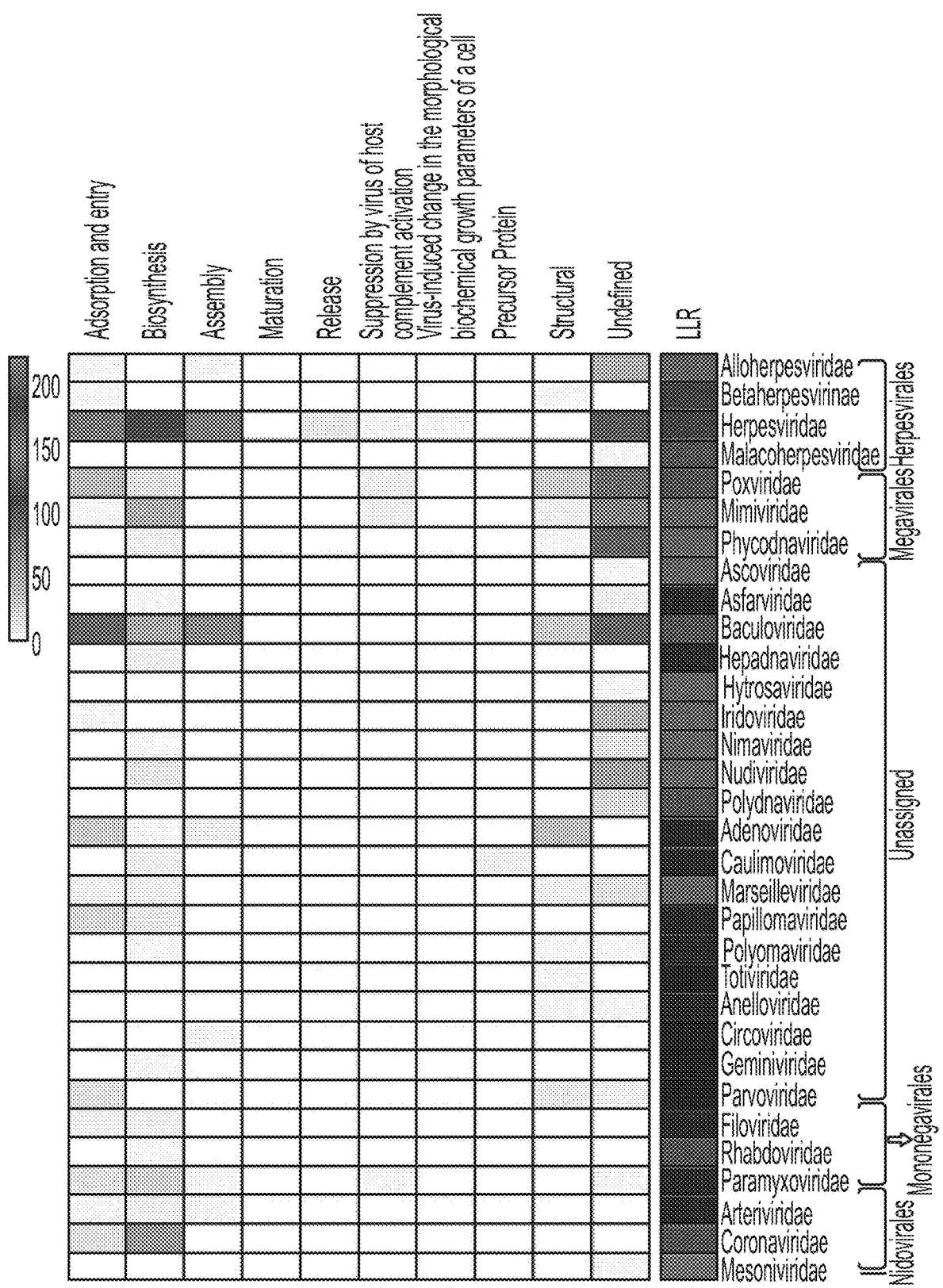
FIG. 3 shows PrD distribution in viral proteins as a heatmap, along with the GO term analyses. The correlations between the functions of PrD-containing proteins, PrD numbers, their LLR scores, and viral families are presented. Columns correspond to the main protein function; rows correspond to viral families. Cells are indexed by rows and columns are marked using a gradient, ranging from white (no PrD-containing proteins) to shaded (maximum number of proteins with PrDs). Mean LLC scores of proteins presented in the far-right column are denoted by using a gradient, ranging from black (score 0) to gray (score 70; color bar). Viral families are grouped according to their genetic material. The first 26 viruses are DNA viruses; the remaining viruses are RNA viruses.
Figure 3:
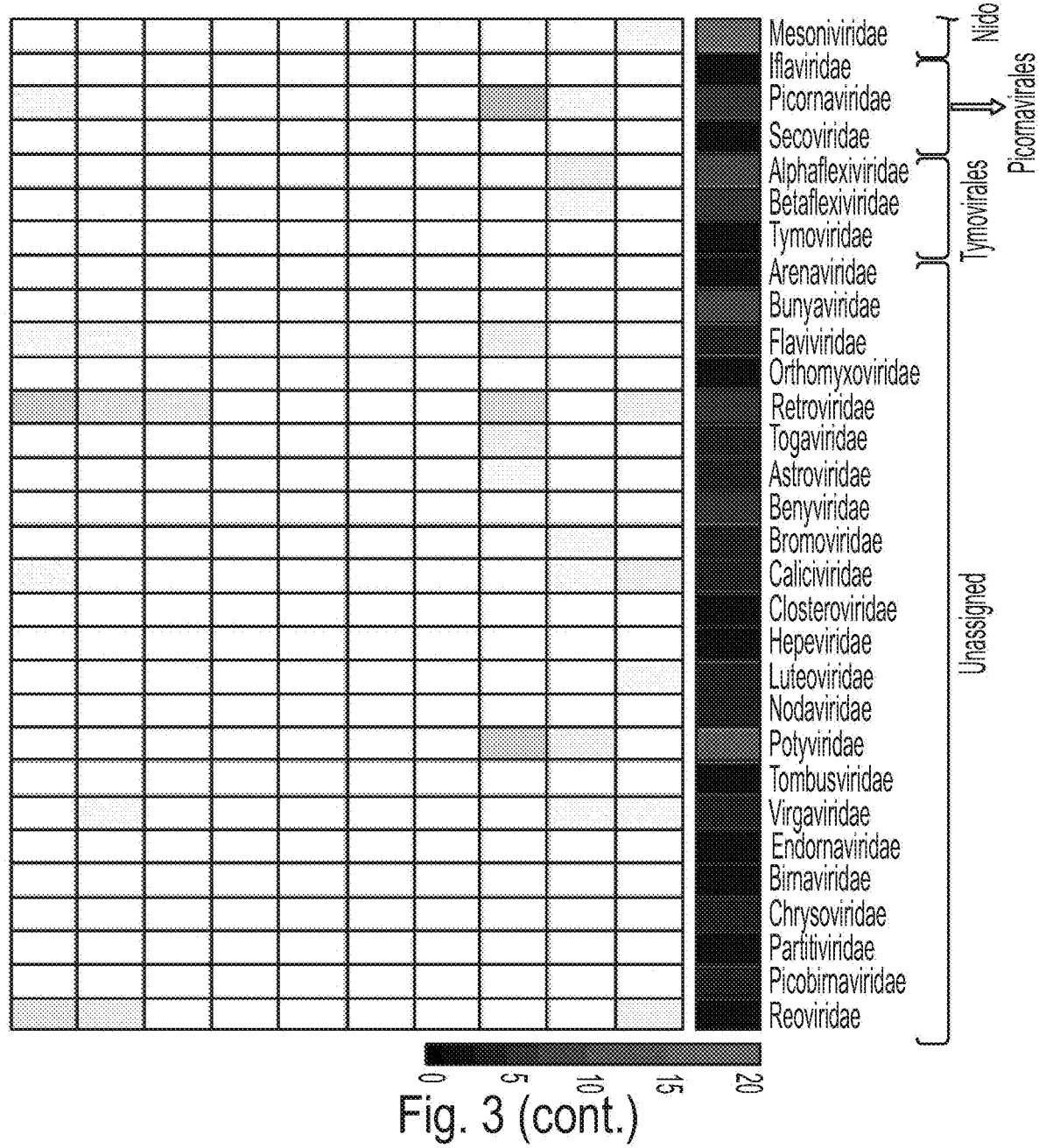

The inventors clustered PrDs into six functional groups based on the major processes during the viral interaction with the host cell: adsorption and entry, biosynthesis, including the transcription, translation, and synthesis of viral components, maturation, assembly, release, and a group comprising proteins with an unknown function (De Clercq, 2002). The inventors separately analyzed the PrDs in the viral precursor proteins (Yost and Marcotrigiano 2013). Additionally, the inventors analyzed the PrDs identified in proteins with the functions not related to the main viral processes, but that, nevertheless, play important roles in disease pathogenesis, the virus-induced changes in the morphological, biochemical, or growth parameters of cells, and the suppression of host complement activation. The correlations the PrDs and protein functions were identified, and the PrD numbers, their LLR scores, and viral families were analyzed (FIG. 3A).

To facilitate the interpretation of the results, the proteins were grouped based on their functions using the GO terms (FIGS. 7A-7H).

Following this, the inventors identified 433 PrPs (medium LLR score, 5.05) in proteins involved in the viral adsorption and entry, and predominantly associated with the host cell-membrane binding. This group contains proteins belonging to different GO terms, including the integral component of membrane, viral envelope, virion attachment to host cell, fusion of virus membrane with host plasma membrane, receptor-mediated virion attachment to host cell, and others (FIGS. 7A-7H). The inventors identified PrDs in proteins associated with the adsorption and those involved in the direct contact with the host cell, such as spike proteins, VP1, glycoproteins, hemagglutinin-neuraminidase, etc. (Bonavia et al., 2003). Heatmap analysis results showed that the members of Baculoviridae and Herpesviridae have the highest number of PrDs associated with the viral adsorption and entry (FIG. 3A). Furthermore, the inventors identified PrDs in glycoproteins and membrane proteins of viruses that affect human health, such as human α-, β-, and γ-herpesviruses (human herpes virus 1, 2, 5, and 7) and other viruses associated with human diseases, such as hepatitis B and C, Marburg virus, rotavirus A, human immunodeficiency virus 1 (HIV 1), and others (Kobiler et al., 2012).

The biggest cluster of PrDs (502 proteins) contained the proteins involved in viral transcription, translation, and protein synthesis (LLR score, 6.69), with multiple molecular functions and belonging to different GO terms. The members of Herpesviridae family contained the majority of these PrDs (FIG. 3A). The inventors identified PrDs in the DNA polymerases of different human herpesviruses, such as cytomegalovirus, Epstein-Barr, varicella-zoster viruses, and herpes simplex virus 2. Additionally, the inventors detected them in the Epstein-Barr nuclear antigens (EBNA) and large tegument protein deneddylase of these viruses, in the RNA-directed 5'-3' RNA polymerases and nucleoproteins of Filoviridae viruses, such as Marburg virus and Zaire ebolavirus, in the nucleoproteins of human coronavirus and porcine epidemic diarrhea (PED) virus (Coronaviridae), and others (Gastaldello et al., 2010; Menéndez-Arias and Andino, 2017).

Following this, the inventors analyzed PrD-containing viruses associated with the viral assembly. 209 PrDs were identified, with the mean LLR score of 7.79. The main GO terms represented were the viral capsid assembly, serine-type endopeptidase activity, nuclear capsid assembly, viral DNA genome packaging, and others (FIGS. 7A-7H). The key PrD-containing proteins shown to be involved in the viral assembly were identified in the Baculoviridae and Herpesviridae families. One or more of these PrD-containing structural proteins may promote LLPS. The inventors identified desmoplakin as the main PrD-containing protein in Baculoviridae, capsid scaffold protein and small capsomere-interacting protein 1 were the most abundant in different herpesviruses, Gag protein in many Retroviridae and other viruses (FIG. 3A) (Swanstrom et al., 1997; Chen et al., 1999).

The identified PrDs in proteins involved in the release of viral progeny from the host cell were shown to be less abundant, with only 19 proteins found to contain these domains (LLR score, 3.68). In the GO terms, this group predominantly comprised proteins associated with the DNA packaging and viral release from the host cell. The highest number of them were identified in Herpesviridae, including partial proteins, capsid vertex component 2, and tegument protein pp150 (FIG. 3A, 3B). One or more of these PrD-containing structural proteins may promote LLPS.

Additionally, the inventors identified six PrDs in proteins associated with the viral maturation (LLR score, 23.61) and with the GO terms associated with the integral components of the membrane and methyltransferase activity in different viruses (FIG. 3A) (Chiu and Chang 2002).

The PrDs were also detected in 223 structural proteins, predominantly represented by capsid, coat proteins, and hexons (mean LLR score, 5.78) (Ostapchuk and Hearing 2001). Notably, the majority of these proteins was found in different non-enveloped viruses, primarily from the Adenoviridae and Baculoviridae families, and these were less abundant in the enveloped viruses, primarily belonging to Poxviridae (FIGS. 7A-7H). One or more of these PrD-containing structural proteins may promote LLPS.

Furthermore, the inventors identified 138 PrDs (mean LLR score, 6.47) in the viral precursor proteins. Positive-strand RNA viruses are characterized by a positive strand RNA genome encoding a single poly-protein precursor, which, during the post-translational processing, are cleaved and processed into the mature proteins. PrDs were identified in the genome polyproteins of Picornavirales (foot-and-mouth disease virus, enterovirus B, and cardiovirus B) and Flaviviridae (Zika virus, hepatitis C virus), in the Gag polyprotein of Retroviridae (HIV1, bovine leukemia virus), and others (FIG. 3A, Table 12) (Belshaw et al., 2007; Perera and Kuhn, 2008).

The PrDs identified in the proteins associated with the viral suppression of host complement activation were less abundant, and only 39 of these proteins were identified (mean LLR score, 7.11). In the GO terms, they were represented with the G-protein coupled receptor activity, evasion or tolerance of host immune response, metal ion binding, and unassigned processes. PrDs were found in NF-kappa B inhibitors, envelope glycoprotein UL33, ankyrin repeat-containing protein, and others, and among different viruses, including some important human pathogens, such as cytomegalovirus, Kaposi's sarcoma-associated herpesvirus, and HIV1 and 2 (Varnum et al., 2004; Chan et al., 2016).

14 PrDs (mean LLR score, 11.09) were found in proteins implicated in the virus-induced change in the morphological, biochemical, or growth parameters of cells. Among these, late membrane protein 1 and K1 were identified in Epstein-Barr virus and Kaposi's sarcoma-associated herpesvirus (FIG. 3A) (Benedict et al., 2002).

Finally, 1097 PrDs were identified in proteins with still unknown functions (mean LLR score, 9.79). The vast majority of these are uncharacterized proteins, which has still not been reviewed in the GO terms.

Example 3: Use of Tetz-Proteins for the Detection and Treatment in Patients with Different Diseases For probe "N-plasma", healthy human blood plasma was heated at 100° C. for 5 minutes. For probe "N-plasma+proteinase K", healthy human blood plasma was incubated for 30 minutes with Proteinase K (100 mcg/ml) followed by heating at 100° C. for 5 minutes. For probe "N-plasma+DNA", healthy human blood plasma was incubated for 30 minutes with DNA (10 mcg), following by heating at 100° C. for 5 minutes. For, probe "Cancer", the blood of a patient with breast cancer was heated at 100° C. for 5 minutes. For probe "Cancer+proteinase K", the blood of a patient with breast cancer was treated with Proteinase K (100 mcg/ml) for 30 minutes and subsequently heated up to 100° C. for 5 minutes.

LC/MS was conducted as previously described. Table 4 below shows a comparison of Tetz-proteins found in the plasma of a healthy volunteers and cancer patients.

TABLE 4

| Identified Proteins (635) | Molecular Weight | N-plasma | Cancer |
|---|---|---|---|
| Cluster of Serum albumin OS = Homo sapiens GN = ALB PE = 1 | 69 kDa | 254 | 729 |
| Serum albumin OS = Homo sapiens GN = ALB PE = 1 SV = 2 | 69 kDa | 254 | 729 |
| Serum albumin OS = Homo sapiens GN = ALB PE = 1 SV = 1 | 69 kDa | 241 | 676 |
| Cluster of Complement C3 OS = Homo sapiens GN = C3 PE = 1 | 187 kDa | 77 | 186 |
| Complement C3 OS = Homo sapiens GN = C3 PE = 1 SV = 2 | 187 kDa | 77 | 186 |
| Complement C3 (Fragment) OS = Homo sapiens GN = C3 | 11 kDa | | 13 |
| Cluster of Serotransferrin OS = Homo sapiens GN = TF PE = 1 SV = 3 (TRFE_HUMAN) | 77 kDa | 59 | 121 |
| Serotransferrin OS = Homo sapiens GN = TF PE = 1 SV = 3 | 77 kDa | 59 | 121 |
| Serotransferrin (Fragment) OS = Homo sapiens GN = TF | 8 kDa | | 9 |
| Cluster of Complement C4-A OS = Homo sapiens GN = C4A | 193 kDa | 45 | 94 |
| Complement C4-A OS = Homo sapiens GN = C4A PE = 1 | 193 kDa | 44 | |
| Complement C4-B OS = Homo sapiens GN = C4B PE = 1 | 188 kDa | 44 | 94 |
| Cluster of Alpha-1-antitrypsin OS = Homo sapiens GN = SERPINA1 PE = 1 SV = 3 (A1AT_HUMAN) | 47 kDa | 178 | 135 |
| Alpha-1-antitrypsin OS = Homo sapiens GN = SERPINA1 PE = 1 SV = 3 | 47 kDa | 178 | 135 |
| Alpha-1-antitrypsin OS = Homo sapiens GN = SERPINA1 | 47 kDa | 160 | 125 |
| Alpha-2-macroglobulin OS = Homo sapiens GN = A2M PE = 1 SV = 3 | 163 kDa | 76 | 115 |
| Fibronectin OS = Homo sapiens GN = FN1 PE = 1 SV = 4 | 263 kDa | 12 | 82 |
| Hemopexin OS = Homo sapiens GN = HPX PE = 1 SV = 2 | 52 kDa | 37 | 65 |
| Cluster of Gelsolin OS = Homo sapiens GN = GSN PE = 1 SV = 1 | 86 kDa | 3 | 18 |
| Gelsolin OS = Homo sapiens GN = GSN PE = 1 SV = 1 | 86 kDa | 3 | 18 |
| Gelsolin (Fragment) OS = Homo sapiens GN = GSN PE = 1 | 29 kDa | | 6 |
| Gelsolin (Fragment) OS = Homo sapiens GN = GSN PE = 1 | 26 kDa | | 2 |
| Ceruloplasmin OS = Homo sapiens GN = CP PE = 1 SV = 1 | 122 kDa | 24 | 59 |
| Immunoglobulin heavy constant gamma 1 | 44 kDa | 36 | 50 |
| Cluster of cDNA FLJ55673, highly similar to Complement factor B | 141 kDa | 11 | 37 |
| CDNA FLJ55673, highly similar to Complement factor B | 141 kDa | 11 | 36 |
| Complement C2 OS = Homo sapiens GN = C2 PE = 1 SV = 2 | 83 kDa | | 4 |
| Vitamin D-binding protein OS = Homo sapiens GN = GC PE = 1 | 53 kDa | 15 | 35 |
| Cluster of Complement factor H OS = Homo sapiens GN = CFH | 139 kDa | 15 | 51 |
| Complement factor H OS = Homo sapiens GN = CFH PE = 1 | 139 kDa | 15 | 48 |
| Complement factor H-related protein 1 OS | 31 kDa | | 6 |
| Immunoglobulin heavy constant gamma 2 OS | 36 kDa | 11 | 39 |
| Pigment epithelium-derived factor OS | 46 kDa | | 8 |
| Plasminogen OS = Homo sapiens GN = PLG PE = 1 SV = 2 | 91 kDa | 6 | 29 |
| Immunoglobulin heavy constant gamma 3 OS = Homo sapiens GN = IGHG3 PE = 1 V = 2 | 41 kDa | 14 | 30 |
| Cluster of ITIH4 protein OS = Homo sapiens GN = ITIH4 PE = 1 | 104 kDa | 11 | 39 |
| ITIH4 protein OS = Homo sapiens GN = ITIH4 PE = 1 SV = 1 | 104 kDa | 11 | 39 |
| Inter-alpha-trypsin inhibitor heavy chain H4 (Fragment) | 80 kDa | 8 | 28 |
| Afamin OS = Homo sapiens GN = AFM PE = 1 SV = 1 | 69 kDa | 15 | 25 |
| Alpha-1-acid glycoprotein 2 OS = Homo sapiens GN = ORM2 | 24 kDa | 145 | 106 |
| Cluster of Hemoglobin subunit alpha OS = Homo sapiens | 15 kDa | | 5 |
| Hemoglobin subunit alpha OS = Homo sapiens | 15 kDa | | 5 |
| CON P01966 | ? | | 4 |
| Heparin cofactor 2 OS = Homo sapiens GN = SERPIND1 | 57 kDa | 7 | 16 |
| Inter-alpha-trypsin inhibitor heavy chain H2 | 106 kDa | 9 | 26 |
| Vitronectin OS = Homo sapiens GN = VTN PE = 1 SV = 1 | 54 kDa | 9 | 16 |
| Inter-alpha-trypsin inhibitor heavy chain H1 | 101 kDa | 8 | 24 |
| Complement C5 OS = Homo sapiens GN = C5 PE = 1 SV = 4 | 188 kDa | | 22 |

TABLE 4-continued

| Identified Proteins (635) | Molecular Weight | N-plasma | Cancer |
|---|---|---|---|
| Retinol binding protein 4, plasma, isoform CRA_b OS = Homo | 23 kDa | 4 | 10 |
| Vitamin K-dependent protein S OS = Homo sapiens | 75 kDa | 3 | 8 |
| Immunoglobulin heavy constant mu OS = Homo sapiens | 49 kDa | 21 | 40 |
| N-acetylmuramoyl-L-alanine amidase | 62 kDa | 2 | 13 |
| Complement C1q subcomponent subunit B (Fragment) | 24 kDa | | 5 |
| **Immunoglobulin lambda constant 7 OS = *Homo sapiens* | 11 kDa | | 16** |
| **Cluster of Actin, cytoplasmic 1 OS = *Homo sapiens* | 42 kDa | | 12** |
| **Actin, cytoplasmic 1 OS = *Homo sapiens* GN = ACTB | 42 kDa | | 12** |
| **Coagulation factor XII OS = *Homo sapiens* GN = F12 PE = 1 | 68 kDa | | 10** |
| Keratin, type II cytoskeletal 2 epidermal OS = Homo sapiens | 65 kDa | 1 | 3 |
| SAA2-SAA4 readthrough OS = Homo sapiens GN = SAA2- | 23 kDa | 4 | 10 |
| **Complement component C6 OS = *Homo sapiens* GN = C6 | 105 kDa | | 7** |
| **Calmodulin-1 OS = *Homo sapiens* GN = CALM1 PE = 1 SV = 1 | 17 kDa | | 7** |
| Keratin, type I cytoskeletal 9 OS = Homo sapiens GN = KRT9 | 62 kDa | 10 | 5 |
| Cluster of Thymosin beta-4 OS = Homo sapiens GN = TMSB4X | 5 kDa | 1 | 13 |
| Thymosin beta-4 OS = Homo sapiens GN = TMSB4X PE = 1 | 5 kDa | 1 | 12 |
| **Thymosin beta-10 OS = *Homo sapiens* GN = TMSB10 | 5 kDa | | 2** |
| Apolipoprotein B-100 OS = Homo sapiens GN = APOB | 516 kDa | 48 | 117 |
| Apolipoprotein(a) OS = Homo sapiens GN = LPA PE = 1 SV = 1 | 501 kDa | 28 | 5 |
| CD5 antigen-like OS = Homo sapiens GN = CD5L PE = 1 SV = 1 | 38 kDa | 3 | 13 |
| Cadherin-5 OS = Homo sapiens GN = CDH5 PE = 1 SV = 5 | 88 kDa | 14 | 5 |
| C4b-binding protein alpha chain OS = Homo sapiens | 67 kDa | 4 | 17 |
| **Cluster of Tropomyosin alpha-4 chain OS = *Homo sapiens* | 29 kDa | | 29** |
| **Tropomyosin alpha-4 chain OS = *Homo sapiens* = 3 | 29 kDa | | 24** |
| **Tropomyosin beta chain OS = *Homo sapiens* GN = TPM2 | 33 kDa | | 13** |
| Tropomyosin alpha-4 chain (Fragment) | 21 kDa | | 10 |
| Cluster of Epididymis luminal protein 189 | 27 kDa | | 30 |
| Epididymis luminal protein 189 | 27 kDa | | 18 |
| Tropomyosin alpha-1 chain | 32 kDa | | 12 |
| Tropomyosin 1 (Alpha), isoform CRA_f | 37 kDa | | 13 |
| Tropomyosin alpha-3 chain | 33 kDa | | 16 |

Blood plasma of normal healthy volunteers and cancer patients differs in that cancer blood plasma contains certain Tetz-proteins that are not found in normal plasma, and thus can be used for diagnosis. These proteins are indicated in bold in Table 4 and shown below in Table 5.

TABLE 5

| Identified Proteins (635) | Molecular Weight | Cancer |
|---|---|---|
| Complement C3 (Fragment) OS = Homo sapiens | 11 kDa | 13 |
| CON__Q2UVX4 | ? | 7 |
| Serotransferrin (Fragment) OS = Homo sapiens | 8 kDa | 9 |
| Gelsolin (Fragment) OS = Homo sapiens GN = GSN | 29 kDa | 6 |
| Gelsolin (Fragment) OS = Homo sapiens GN = GSN | 26 kDa | 2 |
| Complement C2 OS = Homo sapiens GN = C2 | 83 kDa | 4 |
| Complement factor H-related protein 1 | 31 kDa | 6 |
| Pigment epithelium-derived factor | 46 kDa | 8 |
| Cluster of Hemoglobin subunit alpha | 15 kDa | 5 |
| Hemoglobin subunit alpha | 15 kDa | 5 |
| CON__P01966 | ? | 4 |
| Complement C5 OS = Homo sapiens GN = C5 PE = 1 | 188 kDa | 22 |
| Complement C1q subcomponent subunit B (Fragment) | 24 kDa | 5 |
| Immunoglobulin lambda constant 7 | 11 kDa | 16 |
| Cluster of Actin, cytoplasmic 1 | 42 kDa | 12 |
| Actin, cytoplasmic 1 OS = Homo sapiens GN = ACTB | 42 kDa | 12 |
| Coagulation factor XII OS = Homo sapiens GN = F12 | 68 kDa | 10 |
| Complement component C6 OS = Homo sapiens | 105 kDa | 7 |
| Calmodulin-1 OS = Homo sapiens GN = CALM1 PE = 1 | 17 kDa | 7 |
| Thymosin beta-10 OS = Homo sapiens GN = TMSB10 | 5 kDa | 2 |
| Cluster of Tropomyosin alpha-4 chain | 29 kDa | 29 |
| Tropomyosin alpha-4 chain | 29 kDa | 24 |
| Tropomyosin beta chain | 33 kDa | 13 |
| Tropomyosin alpha-4 chain (Fragment) | 21 kDa | 10 |
| Cluster of Epididymis luminal protein 189 | 27 kDa | 30 |
| Epididymis luminal protein 189 | 27 kDa | 18 |
| Tropomyosin alpha-1 chain | 32 kDa | 12 |
| Tropomyosin 1 (Alpha), isoform CRA_f | 37 kDa | 13 |
| Tropomyosin alpha-3 chain | 33 kDa | 16 |

Some non-limiting examples of such Tetz-proteins include CON_Q2UVX4, Serotransferrin, Gelsolin, Complement C2, Complement factor H-related protein 1, Pigment epithelium-derived factor, Hemoglobin subunit alpha, Complement C5, Complement C1q, Immunoglobulin lambda constant 7, Actin, cytoplasmic 1, Coagulation factor XII, Complement component C6, Calmodulin-1, Tropomyosin alpha-4, Tropomyosin beta Epididymis luminal protein 189, Tropomyosin alpha-1, Tropomyosin alpha-3. Also, certain Tetz-proteins were not found in cancer plasma but were found in plasma for normal healthy volunteers, leading to the altered amount of Tetz-proteins following Tetz-proteins isolation. A non-limiting example includes Complement C4-A. These identified proteins may serve as a qualitative and/or quantitative diagnostic tool. Moreover, the Tetz-proteins whose abundance is changed compared to normal plasma, or which are found solely in cancer specimens, can be used as a target for the treatment.

Table 6 below shows a comparison of Tetz-proteins in the plasma of healthy volunteers, the plasma of healthy volunteers after processing with DNA, and cancer patients. Table 7 below shows the Tetz-proteins that are not present in plasma of healthy volunteers but are present in plasma of healthy volunteers after processing with DNA, and are present in the plasma of patients with cancer.

TABLE 6

| Identified Proteins (635) | N-plasma | N-plasma + DNA | Cancer |
|---|---|---|---|
| Cluster of Serum albumin OS = *Homo sapiens* GN = ALB PE = 1 | 254 | 532 | 729 |
| Serum albumin OS = *Homo sapiens* GN = ALB PE = 1 SV = 2 | 254 | 532 | 729 |
| Serum albumin OS = *Homo sapiens* GN = ALB PE = 1 SV = 1 | 241 | 502 | 676 |
| Cluster of Complement C3 OS = *Homo sapiens* GN = C3 PE = 1 | 77 | 120 | 186 |
| Complement C3 OS = *Homo sapiens* GN = C3 PE = 1 SV = 2 | 77 | 120 | 186 |
| CON__Q2UVX4 | | 7 | 7 |
| Cluster of Serotransferrin OS = *Homo sapiens* GN = TF PE = 1 | 59 | 88 | 121 |
| Serotransferrin OS = *Homo sapiens* GN = TF PE = 1 SV = 3 | 59 | 88 | 121 |
| **Serotransferrin (Fragment) OS = *Homo sapiens* GN = TF | | 5 | 9** |
| Alpha-2-macroglobulin OS = *Homo sapiens* GN = A2M PE = 1 SV = 3 | 76 | 101 | 115 |
| Fibronectin OS = *Homo sapiens* GN = FN1 PE = 1 SV = 4 | 12 | 38 | 82 |
| Hemopexin OS = *Homo sapiens* GN = HPX PE = 1 SV = 2 | 37 | 52 | 65 |
| Ceruloplasmin OS = *Homo sapiens* GN = CP PE = 1 SV = 1 | 24 | 39 | 59 |
| Immunoglobulin heavy constant gamma 1 (Fragment) OS = *Homo sapiens* GN = IGHG1 PE = 1 SV = 1 | 36 | 50 | 50 |
| Cluster of cDNA FLJ55673, highly similar to Complement factor B | 11 | 20 | 37 |
| cDNA FLJ55673, highly similar to Complement factor B | 11 | 20 | 36 |
| Vitamin D-binding protein OS = *Homo sapiens* | 15 | 32 | 35 |
| Cluster of Complement factor H OS = *Homo sapiens* GN = CFH | 15 | 31 | 51 |
| Complement factor H OS = *Homo sapiens* GN = CFH PE = 1 SV = 4 | 15 | 29 | 48 |
| **Complement factor H-related protein 1 OS = *Homo sapiens* | | 4 | 6** |
| Immunoglobulin heavy constant gamma 2 OS = *Homo sapiens* | 11 | 29 | 39 |
| **Pigment epithelium-derived factor OS = *Homo sapiens* | 4 | 3 | 8** |
| Plasminogen OS = *Homo sapiens* GN = PLG PE = 1 SV = 2 | 6 | 19 | 29 |
| Cluster of ITIH4 protein OS = *Homo sapiens* GN = ITIH4 PE = 1 | 11 | 24 | 39 |
| ITIH4 protein OS = *Homo sapiens* GN = ITIH4 PE = 1 SV = 1 | 11 | 24 | 39 |
| Inter-alpha-trypsin inhibitor heavy chain H4 (Fragment) 1 | 8 | 18 | 28 |
| Cluster of Hemoglobin subunit alpha) | | 5 | 5 |
| Hemoglobin subunit alpha | | 5 | 5 |
| CON__P01966 | | 4 | 4 |
| Inter-alpha-trypsin inhibitor heavy chain H2 | 9 | 20 | 26 |
| **Complement C5 OS = *Homo sapiens* GN = C5 PE = 1 SV = 4 | | 6 | 22** |
| Immunoglobulin lambda constant 7 | | 12 | 16 |

TABLE 7

| Identified Proteins (635) | N-plasma + DNA | Cancer |
|---|---|---|
| CON__Q2UVX4 | 7 | 7 |
| Serotransferrin (Fragment) OS = *Homo sapiens* | 5 | 9 |
| Complement factor H-related protein 1 OS = *Homo* | 4 | 6 |
| Pigment epithelium-derived factor OS = *Homo sapiens* | 3 | 8 |
| Cluster of Hemoglobin subunit alpha | 5 | 5 |
| Hemoglobin subunit alpha | 5 | 5 |
| CON__P01966 | 4 | 4 |
| Complement C5 OS = *Homo sapiens* GN = C5 PE = 1 | 6 | 22 |
| Immunoglobulin lambda constant 7 | 12 | 16 |

Treatment of blood plasma with DNA led to the (a) formation of certain Tetz-proteins that are not found in normal plasma, but are typical/found in cancer specimens. These proteins are indicated in bold in Table 6 and shown above in Table 7. Non-limiting examples include: CON_Q2UVX4, Serotransferrin, Complement factor H-related protein 1, Pigment epithelium-derived factor, Cluster of Hemoglobin subunit alpha, Hemoglobin subunit alpha, CON_P01966, Complement C5, Immunoglobulin lambda constant 7. Also, treatment with DNA altered the amount of Tetz-proteins in a normal sample such that the amount of Tetz-proteins was similar to that found in cancer samples. Therefore, the addition of DNA (including, but not limited to eukaryotic, prokaryotic or extracellular prokaryotic DNA) to the blood specimens can be used for the diagnostics of human diseases. Moreover, increased amounts of bacterial DNA in blood plasma can lead to the formation of altered Tetz-proteins and thus can be used a therapeutic target.

Table 8 below shows a comparison of Tetz-proteins in plasma of healthy volunteers and cancer patients, both before and after processing with proteases.

Such Tetz-proteins can be used for diagnosis, with non-limiting examples including Complement C3, CON_Q2UVX4, Serotransferrin, Gelsolin, Immunoglobulin lambda constant 7, and Inter-alpha-trypsin inhibitor heavy chain H3. Other Tetz-proteins form in cancer blood plasma

TABLE 8

| Identified Proteins Accession Number | MW (kDa) | N-plasma | N-plasma + pK | Effect | Cancer | Cancer + pK | Effect |
|---|---|---|---|---|---|---|---|
| ALBU_HUMAN [3] | 69 | 254 | 440 | ↑ | 729 | 555 | ↓ |
| ALBU_HUMAN (+1) | 69 | 254 | 440 | ↑ | 729 | 554 | ↓ |
| A0A0C4DGB6_HUMAN | 69 | 241 | 390 | ↑ | 676 | 475 | ↓ |
| CO3_HUMAN [3] | 187 | 77 | 93 | ↑ | 186 | 122 | ↓ |
| CO3_HUMAN | 187 | 77 | 88 | ↑ | 186 | 119 | ↓ |
| M0R0Q9_HUMAN | 11 | | 6 | ↑ | 13 | 5 | ↓ |
| CON_Q2UVX4 | ? | | 6 | | 7 | 8 | |
| TRFE_HUMAN [2] | 77 | 59 | 135 | ↑ | 121 | 113 | ↓ |
| TRFE_HUMAN | 77 | 59 | 134 | ↑ | 121 | 113 | ↓ |
| C9JB55_HUMAN | 8 | | 12 | ↑ | 9 | 8 | |
| CO4A_HUMAN [2] | 193 | 45 | 48 | | 94 | 57 | ↓ |
| CO4A_HUMAN | 193 | 44 | 45 | | | 54 | ↑ |
| F5GXS0_HUMAN | 188 | 44 | 43 | | 94 | 52 | ↓ |
| A2MG_HUMAN | 163 | 76 | 109 | ↑ | 115 | 117 | |
| FINC_HUMAN | 263 | 12 | 72 | ↑ | 82 | 84 | |
| HEMO_HUMAN | 52 | 37 | 53 | ↑ | 65 | 56 | ↓ |
| GELS_HUMAN | 86 | 3 | 32 | ↑ | 18 | 28 | |
| Q5T0I0_HUMAN | 29 | | 5 | ↑ | 6 | 5 | |
| A0A0U1RQL8_HUMAN | 26 | | 1 | | 2 | 2 | |
| CERU_HUMAN | 122 | 24 | 40 | ↑ | 59 | 46 | ↓ |
| A0A0A0MS08_HUMAN | 44 | 36 | 45 | ↑ | 50 | 36 | ↓ |
| B4E1Z4_HUMAN [2] | 141 | 11 | 22 | ↑ | 37 | 25 | ↓ |
| B4E1Z4_HUMAN | 141 | 11 | 22 | ↑ | 36 | 25 | ↓ |
| VTDB_HUMAN | 53 | 15 | 32 | ↑ | 35 | 32 | |
| CFAH_HUMAN [3] | 139 | 15 | 58 | ↑ | 51 | 56 | |
| CFAH_HUMAN | 139 | 15 | 56 | ↑ | 48 | 54 | |
| IGHG2_HUMAN | 36 | 11 | 31 | ↑ | 39 | 26 | ↓ |
| PLMN_HUMAN | 91 | 6 | 22 | ↑ | 29 | 19 | ↓ |
| IGHG3_HUMAN | 41 | 14 | 25 | ↑ | 30 | 23 | ↓ |
| B7ZKJ8_HUMAN [3] | 104 | 11 | 34 | ↑ | 39 | 39 | |
| B7ZKJ8_HUMAN (+1) | 104 | 11 | 34 | ↑ | 39 | 39 | |
| IGHA1_HUMAN [2] | 38 | 28 | 36 | ↑ | 39 | 31 | |
| IGHA1_HUMAN | 38 | 22 | 30 | ↑ | 39 | 31 | |
| A0A0G2JMB2_HUMAN | 37 kDa | 21 | 26 | ↑ | 28 | 21 | ↓ |
| APOH_HUMAN | 38 | 13 | 22 | ↑ | 24 | 24 | |
| FIBA_HUMAN | 95 | 113 | 74 | ↓ | 84 | 94 | ↑ |
| ITIH2_HUMAN (+1) | 106 | 9 | 24 | ↑ | 26 | 19 | ↓ |
| ITIH1_HUMAN | 101 | 8 | 23 | ↑ | 24 | 24 | |
| A0A087WYJ9_HUMAN | 49 | 21 | 43 | ↑ | 40 | 31 | ↓ |
| IGLC7_HUMAN | 11 | | 13 | ↑ | 16 | 15 | |
| APOB_HUMAN | 516 | 48 | 100 | ↑ | 117 | 102 | ↓ |
| C4BPA_HUMAN | 67 | 4 | 10 | ↑ | 17 | 4 | ↓ |
| A0A087WW43_HUMAN | 75 | | 10 | ↑ | 3 | 9 | |
| FLNA_HUMAN (+2) | 281 | | | | | 18 | ↑ |
| VINC_HUMAN | 124 | | | | | 10 | ↑ |

Treatment of blood plasma of volunteers and cancer patients with proteases led to the (a) formation of certain Tetz-proteins that are not found in normal plasma but are found in cancer blood plasma. Exemplary such proteins are listed in Table 9.

with protease treatment that are not formed in normal plasma. These Tetz-proteins can be used for diagnosis. Examples of such proteins are listed in Table 10. Treatment of blood plasma of cancer patients with proteases can lead to decreased levels of a set of Tetz-proteins (for example,

TABLE 9

| Identified Proteins Accession Number | N-plasma | N-plasma + pk | Effect | Cancer | Cancer + pk | Effect |
|---|---|---|---|---|---|---|
| M0R0Q9_HUMAN | | 6 | ↑ | 13 | 5 | ↓ |
| CON_Q2UVX4 | | 6 | ↑ | 7 | 8 | |
| C9JB55_HUMAN | | 12 | ↑ | 9 | 8 | |
| Q5T0I0_HUMAN | | 5 | ↑ | 6 | 5 | |
| A0A0U1RQL8_HUMAN | | 1 | | 2 | 2 | |
| IGLC7_HUMAN | | 13 | ↑ | 16 | 15 | |
| A0A087WW43_HUMAN | | 10 | ↑ | 3 | 9 | | those listed in Table 11) while treatment of blood plasma of healthy subjects (or volunteers) either increases or does not significantly change the levels of the Tetz-proteins in the same set.

TABLE 10

| Identified Proteins/<br>Accession Number | N-plasma | N-plasma +<br>pK | Effect | Cancer | Cancer +<br>pK | Effect |
|---|---|---|---|---|---|---|
| Complement C4-A | 44 | 45 | | | 54 | ↑ |
| Fibrinogen alpha chain | 113 | 74 | ↓ | 84 | 94 | ↑ |
| Filamin-A | | | | | 18 | ↑ |
| Vinculin OS | | | | | 10 | ↑ |

TABLE 11

| Identified Proteins<br>Accession Number | N-plasma | N-plasma +<br>pK | Effect | Cancer | Cancer +<br>pk | Effect |
|---|---|---|---|---|---|---|
| ALBU_HUMAN [3] | 254 | 440 | ↑ | 729 | 555 | ↓ |
| ALBU_HUMAN (+1) | 254 | 440 | ↑ | 729 | 554 | ↓ |
| A0A0C4DGB6_HUMAN | 241 | 390 | ↑ | 676 | 475 | ↓ |
| CO3_HUMAN [3] | 77 | 93 | ↑ | 186 | 122 | ↓ |
| CO3_HUMAN | 77 | 88 | ↑ | 186 | 119 | ↓ |
| M0R0Q9_HUMAN | | 6 | ↑ | 13 | 5 | ↓ |
| TRFE_HUMAN [2] | 59 | 135 | ↑ | 121 | 113 | ↓ |
| TRFE_HUMAN | 59 | 134 | ↑ | 121 | 113 | ↓ |
| CO4A_HUMAN [2] | 45 | 48 | | 94 | 57 | ↓ |
| F5GXS0_HUMAN | 44 | 43 | | 94 | 52 | ↓ |
| HEMO_HUMAN | 37 | 53 | ↑ | 65 | 56 | ↓ |
| CERU_HUMAN | 24 | 40 | ↑ | 59 | 46 | ↓ |
| A0A0A0MS08_HUMAN (+1) | 36 | 45 | ↑ | 50 | 36 | ↓ |
| B4E1Z4_HUMAN [2] | 11 | 22 | ↑ | 37 | 25 | ↓ |
| B4E1Z4_HUMAN | 11 | 22 | ↑ | 36 | 25 | ↓ |
| IGHG2_HUMAN | 11 | 31 | ↑ | 39 | 26 | ↓ |
| PLMN_HUMAN | 6 | 22 | ↑ | 29 | 19 | ↓ |
| IGHG3_HUMAN | 14 | 25 | ↑ | 30 | 23 | ↓ |
| A0A0G2JMB2_HUMAN | 21 | 26 | ↑ | 28 | 21 | ↓ |
| ITIH2_HUMAN (+1) | 9 | 24 | ↑ | 26 | 19 | ↓ |
| A0A087WYJ9_HUMAN (+1) | 21 | 43 | ↑ | 40 | 31 | ↓ |
| APOB_HUMAN | 48 | 100 | ↑ | 117 | 102 | ↓ |
| C4BPA_HUMAN | 4 | 10 | ↑ | 17 | 4 | ↓ |

Further, the protease activity that leads to the formation of novel/altered abundance of Tetz-proteins in cancer patients can be used as a therapeutic target.

Example 4: Identification of Tetz-Proteins in Blood Plasma 5 ml of blood plasma of healthy volunteers was used and was divided into the groups listed below. Each group was heated with different temperature regimens and/or treated with proteinase K (Sigma Aldrich) from 10 to 250 mcg/ml and/or treated with DNA from 10 to 250 mcg/ml:

Group #1—plasma heated at 80° C. for 1 minute
Group #2—plasma heated at 80° C. for 30 minutes
Group #3—plasma heated at 100° C. for 15 minutes
Group #4—plasma heated at 150° C. for 15 minutes
Group #5—plasma heated at 100° C. for 15 min treated with proteinase K 10 mcg/ml for 30 min (37° C.)
Group #6—plasma heated at 100° C. for 15 minutes+ treated with proteinase K 10 mcg/ml for 30 min at room temperature
Group #7—plasma heated at 100° C. for 15 minutes+ treated with proteinase K 250 mcg/ml for 30 min (37° C.)
Group #8—plasma heated at 100° C. for 15 minutes+ treated with proteinase K 100 mcg/ml for 3 min at room temperature
Group #9—plasma heated at 100° C. for 15 minutes+ treated with DNA 100 mcg/ml for 30 min at 37° C.
Group #10—plasma heated at 100° C. for 15 minutes+ treated with DNA 1 mcg/ml for 30 min at 37° C.
Group #11—plasma heated at 100° C. for 15 minutes+ treated with DNA 1 mcg/ml for 30 min at 37° C. and treated with proteinase K 100 mcg/ml for 30 min at 37° C.

Protein bands were analyzed with gel electrophoresis and subsequently subjected to LC/MS analysis. Electrophoresis was conducted in the BIO-RAD Mini PROTEAN Tetra Cell (Bio-Rad Laboratories) at 60 volts for about 40 minutes with 12% polyacrylamide gel (Bio-Rad Laboratories). Proteins were stained with Coomassie blue and then were destained with Destining Solution according to manufacturer's instructions (all Bio-Rad Laboratories).

LC/MS analysis was conducted using nanoflow UPLC-MS/MS (Thermo Q Exactive HF Orbitrap) in which ultra high-performance liquid chromatography was coupled to tandem mass spectrometry according to the manufacturer's instructions.

Analysis for the presence of prion-like domains in the identified proteins was conducted with prion-like amino acid composition algorithm (PLAAC) (plaac.wi.mit.edu). PLAAC analysis involves evaluation of proteins to determine if they contain prion-like domains, defined as domains with compositional similarity to yeast prion domains, based on amino-acid interaction sets (Michelitsch and Weissman, 2000; Batlle et al., 2017). The resulting log-likelihood ratio (LLR) indicates the possibility that the analyzed protein is a prion. Using PLAAC algorithms, PrDs, defined as domains shown to contain at least a domain compositionally similar to yeast prions, were recently investigated in different species, both eukaryotic and prokaryotic, confirming their important regulatory and functional roles (Malinovska et al., 2013; Iglesias et al., 2015; March et al., 2016; Tetz and Tetz 2017).

Figure 4:
FIG. 4 is a Coomassie-stained acrylamide gel showing thermostable proteins of human blood plasma before and after proteinase K treatment. Lane 1 shows a molecular weight marker (250-10 kB, BioRad), lane 2 shows a human plasma and proteinase K (100 mcg/ml, 37° C., 30 minutes exposition), and lane 3 shows human plasma.
Figure 5:
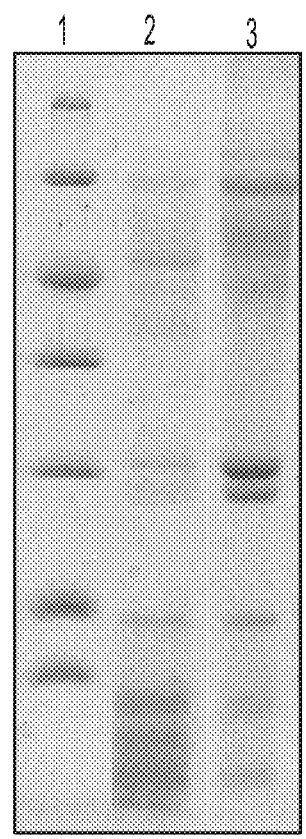
FIG. 5 is a Coomassie-stained acrylamide gel showing thermostable proteins of human blood plasma before and after DNA treatment. Lane 1 shows a molecular weight marker (250-10 KB, BioRad), lane 2 shows a human plasma and proteinase K (100 mcg/ml, 37° C., 30 minutes exposition), and lane 3 shows human plasma.

The presence of thermostable proteins was found in all the groups. Moreover, the alteration of the electrophoretic profile of these proteins under proteinase K and DNA treatment was identical for all the probes. The results for some of them are shown in FIGS. 4 and 5. As it is seen, human blood plasma possesses thermostable proteins. The content of these proteins is changed under Proteinase K and DNA treatment.

Thermostable proteins from healthy blood plasma before and after proteinase K and DNA treatment lack known prion-like domains and the amounts of such proteins were changed by processing with proteases, nucleic acids, or combinations of proteases and nucleic acids. Identified thermostable proteins were analyzed with a PLAAC algorithm dedicated to identify prion-like domains that could address thermostable properties of these proteins, but have not found any prion-like domains within these proteins (for some proteins data are illustrated with FIGS. 6A and 6B).

Example 5: Identification of Tetz-Proteins in Cerebrospinal Fluid 5 ml of cerebrospinal fluid (CSF) of healthy volunteers was used and divided into the following groups. Each group was heated with different temperature regimens and/or treated with proteinase K (Sigma Aldrich) from 10 to 250 mcg/ml and/or treated with DNA from 10 to 250 mcg/ml:

Group #1—CSF heated at 80° C. for 1 minute
Group #2—CSF heated at 80° C. for 30 minutes
Group #3—CSF heated at 100° C. for 15 minutes
Group #4—CSF heated at 150° C. for 15 minutes
Group #5—CSF heated at 100° C. for 15 minutes+treated with proteinase K 10 mcg/ml for 30 min at 37° C.
Group #6—CSF heated at 100° C. for 15 minutes+treated with proteinase K 10 mcg/ml for 30 min at room temperature
Group #7—CSF heated at 100° C. for 15 minutes+treated with proteinase K 250 mcg/ml for 30 min at 37° C.
Group #8—CSF heated at 100° C. for 15 minutes+treated with proteinase K 100 mcg/ml for 3 min at room temperature
Group #9—CSF heated at 100° C. for 15 minutes+treated with DNA 100 mcg/ml for 30 min at 37° C.
Group #10—CSF heated at 100° C. for 15 minutes+treated with DNA 1 mcg/ml for 30 min at 37° C.
Group #11—CSF heated at 100° C. for 15 minutes+treated with DNA 1 mcg/ml for 30 min at 37° C. and treated with proteinase K 100 mcg/ml for 30 min at 37° C.

Protein bands were analyzed with gel electrophoresis and subsequent LC/MS analysis. Electrophoresis was conducted in the BIO-RAD Mini PROTEAN Tetra Cell (Bio-Rad Laboratories) at 60 volts for about 40 minutes with 12% polyacrylamide gel (Bio-Rad Laboratories). Proteins were stained with Coomassie blue and then were destained with Destaining Solution according to the manufacturer's instructions (all Bio-Rad Laboratories).

LC/MS analysis was conducted using nanoflow UPLC-MS/MS (Thermo Q Exactive HF Orbitrap)—that is, ultra high-performance liquid chromatography coupled to tandem mass spectrometry according to the manufacturer's instruction.

Analysis for the presence of prion-like domains in the identified proteins was conducted with the prion-like amino acid composition algorithm (PLAAC) (plaac.wi.mit.edu). PLAAC analysis, which allows the evaluation proteins containing prion-like domains, defined as domains with compositional similarity to yeast prion domains, based on amino-acid interaction sets (Michelitsch and Weissman, 2000; Batlle et al., 2017). The resulting log-likelihood ratio (LLR) indicates the possibility that the analyzed protein is a prion. Using PLAAC algorithms, PrDs, defined as domains shown to contain at least a domain compositionally similar to yeast prions, were recently investigated in different species, both eukaryotic and prokaryotic, confirming their important regulatory and functional roles (Malinovska et al., 2013; Iglesias et al., 2015; March et al., 2016; Tetz and Tetz 2017).

Figure 6A:
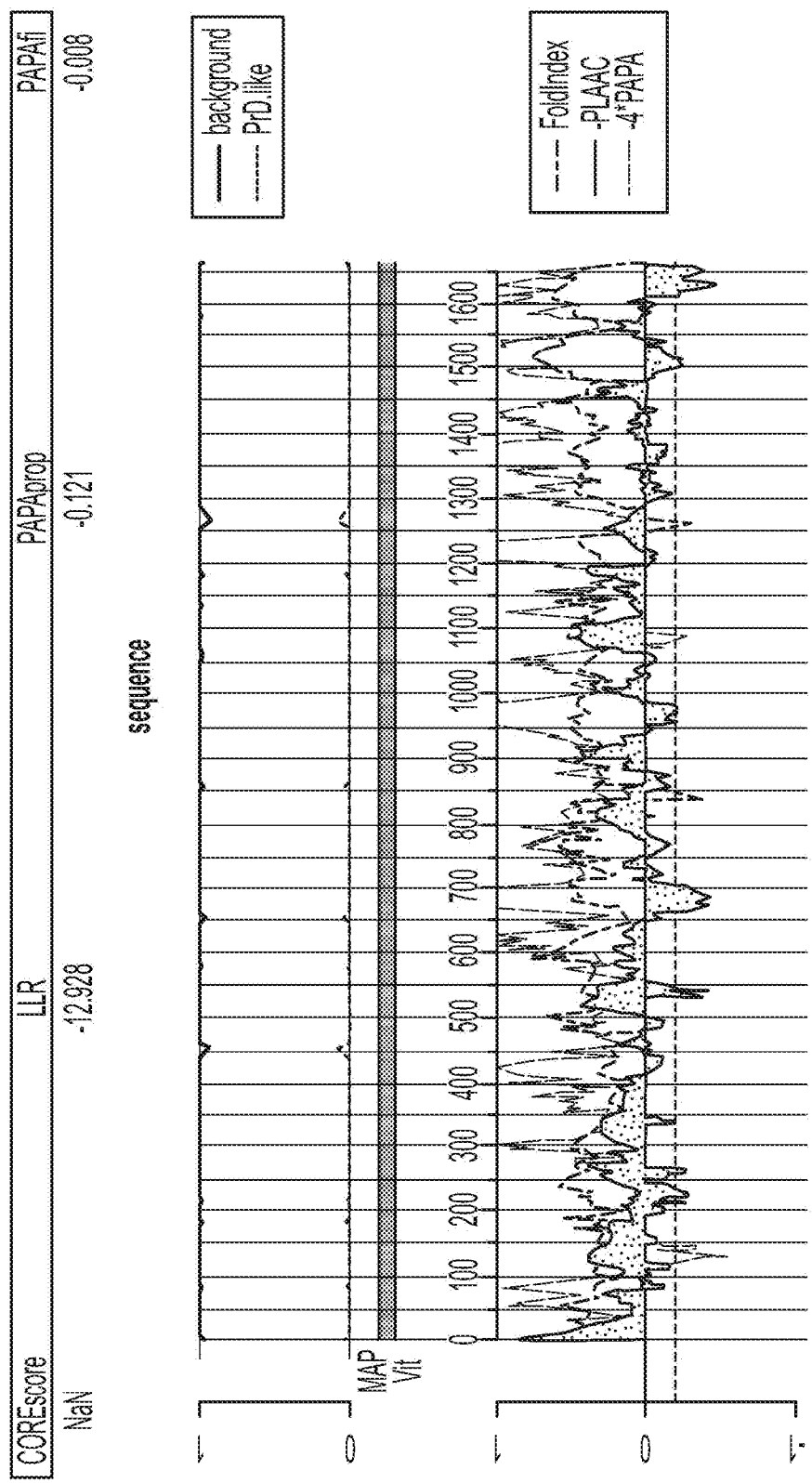
FIGS. 6A and 6B show data for thermostable proteins identified with PLAAC algorithm.
Figure 6B:
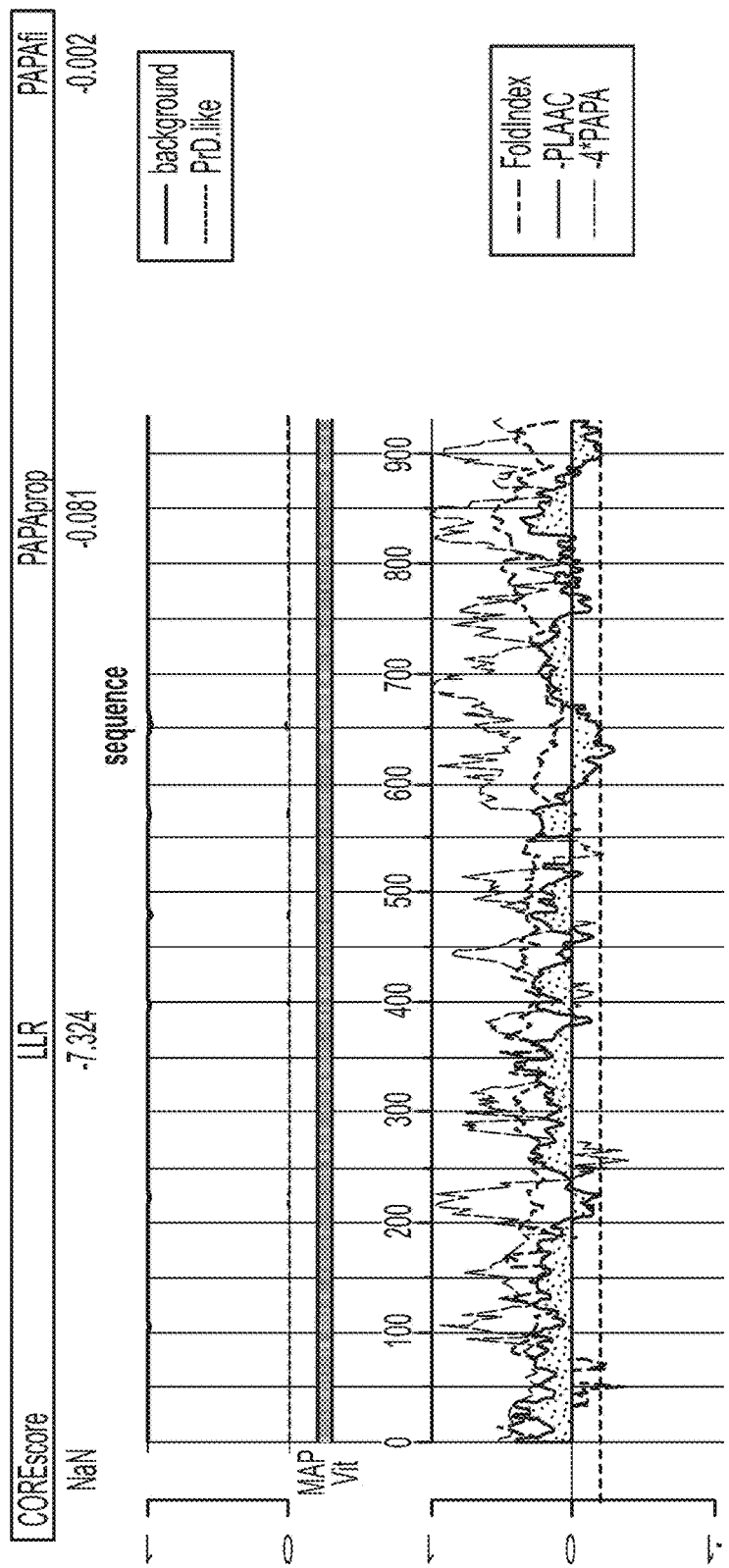
Figure 7A:
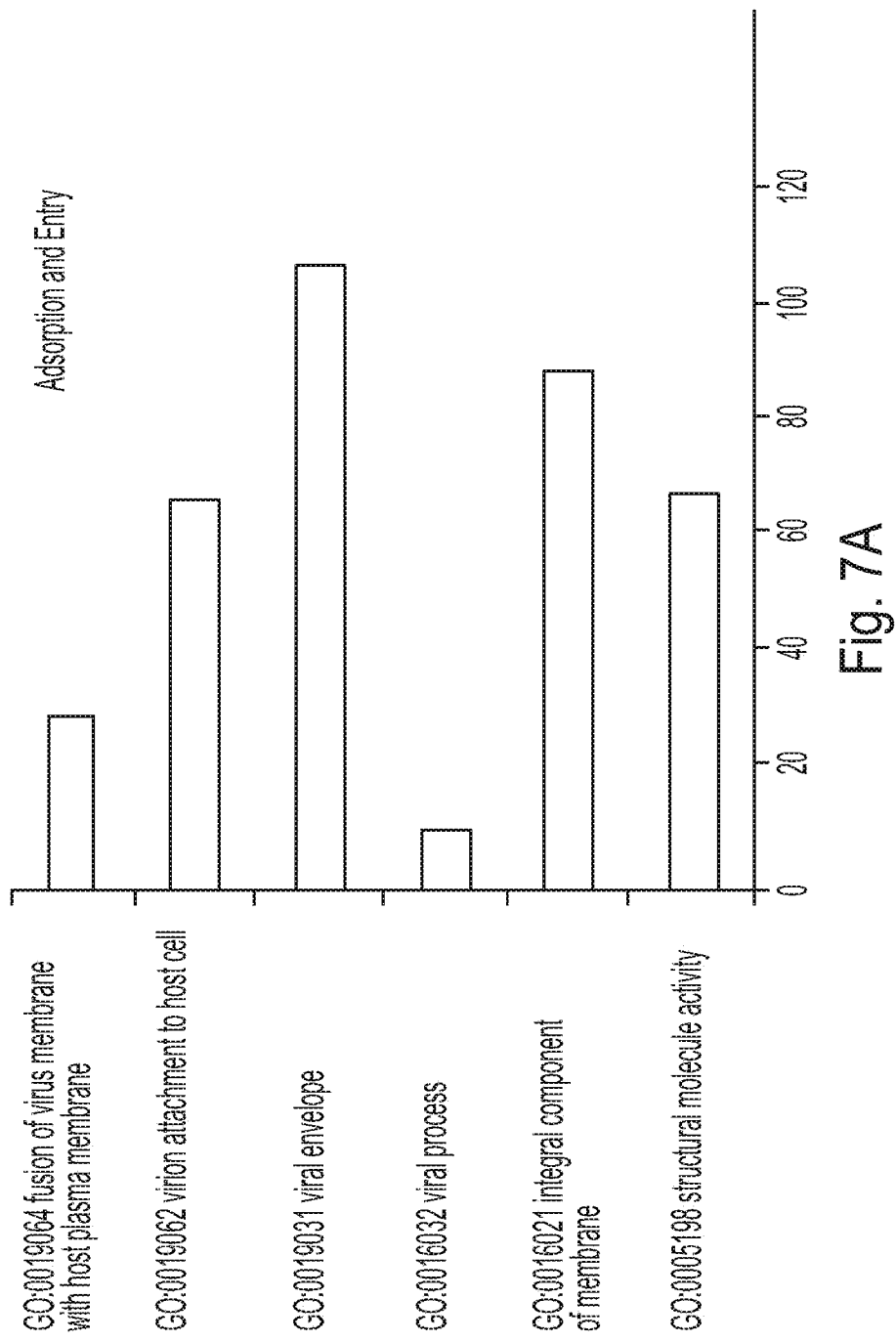
Figure 7C:
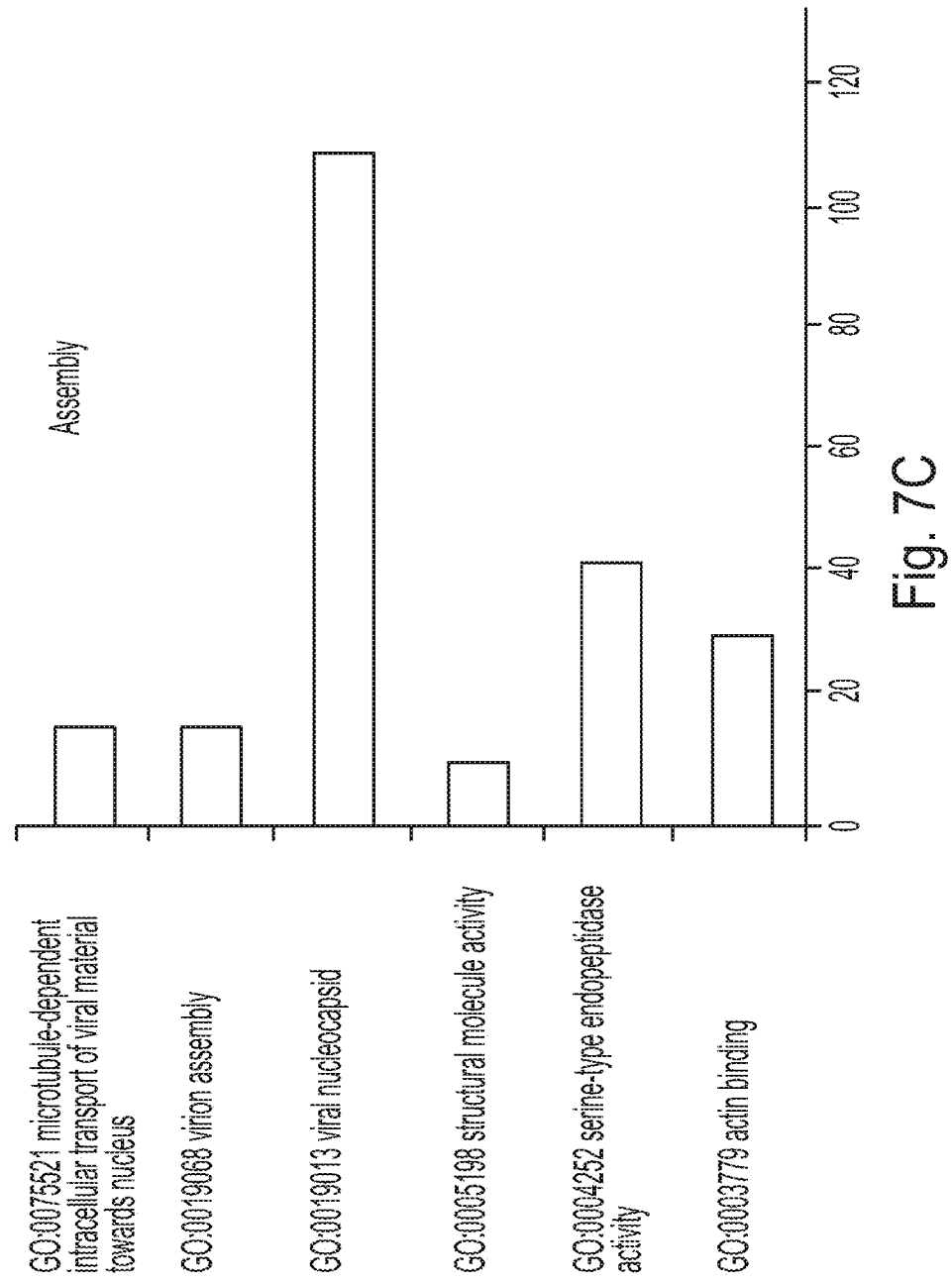
Figure 7F:
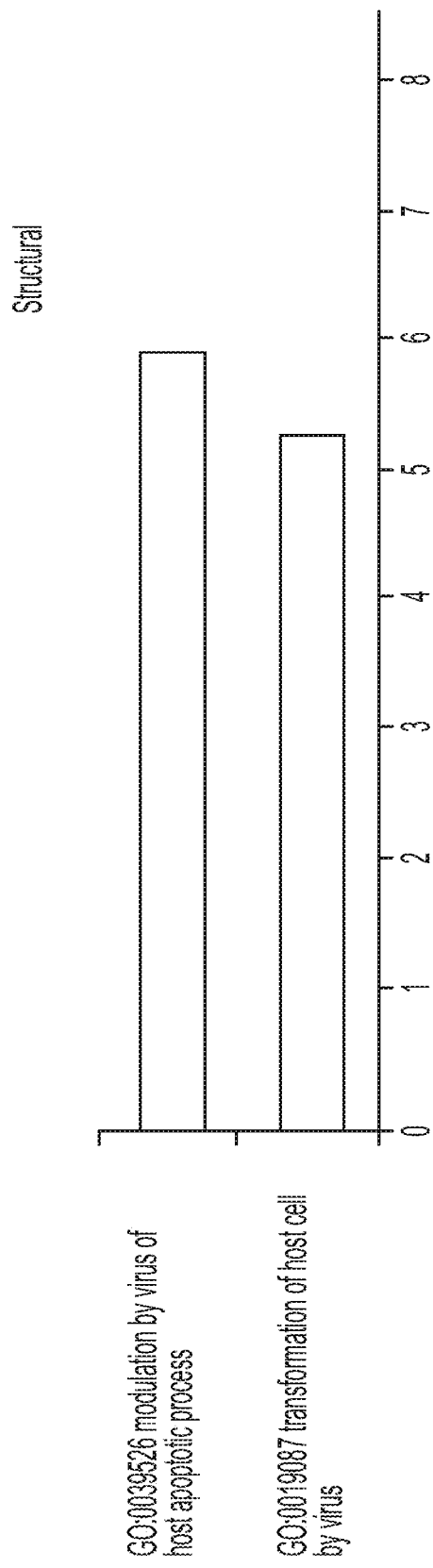
Figure 7G:
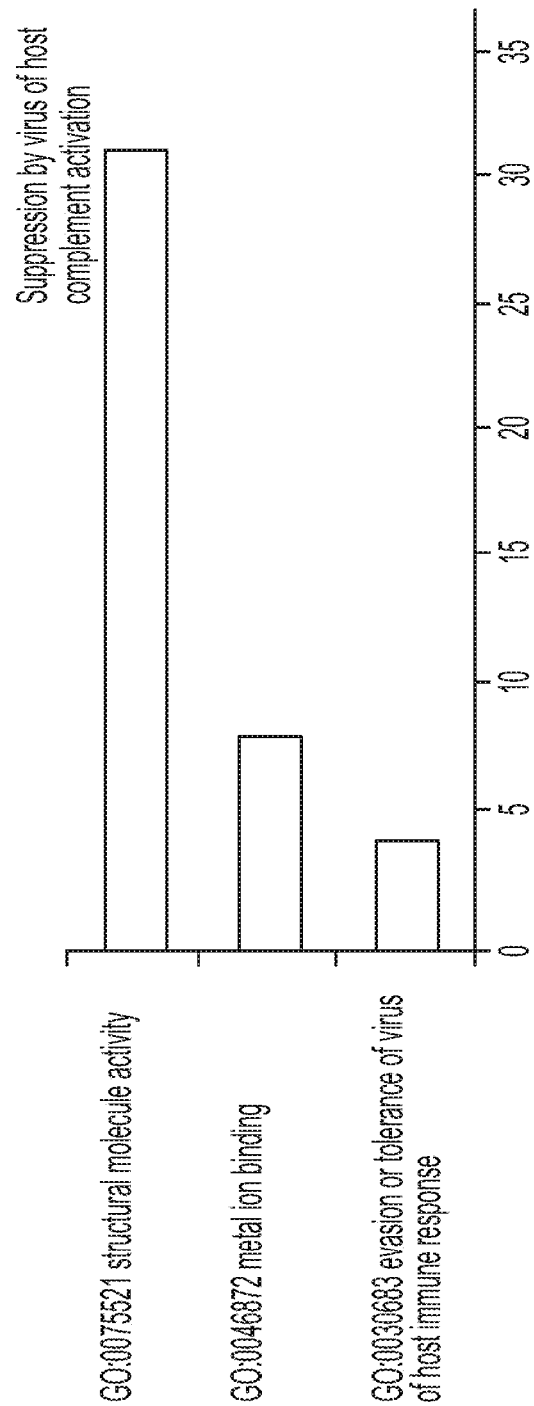
Figure 7H:
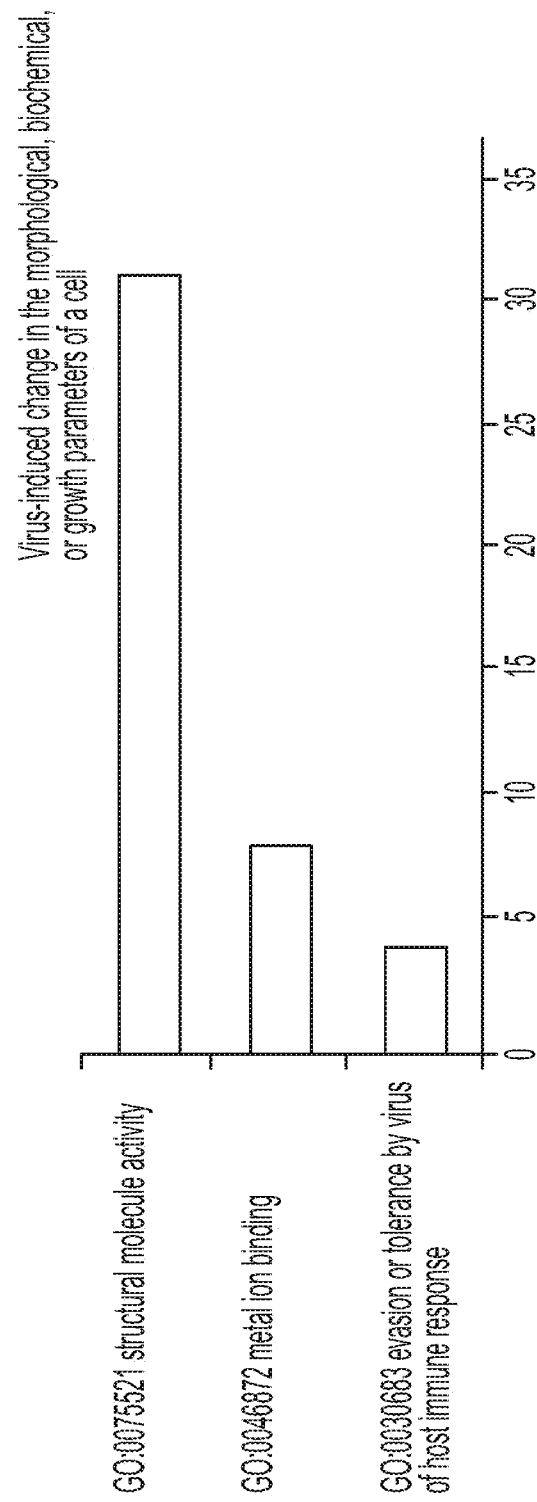
Figure 8:
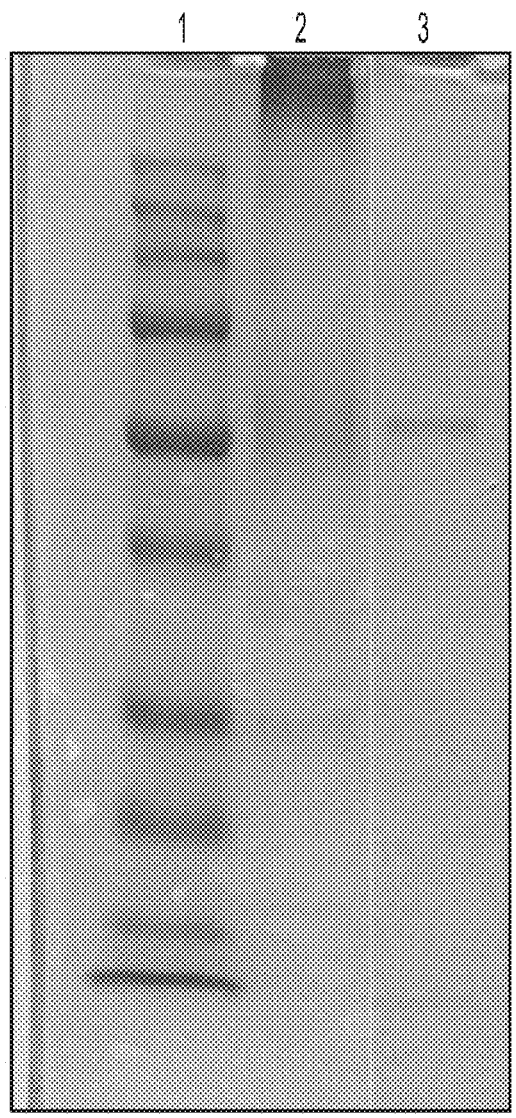
FIG. 8 is a Coomassie-stained acrylamide gel showing thermostable proteins of human CSF before and after proteinase K treatment. Lane 1 shows a molecular weight marker (250-10 KB, BioRad), lane 2 shows control CSF, and lane 3 shows control CSF+proteinase K (100 mcg/ml, 37 C, 30 minutes exposition).

The presence of thermostable proteins was found in all the groups. Moreover, the alteration of the electrophoretic profile of these proteins under proteinase K and DNA treatment was identical for all the probes. The results for some of them are shown in FIGS. 6A and 6B.

As it is seen, CSF possesses thermostable proteins. The content of these proteins is changed under Proteinase K treatment.

Figure 9A:
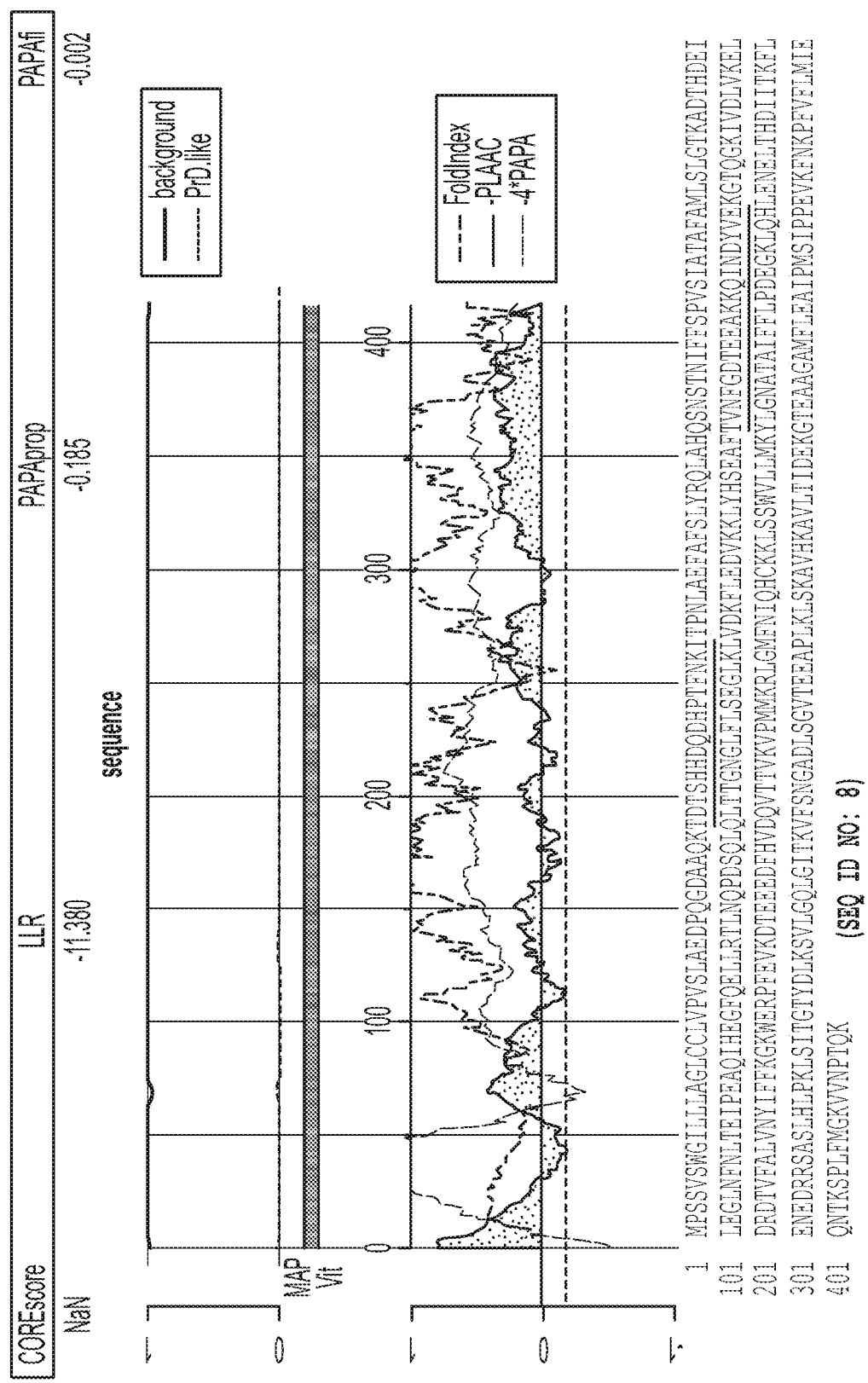
FIGS. 9A and 9B show data for thermostable Tetz-proteins, in CSF and which amount was increased following proteinase K treatment. As it is seen, neither of these proteins possess prion-like domain. The sequence of alpha-1-antitrypsin is shown in FIG. 9A, and the sequence of fibrinogen gamma chain OS is shown in FIG. 9B. Thus, their unexpected thermostability and resistance to proteinases are not attributed to the prion-nature.
Figure 9B:
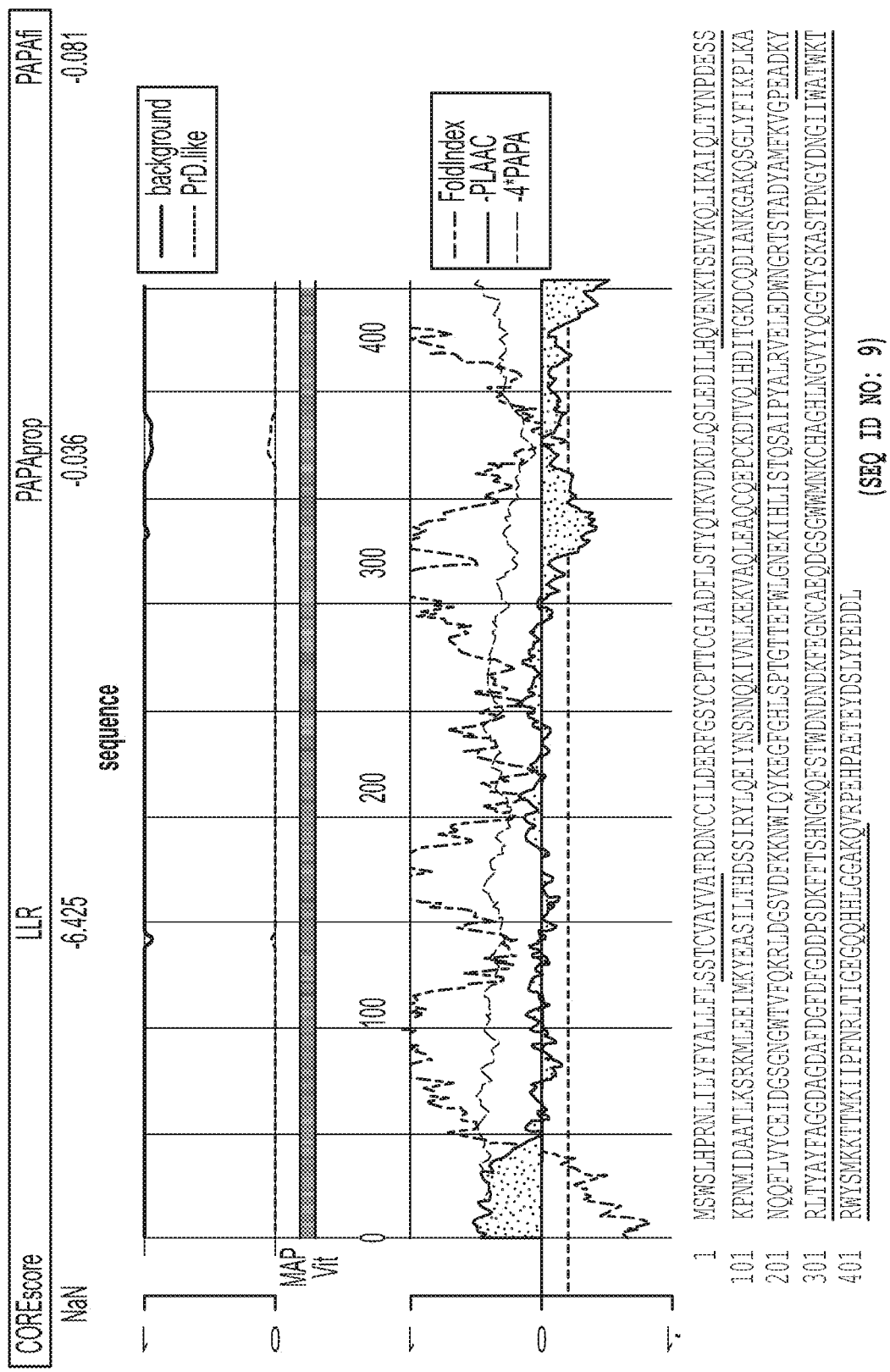

Table 12 demonstrates thermostable proteins from healthy CSF before and after proteinase K treatment. Identified thermostable proteins were analyzed with a PLAAC algorithm dedicated to identifying prion-like domains, that could address thermostable properties of these proteins. The inventors did not find any prion-like domains within these proteins (for some proteins data are illustrated with FIGS. 9A and 9B).

TABLE 12

| Protein Accession Number | CSF | CSF + pK | Protein Accession Number | CSF | CSF + pK |
|---|---|---|---|---|---|
| ALBU_HUMAN [3] | 950 | 97 | NCHL1_HUMAN | 32 | 4 |
| ALBU_HUMAN (+1) | 950 | 97 | CNTN1_HUMAN | 32 | 5 |
| A0A0C4DGB6 HUMAN | 893 | 92 | CMGA_HUMAN | 32 | |
| CO3_HUMAN [3] | 191 | 13 | ANGT_HUMAN | 30 | 1 |
| CO3_HUMAN | 191 | 11 | IGHG2_HUMAN | 29 | 2 |
| MOROQ9_HUMAN | 10 | | APOA4_HUMAN | 28 | |
| CON__Q2UVX4 | 9 | 2 | HPT_HUMAN [2] | 28 | 3 |
| TRFE_HUMAN [2] | 186 | 12 | HPT_HUMAN | 28 | 3 |
| TRFE_HUMAN | 186 | 12 | HPTR_HUMAN | 10 | 2 |
| C9JB55_HUMAN | 19 | | APOD_HUMAN (+1) | 28 | 1 |

TABLE 12-continued

| Protein Accession Number | CSF | CSF + pK | Protein Accession Number | CSF | CSF + pK |
|---|---|---|---|---|---|
| CO4A_HUMAN [2] | 128 | 3 | PEDF_HUMAN | 28 | |
| CO4A_HUMAN | 123 | 3 | DKK3_HUMAN | 28 | 2 |
| F5GXS0_HUMAN | 118 | 3 | APLP1_HUMAN (+2) | 28 | 1 |
| A1AT_HUMAN [2] | 102 | 6 | CSTN1_HUMAN | 28 | |
| A1AT_HUMAN | 100 | 6 | PLMN_HUMAN | 27 | |
| A0A024R617_HUMAN | 98 | 6 | B4GA1_HUMAN | 27 | |
| A2MG_HUMAN | 94 | 4 | HBB_HUMAN [3] | 25 | 2 |
| FINC_HUMAN | 85 | 5 | HBB_HUMAN | 23 | 2 |
| PTGDS_HUMAN | 67 | 5 | HBD_HUMAN | 14 | 2 |
| HEMO_HUMAN | 64 | | CON__P02070 | 1 | |
| APOE_HUMAN | 64 | 4 | VGF_HUMAN | 25 | 1 |
| TTHY_HUMAN | 60 | 18 | A4_HUMAN (+1) | 25 | |
| CON__P02769 | 60 | 12 | A1AG1_HUMAN | 24 | 6 |
| GELS_HUMAN [3] | 57 | 3 | IC1_HUMAN | 24 | 3 |
| GELS_HUMAN | 57 | 3 | A1BG_HUMAN | 23 | |
| Q5T0I0_HUMAN | 14 | | IGHG3_HUMAN | 23 | 1 |
| A0A0U1RQL8_HUMAN | 10 | | SCG3_HUMAN | 23 | |
| CERU_HUMAN | 54 | | B7ZKJ8_HUMAN [3] | 22 | |
| SCG1_HUMAN | 48 | 2 | B7ZKJ8_HUMAN (+1) | 22 | |
| A0A0A0MS08_HUMAN (+1) | 45 | 2 | H7C0L5_HUMAN | 16 | |
| CYTC_HUMAN | 45 | 1 | A0A087WTE4_HUMAN (+2) | 21 | 1 |
| B4E1Z4_HUMAN [2] | 43 | 1 | OSTP_HUMAN | 21 | |
| B4E1Z4_HUMAN | 42 | 1 | F8VVB6_HUMAN (+1) | 21 | 1 |
| CO2_HUMAN | 6 | | KNG1_HUMAN | 20 | 1 |
| VTDB_HUMAN | 42 | 1 | IGKC_HUMAN | 20 | |
| CLUS_HUMAN | 42 | 1 | AFAM_HUMAN | 20 | |
| CFAH_HUMAN [3] | 41 | | FBLN3_HUMAN | 20 | 5 |
| CFAH_HUMAN | 40 | | A1AG2_HUMAN | 19 | 5 |
| B1AKGO_HUMAN (+1) | 4 | | B4DPQ0_HUMAN | 19 | |
| CNDP1_HUMAN | 40 | 1 | FETUA_HUMAN | 18 | |
| APOA1_HUMAN | 39 | 4 | THRB_HUMAN | 18 | |
| SPRL1_HUMAN | 39 | 1 | HBA_HUMAN [2] | 18 | |
| ANT3_HUMAN | 35 | 1 | HBA_HUMAN | 18 | |
| AACT_HUMAN | 35 | | CON__P01966 | 8 | |
| C9JYY6_HUMAN (+1) | 34 | | CO7_HUMAN | 18 | |
| E7EUF1_HUMAN (+1) | 34 | | HEP2_HUMAN | 17 | |
| FBLN1_HUMAN [2] | 32 | 1 | PCSK1_HUMAN | 16 | |
| FBLN1_HUMAN | 27 | 1 | FIBB_HUMAN | 15 | 1 |
| B1AHL2_HUMAN | 23 | | F5H5G1_HUMAN (+2) | 9 | |
| IGHA1_HUMAN [2] | 15 | | LDHB_HUMAN | 9 | |
| IGHA1_HUMAN | 13 | | BTD_HUMAN | 9 | |
| A0A0G2JMB2_HUMAN | 11 | | DAG1_HUMAN | 9 | |
| APOH_HUMAN | 15 | | IBP2_HUMAN | 9 | |
| CD14_HUMAN | 15 | | NEO1_HUMAN | 9 | |
| J3KQ66_HUMAN (+1) | 15 | | NPTX1_HUMAN | 9 | |
| FIBA_HUMAN | 14 | | A0A0D9SEP4_HUMAN (+4) | 9 | |
| ITIH2_HUMAN (+1) | 14 | | APLP2_HUMAN | 9 | |
| A2AP_HUMAN | 14 | | OPCM_HUMAN | 9 | |
| VTNC_HUMAN | 14 | | PON1_HUMAN | 8 | |
| PLTP_HUMAN | 14 | | CO9_HUMAN | 8 | |
| C1S_HUMAN | 14 | | A0A087X1J7_HUMAN (+1) | 8 | |
| A0A0C4DFP6_HUMAN (+1) | 14 | | SPRC_HUMAN | 8 | |
| CBPE_HUMAN | 14 | | FAM3C_HUMAN | 8 | 1 |
| A0A0B4J231_HUMAN [3] | 14 | 1 | PGCB_HUMAN | 8 | 1 |
| IGLC3_HUMAN | 11 | 1 | A0A1B0GVD5_HUMAN (+3) | 8 | |
| AOAOB4J231_HUMAN (+1) | 10 | | CA2D1_HUMAN | 8 | |
| IGHG4_HUMAN | 14 | 1 | H9KV31_HUMAN (+1) | 8 | |
| ZA2G_HUMAN | 13 | 1 | IBP7_HUMAN | 8 | |
| KLK6_HUMAN | 13 | 1 | PTPRZ_HUMAN | 8 | |
| CH3L1_HUMAN | 13 | | VAS1_HUMAN | 8 | |
| NPTXR_HUMAN | 13 | | H3BTN5_HUMAN [2] | 8 | |
| PCOC1_HUMAN | 13 | | H3BTN5_HUMAN | 7 | |
| HRG_HUMAN | 12 | | KPYM_HUMAN | 7 | |
| LG3BP_HUMAN | 12 | | NTRI_HUMAN | 8 | |
| B2MG_HUMAN | 12 | | LUM_HUMAN | 7 | |
| A0A087WXI2_HUMAN (+1) | 12 | | CFAI_HUMAN (+2) | 7 | 1 |
| A0A087X0S5_HUMAN (+1) | 12 | | AMBP_HUMAN | 7 | 2 |

TABLE 12-continued

| Protein Accession Number | CSF | CSF + pK |
|---|---|---|
| SCG2_HUMAN | 12 | |
| SHPS1_HUMAN | 12 | |
| A0A0U1RRJ0_HUMAN (+1) | 12 | |
| PZP_HUMAN | 12 | |
| FIBG_HUMAN | 11 | 32 |
| ITIH1_HUMAN | 11 | |
| CO5_HUMAN | 11 | 1 |
| MIME_HUMAN | 11 | 1 |
| AMD_HUMAN | 11 | |
| APOA2_HUMAN (+1) | 10 | 2 |
| A2GL_HUMAN | 10 | |
| Q5VY30_HUMAN (+1) | 10 | |
| PROS_HUMAN | 10 | |
| ECM1_HUMAN | 10 | |
| C9JIZ6_HUMAN (+1) | 10 | 4 |
| A0A1W2PQ11_HUMAN (+1) | 10 | 1 |
| A2A2V1_HUMAN (+1) | 10 | |
| 7B2_HUMAN [2] | 10 | |
| 7B2_HUMAN | 8 | |
| C9J650_HUMAN | 8 | |
| A0A087WYJ9_HUMAN (+1) | 9 | |
| CON_P00761 | 9 | 9 |
| HV309_HUMAN (+1) | 1 | |
| HV313_HUMAN | | |
| CBG_HUMAN | 6 | |
| THBG_HUMAN | 6 | |
| A0A0J9YY99_HUMAN [3] | 6 | |
| A0A0J9YY99_HUMAN | 3 | |
| HV374_HUMAN | 3 | |
| A0A075B7B8_HUMAN | 2 | |
| C1QC_HUMAN | 6 | |
| B4DV12_HUMAN (+16) | 6 | 1 |
| TIMP2_HUMAN | 6 | 1 |
| A8MVZ9_HUMAN (+1) | 6 | |
| ALDOA_HUMAN (+2) | 6 | |
| CADH2_HUMAN | 6 | |
| F8VYK9_HUMAN (+1) | 6 | |
| PEBP4_HUMAN | 6 | |
| Q5H9A7_HUMAN (+1) | 6 | |
| SEM7A_HUMAN | 6 | |
| SODE_HUMAN | 6 | |
| T132A_HUMAN | 6 | |
| IGLC7_HUMAN | 6 | 1 |
| KAIN_HUMAN | 5 | |
| CAD13_HUMAN | 5 | |
| ACTB_HUMAN [4] | 5 | |
| ACTB_HUMAN (+1) | 5 | |
| ACTC_HUMAN (+1) | 3 | |
| A0A0A0MRJ7_HUMAN (+1) | 5 | |
| G3V357_HUMAN (+1) | 5 | |
| A0A0A0MT71_HUMAN (+1) | 5 | |
| AATC_HUMAN | 5 | |
| CALR_HUMAN (+1) | 5 | |
| H7BY57_HUMAN (+2) | 5 | |
| IL6RB_HUMAN | 5 | |
| PGBM_HUMAN | 5 | |
| PXDC2_HUMAN | 5 | |
| B0QYH4_HUMAN (+3) | 5 | |
| SODC_HUMAN | 5 | |
| C9J8S2_HUMAN (+1) | 5 | |
| ASIC2_HUMAN | 5 | 1 |
| PGRP2_HUMAN | 7 | |
| E9PHK0_HUMAN (+1) | 7 | |
| LCAT_HUMAN | 7 | |
| A0A0A0MSV6_HUMAN (+2) | 7 | 1 |
| NPC2_HUMAN | 7 | 1 |
| BGH3_HUMAN | 7 | |
| CADM4_HUMAN | 7 | |
| MEGF8_HUMAN | 7 | |
| NCAN_HUMAN | 7 | |
| SAP3_HUMAN | 7 | |
| A0A087WYL5_HUMAN (+1) | 7 | |
| G5E9G7_HUMAN (+1) | 7 | |
| A0A0B4J2B5_HUMAN [6] | 7 | |
| A0A0B4J2B5_HUMAN (+1) | 4 | |
| HV307_HUMAN | 2 | |

Example 6: Identification of Protein Sequences in Viral Proteomes

To identify the PrDs present in viral proteomes, protein sequences were obtained from the UniProt KnowledgeBase (Swiss-Prot and TrEMBL). The presence of PrDs in viral proteomes was analyzed in the known viruses, excluding bacteriophages, using the PLAAC prion prediction algorithm, based on the HMM, and the identification of PrDs was based on the compositional bias towards asparagine and glutamine aminoacyls, an average residue hydrophobicity, and the net charge of sequences. For the analysis the total number of viral proteins was contained in the UniProt database was adjusted, since in the proteomes of different viruses, multiple fragments of the same proteins had multiple representation. Therefore, multiple copies of the same sequences were removed in Excel (Windows 10) using the 'remove duplicates' function. With the LLR cutoff of 0.003, 2,681 PrDs were identified. The regularities in the likelihood of the identified PrDs to be prions, and their distribution among different viral orders and families were analyzed. The functions of proteins with the identified PrDs were classified using the manually-curated GO categories and were based on the major steps of viral replication. A heatmap was generated using R-statistical computing (www.r-project.org) with the "levelplot" package. The values in the heatmap range between the lowest and the highest LLR values.

A list of viral species in which at least one prion-like domain was identified is found in Table 13.

TABLE 13

| List of Viral Species with at least one Identified Prion-Like Domain | |
|---|---|
| Acanthamoeba_castellanii_mamavirus | Ateline_gammaherpesvirus_3 |
| Acanthamoeba_polyphaga_mimivirus | Atlantic_salmon_swim_bladder_sarcoma_virus |
| Acanthocystis_turfacea_Chlorella_virus_1 | Aureococcus_anophagefferens_virus |
| Adeno-associated virus 2 | Autographa_californica_multiple_nucleopolyhedrovirus |
| Adeno-associated virus-8 | *Avastrovirus* 3 |
| Adeno-associated virus-1 | *Avian avulavirus* 1 |
| Adeno-associated virus | Avian_coronavirus |
| Adeno-associated_dependoparvovirus_A | Avian_leukosis_virus |
| Adeno-associated_dependoparvovirus_B | Avian_musculoaponeurotic_fibrosarcoma_virus_AS42 |
| Adoxophyes_honmai_entomopoxvirus_'L' | Avian_paramyxovirus_2 |
| Adoxophyes_honmai_nucleopolyhedrovirus | Avian_paramyxovirus_4 |
| Adoxophyes_orana_granulovirus | Avian_paramyxovirus_5 |
| Adoxophyes orana_nucleopolyhedrovirus | Avian_paramyxovirus_6 |
| Aedes_pseudoscutellaris_reovirus | Avian_paramyxovirus_7 |
| African_bat_icavirus_A | Avian_sapelovirus |
| African_green_monkey_simian_foamy_virus | Avian_sarcoma_virus |
| African_horse_sickness_virus | Avon-Heathcote_Estuary_associated_circular virus 14 |
| African_swine_fever_virus | Avon-Heathcote_Estuary_associated_circular virus_15 |
| Agropyron_mosaic_virus | Avon-Heathcote_Estuary_associated_circular virus 25 |
| *Agrotis segetum* nuclear polyhedrosis virus | Avon-Heathcote_Estuary_associated_circular virus 6 |
| *Agrotis segetum* nuclear polyhedrosis virus | Bakunsa virus |
| Agrotis_ipsilon_multiple_nucleopolyhedrovirus | Banana_streak_OL_virus |
| Agrotis_segetum_granulovirus | Barley_yellow_mosaic_virus |
| Agrotis_segetum_nucleopolyhedrovirus_B | Basella_rugose_mosaic_virus |
| Alcelaphine_gammaherpesvirus_1 | Bat coronavirus HKU5 |
| Alcelaphine_gammaherpesvirus_2 | Bat_betaherpesvirus_B7D8 |
| Alfalfa_leaf_curl_virus | Bat_bocavirus |
| Alphacoronavirus_1 | Bat_coronavirus |
| Alphacoronavirus_2 | Bat_coronavirus 1A |
| Alphamesonivirus_1 | Bat_coronavirus BM48-31/BGR/2008 |
| Alphapapillomavirus_1 | Bat_coronavirus_CDPHE15 |
| Alphapapillomavirus_10 | Bat_coronavirus_HKU10 |
| Alphapapillomavirus_2 | Bat_hepatitis_virus |
| Alphapapillomavirus_5 | Bat_Hp-betacoronavirus/Zhejiang2013 |
| Alphapapillomavirus_6 | Bat_mastadenovirus_A |
| Alphapapillomavirus_9 | Bat_mastadenovirus_B |
| Alternanthera_mosaic_virus | Bat_mastadenovirus_WIV10 |
| Ambystoma_tigrinum_virus | Bat_mastadenovirus_WIV12 |
| Amsacta_moorei_entomopoxvirus | Bat_mastadenovirus_WIV13 |
| Anatid_herpesvirus_1 | Bathycoccus_sp. RCC1105_virus_BpV |
| Anguillid herpesvirus 1 | Beak_and_feather_disease_virus |
| Anguillid_herpesvirus_1 | BeAn_58058_virus |
| Anomala_cuprea_entomopoxvirus | Bearded_dragon_parvovirus |
| Anopheles_minimus_irodovirus | Beet_necrotic_yellow_vein_virus |
| Antheraea_pernyi_nucleopolyhedrovirus | Beet_ringspot_virus |
| Anticarsia_gemmatalis_multiple_nucleopolyhedrovirus | Beet_soil-borne_mosaic_virus |

TABLE 13-continued

List of Viral Species with at least one Identified Prion-Like Domain

Anticarsia_gemmatalis_nucleopolyhedrovirus
Aotine_betaherpesvirus_1
Apocheima_cinerarium_nucleopolyhedrovirus Apple_green_crinkle_associated_virus
Apple_stem pitting_virus
Apricot_latent_virus
Astrovirus_VA1
Astrovirus_wild_boar/WBAstV-1/2011/HUN
Ateline_gammaherpesvirus_2
Blackberry_virus_Y
Blueberry_red_ringspot_virus
Blueberry_virus_A
Bombyx_mori_nucleopolyhedrovirus
Boolarra_virus

*Bovine rhinovirus* 1
Bovine_adenovirus_E
Bovine_adenovirus_F
Bovine_astrovirus
Bovine_astrovirus_B18/HK
Bovine_astrovirus_B76-2/HK
Bovine_foamy_virus
Bovine_gammaherpesvirus_4
Bovine_gammaherpesvirus_6
Bovine_kobuvirus
Bovine_leukemia_virus Bovine_mastadenovirus_B Bovine_mastadenovirus_C
Bovine_nidovirus_TCH5
Bovine_papular_stomatitis_virus
Bovine_picornavirus
Bovine_rhinitis_B_virus
Bovine_torovirus
Brazilian_marseillevirus
Broad_bean_necrosis_virus
Brome_streak_mosaic_virus
BtMr-AlphaCoV/SAX2011

BtNv-AlphaCoV/SC2013

BtRf-AlphaCoV/HuB2013
BtRf-AlphaCoV/YN2012
Bulbul_coronavirus_HKU11
Buzura_suppressaria_nucleopolyhedrovirus
Cafeteria_roenbergensis_virus
Caladenia_virus A
California_sea_lion_adenovirus 1
Callitrichine_gammaherpesvirus_3
Camelpox_virus
Canarypox_virus
Canid_alphaherpesvirus_1
Canine_distemper_virus
Canine_mastadenovirus_A
*Canis familiaris* polyomavirus 1
Cannes_8_virus
Cardioderma_polyomavirus
Cardiovirus_A
Cardiovirus_B Carnivore_protoparvovirus_1
Carollia_perspicillata_polyomavirus_1
Carrot_mottle_mimic_virus
Casuarina_virus
Catopsilia_pomona_nucleopolyhedrovirus
Caviid_betaherpesvirus_2
Cedar_virus
Ceratobasidium_endornavirus_B
Cercopithecine_alphaherpesvirus_2
Cercopithecine_alphaherpesvirus_9
Chenuda_virus
Cherry green ring_mottle_virus
Chicken_calicivirus
Chikungunya_virus
Chilli_leaf_curl_virus
Chimpanzee_alpha-1_herpesvirus Beet_yellows_virus
Betacoronavirus_1
Betacoronavirus_Erinaceus/VMC/DEU/2012
Betacoronavirus_HKU24
*Betapapillomavirus*_1
*Betapapillomavirus*_2
*Betapapillomavirus*_3
Bitter_gourd_yellow_vein_virus
Blackberry_chlorotic_ringspot_virus
Diatraea_saccharalis_granulovirus
Dioscorea_bacilliform_virus
Donkey_orchid_symptomless_virus
Dracaena_mottle_virus
Dromedary_stool-associated_circular_ssDNA virus
Drosophila_x_virus
Duck_adenovirus_A
Duck_astrovirus_GII.A
Dyoetapapillomavirus_1
Dyokappapapillomavirus_1
Dyoomikronpapillomavirus_1
Dyoxipapillomavirus_1
Ectromelia_virus
Ectropis_obliqua_nucleopolyhedrovirus
Eidolon_polyomavirus_1
Elephant_endotheliotropic_herpesvirus 4
Elephant_endotheliotropic_herpesvirus 5
Elephantid_betaherpesvirus_1
Enterovirus_A
Enterovirus_B
Enterovirus_D
Enterovirus_E
Enterovirus_G
Enterovirus_H
Enterovirus_sp.
Epinotia_aporema_granulovirus
Epiphyas_postvittana_nucleopolyhedrovirus
Epizootic_haematopoietic_necrosis_virus
Epizootic_hemorrhagic_disease_virus
Epsilonpapillomavirus_1
Epstein barr virus
Equid_alphaherpesvirus_1
Equid_alphaherpesvirus_4
Equid_alphaherpesvirus_8
Equid_alphaherpesvirus_9
Equid_gammaherpesvirus_2
Equid_gammaherpesvirus_5
Equine_foamy_virus
Equine_infectious_anemia_virus
Equine_mastadenovirus_A
Equine_rhinitis_A_virus
Equine_rhinitis_B_virus
Equine_torovirus
Erinnyis_ello_granulovirus
Euphorbia_caput-medusae_latent_virus
Euproctis_pseudoconspersa_nucleopolyhedrovirus
European_catfish_virus
Euscelidius_variegatus_virus_1
Fako_virus
Falconid_herpesvirus_1
Feldmannia_species_virus
Felid_alphaherpesvirus_1
Feline_bocavirus_2
Feline_calicivirus
Feline_foamy_virus
Feline_immunodeficiency_virus
Feline_leukemia_virus
Feline_morbillivirus
Feline_rotavirus
Felis_catus_gammaherpesvirus_1
Felis_catus_papillomavirus_3
Felis_catus_papillomavirus_4

TABLE 13-continued

List of Viral Species with at least one Identified Prion-Like Domain

Chlamys_acute_necrobiotic_virus
*Choristoneura murinana* nucleopolyhedrovirus
Choristoneura_biennis_entomopoxvirus
Choristoneura_fumiferana_DEF_multiple_nucleopolyhedrovirus
Choristoneura_fumiferana_entomopoxvirus
Choristoneura_fumiferana_granulovirus
Choristoneura_fumiferana_multiple_nucleopolyhedrovirus
Choristoneura_occidentalis_granulovirus
Choristoneura_rosaceana_alphabaculovirus
Choristoneura_rosaceana_entomopoxvirus_'L'
Chrysanthemum_virus_B
Chrysochromulina_ericina_virus
Chrysodeixis_chalcites_nucleopolyhedrovirus
Chrysodeixis_includens_nucleopolyhedrovirus
Citrus_variegation_virus
Citrus_yellow_mosaic_virus
Clanis_bilineata_nucleopolyhedrovirus
Clostera_anachoreta_granulovirus
Cnaphalocrocis_medinalis_granulovirus
Cocksfoot_streak_virus
Cod_iridovirus
Colobus_monkey_papillomavirus
Colombian_potato_soil-borne_virus
Commelina_yellow_mottle_virus
Common-moorhen_coronavirus_HKU21
Condylorrhiza_vestigialis_MNPV
Cosavirus A
Cosavirus_A
Cotesia_congregata_bracovirus
Cotesia_plutellae_polydnavirus
Cotia_virus
Cowpea_polerovirus_2

Cowpox virus
Cricetid_gammaherpesvirus_2
Cryptophlebia_leucotreta_granulovirus
Culex_nigripalpus_NPV_Florida/1997
Cydia_pomonella_granulovirus
Cynomolgus cytomegalovirus
Cypovirus_2
Cyprinid_herpesvirus_1

Cyprinid_herpesvirus_2

Cyprinid_herpesvirus_3
Dak_Nong_virus
Dasheen_mosaic_virus
Deerpox_virus_W-848-83
Deltapapillomavirus_6
Dengue_virus
Desmodus_rotundus_endogenous_retrovirus
Hordeum_vulgare_endornavirus Horseshoe_bat_hepatitis_B_virus
Hughes_nairovirus
Human herpes simplex virus 1

Human herpes simplex virus 2
Human herpesvirus 5
Human Herpesvirus 6
Human Herpesvirus 7
Human herpesvirus 8 type
Human parainfluenza 2 virus Human respirovirus 3
Human SARS coronavirus
Human T-cell leukemia virus 1
Human_betaherpesvirus_6B
Human_coronavirus_229E
Human_coronavirus_HKU1
Human_coronavirus_NL63
Human_cosavirus
Human_immunodeficiency_virus_1
Human_immunodeficiency_virus_2
Human_mastadenovirus_A Ferret_coronavirus
Fiji_disease_virus Foot-and-mouth_disease_virus
Fowl_aviadenovirus_A Fowl_aviadenovirus_B
Fowl_aviadenovirus_C
Fowl_aviadenovirus_D Fowl_aviadenovirus_E
Fowlpox_virus
Free_State_vervet_virus
Frog_virus_3
Galinsoga_mosaic_virus
Gallid herpesvirus 1
Gallid_alphaherpesvirus_2
Gammapapillomavirus_15
Gammapapillomavirus_3
Gammapapillomavirus_7
Gammapapillomavirus_8
Garlic_virus_A
Garlic_virus_B
Garlic_virus_D
Garlic_virus_E
Garlic_virus_X
Gentian_ovary_ringspot_virus
German_gecko_ranavirus
Glossina_hytrovirus
Glyptapanteles_flavicoxis_bracovirus
Golden_Marseillevirus
Goose_aviadenovirus_A
Goose_calicivirus
Goose_paramyxovirus_SF02
Gooseberry_vein_banding_associated_virus
Gorilla_anellovirus
Grapevine_fanleaf_virus
Grapevine_leafroll-associated_virus_4
Ground_squirrel_hepatitis_virus
*Gryllus_bimaculatus*_nudivirus
Hana_virus
*Helicoverpa_armigera*_granulovirus
*Helicoverpa_armigera*_nucleopolyhedrovirus
*Helicoverpa_zea*_single_nucleopolyhedrovirus
*Heliothis_armigera*_entomopoxvirus
*Heliothis*_virescens_ascovirus_3a
*Heliothis_zea*_nudivirus
*Hemileuca*_sp._nucleopolyhedrovirus
Hepatitis_B_virus
Hepatitis_C_virus
*Heterosigma_akashiwo*_virus_01
Middle East respiratory syndrome-related coronavirus
Mikumi_yellow_baboon_virus_1
Miniopterus_bat_coronavirus_HKU8
Mink_calicivirus
Mink_circovirus
Mink_coronavirus_1
*Mocis*_sp._granulovirus
*Molluscum*_contagiosum_virus
Moloney_murine_sarcoma_virus
Monkeypox_virus
Moroccan_watermelon mosaic_virus
Mosavirus A2
Mossman_virus
Moumouvirus
Mouse_astrovirus_M-52/USA/2008
Mumps rubulavirus
Mumps_virus
Munia_coronavirus_HKU13
Murid herpesvirus 1
Murid_betaherpesvirus_2
Murid_betaherpesvirus_8
Murine roseolovirus

TABLE 13-continued

List of Viral Species with at least one Identified Prion-Like Domain

Human_mastadenovirus_B
Human_mastadenovirus_C
Human_mastadenovirus_F
Human_mastadenovirus_G
Human_papillomavirus
Human_papillomavirus_type_154
Human_papillomavirus_type_167
Human_papillomavirus_type_197
Human_parainfluenza_virus_1
Human_parainfluenza_virus_2
Hunnivirus_A
Hydrangea_ringspot_virus
Hyphantria_cunea_nucleopolyhedrovirus
Hyposoter_fugitivus_ichnovirus
Ictalurid_herpesvirus_1
Infectious_bursal_disease_virus
Infectious_spleen_and_kidney_necrosis_virus
Influenza_A_virus_H13N6
Influenza_A_virus_H3N2
Invertebrate_iridescent_virus_22
Invertebrate_iridescent_virus_3
Invertebrate_iridescent_virus_30
Invertebrate_iridescent_virus_31
Invertebrate_iridescent_virus_6
Invertebrate_iridescent_virus_9
Invertebrate_iridovirus_22
Invertebrate_iridovirus_25
Johnsongrass_mosaic_virus
J-virus
Kafue_kinda_ x_chacma_baboon_virus
Kallithea_virus
Kibale red colobus virus 2
Kibale_red_colobus_virus_1
La Piedad-Michoacan-Mexico virus
La_Jolla_virus
Lactate_dehydrogenase-elevating_virus
Lambdapapillomavirus_5
Lambdina_fiscellaria_nucleopolyhedrovirus
Lassa_mammarenavirus
Lausannevirus
Lepidopteran_iteradensovirus_5
Lesavirus_2
Leucania_separata_nucleopolyhedrovirus
Liao_ning_virus
Lizard_adenovirus_2
*Lloviu cuevavirus*
Lucheng_Rn_rat_coronavirus
Luffa_yellow_mosaic_virus
Lutzomyia_reovirus_1
*Lymantria dispar* multicapsid nuclear polyhedrosis virus
Lymantria_xylina_MNPV
Lymphocystis_disease_virus_-_isolate_China
Lymphocystis_disease_virus_Sa
Macaca_nemestrina_herpesvirus_7
Macacine_betaherpesvirus_3
Macacine_gammaherpesvirus_4
Macacine_gammaherpesvirus_5
Macaque_simian_foamy_virus
Macrobrachium_rosenbergii_nodavirus
Macropodid_alphaherpesvirus_1
Magpie-robin_coronavirus_HKU18
Maize_dwarf_mosaic_virus
Maize_rayado_fino_virus
Mal_de_Rio_Cuarto_virus
Malacosoma_neustria_nucleopolyhedrovirus
Mamastrovirus_1
Mamestra_brassicae_multiple_
nucleopolyhedrovirus
Mamestra_configurata_
nucleopolyhedrovirus_A
Mamestra_configurata_
nucleopolyhedrovirus_B
Murine_coronavirus
Murine_mastadenovirus B
Murine_mastadenovirus_C
Mus_musculus_polyomavirus_1
Musca_hytrovirus
Myotis_gammaherpesvirus_8
Mythimna_separata_entomopoxvirus_'L'
Mythimna_unipuncta_granulovirus
Myxoma_virus
Myzus_persicae_densovirus
Ndumu_virus
Neodiprion_abietis_NPV
Neodiprion_lecontei_
nucleopolyhedrovirus
Neodiprion_sertifer_
nucleopolyhedrovirus
Nerine_virus_X
Night-heron_coronavirus_HKU19
Nigrospora_oryzae_victorivirus_1
Nilaparvata_lugens_reovirus
Nile_crocodilepox_virus
Nipah_virus
NL63-related_bat_coronavirus
Norwalk_virus
Norway_rat_hunnivirus
Noumeavirus
Nse_virus
Oat_necrotic_mottle_virus
Odontoglossum_ringspot_virus
Omegapapillomavirus_1
Omikronpapillomavirus_1
Only_Syngen_Nebraska_virus_5
Opsiphanes_invirae_iflavirus_1
Orf_virus
Orgyia_leucostigma_NPV
Orgyia_pseudotsugata_multiple_nucleopolyhedrovirus
Orthohepevirus_A
Oryctes_rhinoceros_nudivirus
Oryctes_rhinoceros_nudivirus
Ostreid_herpesvirus_1
Ostreococcus_lucimarinus_virus_1
Ostreococcus_lucimarinus_virus_2
Ostreococcus_lucimarinus_virus_7
Ostreococcus_mediterraneus_virus_1
Ostreococcus_tauri_virus_1
Ostreococcus_tauri_virus_2
Ostreococcus_tauri_virus_OtV5
Ostreococcus_tauri_virus_RT-2011
Ovine_adenovirus_D
Ovine_gammaherpesvirus_2
Ovine_mastadenovirus_A
Pagoda_yellow_mosaic_associated_
virus
Pan_troglodytes_verus_polyomavirus_1
Panine_betaherpesvirus_2
Papiine_alphaherpesvirus_2
Parainfluenza_virus_5
Paramecium_bursaria_Chlorella_virus_1
Paramecium_bursaria_Chlorella_virus_A1
Paramecium_bursaria_Chlorella_virus_
AR158
Paramecium_bursaria_Chlorella_virus_
NY2A
Parapoxvirus_red_deer/HL953
Pariacoto_virus
Parietaria_mottle_virus
Passerivirus A1
Passerivirus_A
Penaeus_monodon_nudivirus
Penaeus_vannamei_nodavirus
Penguinpox_virus
Penicillium_janczewskii_chrysovirus_1

Pepper_mild_mottle_virus

Peridroma_alphabaculovirus

TABLE 13-continued

List of Viral Species with at least one Identified Prion-Like Domain

Mammalian rubulavirus 5
Mammalian_orthoreovirus
Marbled_eel_polyomavirus
Marburg_marburgvirus
Marseillevirus_marseillevirus
Maruca_vitrata_nucleopolyhedrovirus
Mason-Pfizer_monkey_virus
Megavirus_chiliensis
Melanoplus_sanguinipes_entomopoxvirus
Melbournevirus
Meleagrid_alphaherpesvirus_1
Menghai flavivirus
Meno_virus
Merkel_cell_polyomavirus
Merremia_mosaic_Puerto_Rico_virus
Micromonas_pusilla_reovirus
Micromonas_pusilla_virus_SP1
Micromonas_sp._RCC1109_virus_MpV1
Microplitis_demolitor_bracovirus
Middelburg_virus
Porcine_mastadenovirus_A
Porcine_picobirnavirus
Porcine_reproductive_and_respiratory_syndrome_virus
Porcine_stool-associated_circular_virus_5
Porcine_teschovirus
Porcine_torovirus Potato_leafroll_virus
Potato_mop-top_virus
Potato_virus_Y
Potato_yellow_dwarf_virus
Potato_yellow_vein_virus
Primate_tetraparvovirus_1
Pseudaletia_unipuncta_granulovirus
Pseudocowpox_virus
Psittacid_alphaherpesvirus_1
Psittacine_adenovirus_3
Pteropox_virus
Rabbit_bocaparvovirus
Rabbit_coronavirus_HKU14
Rabbit_fibroma_virus
Rabbit_hemorrhagic_disease_virus
Rabbit_picornavirus
Rabies_lyssavirus
Rabovirus_A
Raccoon_polyomavirus
Raccoonpox_virus Ranid herpesvirus 1
Ranid herpesvirus 1
Ranid_herpesvirus_2
Raspberry_latent_virus
Rat_arterivirus_Jilin2014
Red_seabream_iridovirus
Reston_ebolavirus
Reticuloendotheliosis_virus
Rhinolophus_bat_coronavirus_HKU2
Rhinolophus_sinicus_bat_bocaparvovirus
Rhinovirus_A
Rhinovirus_B
Rhinovirus_C
Rhopapillomavirus_1
Ribgrass_mosaic_virus
Rice_yellow_stunt_virus
Rotavirus_A
Rotavirus_C
Rotavirus_D
Rotavirus_F
Rotavirus_I
Roundleaf_bat_hepatitis_B_virus
Rousettus_bat_coronavirus
Rousettus_bat_coronavirus_HKU9
Rubus_yellow_net_virus Saimiriine_alphaherpesvirus_1
Saimiriine_betaherpesvirus_4

Perigonia_lusca_single_nucleopolyhedrovirus
Petunia_vein_clearing_virus
Phaeocystis_globosa_virus
Phthorimaea_operculella_granulovirus
Pieris_rapae_granulovirus
Pigeon_aviadenovirus_A
Pigeonpox_virus
Pleurotus_ostreatus_virus 1
Plodia_interpunctella_granulovirus
Plum_pox_virus
Plutella_xylostella_granulovirus
Pokeweed_mosaic_virus
Porcine_astrovirus_2
Porcine_astrovirus_4
Porcine_bocavirus
Porcine_bocavirus_5
Porcine_circovirus_2
Porcine_coronavirus_HKU15
Porcine_epidemic_diarrhea_virus
Tanapox_virus
Taterapox_virus
Taupapillomavirus_1
Tent-making_bat_hepatitis_B_virus Testudinid_herpesvirus_3
Thiafora_nairovirus
Thysanoplusia_orichalcea_nucleopolyhedrovirus
Tianjin_totivirus
Tioman_virus
Tipula_oleracea_nudivirus
Tobacco_mosaic_virus
Tokyovirus_A1
Tomato_aspermy_virus
Tomato_leaf_curl_New_Delhi_virus
Tomato_torrado_virus
Torque_teno_midi virus 2
Torque_teno_mini_virus_3
Torque_teno_mini_virus_6
Torque_teno_sus_virus_1b
Torque_teno_sus_virus_k2
Torque_teno_virus
Tortoise_picornavirus
Trichomonas_vaginalis_virus_1
Trichomonas_vaginalis_virus_4
Trichoplusia_ni_ascovirus_2c
Trichoplusia_ni_granulovirus
Trichoplusia_ni_single_nucleopolyhedrovirus
Triticum_mosaic_virus
TTV-like_mini_virus
Tuhoko_virus_2
Tunisvirus_fontaine2
Tupaiid_betaherpesvirus_1
Turbot_reddish_body_iridovirus
Turkey_aviadenovirus_4
Turkey_aviadenovirus_B
Turkey_siadenovirus_A
Turkeypox virus
Turnip_vein-clearing_virus
Tylonycteris_bat_coronavirus_HKU4
Ungulate_bocaparvovirus_1
Ungulate_bocaparvovirus_5
Ungulate_protoparvovirus_1
unidentified_adenovirus
Upsilonpapillomavirus_1
Urbanus_proteus_nucleopolyhedrovirus
Usutu_virus
Vaccinia_virus
Varicella-zoster virus
Variola virus
Variola_virus
Venezuelan_equine_encephalitis_virus
Vesivirus_ferret_badger/JX12/China/2012
Vicia_faba_endornavirus
virus_species TABLE 13-continued List of Viral Species with at least one Identified Prion-Like Domain Saimiriine_gammaherpesvirus_2
Salem_virus
Salmon_gill_poxvirus
Salmon_pancreas_disease_virus
Sapelovirus_A
Sapelovirus_B
Sapporo_virus
Scale_drop_disease_virus
Sclerotinia_sclerotiorum_partitivirus_S
Scotophilus_bat_coronavirus_512
Senecavirus_A
Shallot_virus_X
Short-finned_eel_ranavirus
*Simian cytomegalovirus*
Simian_adenovirus_16
Simian_adenovirus_18
Simian_adenovirus_20
Simian_adenovirus_B
Simian_adenovirus_C
Simian_adenovirus_DM-2014
Simian_foamy_virus
Simian_immunodeficiency_virus
Simian_mastadenovirus_A
Simian_retrovirus_4
Simian_retrovirus_8
Singapore_grouper_iridovirus
Skunkpox_virus
Small_anellovirus
Snake_adenovirus_A
Sorghum_mosaic_virus
Soybean_Putnam_virus
Sparrow_coronavirus_HKU17
*Spodoptera frugiperda* nuclear polyhedrosisvirus
Spodoptera_exigua_multiple_nucleopolyhedrovirus
Spodoptera_frugiperda_ascovirus_1a
Spodoptera_frugiperda_granulovirus
Spodoptera_littoralis_nucleopolyhedrovirus
Spodoptera_litura_granulovirus
Spodoptera_litura_nucleopolyhedrovirus
Spodoptera_litura_nucleopolyhedrovirus_II
Squirrel_monkey_retrovirus
Squirrelpox_virus
STL_polyomavirus
Sucra_jujuba_nucleopolyhedrovirus
Sugarcane bacilliform Guadeloupe D virus
Sugarcane_mosaic_virus
Sugarcane_streak_mosaic_virus
Sugarcane_yellow_leaf_virus
Suid_alphaherpesvirus_1
Suid_betaherpesvirus_2
Sunflower_mild_mosaic_virus
Sweet_clover_necrotic_mosaic_virus
Sweet_potato_badnavirus_A
Sweet_potato_badnavirus_B
Swinepox_virus
Tai_Forest_ebolavirus
Tailam_virus
Volepox_virus
Walleye_dermal_sarcoma_virus
Wasabi_mottle_virus
West_Nile_virus
Wheat_streak_mosaic_virus
Wheat_yellow_dwarf_virus-GPV
White_spot_syndrome_virus
White-eye_coronavirus_HKU16
Wisteria badnavirus 1
Woodchuck_hepatitis_virus
Wound_tumor_virus
Xestia_c-nigrum_granulovirus
Y73_sarcoma_virus
Yaba_monkey_tumor_virus
Yacon_necrotic_mottle_virus
Yata_virus
Yellowstone_lake_mimivirus
Yellowstone_lake_phycodnavirus_1
Yellowstone_lake_phycodnavirus_2
Yellowstone_lake_phycodnavirus_3
Yoka_poxvirus
Youcai_mosaic_virus
Zaire_ebolavirus
Zantedeschia_mild_mosaic_virus
Zika_virus
human adenovirus type 5
human adenovirus (all types)
human adenovirus type 2
human adenovirus type 3
human adenovirus type 4
human adenovirus type 6
human adenovirus type 7
human adenovirus type 8
human adenovirus type 9
human adenovirus type 10
human adenovirus type 1
simian immunodeficiency virus
equine infectious anaemia virus
Feline immunodeficiency virus
Simian foamy virus
Human spumaretrovirus
Moloney murine leukemia virus
Human immunodeficiency virus
Simian immunodeficiency virus
Rous sarcoma virus
Bovine leukemia virus
Adeno-associated virus

TABLE 14

Distribution of viral families with the LLR scores higher than 40, 50, and 60
Table of virus_family by LLR_cod

| virus_family | | <30 | >30 | >40 | >50 | >60 | Total |
|---|---|---|---|---|---|---|---|
| Adenoviridae | Frequency | 80 | 0 | 0 | 0 | 0 | 80 |
| | Col Pct | 3.11 | 0 | 0 | 0 | 0 | |
| Alloherpesviridae | Frequency | 54 | 2 | 1 | 0 | 0 | 57 |
| | Col Pct | 2.1 | 3.13 | 3.85 | 0 | 0 | |
| Alphaflexiviridae | Frequency | 15 | 0 | 0 | 0 | 0 | 15 |
| | Col Pct | 0.58 | 0 | 0 | 0 | 0 | |

TABLE 14-continued

Distribution of viral families with the LLR scores higher than 40, 50, and 60
Table of virus_family by LLR_cod

| virus_family | | <30 | >30 | >40 | >50 | >60 | Total |
|---|---|---|---|---|---|---|---|
| Anelloviridae | Frequency | 11 | 0 | 0 | 0 | 0 | 11 |
| | Col Pct | 0.43 | 0 | 0 | 0 | 0 | |
| Arenaviridae | Frequency | 1 | 0 | 0 | 0 | 0 | 1 |
| | Col Pct | 0.04 | 0 | 0 | 0 | 0 | |
| Arteriviridae | Frequency | 24 | 0 | 0 | 0 | 0 | 24 |
| | Col Pct | 0.93 | 0 | 0 | 0 | 0 | |
| Ascoviridae | Frequency | 5 | 1 | 0 | 0 | 0 | 6 |
| | Col Pct | 0.19 | 1.56 | 0 | 0 | 0 | |
| Asfarviridae | Frequency | 17 | 0 | 0 | 0 | 0 | 17 |
| | Col Pct | 0.66 | 0 | 0 | 0 | 0 | |
| Astroviridae | Frequency | 13 | 0 | 0 | 0 | 0 | 13 |
| | Col Pct | 0.5 | 0 | 0 | 0 | 0 | |
| Baculoviridae | Frequency | 385 | 11 | 3 | 0 | 0 | 399 |
| | Col Pct | 14.95 | 17.19 | 11.54 | 0 | 0 | |
| Baculoviridae | Frequency | 4 | 0 | 0 | 0 | 0 | 4 |
| | Col Pct | 0.16 | 0 | 0 | 0 | 0 | |
| Benyviridae | Frequency | 7 | 0 | 0 | 0 | 0 | 7 |
| | Col Pct | 0.27 | 0 | 0 | 0 | 0 | |
| Betaflexiviridae | Frequency | 7 | 0 | 0 | 0 | 0 | 7 |
| | Col Pct | 0.27 | 0 | 0 | 0 | 0 | |
| Betaherpesvirinae | Frequency | 18 | 0 | 0 | 0 | 0 | 18 |
| | Col Pct | 0.7 | 0 | 0 | 0 | 0 | |
| Birnaviridae | Frequency | 2 | 0 | 0 | 0 | 0 | 2 |
| | Col Pct | 0.08 | 0 | 0 | 0 | 0 | |
| Bromoviridae | Frequency | 8 | 0 | 0 | 0 | 0 | 8 |
| | Col Pct | 0.31 | 0 | 0 | 0 | 0 | |
| Bunyaviridae | Frequency | 3 | 0 | 0 | 0 | 0 | 3 |
| | Col Pct | 0.12 | 0 | 0 | 0 | 0 | |
| Caliciviridae | Frequency | 26 | 0 | 0 | 0 | 0 | 26 |
| | Col Pct | 1.01 | 0 | 0 | 0 | 0 | |
| Caulimoviridae | Frequency | 20 | 0 | 0 | 0 | 0 | 20 |
| | Col Pct | 0.78 | 0 | 0 | 0 | 0 | |
| Chrysoviridae | Frequency | 1 | 0 | 0 | 0 | 0 | 1 |
| | Col Pct | 0.04 | 0 | 0 | 0 | 0 | |
| Circoviridae | Frequency | 9 | 0 | 0 | 0 | 0 | 9 |
| | Col Pct | 0.35 | 0 | 0 | 0 | 0 | |
| Closteroviridae | Frequency | 6 | 0 | 0 | 0 | 0 | 6 |
| | Col Pct | 0.23 | 0 | 0 | 0 | 0 | |
| Coronaviridae | Frequency | 74 | 4 | 1 | 0 | 0 | 79 |
| | Col Pct | 2.87 | 6.25 | 3.85 | 0 | 0 | |
| Endornaviridae | Frequency | 3 | 0 | 0 | 0 | 0 | 3 |
| | Col Pct | 0.12 | 0 | 0 | 0 | 0 | |
| Filoviridae | Frequency | 23 | 0 | 0 | 0 | 0 | 23 |
| | Col Pct | 0.89 | 0 | 0 | 0 | 0 | |
| Flaviviridae | Frequency | 21 | 0 | 0 | 0 | 0 | 21 |
| | Col Pct | 0.82 | 0 | 0 | 0 | 0 | |
| Geminiviridae | Frequency | 8 | 0 | 0 | 0 | 0 | 8 |
| | Col Pct | 0.31 | 0 | 0 | 0 | 0 | |
| Hepadnaviridae | Frequency | 17 | 0 | 0 | 0 | 0 | 17 |
| | Col Pct | 0.66 | 0 | 0 | 0 | 0 | |
| Hepeviridae | Frequency | 2 | 0 | 0 | 0 | 0 | 2 |
| | Col Pct | 0.08 | 0 | 0 | 0 | 0 | |
| Herpesviridae | Frequency | 412 | 4 | 1 | 0 | 1 | 418 |
| | Col Pct | 16 | 6.25 | 3.85 | 0 | 50 | |
| Hytrosaviridae | Frequency | 10 | 1 | 0 | 0 | 0 | 11 |
| | Col Pct | 0.39 | 1.56 | 0 | 0 | 0 | |
| Iflaviridae | Frequency | 3 | 0 | 0 | 0 | 0 | 3 |
| | Col Pct | 0.12 | 0 | 0 | 0 | 0 | |
| Iridoviridae | Frequency | 45 | 2 | 3 | 1 | 0 | 51 |
| | Col Pct | 1.75 | 3.13 | 11.54 | 7.69 | 0 | |
| Luteoviridae | Frequency | 8 | 0 | 0 | 0 | 0 | 8 |
| | Col Pct | 0.31 | 0 | 0 | 0 | 0 | |
| Malacoherpesviridae | Frequency | 7 | 0 | 0 | 0 | 0 | 7 |
| | Col Pct | 0.27 | 0 | 0 | 0 | 0 | |
| Marseilleviridae | Frequency | 46 | 0 | 0 | 0 | 0 | 46 |
| | Col Pct | 1.79 | 0 | 0 | 0 | 0 | |
| Mesoniviridae | Frequency | 9 | 0 | 0 | 0 | 0 | 9 |
| | Col Pct | 0.35 | 0 | 0 | 0 | 0 | |
| Mimiviridae | Frequency | 270 | 15 | 8 | 7 | 0 | 300 |
| | Col Pct | 10.49 | 23.44 | 30.77 | 53.85 | 0 | |
| Nimaviridae | Frequency | 22 | 0 | 1 | 1 | 0 | 24 |
| | Col Pct | 0.85 | 0 | 3.85 | 7.69 | 0 | |

TABLE 14-continued

Distribution of viral families with the LLR scores higher than 40, 50, and 60
Table of virus_family by LLR_cod

| virus_family | | <30 | >30 | >40 | >50 | >60 | Total |
|---|---|---|---|---|---|---|---|
| Nodaviridae | Frequency | 4 | 0 | 0 | 0 | 0 | 4 |
| | Col Pct | 0.16 | 0 | 0 | 0 | 0 | |
| Nudiviridae | Frequency | 59 | 8 | 4 | 0 | 0 | 71 |
| | Col Pct | 2.29 | 12.5 | 15.38 | 0 | 0 | |
| Orthomyxoviridae | Frequency | 3 | 0 | 0 | 0 | 0 | 3 |
| | Col Pct | 0.12 | 0 | 0 | 0 | 0 | |
| Papillomaviridae | Frequency | 37 | 0 | 0 | 0 | 0 | 37 |
| | Col Pct | 1.44 | 0 | 0 | 0 | 0 | |
| Paramyxoviridae | Frequency | 55 | 0 | 0 | 0 | 0 | 55 |
| | Col Pct | 2.14 | 0 | 0 | 0 | 0 | |
| Partitiviridae | Frequency | 2 | 0 | 0 | 0 | 0 | 2 |
| | Col Pct | 0.08 | 0 | 0 | 0 | 0 | |
| Parvoviridae | Frequency | 43 | 0 | 0 | 0 | 0 | 43 |
| | Col Pct | 1.67 | 0 | 0 | 0 | 0 | |
| Phycodnaviridae | Frequency | 138 | 8 | 1 | 0 | 0 | 147 |
| | Col Pct | 5.36 | 12.5 | 3.85 | 0 | 0 | |
| Picobirnaviridae | Frequency | 1 | 0 | 0 | 0 | 0 | 1 |
| | Col Pct | 0.04 | 0 | 0 | 0 | 0 | |
| Picornaviridae | Frequency | 54 | 0 | 0 | 0 | 0 | 54 |
| | Col Pct | 2.1 | 0 | 0 | 0 | 0 | |
| Polydnaviridae | Frequency | 24 | 0 | 0 | 0 | 0 | 24 |
| | Col Pct | 0.93 | 0 | 0 | 0 | 0 | |
| Polyomaviridae | Frequency | 17 | 0 | 0 | 0 | 0 | 17 |
| | Col Pct | 0.66 | 0 | 0 | 0 | 0 | |
| Polyomaviridae | Frequency | 3 | 0 | 0 | 0 | 0 | 3 |
| | Col Pct | 0.12 | 0 | 0 | 0 | 0 | |
| Potyviridae | Frequency | 36 | 2 | 0 | 2 | 0 | 40 |
| | Col Pct | 1.4 | 3.13 | 0 | 15.38 | 0 | |
| Poxviridae | Frequency | 220 | 5 | 2 | 2 | 1 | 230 |
| | Col Pct | 8.54 | 7.81 | 7.69 | 15.38 | 50 | |
| Reoviridae | Frequency | 44 | 0 | 0 | 0 | 0 | 44 |
| | Col Pct | 1.71 | 0 | 0 | 0 | 0 | |
| Retroviridae | Frequency | 87 | 0 | 0 | 0 | 0 | 87 |
| | Col Pct | 3.38 | 0 | 0 | 0 | 0 | |
| Rhabdoviridae | Frequency | 6 | 0 | 1 | 0 | 0 | 7 |
| | Col Pct | 0.23 | 0 | 3.85 | 0 | 0 | |
| Secoviridae | Frequency | 3 | 0 | 0 | 0 | 0 | 3 |
| | Col Pct | 0.12 | 0 | 0 | 0 | 0 | |
| Togaviridae | Frequency | 13 | 0 | 0 | 0 | 0 | 13 |
| | Col Pct | 0.5 | 0 | 0 | 0 | 0 | |
| Tombusviridae | Frequency | 3 | 0 | 0 | 0 | 0 | 3 |
| | Col Pct | 0.12 | 0 | 0 | 0 | 0 | |
| Totiviridae | Frequency | 6 | 0 | 0 | 0 | 0 | 6 |
| | Col Pct | 0.23 | 0 | 0 | 0 | 0 | |
| Tymoviridae | Frequency | 1 | 0 | 0 | 0 | 0 | 1 |
| | Col Pct | 0.04 | 0 | 0 | 0 | 0 | |
| Virgaviridae | Frequency | 19 | 0 | 0 | 0 | 0 | 19 |
| | Col Pct | 0.74 | 0 | 0 | 0 | 0 | |
| undef | Frequency | 1 | 1 | 0 | 0 | 0 | 2 |
| | Col Pct | 0.04 | 1.56 | 0 | 0 | 0 | |
| Total | Frequency | 2574 | 64 | 26 | 13 | 2 | 2679 |

Example 7: Antiviral Effect of Drugs with Prion Activity

A list of prion-like domains in human Herpes Virus 1 is shown in Table 15 below.

TABLE 15

| Protein Description | Protein function detailed | Protein function | LLR_0.0 |
|---|---|---|---|
| Envelope glycoprotein I | viral envelope | Adsorption and entry | 3.075 |
| Envelope glycoprotein C | viral envelope | Adsorption and entry | 3.043 |
| Envelope glycoprotein E | viral envelope | Adsorption and entry | 0.382 |
| Envelope glycoprotein B | viral envelope | Adsorption and entry | 0.158 |
| Large tegument protein | nuclear capsid assembly | Assembly | 5.704 |
| Tripartite terminase subunit 1 | viral DNA genome packaging | Assembly | 0.477 |

TABLE 15-continued

| Protein Description | Protein function detailed | Protein function | LLR_0.0 |
|---|---|---|---|
| DNA packaging terminase subunit 2 | viral genome packaging | Assembly | 0.158 |
| Packaging protein UL32 | viral envelope | Assembly | 0.158 |
| Large tegument protein deneddylase | viral DNA genome replication | Biosynthesis | 37.746 |
| Deneddylase | viral DNA genome replication | Biosynthesis | 21.823 |
| Transcriptional regulator ICP4 | positive regulation of transcription, DNA-templated | Biosynthesis | 4.891 |
| Ubiquitin E3 ligase ICP0 | ligase activity | Biosynthesis | 4.425 |
| ICP0 | metal ion binding | Biosynthesis | 0.412 |
| Capsid vertex component 2 | DNA Packaging | release | 0.473 |
| Neurovirulence protein ICP34.5 | Unreviewed | suppression by virus of host complement activation | 0.166 |

An anti-PrD drug called Tacrolimus was used to study its possible antiviral activity. Tacrolimus is an anti-PrD drug with known activity against prions but is not known to have antiviral activity. For anti-HSV activity, Vero cells were seeded in 24-well plates at a density of $70\times10^3$ cells. After 24 h, the cells were treated with a clinical isolate of HSV-1 at a multiplicity of infection (MOI) of 0.1 PFU/cell. Following virus adsorption (2 h at 37° C.), Tacrolimus was added and cultures were maintained in medium containing for another 48 h until control cultures displayed extensive cytopathology. It has been thus determined that Tacrolimus has the antiviral activity against the herpes virus used (type I), as seen in Table 16 below.

TABLE 16

| Preparation | Number (%) of unaltered cells Herpes virus of type I |
|---|---|
| Reference (non-infected cells) | 80% |
| Tacrolimus | 30% |

As can be seen from the data presented, an anti-PrD drug without a known antiviral activity inhibits the reproduction of herpesviruses which proteome is enriched in prion-like domains. Thus, an antiprionogenic drug possesses antiviral activity against prion-containing viruses.

Example 8: Inhibition of Amyloid Formation in Bacterial Biofilms Following Incubation with Anti-PrD Drugs The effect of anti-PrD drugs on biofilm amyloid formation was analyzed using a Congo Red assay. It is known that when Congo Red (CR) interacts with microbial amyloid, it also produces a bright red fluorescence that can be quantified with an excitation wavelength of 485 nm and an emission wavelength of 612 nm (Zhou, Yizhou, et al. "Bacterial amyloids." Amyloid Proteins. Humana Press, 2012. 303-320.)

Tacrolimus, Pentosan polysulfate, and Quinacrine were used as drugs with known anti-prion activity (Karapetyan, Yervand Eduard, et al. "Unique drug screening approach for prion diseases identifies tacrolimus and astemizole as anti-prion agents." Proceedings of the National Academy of Sciences 110.17 (2013): 7044-7049.; Rahman, Ziyaur, Ahmed Zidan, and Mansoor A. Khan. "Tacrolimus properties and formulations: potential impact of product quality on safety and efficacy." Tacrolimus: Effectiveness, Safety and Drug Interactions, Nova Science Publishers Inc., New York (2013): 1-39.; Farquhar, C., Dickinson, A., & Bruce, M. (1999). Prophylactic potential of pentosan polysulphate in transmissible spongiform encephalopathies. The Lancet, 353(9147), 117.; Geschwind, Michael D., et al. "Quinacrine treatment trial for sporadic Creutzfeldt-Jakob disease." Neurology 81.23 (2013): 2015-2023.; Geschwind, M. D.; Kuo, A.; Raudabaugh, B.; Haman, A.; Devereux G.; Johnson D. Y.; Torres-Chae, C.; Wong K. S.; Prusiner S.; Miller B. L. The first U.S. treatment trial for sporadic CJD. In: Abstracts of the 134th Annual Meeting of The American Neurological Association. Oct. 11-14, 2009. Baltimore, Maryland, USA. Ann Neurol., 2009, 66, S49-S50 (Abs).)

Inhibition of Congo-red and inhibition of biofilm formation was examined by directly applying the anti-PrD drugs at time zero to a growing culture in liquid medium at 37° C. Cells were analyzed for CR binding when reached absorbance (A600 nm) of approximately 1.2 absorbance units (AU). The amyloid-producing bacteria displayed elevated levels of CR binding. However, in the presence of the Tacrolimus, Pentosan polysulfate or Quinacrine, about 40% decrease in CR binding was observed, suggesting that the drugs affect amyloid production.

A biofilm formation assay was undertaken. An inoculum of amyloid producing *Escherichia coli* strain VT-156 and non-amyloid producer *Escherichia coli* strain RA-74 were prepared by using a 24-h broth culture. The inoculum, which contained 7.53+/−0.22 log 10 CFU/ml, was added to the wells of 96-well plates (200 mcl/well), 35-mm petri dishes (2 ml), and coverslips that were placed in glass tubes (2 ml) (all from Sarstedt, Germany); and the plates, dishes, and coverslips were incubated at 37° C. for 24 h. The effect of the anti-PrD drugs on a 24 hour old *S. aureus* biofilm (beta amyloid formation) is shown in Table 17 below.

TABLE 17

| Compound (mcg/ml) | Bacterial OD (570 nm) | |
|---|---|---|
| | *Escherichia coli* strain VT-56 | *Escherichia coli* strain RA-74 |
| Control | 1.899 | 1.634 |
| Tacrolimus-1 | 0.678 | 1.382 |

TABLE 17-continued

| | Bacterial OD (570 nm) | |
|---|---|---|
| Compound (mcg/ml) | Escherichia coli strain VT-56 | Escherichia coli strain RA-74 |
| Pentosan polysulfate-1 | 0.547 | 1.416 |
| Quinacrine-1 | 0.657 | 1.406 |

As can be seen from the data presented, the anti-PrD drugs inhibited formation of bacterial amyloid (based on CR assay) and inhibited biofilm formation of amyloid-producing bacteria of microbial biofilms. Thus, these drugs possess antimicrobial and antibiofilm activity.

Example 9: Prevention of the Appearance of Prion-Like and/or Tetz-Proteins, Due to Inactivation of Extracellular DNA Leading to their Appearance The effect on the model of increased gut permeability in mice was studied. Increased gut permeability allows increased levels of bacterial DNA in the blood circulation, leading to the increase in the level of beta amyloid (Bala, S. et al., 2014; DiBiagio, J. R. et al., 2016). DNAse prevents the appearance of a thermostable protein formed by the extracellular DNA.

Hemizygous transgenic mice expressing familial Alzheimer's disease mutant human (line Tg2576, Hsiao et al., 1996). A total of 70 male mice were used. To identify beta-amyloid (AB) amount, one quarter brain from each animal was homogenized in 70% formic acid at a weight:volume ratio of 100 mg/ml. The homogenate was sonicated for 2 min and centrifuged at 100,000 g for 1 h. After centrifugation, the supernatant fraction was removed and neutralized with 19 vol of Tris-phosphate buffer. Samples were analyzed by a modified sandwich ELISA that detects total AB. To detect human Aβ, aliquots of homogenate were added to Nunc Maxisorb plates coated with monoclonal antibody 6E10 (Senetek) capture antibody. After incubation at 4° C. overnight, human Ab was detected by monoclonal antibody 4G8 (Senetek) conjugated to horseradish peroxidase (HRP). After washing with PBS containing 0.05% Tween 20, the bound peroxidase was detected by the TMB peroxidase kit (Kirkegaard & Perry). Plates were read at 450 nm in a standard plate reader, and unknowns were quantified by comparison to known quantities of freshly dissolved Ab40 (Bachem).

Animals were injected daily, with increasing concentrations of S. aureus bacterial DNA. Control animals were injected with sterile water. DNase (2000 Kunitz units) was administered orally or by IV on day 1. Data are presented in Table 18.

TABLE 18

| Amount of Aβ in the brain | |
|---|---|
| Probe | Total Aβ(pmol/mg) |
| Control | 87 +/− 22 |
| DNA 5 mcg | 354 +/− 56 |
| DNA 20 mcg | 420 +/− 39 |
| DNA 5 mcg + DNase | 5 mcg IV | 94 +/− 23 |
| DNA 20 mcg + DNase | 5 mcg IV | 73 +/− 12 |
| DNA 5 mcg + DNase | 5 mcg PO | 103 +/− 35 |
| DNA 20 mcg + DNase | 5 mcg PO | 95 +/− 12 |

As it is seen, inactivation of DNA lead to the decreased amount of amyloid-beta in the mice brains. Thus, the destruction of extracellular DNA can be used for the prevention of prion-like and/or Tetz-proteins formation.

Example 10: Inhibition of Amyloid Beta Formation in Bacterial Biofilms

The effect of antibodies against bacterial amyloid on amyloid formation was analyzed using Congo red assay. It is known that when Congo red (CR) interacts with microbial amyloid, it also produces a bright red fluorescence that can be quantified with an excitation wavelength of 485 nm and an emission wavelength of 612 nm (Zhou, Yizhou, et al. "Bacterial amyloids." Amyloid Proteins. Humana Press, 2012. 303-320.)

Antibodies were obtained by immunizing the rabbit by alfa amyloid. Amyloid was received from bacterial biofilm. Chai, L. et al., "Isolation, characterization, and aggregation of a structured bacterial matrix precursor" J. Biol. Chem. 2013 Jun. 14; 288(24):17559-68.

Inhibition of Congo-red and inhibition of biofilm formation were examined by directly applying the anti-PrD drugs at time zero to a growing culture in liquid medium at 37° C. Cells were analyzed for CR binding when reached absorbance (A600 nm) of approximately 1.2 absorbance units (AU). The amyloid-producing bacteria displayed elevated levels of CR binding. However, in the presence of the antibodies to amyloid about 30% decrease in CR binding was observed, suggesting that the drugs affect amyloid production. Table 19 below shows amyloid beta formation in a biofilm of E. coli.

TABLE 19

| Agent | Optical density at 570 nm of biofilm biomass |
|---|---|
| Control | 1.634 |
| Antibody | 0.764 |

Biofilm formation assay. An inoculum of amyloid producing Escherichia coli strain VT-156 and an inoculum of non-amyloid producer Escherichia coli strain RA-74 were prepared by using a 24-h broth culture. Each inoculum, which contained 7.53+/−0.22 log 10 CFU/ml, was added to the wells of 96-well plates (200 mcl/well) and 35-mm petri dishes (2 ml). Coverslips were placed in glass tubes (2 ml) (all from Sarstedt, Germany); and the plates, dishes, and coverslips were incubated at 37° C. for 24 h. Table 20 below shows the effect on S. aureus biofilm beta amyloid formation over 24 hours.

TABLE 20

| | Bacterial OD (570 nm) | |
|---|---|---|
| Group | Escherichia coli strain VT-156 | Escherichia coli strain RA-74 |
| Control without antibodies | 1.965 | 1.781 |
| With anti-amyloid antibodies | 0.719 | 1.802 |

As can be seen from the data presented, the antibodies against amyloid inhibited formation of bacterial amyloid (based on CR assay) and inhibited biofilm formation of amyloid-producing bacteria of microbial biofilms, thus possessing antimicrobial and antibiofilm activity.

Example 11: Inactivation of Amyloid with Specific Antibodies

Antibodies were obtained by immunizing a rabbit by alfa amyloid. Amyloid was received from *S. aureus* VT-177 bacterial biofilm. Chai, L. et al., "Isolation, characterization, and aggregation of a structured bacterial matrix precursor" J. Biol. Chem. 2013 Jun. 14; 288(24):17559-68.

C57B1 mice and white randomly bred mice were used. The weight of animals was 24-26 g. 6-7 animals were kept in one cage on a standard diet without limitation of water. Animals were administered amyloid of *S. aureus* VT-177, IV, 10 mcg/mL for 6 days. The experimental group was administered IV antibodies starting from day 1. Control animals were administered IV sterile water. Each group contained 10 animals. Animal survival was measured as a primary endpoint. Table 21 below shows the number of animals that died in each of the groups of 10 animals.

TABLE 21

| Group | Number of dead animals per group |
|---|---|
| Control | 3 |
| Antibodies | 0 |

The data obtained revealed that antibodies against bacterial amyloid results in significant protection from bacterial-related mortality.

Example 12: Antibodies to Proteinase K Protected from the Appearance of Tetz-Proteins in the Serum Antibodies were obtained by immunizing the rabbit by Proteinase K and can be used for both diagnostics and treatment of human malignancies. It is known that human blood plasma and CSF in cancer patients, and patients neurodegenerative and autoimmune diseases, possess elevated levels of proteases (Tamkovich, Svetlana, and Olga Bryzgunova. "Protease Activity and Cell-Free DNA in Blood Plasma of Healthy Donors and Breast Cancer Patients." *Journal of Immunoassay and Immunochemistry.* 37.2 (2016): 141-153; Andreasson, Ulf, et al. "An enzyme activity as a potential biomarker for Alzheimer's disease." *Alzheimer's & Dementia: The Journal of the Alzheimer's Association.* 6.4 (2010): S497-S498.). Thus, inactivation of proteases is suggested to have therapeutic potential.

Figure 10:
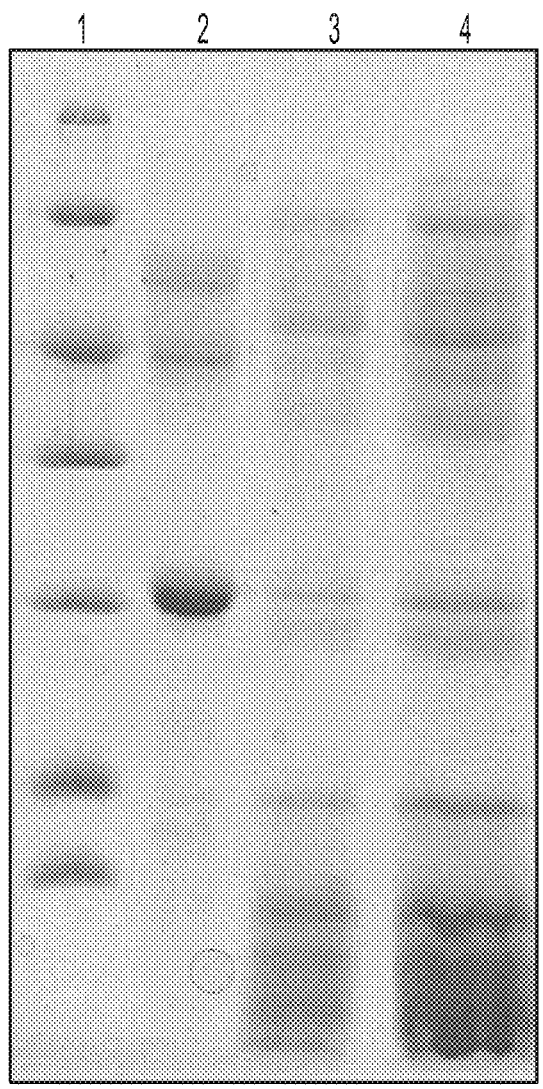
FIG. 10 is a Coomassie-stained acrylamide gel showing proteins separated from human blood plasma. Lane 1 is the molecular weight marker, lane 2 is human plasma+proteinase K, lane 3 is human plasma+proteinase K+antibodies against Proteinase K, and lane 4 is human plasma.

To the human blood plasma, antibodies to proteinase K were added. After a 30-minute exposure, the plasma was heated in a boiling water bath for 15 minutes. The liquid fraction was separated further and studied by electrophoresis in 12% gel. (FIG. 10). As it is seen the electrophoretic profile of proteins in the presence of antibodies to proteinase K was similar to the control. Antibodies against Proteinase K completely prevented alteration of the abundance as well as appearance of Tetz-proteins, providing protection that may be beneficial in the therapy of diseases associated with increased proteases levels.

Figure 11:
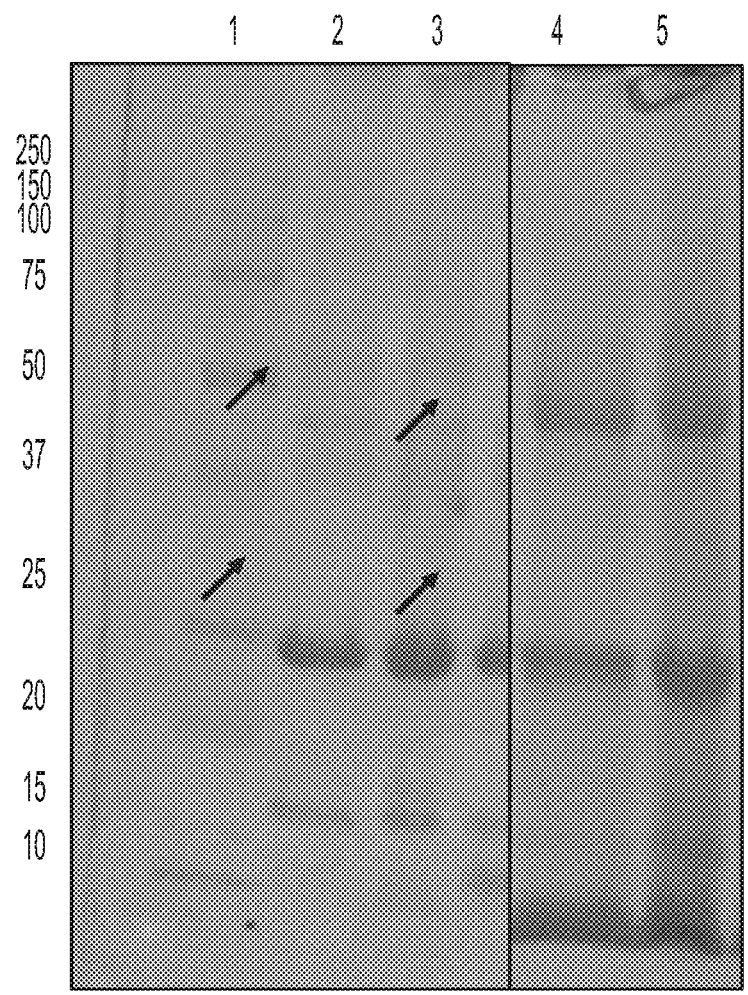
FIG. 11 is a Coomassie-stained acrylamide gel showing the alteration of Tetz-proteins blood plasma content in patients with advanced breast cancer. Lane 1 is the molecular weight marker, lane 2 is the human plasma control, lane 3 is cancer plasma, lane 4 is human plasma control+ proteinase K (20 mcg/ml), and lane 5 is cancer plasma+ proteinase K (20 mcg/ml).

Example 13: Detection of Prion-Like and/or Tetz-Proteins in Blood Plasma as a Diagnostic Sign of Oncological Diseases Identification of Tetz-proteins can be suggested as a novel diagnostic criteria for cancer diagnostics. FIG. 11 shows the alteration of Tetz-proteins blood plasma content in patients with advanced breast cancer (Stage 3). Electrophoresis of proteins was performed by a Bio-Rad system according to the instructions of the manufacturer [www.bio-rad.com/webroot/web/pdf/lsr/literature/Bulletin_6040.pdf].

As it is seen, identification of Tetz-proteins allows detection of an altered amounts of proteins and the appearance of unique proteins that can be visualized by different methods including SDS electrophoresis (red arrows). Processing with proteases leads to the formation of altered proteins, and unique proteins that could be detected and used for the diagnosis of oncological diseases (black arrows).

Figure 12:
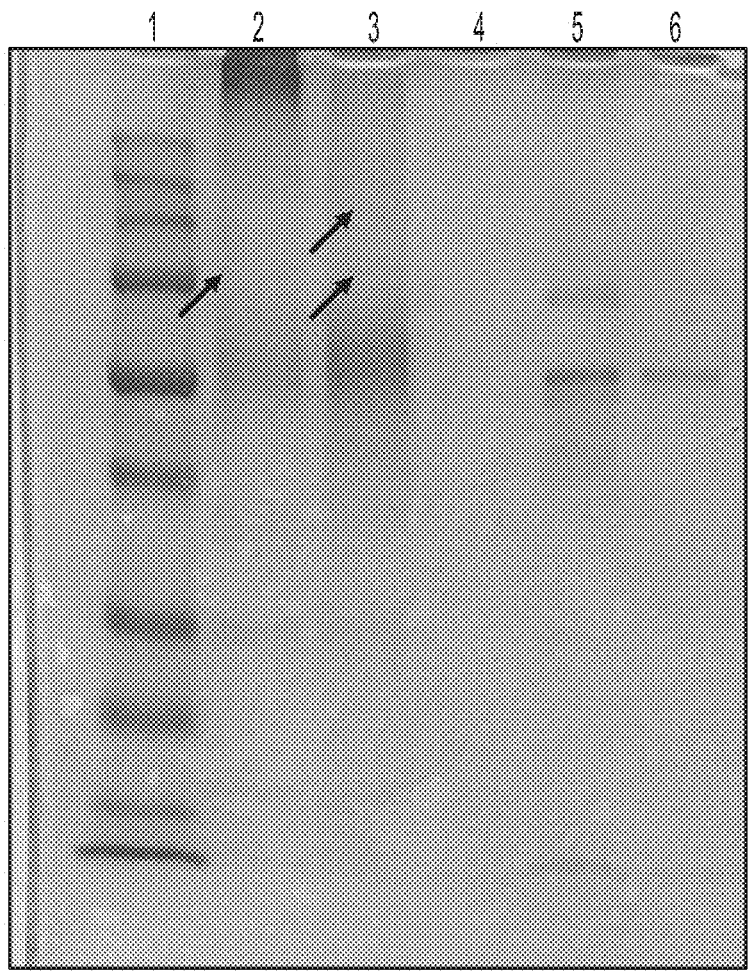
FIG. 12 is a Coomassie-stained acrylamide gel showing the alteration of Tetz-proteins in CSF in patients with advanced Parkinson's disease. Lane 1 is the molecular weight marker, lane 2 is control CSF, lane 3 is Parkinson's disease CSF, lane 4 is blank, lane 5 is Parkinson's disease CSF+proteinase K (250 mcg/ml), and lane 6 is control CSF+proteinase K (250 mcg/ml).

Example 14: Detection of Tetz-Proteins in the Cerebrospinal Fluid as a Diagnostic Sign of Neurodegenerative Diseases Identification of Tetz-proteins may be a novel diagnostic criteria for neurodegenerative diseases. FIG. 12 shows the alteration of Tetz-proteins in CSF in patients with advanced Parkinson's disease. Electrophoresis of proteins was performed by a Bio-Rad system according to the instructions of the manufacturer [www.bio-rad.com/webroot/web/pdf/lsr/literature/Bulletin_6040.pdf].

As it is seen, identification of Tetz-proteins allows detection of an altered amounts of proteins and the appearance of unique proteins in neurodegenerative diseases that can be visualized by different methods including SDS electrophoresis (red arrows). Processing with proteases lead to the formation of altered proteins, and unique proteins that could be detected and used for the diagnosis of neurodegenerative diseases (black arrows).

Example 15: Diagnostic Use of Prion-Like and/or Tetz-Proteins Detection in Patients with Diseases LC/MS was conducted as previously described. The mass spectrometry data for a (Probe_1) healthy human blood plasma heated for 100° C. for 5 minutes; (probe_2) healthy human blood plasma after incubation for 30 minutes with Proteinase K, following heating for 100° C. for 5 minutes; (Probe_3) blood of a patient with breast cancer heated for 100° C. for 5 minutes (probe_4) blood of a patient with breast cancer treated with Proteinase K for 30 minutes and subsequent heating up to 100° C. for 15 minutes.

There was difference in the Tetz-proteins and prion-like proteins abundance, with and without proteinases treatment. Key alternations are presented in Table 22 below, indicating altered abundance [marked with underlining] and appearance of novel proteins [marked in bold], of blood Tetz and prion-like proteins in human blood plasma with and without proteinase treatment.

TABLE 22

| Identified Proteins (635) Accession Number | N-plasma | N-plasma + pK | Cancer | Cancer + pK |
|---|---|---|---|---|
| ALBU_HUMAN [3] | 254 | 440 | 729 | 555 |
| ALBU_HUMAN (+1) | 254 | 440 | <u>729</u> | 554 |
| A0A0C4DGB6_HUMAN | 241 | 390 | <u>676</u> | 475 |
| CO3_HUMAN [3] | 77 | 93 | <u>186</u> | 122 |
| CO3_HUMAN | 77 | 88 | <u>186</u> | 119 |
| MOROQ9_HUMAN | | 6 | <u>13</u> | 5 |
| CON_Q2UVX4 | | 6 | 7 | 8 |
| TRFE_HUMAN [2] | 59 | 135 | <u>121</u> | 113 |
| TRFE_HUMAN | 59 | 134 | <u>121</u> | 113 |
| C9JB55_HUMAN | | 12 | <u>9</u> | 8 |
| CO4A_HUMAN [2] | 45 | 48 | <u>94</u> | 57 |
| F5GXS0_HUMAN | 44 | 43 | <u>94</u> | 52 |

TABLE 22-continued

| Identified Proteins (635) Accession Number | N-plasma | N-plasma + pK | Cancer | Cancer + pk |
|---|---|---|---|---|
| FINC_HUMAN | 12 | 72 | 82 | 84 |
| HEMO_HUMAN | 37 | 53 | 65 | 56 |
| CERU_HUMAN | 24 | 40 | 59 | 46 |
| B4E1Z4_HUMAN [2] | 11 | 22 | 37 | 25 |
| B4E1Z4_HUMAN | 11 | 22 | 36 | 25 |
| VTDB_HUMAN | 15 | 32 | 35 | 32 |
| CFAH_HUMAN [3] | 15 | 58 | 51 | 56 |
| CFAH_HUMAN | 15 | 56 | 48 | 54 |
| B1AKG0_HUMAN (+1) | | 5 | 6 | 4 |
| IGHG2_HUMAN | 11 | 31 | 39 | 26 |
| PLMN_HUMAN | 6 | 22 | 29 | 19 |
| IC1_HUMAN | 17 | 8 | 23 | 12 |
| IGHG3_HUMAN | 14 | 25 | 30 | 23 |
| B7ZKJ8_HUMAN [3] | 11 | 34 | 39 | 39 |
| B7ZKJ8_HUMAN (+1) | 11 | 34 | 39 | 39 |
| H7C0L5_HUMAN | 8 | 29 | 28 | 33 |
| APOH_HUMAN | 13 | 22 | 24 | 24 |
| ITIH2_HUMAN (+1) | 9 | 24 | 26 | 19 |
| PZP_HUMAN | 8 | 11 | 20 | 12 |
| ITIH1_HUMAN | 8 | 23 | 24 | 24 |
| Q5VY30_HUMAN (+1) | 4 | 8 | 10 | 11 |
| A0A087WYJ9_HUMAN (+1) | 21 | 43 | 40 | 31 |
| PGRP2_HUMAN | 2 | 5 | 13 | 13 |
| IGLC7_HUMAN | | 13 | 16 | 15 |
| ACTB_HUMAN [4] | | | 12 | 10 |
| ACTB_HUMAN (+1) | | | 12 | 8 |
| A0A0A0MRJ7_HUMAN (+1) | | | 2 | 4 |
| SODC_HUMAN | | | 2 | |
| KV127_HUMAN [6] | 1 | 2 | 7 | 1 |
| KV105_HUMAN | | 1 | 2 | 1 |
| KV106_HUMAN | | | 1 | |
| KV117_HUMAN | | | 1 | |
| CO8G_HUMAN | | 1 | 4 | 2 |
| FA12_HUMAN | | 1 | 10 | 3 |
| A0A096LPE2_HUMAN | 4 | 2 | 10 | 6 |
| CO6_HUMAN | | 4 | 7 | 4 |
| CALM1_HUMAN (+3) | | | 7 | 3 |
| HV315_HUMAN [3] | | 2 | 3 | 2 |
| HV315_HUMAN | | 1 | 2 | 2 |
| HV372_HUMAN | | 1 | 1 | |
| HV373_HUMAN | | | 2 | |
| 1433Z_HUMAN [3] | 1 | | 2 | 2 |
| 1433Z_HUMAN (+1) | | | 2 | 2 |
| 1433F_HUMAN | 1 | | 1 | |
| C1QA_HUMAN | | | 1 | 1 |
| TYB10_HUMAN | | | 2 | 1 |
| LV310_HUMAN | | 1 | 1 | 4 |
| A0A0C4DH35_HUMAN | | 1 | 1 | 1 |
| IPSP_HUMAN | | | 2 | |
| APOB_HUMAN | 48 | 100 | 117 | 102 |
| APOA_HUMAN | 28 | 15 | 5 | 4 |
| CD5L_HUMAN | 3 | 9 | 13 | 12 |
| C4BPA_HUMAN | 4 | 10 | 17 | 4 |
| Q5SRP5_HUMAN | | 4 | 4 | 4 |
| LBP_HUMAN | | | 2 | |
| ALS_HUMAN | | 2 | 2 | |
| LYVE1_HUMAN | 4 | | | |
| ICAM3_HUMAN | 2 | | | |
| S10A9_HUMAN | 2 | | | |
| CXCL7_HUMAN | 2 | | 9 | 5 |
| FA9_HUMAN | 3 | 2 | | 4 |
| FHR4_HUMAN | 4 | | | |
| TPM4_HUMAN [3] | | | 29 | 20 |
| TPM4_HUMAN | | | 24 | 19 |
| Q5TCU3_HUMAN | | | 13 | 7 |
| K7ENT6_HUMAN | | | 10 | 5 |
| Q5HYB6_HUMAN [6] | | | 30 | 17 |
| Q5HYB6_HUMAN | | | 18 | 13 |
| B7Z596_HUMAN (+2) | | | 12 | 4 |
| Q6ZN40_HUMAN | | | 13 | 4 |
| J3KN67_HUMAN | | | 16 | 12 |
| A0A087WW43_HUMAN (+1) | | 10 | 3 | 9 |
| TLN1_HUMAN | | | 4 | 25 |
| MYH9_HUMAN | | | 3 | 25 |
| F13B_HUMAN | | | 4 | 2 |
| G3V2W1_HUMAN (+1) | | | 3 | 2 | 3 |
| B7Z6Z4_HUMAN (+5) | | | 4 | 5 |
| A6XND0_HUMAN (+2) | 2 | 1 | 3 | 2 |
| H0Y2Y8_HUMAN (+1) | | | 5 | 2 |
| PROF1_HUMAN | | | 2 | 5 |
| COF1_HUMAN | | | 1 | 5 |
| SDPR_HUMAN | | | 6 | |
| TAGL2_HUMAN (+1) | | | 2 | 4 |
| E7END6_HUMAN (+1) | 2 | | 3 | 1 |
| J3QRS3_HUMAN [4] | | | 2 | 4 |
| J3QRS3_HUMAN (+2) | | | 2 | 3 |
| MYL9_HUMAN | | | 2 | 3 |
| PDLI1_HUMAN | | | 5 | |
| A0A0U1RR20_HUMAN (+1) | | 1 | 3 | 1 |
| HABP2_HUMAN | | | 3 | 1 |
| M0R2W8_HUMAN | | 4 | 1 | 2 |
| E7EPV7_HUMAN (+1) | | | 4 | |
| PLF4_HUMAN | | | 3 | 1 |
| C9J6K0_HUMAN (+1) | | | 2 | 2 |
| CCD82_HUMAN (+1) | | | 2 | 2 |
| F5H6P7_HUMAN (+2) | 2 | | 2 | |
| CALD1_HUMAN (+1) | | | 3 | |
| Q5T123_HUMAN (+1) | | | 3 | |
| SRC8_HUMAN | | | 3 | |
| ITA2B_HUMAN | | | 2 | 1 |
| SRGN_HUMAN | | | 2 | 1 |
| H0Y7V6-DECOY | | | 3 | |
| A0A0C4DGZ8_HUMAN (+1) | | | 2 | |
| H3BRJ5_HUMAN | | | 2 | |
| H7BZ94_HUMAN (+3) | | | 2 | |
| NEUG_HUMAN | | | 2 | |
| E9PLM6_HUMAN (+2) | | | 1 | 1 |
| F5H2R5_HUMAN (+3) | | | 1 | 1 |
| Q6YN16-DECOY | | 1 | 1 | |
| TBB1_HUMAN | | | 1 | 1 |
| A0A087WVA8_HUMAN (+3) | | | 1 | |
| A0A0A6YYA4_HUMAN (+1) | | | 1 | |
| A0A1W2PQM2_HUMAN (+11) | | | 1 | |
| BAF_HUMAN (+1) | | | 1 | |
| C9J9W2_HUMAN (+1) | | | 1 | |
| C9JD84_HUMAN (+4) | | | 1 | |
| C9JZW3_HUMAN (+3) | | | 1 | |
| DSA2D_HUMAN (+1) | | | 1 | |
| E7ETM8_HUMAN (+3) | | | 1 | |
| F5GX41_HUMAN (+3) | | | 1 | |
| F6QYZ9-DECOY | | | 1 | |
| F6VVT6_HUMAN (+5) | | | 1 | |
| F8W914_HUMAN (+1) | | | 1 | |
| G3V4R8_HUMAN | | | 1 | |
| H3BM38_HUMAN (+6) | | | 1 | |
| HV205_HUMAN | | | 1 | |
| ILF3_HUMAN (+5) | | | 1 | |
| JUNB_HUMAN | | | 1 | |
| RGCC_HUMAN | | | 1 | |
| SSX5_HUMAN | | 1 | | |

As can be seen from the presented data above, this method allows to identify the difference in the representation of Tetz-proteins in patients with diseases, including by means of addition of proteinases. Moreover, certain proteins following protease treatment had different trends in the alteration of their amount. Thus, for example CO3_HUMAN was increased following proteinase procession of normal blood plasma, but was decreased in cancer patients.

Example 16: Diagnosis of Diseases in Mammals According to the Composition of Thermostable Proteins The electrophoretic profile of thermostable blood plasma of patients was analyzed. Blood plasma specimens were heated for 10 minutes in a water bath. Electrophoresis of proteins was performed by the Bio-Rad system according to the instructions of the manufacturer [www.bio-rad.com/webroot/web/pdf/lsr/literature/Bulletin_6040.pdf].

Figure 13:
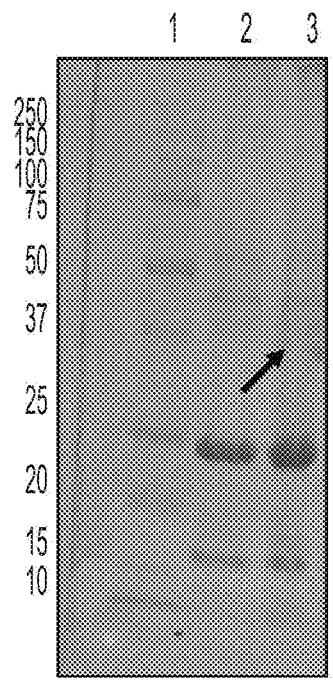
FIGS. 13 and 14 are Coomassie-stained acrylamide gels showing the alteration of thermostable proteins in patients with breast cancer.

FIG. 13 shows the alteration of thermostable proteins in patients with breast cancer. As it is seen, identification of Tetz-proteins allows detection of an altered amounts of proteins and the appearance of unique proteins in cancer that can be visualized by different methods including SDS electrophoresis (red arrows).

Example 17: Diagnosis of Diseases by the Composition of Prion-Like and/or Tetz-Proteins, which are Detected by Treatment with Proteases The electrophoretic profile of thermostable and proteinase-resistant blood plasma of patients were analyzed. Blood plasma specimens were mixed with proteinase K (100 mcg/ml) for 30 minutes and then heated for 10 minutes at water bath. Electrophoresis of proteins was performed by the Bio-Rad system according to the instructions of the manufacturer [www.bio-rad.com/webroot/web/pdf/lsr/literature/Bulletin_6040.pdf].

Figure 14:
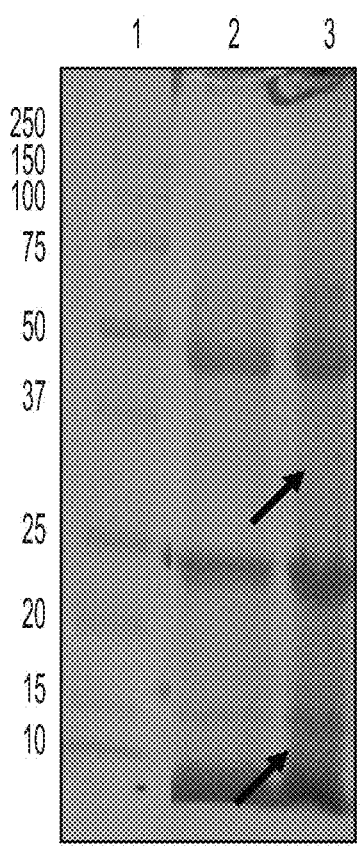

FIG. 14 shows the alteration of thermostable proteins in patients with breast cancer. As it is seen, identification of novel Tetz-proteins allows detection of altered amounts of proteins and the appearance of unique proteins in cancer that can be visualized by different methods including SDS electrophoresis (red arrows).

Example 18: Diagnosis of Diseases by the Composition of Prion-Like and/or Tetz-Proteins, which are Detected by Treatment with the Bacterial DNA The diagnostics of mammalian diseases, using alteration of the proteomic content of biological fluids following DNA processing. Erlich carcinoma was modelled in mice. Cells were cultivated in RPMI-1640 medium with 10% calf serum and 1% penicillin-streptomycin in an atmosphere of 5% $CO_2$. For tumor inoculation in mice, the cells were cultivated till monolayer is formed, then detached with trypsin-TA buffer. The cells were washed 3 times by centrifuging in phosphate buffer and then resuspended up to $0.5 \times 10^7$/ml concentration in the same buffer. The cell viability was determined with methylene blue staining in a hemocytometer. Cells suspensions with no less than 95% of living cell were used for transplantation.

C57B1 mice and white randomly bred mice were used. The weight of the animals was 24-26 g. 6-7 animals were kept in one cage on a standard diet without limitation of water. Erlich tumors were transplanted by administration of 0.2 ml of 10% cell suspension in physiological solution.

Blood plasma was taken before the initiation of cancer and after. To the plasma probes ex vivo, DNA was added (5 mcg). The electrophoretic profiles of thermostable and proteinase-resistant blood plasma were analyzed. Blood plasma specimens were pre-incubated with DNA for 30 minutes at 37° C., then mixed with proteinase K (100 mcg/ml) for 30 minutes and then heated for 10 minutes at water bath. Electrophoresis of proteins was performed by the Bio-Rad system according to the instructions of the manufacturer [www.bio-rad.com/webroot/web/pdf/lsr/literature/Bulletin_6040.pdf].

Figure 15:
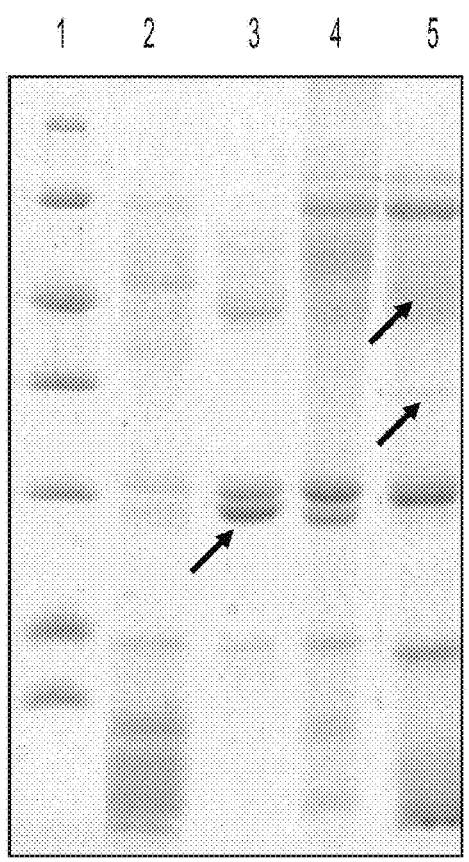
FIGS. 15 and 16 show the alteration of thermostable proteins in mice with Erlich carcinoma.

FIG. 15 shows the alteration of thermostable proteins in mice with Erlich carcinoma. As it is seen, adding DNA ex vivo and followed by processing can be used for cancer diagnostics due to the appearance of novel proteins and alteration of the amount of proteins.

Example 19: Treatment of Mammalian Diseases by Inhibition of Prion-Like and/or Tetz-Proteins Erlich carcinoma was modelled in mice. Cells were cultivated in RPMI-1640 medium with 10% calf serum and 1% penicillin-streptomycin in atmosphere of 5% $CO_2$. For tumor inoculation in mice, the cells were cultivated until a monolayer is formed and then were detached with trypsin-TA buffer. The cells were washed 3 times by centrifuging in phosphate buffer and then resuspended up to $0.5 \times 10^7$/ml concentration in the same buffer. The cell viability was determined with methylene blue staining in a hemocytometer. Cells suspensions with no less than 95% of living cells were used for transplantation.

C57B1 mice and white randomly bred mice were used. Weight of animals was 24-26 g. 6-7 animals were kept in one cage on a standard diet without limitation of water. Erlich tumors were transplanted by administration of 0.2 ml of 10% cell suspension in physiological solution.

Figure 16:
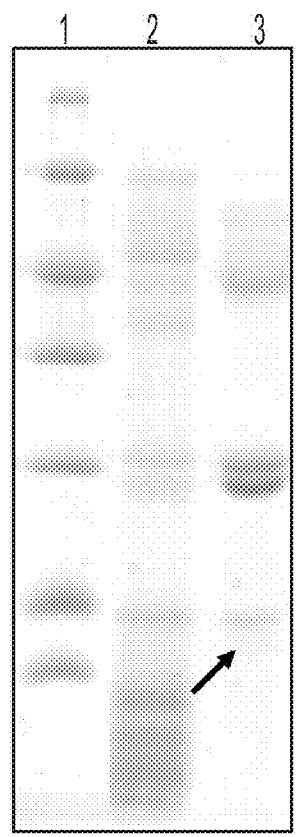

Blood plasma was taken before the initiation of cancer and after. FIG. 16 shows the alteration of thermostable proteins in mice with Erlich carcinoma. The protein that appeared (marked with arrow), was cut from the gel and analyzed with LC/MS as Gelsolin. Antibodies to gelsonin were obtained as described previously.

Resulting antibodies were given (IV) in the same animal model 7 days after cancer initiation.

The mortality rate was analyzed for 45 days. Table 23 shows the mortality rate on the $45^{th}$ day of the experiment.

TABLE 23

| Group | Number alive | Number dead |
| --- | --- | --- |
| Control cancer (no treatment) | 2 | 8 |
| Cancer + antibodies to Gelsolin | 7 | 3 |

As it is seen, the destruction/inactivation of Tetz-proteins and prion-like proteins can be used for the treatment of cancer.

Example 20: Increasing the Number of Prion-Like Domains on Viral Vectors for Adopting Desirable New Properties AAV5x2 and AAV5x5 vectors were synthetically constructed from AAV5 that had 2 and 5 times more PrDs (capsid proteins VP1 with Prion-like-domain) on their surfaces.

Figure 17:
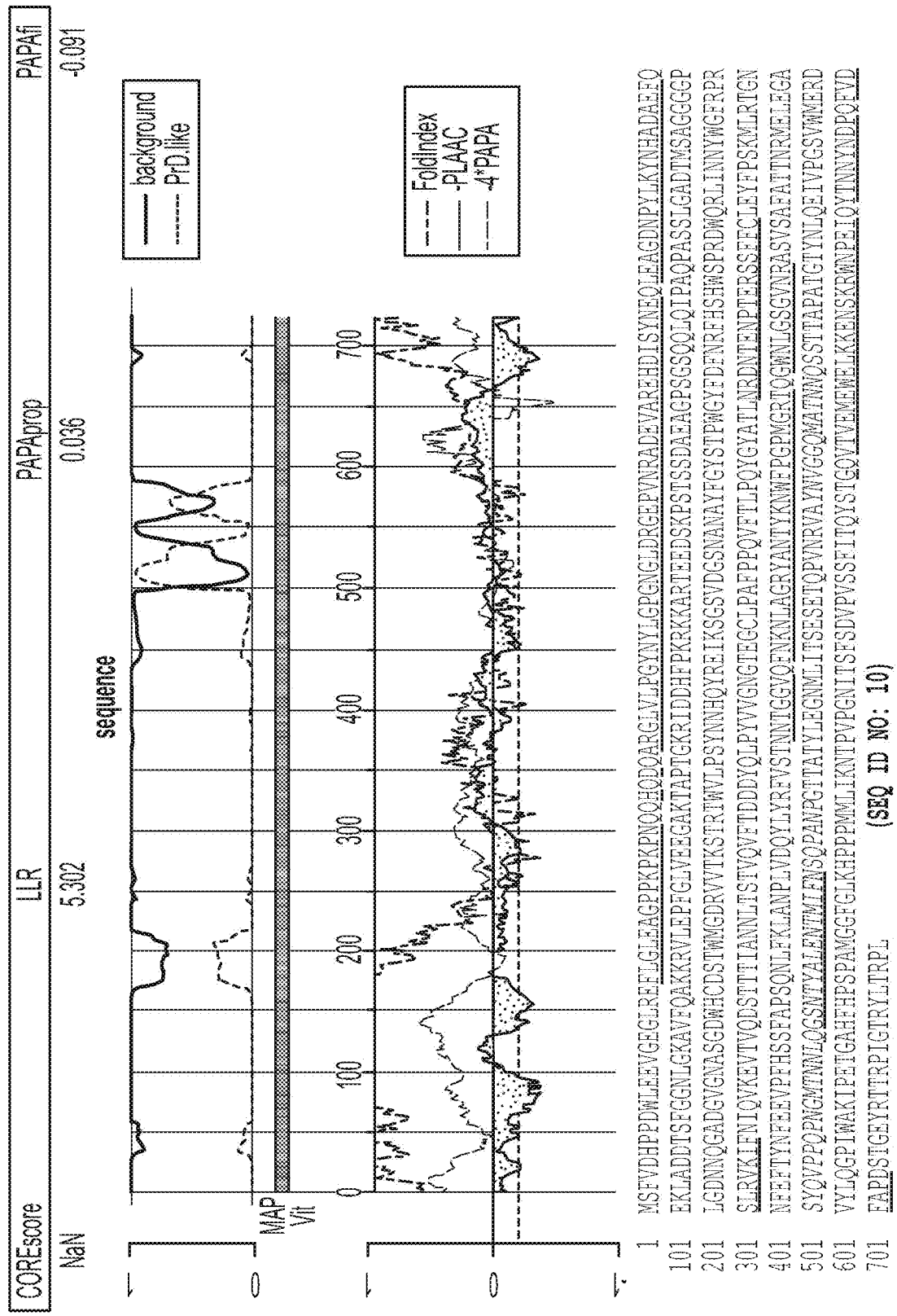
FIG. 17 indicates that the VP1 domain of AAV5 possesses PrDs.
Figure 18:
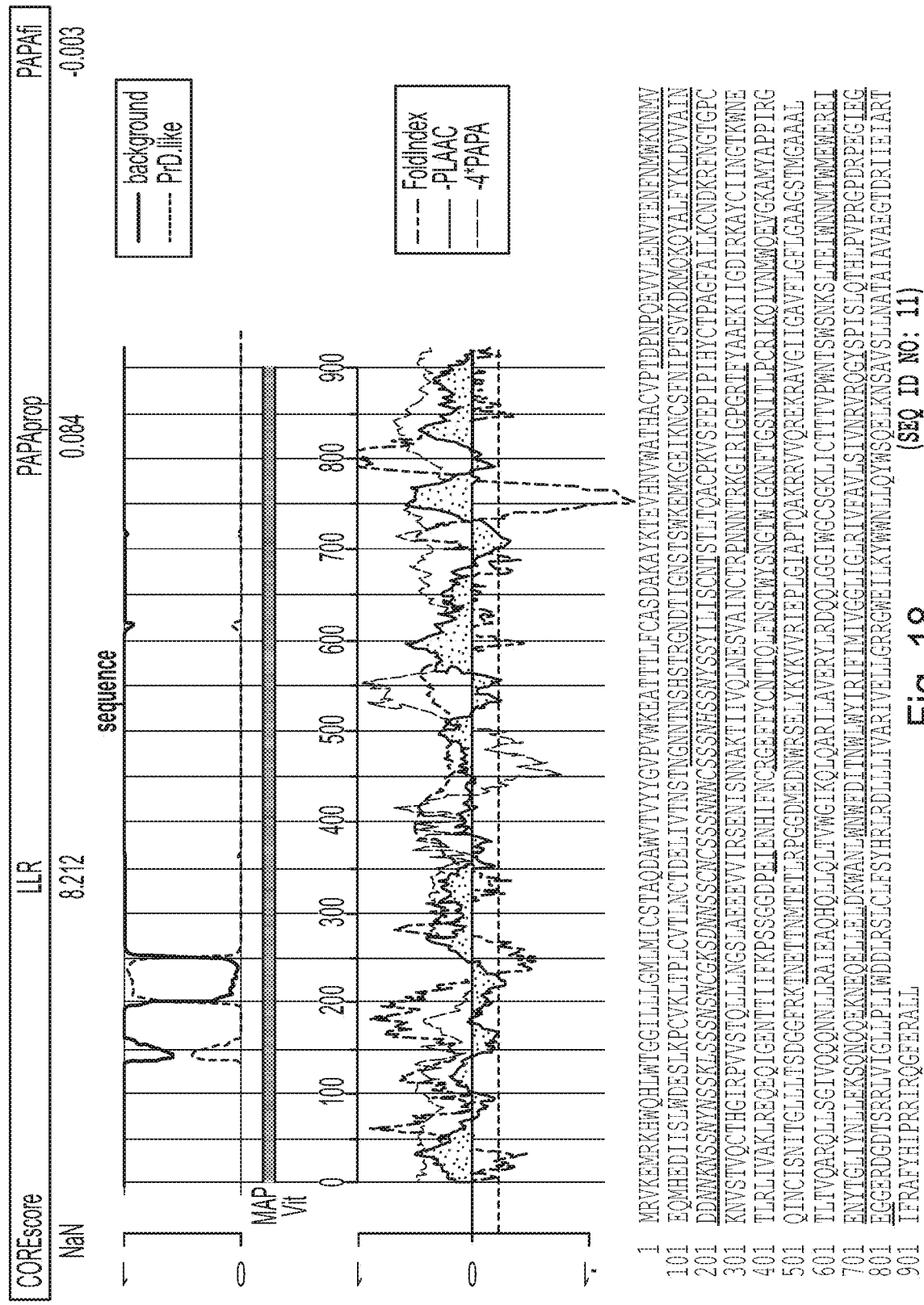
FIG. 18 shows the PrD of Envelope glycoprotein gp160 of human Herpes virus 3.

To identify the PrDs present in viral proteomes, protein sequences were obtained from the UniProt KnowledgeBase (Swiss-Prot and TrEMBL). The presence of PrDs in viral proteomes was analyzed, using the PLAAC prion prediction algorithm, based on the HMM, and the identification of PrDs was based on the compositional bias towards asparagine and glutamine aminoacyls, an average residue hydrophobicity, and the net charge of sequences. The data of FIG. 17 indicate that the VP1 domain of AAV5 possesses PrDs.

Adult male mice C57Bl/6 (20-22 g) were housed at an ambient temperature of 21° C. with a 12:12 hour light-dark cycle. Food was provided ad libidum, as was water. The adeno-associated virus-5 (AAV) was serotype 5, with a transgene cassette containing the promoter driving expression of PrDs. Viral stock was purified by CsCl step and isopycnic gradient centrifugation. The vector was then dialyzed into 50% glycerol as a cryoprotective in a buffer (10 mM Tris, 10 mM His, 75 mM NaCl, 0.5% v/v EtOH, 1 mM MgCl, 0.1 mM EDTA, and 50% v/v glycerol) optimized for the maintenance of adenoviral viability, and diluted in PBS immediately prior to the injection. The concentration of the highly purified virus was determined spectrophotometrically, with one OD260 equivalent to 1012 particles/ml and a particle: pfu ratio of 100:1. Vectors were injected IV $5 \times 10^{11}$ gc/mouse. Biodistribution (C57Bl/6) was measured. The results are shown in Table 24 below.

TABLE 24

| Organ | 7 dpi | | | 28 dpi | | |
|---|---|---|---|---|---|---|
| | AAV5 | AAV5 × 2 | AAV5 × 5 | AAV5 | AAV5 × 2 | AAV5 × 5 |
| Liver | 31.02 +/− 4.05 | 39.61 +/− 4.55 | 48.34 +/− 5.19 | 8.66 +/− 2.95 | 15.80 +/− 3.72 | 24.64 +/− 4.48 |

An increase in the representation of PrDs can allow for increased organ-specific expression.

Example 21: Method for the Diagnosis of Viral Infections in Mammals by Means of Antibodies to Prion-Like Domains of Viruses In total, 30 samples of Kaposi's sarcoma from four patients were studied. Fixed, paraffin-embedded tissue sections were then examined immunohistochemically using the monoclonal antibody to glycoprotein gp160 or to the PrDs region of glycoprotein gp160 of Human Herpes Virus 8. Rat monoclonal antibodies to HHV-8 LNA-1, ORF73 (Advanced Biotechnologies Inc.) were used as a positive control.

Experimental antibodies were developed by immunizing the rabbit by PrDs part of Envelope glycoprotein gp160 of Human Herpes Virus 8. Antibodies were obtained by immunizing the rabbit by gp160 or by PrDs part of gp160. The amino acid sequence of Envelope glycoprotein gp160 Human Herpes Virus 8 is (SEQ ID NO: 1)

MRVKEMRKHWQHLWTGGILLLGMLMICSTAQDAWVTVYYGVPVWKEATTT

LFCASDAKAYKTEVHNVWATHACVPTDPNPQEVVLENVTENFNMWKNNMV

EQMHEDIISLWDESLKPCVKLTPLCVTLNCTDELIVTNSTNGNNTNSHST

RGNDTIGNSTSWKEMKGEIKNCSFNIPTSVKDKMQKQYALFYKLDVVAIN

DDNNKNSSNYNSSKLSSSNSNCGKSDNNSSCNCSSSNNNCSSSNHSSNYS

SYILISCNTSTLTQACPKVSFEPIPIHYCTPAGFAILKCNDKRFNGTGPC

KNVSTVQCTHGIRPVVSTQLLLNGSLAEEEVVIRSENISNNAKTIIVQLN

ESVAINCTRPNNNTRKGIRIGPGRTFYAAEKIIGDIRKAYCIINGTKWNE

TLRLIVAKLREQEQIGENTTIIFKPSSGGDPEIENHIFNCRGEFFYCNTT

QLFNSTWYSNGTWIGKNFTGSNITLPCRIKQIVNMWQEVGKAMYAPPIRG

QINCISNITGLLLTSDGGFRKTNETTNMTETLRPGGGDMRDNWRSELYKY

KVVRIEPLGIAPTQAKRRVVQREKRAVGIIGAVFLGFLGAAGSTMGAAAL

TLTVQARQLLSGIVQQQNNLLRAIEAQHQLLQLTVWGIKQLQARILAVER

-continued

YLRDQQLLGIWCSGKLICTTTVPWNTSWSNKSLTEIWNNMTWMEWEREIE

NYTGLIYNLLEKSQNQQEKNEQELLELDKWANLWNWFDITNWLWYIRIFI

MIVGGLIGLRIVFAVLSIVNRVRQGYSPISLQTHLPVPRGPDRPEGIEGE

GGERDGDTSRRLVIGLLPLIWDDLRSLCLFSYHRLRDLLLIVARIVELLG

RRGWEILKYWWNLLQYWSQELKNSAVSLLNATAIAVAEGTDRIIEIARTI

FRAFYHIPRRIRQGFERALL.

The PrD of Envelope glycoprotein GP4 Human Herpes Virus 3 is shown in FIG. 18.

Antibodies that recognize the HHV-3 gH/gL protein complex were used as a positive control. Surviving virus was titrated on subconfluent HFL monolayers propagated in 1 ml of 10% FBS-DMEM in 12-well plates. Plaque reduction is expressed in percent virus survival for triplicate experiments. The data is shown in FIG. 20.

As it can be seen the concentration of antibodies to gH/gL that produced 50% plaque reduction was 0.6 μg/ml, while antibodies to GP4 and antibodies to PrD GP4 that produced 50% plaque reduction were 0.1 μg/ml and 0.06 μg/ml respectively.

Tissue sections were stained and were used to detect rat antibodies (three drops rabbit normal serum concentrate, one drop biotinylated rabbit, anti-rat secondary antibody (Vector Laboratories, Burlingame, CA, USA) for every 10 ml of biotinylated immunoglobulin from the standard DAB detection kit). Primary antibody dilution was 1:1000 with an incubation time of 30 min. Antigen retrieval was achieved with a 15-min treatment in a microwave pressure cooker with citrate buffer, followed by a 15-min cool down. A cell block of the primary effusion lymphoma cell line BC-3 and a sample from a patient having Kaposi's sarcoma were used as positive controls. The results are shown in Table 25 below.

TABLE 25

| Immunostaining results summary | | | | | | |
|---|---|---|---|---|---|---|
| | HHV-8 positive | | | HHV-8 negative | | |
| | LNA-1 | gp160 | PrDs of p160 | LNA-1 | gp160 | PrDs of p160 |
| Kaposi's sarcoma | 60% | 80% | 100% | 40% | 20% | 0% |

The above data indicate that the use of antibodies to proteins with PrDs and antibodies to the epitopes containing PrDs increases sensitivity of diagnostics. The properties of prion-like proteins allow the use of antibodies in a wide range of diagnostic methods, including, but not limited to Western Blot or monoclonal antibody-blocking EIA, enzyme-linked immunosorbent assay (ELISA), and others.

Example 22: A Method for the Treatment of Viral Infections in Mammals by Means of Antibodies to Prion-Like Domains of Viruses Human lung fibroblast (HFL) cells (ATCC, VA) were cultured in Dulbecco's modified Eagle's medium supplemented with 4 mM L-glutamine (DMEM; Sigma-Aldrich, St. Louis, MO) and 10% fetal bovine serum (FBS) (Atlanta Biologicals, Lawrenceville, GA). Human Herpes Virus 3 (HHV-3) was propagated by co-cultivating infected cells with uninfected cell. Infected HFL cultures were harvested at the height of virus-induced cytopathic effect, for 72 h postinfection (dpi). To study the plaque reduction antibody neutralization assay, aliquots of VZV-infected HFL cells were incubated for 60 min at 37° C. in 50 µl DMEM containing increasing amounts of monoclonal antibodies. The inventors developed antibodies to GP4 protein or to the PrD of GP4 protein. The amino acid sequence of the Envelope GP4 Human Herpes Virus 3 is (SEQ ID NO: 2)
MQKGSSFKCYMCVLFSCFIIGAGSNNTSTQPPTTTNSMSTTNQATLGQTC

FQCAFQIVNNSTQNFTVTFAYHENCHLSFRTHTEALSVSTISHYHHHDCW

VSALRAVYQGYNVTINQTHYCYLPNVETGINPAVVRLACAVVLLVKLAQF

WT.

Figure 19:
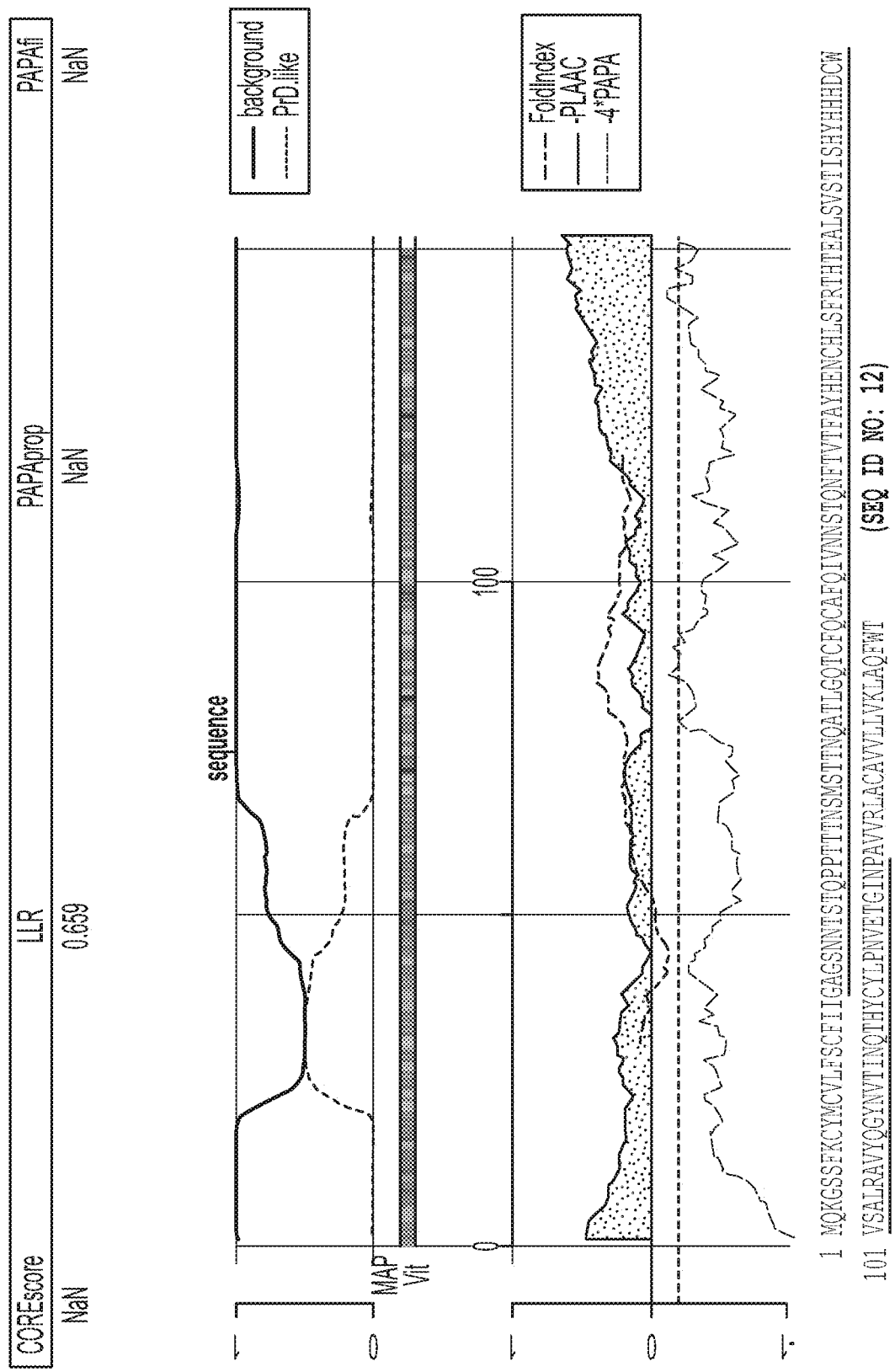
FIG. 19 shows the PrD of Envelope glycoprotein GP4 human Herpes virus 3.

The PrD of Envelope glycoprotein GP4 Human Herpes Virus 3 is shown in FIG. 19.

Figure 20:
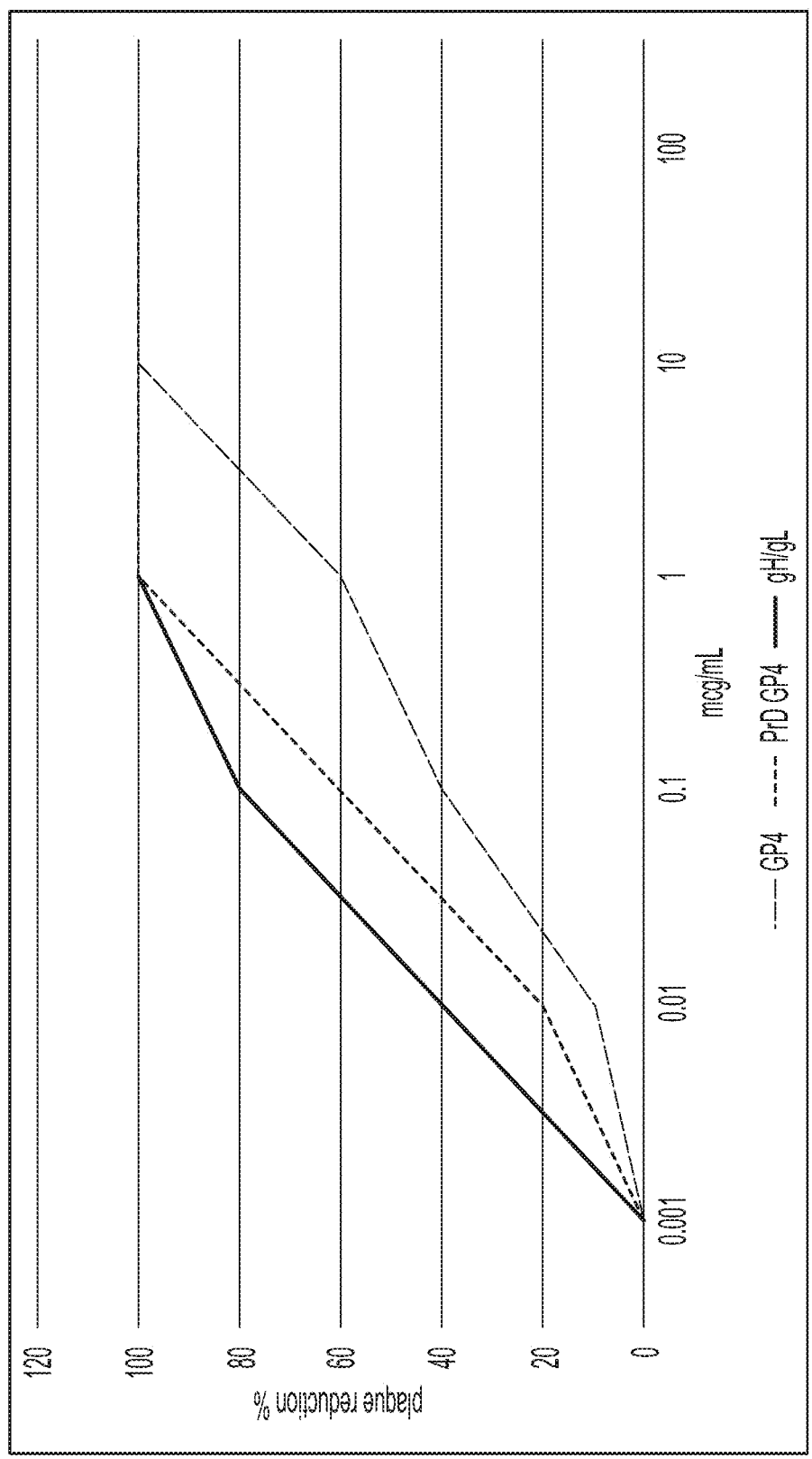
FIG. 20 is a graph showing plaque reduction expressed in percent of human Herpes virus 3 survival.
Figure 21:
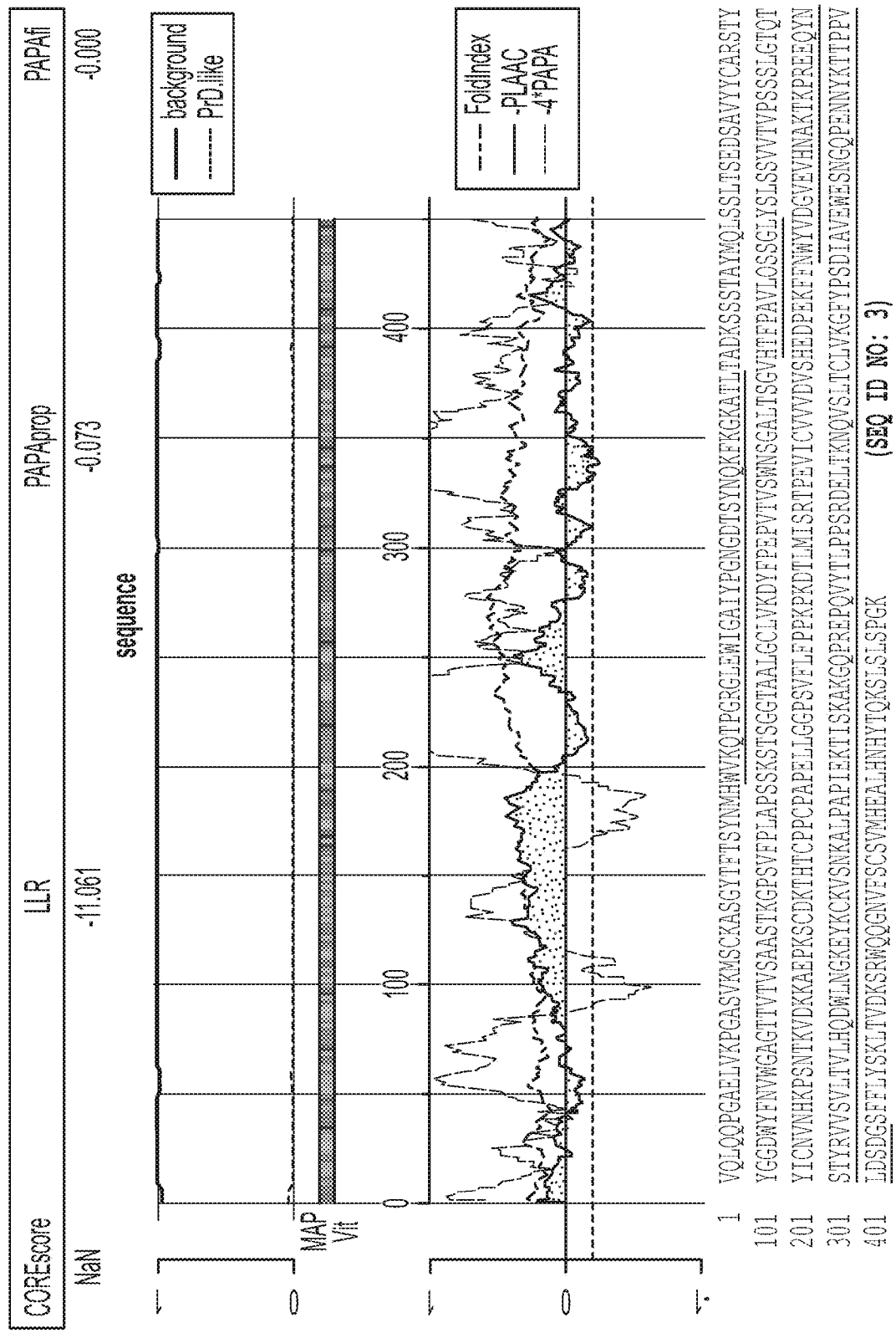
FIG. 21 shows the PrD of the heavy chain of the Rituximab chimeric antibody.
Figure 22:
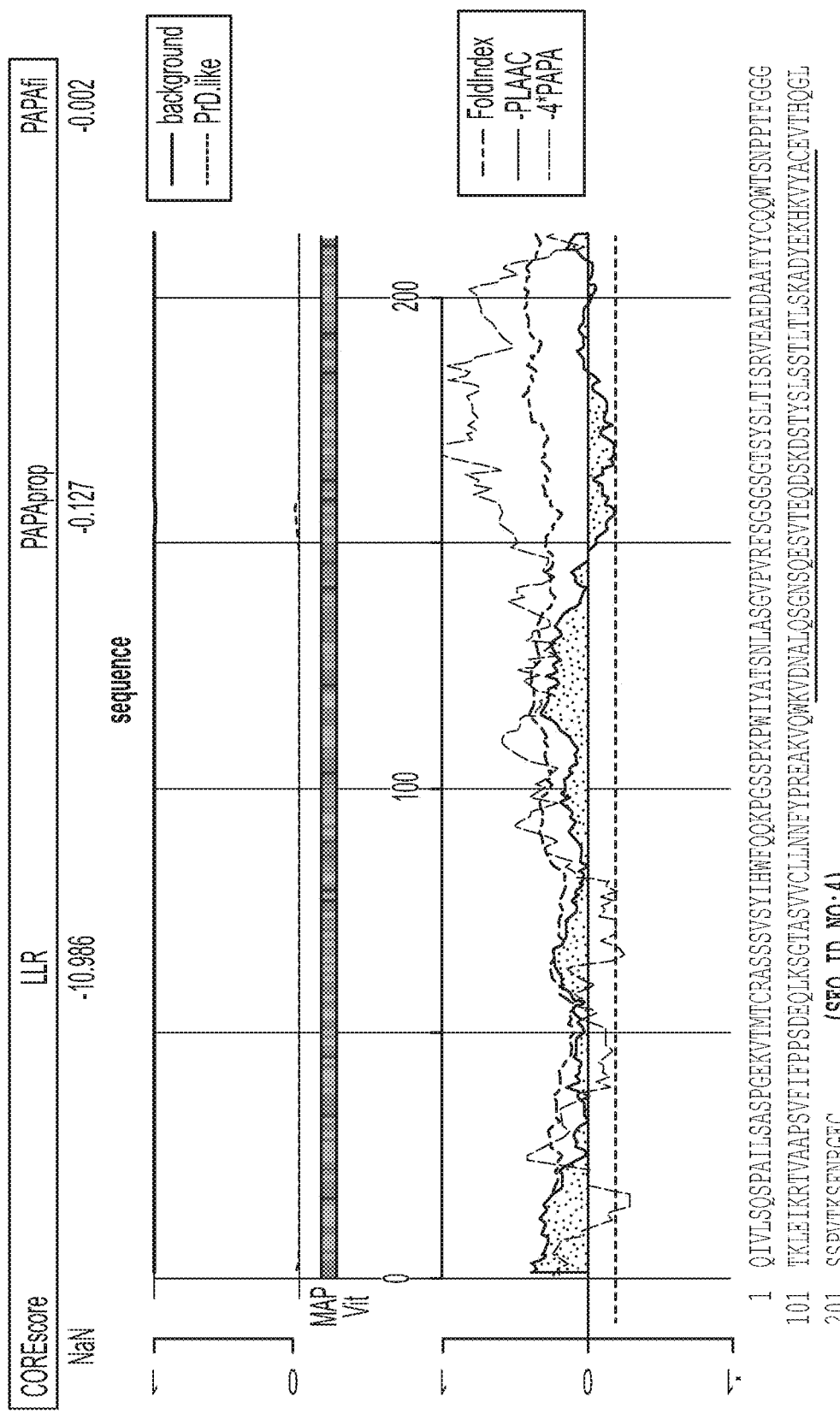
FIG. 22 shows the PrD of the light chain of the Rituximab chimeric antibody.
Figure 23:
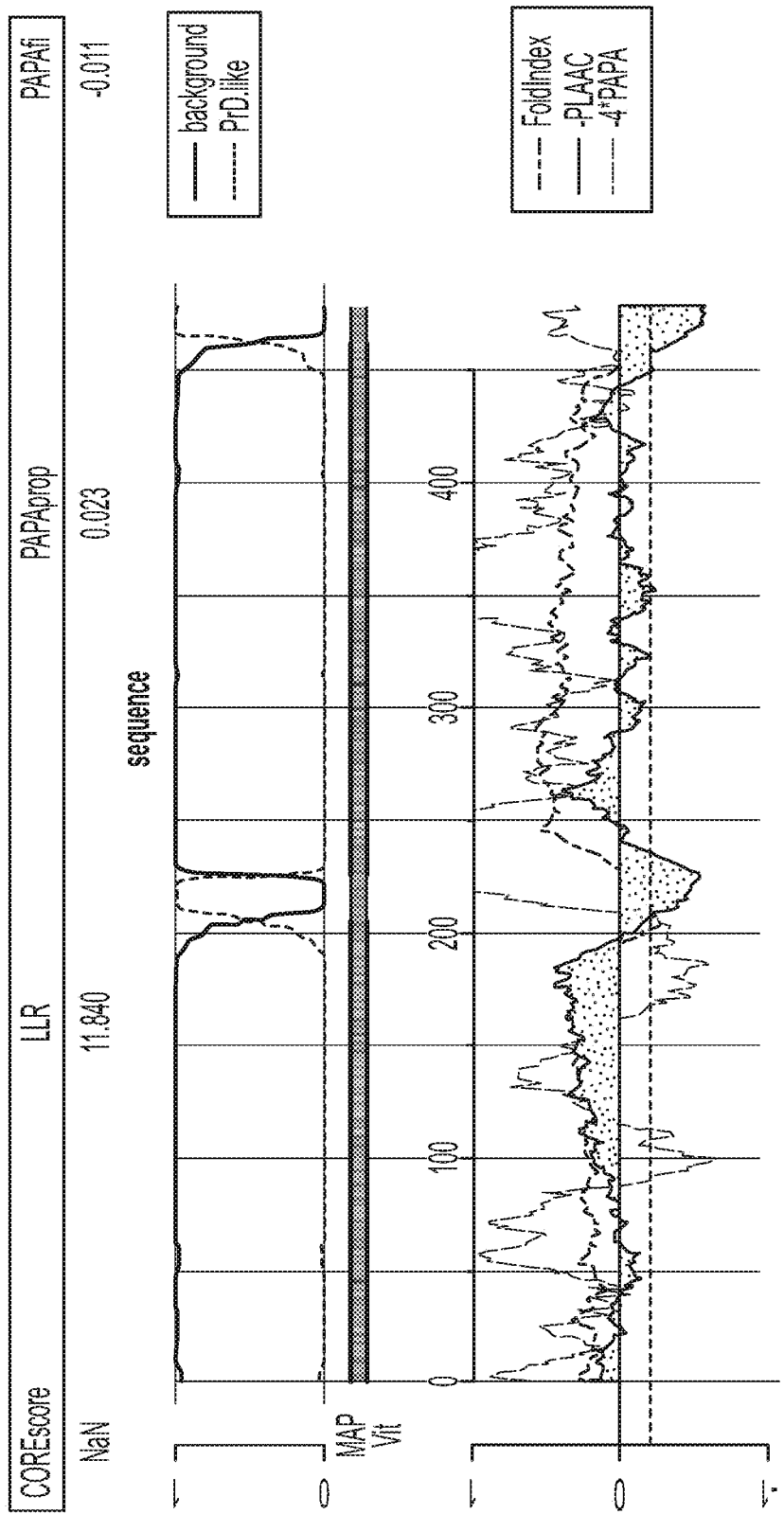
FIG. 23 shows the PrD of the heavy chain of Rituximab-Mod.

Antibodies that recognize the HHV-3 gH/gL protein complex were used as a positive control. Surviving virus was titrated on subconfluent HFL monolayers propagated in 1 ml of 10% FBS-DMEM in 12-well plates. Plaque reduction is expressed as percent virus survival for triplicate experiments. The data are shown in FIG. 20.

As it can be seen the concentration of antibodies to gH/gL that produced 50% plaque reduction was 0.01 μg/ml, while antibodies to GP4 and antibodies to PrD GP4 that produced 50% plaque reduction were 0.6 μg/ml and 0.06 μg/ml respectively.

Example 23: A Method for Increasing the Efficiency of Anti-Tumor Antibodies, by the Addition of Prion-Like Sequences Modified Rituximab antibodies (Rituximab-Mod) with added PrDs were constructed. Rituximab, in contrast, has no PrDs.

The sequence of the heavy chain of the Rituximab chimeric antibody is as follows.

(SEQ ID NO: 3)

```
VQLQQPGAELVKPGASVKMSCKASGYTFTSYNMHWVKQTPGRGLEWIGAI
YPGNGDTSYNQKFKGKATLTADKSSSTAYMQLSSLTSEDSAVYYCARSTY
YGGDWYFNVWGAGTTVTVSAASTKGPSVFPLAPSSKSTSGGTAALGCLVK
DYFPEPVTVSWNSGALTSGVHTFPAVLQSSGLYSLSSVVTVPSSSLGTQT
YICNVNHKPSNTKVDKKAEPKSCDKTHTCPPCPAPELLGGPSVFLFPPKP
KDTLMISRTPEVTCVVVDVSHEDPEVKFNWYVDGVEVHNAKTKPREEQYN
STYRVVSVLTVLHQDWLNGKEYKCKVSNKALPAPIEKTISKAKGQPREPQ
VYTLPPSRDELTKNQVSLTCLVKGFYPSDIAVEWESNGQPENNYKTTPPV
LDSDGSFFLYSKLTVDKSRWQQGNVFSCSVMHEALHNHYTQKSLSLSPGK.
```

The PrD of the heavy chain of the Rituximab chimeric antibody is shown in FIG. 21.

The sequence of the light chain of the Rituximab chimeric antibody is as follows.

(SEQ ID NO: 4)

```
QIVLSQSPAILSASPGEKVTMTCRASSSVSYIHWFQQKPGSSPKPWIYAT
SNLASGVPVRFSGSGSGTSYSLTISRVEAEDAATYYCQQWTSNPPTFGGG
```

-continued

```
TKLEIKRTVAAPSVFIFPPSDEQLKSGTASVVCLLNNFYPREAKVQWKVD
NALQSGNSQESVTEQDSKDSTYSLSSTLTLSKADYEKHKVYACEVTHQGL
SSPVTKSFNRGEC.
```

The PrD of the light chain of the Rituximab chimeric antibody is shown in FIG. 22.

Rituximab-Mod has PrD. The sequence of Rituximab-Mod is shown below, with the PrDs underlined and in bold.

(SEQ ID NO: 5)

VQLQQPGAELVKPGASVKMSCKASGYTFTSYNMHWVKQTPGRGLEWIGAI
YPGNGDTSYNQKFKGKATLTADKSSSTAYMQLSSLTSEDSAVYYCARSTY
YGGDWYFNVWGAGTTVTVSAASTKGPSVFPLAPSSKSTSGGTAALGCLVK
DYFPEPVTVSWNSGALTSGVHTFPAVLQSSGLYSLSSVVTVPSSSLGTQT
YICNVNHKP<u>QNQNQNQNQNQNQN</u>SNTKVDKKAEPKSCDKTHTCPPCPAPE
LLGGPSVFLFPPKPKDTLMISRTPEVTCVVVDVSHEDPEVKFNWYVDGVE
VHNAKTKPREEQYNSTYRVVSVLTVLHQDWLNGKEYKCKVSNKALPAPIE
KTISKAKGQPREPQVYTLPPSRDELTKNQVSLTCLVKGFYPSDIAVEWES
NGQPENNYKTTPPVLDSDGSFFLYSKLTVDKSRWQQGNVFSCSVMHEALH
NHYTQKSLSLSPGK<u>QNQNQNQNQNQNQN</u>

The PrD of the heavy chain of Rituximab-Mod is shown in FIG. 23.

The efficacies of Rituximab and Rituximab-Mod were compared based on Binding to CD20-expressing target cells and antibody-dependent cell-mediated cytotoxicity [ADCC] assays.

The binding of Rituximab-Mod and rituximab was assessed on SU-DHL4 cell lines with high (1,000,000) CD20 receptor copy numbers. Titration of antibody concentrations up to 10 μg/mL showed that the maximal binding intensity of Rituximab-Mod to tumor cells was over 2 times that observed with the same concentrations of rituximab. The ability of Rituximab-Mod and rituximab to mediate ADCC was assessed using SU-DHL4 target cell lines. The potency of Rituximab-Mod was higher than that of rituximab. The superiority of Rituximab-Mod was apparent in terms of both $EC_{50}$ values of target cell killing (~0.1 ng/ml for Rituximab-Mod vs. ~10 ng/mL for rituximab) and higher overall killing efficacy, particularly at low antibody concentrations.

Example 24: Use of Tetz-Proteins to Diagnose Neoplastic Processes and Other Diseases as Well as to Identify Markers of these Diseases 5 ml of blood plasma of a patient with breast cancer was used and heated at 100° C. for 5 minutes. Proteins were analyzed with LC/MS analysis, which was conducted using nanoflow UPLC-MS/MS (Thermo Q Exactive HF Orbitrap) in which ultra high-performance liquid chromatography was coupled to tandem mass spectrometry according to the manufacturer's instructions.

The presence of thermostable proteins and their parts was found. Almost all of the identified proteins are known to be associated with different cancers.

Non-limiting examples of identified thermostable Tetz-proteins are shown in Table 26 below.

TABLE 26

| Identified protein | Reference |
| --- | --- |
| Cluster of cDNA FLJ55673 B4E1Z4_HUMAN [2] | Rehman, Ishtiaq, et al. "iTRAQ identification of candidate serum biomarkers associated with metastatic progression of human prostate cancer." *PloS one* 7.2 (2012): e30885. |
| CERU_HUMAN | Varela, A. Senra, JJ Bosco Lopez Saez, and D. Quintela Senra. "Serum ceruloplasmin as a diagnostic marker of cancer." *Cancer letters* 121.2 (1997): 139-145. |
| VTDB_HUMAN | Tagliabue, Elena, Sara Raimondi, and Sara Gandini. "Meta-analysis of vitamin D-binding protein and cancer risk." *Cancer Epidemiology and Prevention Biomarkers* (2015). |
| CFAH_HUMAN | Kinders, Robert, et al. "Complement factor H or a related protein is a marker for transitional cell cancer of the bladder." *Clinical Cancer Research* 4.10 (1998): 2511-2520. |
| B7ZKJ8_HUMAN [3] | van Winden, Annemieke WJ, et al. "Validation of previously identified serum biomarkers for breast cancer with SELDI-TOF MS: a case control study." *BMC medical genomics* 2.1 (2009): 4. |

Identification of Tetz-proteins allows for simultaneous evaluation of a large variety of different cancer biomarkers. Such simultaneous analysis can be useful for the diagnosing neoplastic processes. Analysis of a correlation between Tetz-proteins that are also known as oncomarkers and/or other Tetz-proteins can be used for the development of algorithms for the specific evaluation of certain cancers.

Example 25: Use of Tetz-Proteins to Diagnose Neoplastic Processes and Other Diseases as Well as to Identify Markers of these Diseases 0.5 ml of blood plasma of control patient with no known oncology and 0.5 ml of blood plasma of patient with breast cancer were used and heated at 100° C. for 5 minutes. Proteins were analyzed with LC/MS analysis, which was conducted using nanoflow UPLC-MS/MS (Thermo Q Exactive HF Orbitrap) in which ultra high-performance liquid chromatography was coupled to tandem mass spectrometry according to the manufacturer's instructions.

The presence of thermostable proteins and their parts was found in both the groups. Moreover, among these proteins there was a large number of cancer biomarkers, that are known to be associated with different cancers.

The effects of added DNA, added proteinase K and added DNA plus proteinase K are shown in a set of thermostable proteins in Table 27. The amount of each of the Tetz-proteins listed in Table 27 increases when either proteinase K or DNA was added to normal plasma. When proteinase K is added in combination with DNA, the amount of the Tetz-proteins listed in Table 27 decreases relative to when only DNA is added. In plasma cells from patients with cancer, adding proteinase K generally decreases the level of Tetz-proteins listed in Table 27.

TABLE 27

| Identified Proteins (635) | Accession Number | Alternate ID | Molecular Weight | N-plasma | N-plasma + pk | Effect | N-plasma + DNA | N-plasma + DNA + pK | Effect | Cancer | Cancer + pk | Effect |
| --- | --- | --- | --- | --- | --- | --- | --- | --- | --- | --- | --- | --- |
| Cluster of Complement C3 OS = *Homo sapiens* GN = C3 PE = 1 SV = 2 (CO3_HUMAN) | CO3_HUMAN [3] | C3 | 187 kDa | 77 | 93 | ↑ | 120 | 87 | ↓ | 186 | 122 | ↓ |
| Complement C3 OS = *Homo sapiens* GN = C3 PE = 1 SV = 2 | CO3_HUMAN | C3 | 187 kDa | 77 | 88 | ↑ | 120 | 85 | ↓ | 186 | 119 | ↓ |
| Immunoglobulin heavy constant gamma 1 (Fragment) OS = *Homo sapiens* GN = IGHG1 PE = 1 SV = 1 | A0A0A0MS08_HUMAN (+1) | IGHG1 | 44 kDa | 36 | 45 | ↑ | 50 | 42 | ↓ | 50 | 36 | ↓ |
| Vitamin D-binding protein OS = *Homo sapiens* GN = GC PE = 1 SV = 1 | VTDB_HUMAN | GC | 53 kDa | 15 | 32 | ↑ | 32 | 33 | NOT CHANGED | 35 | 32 | NOT CHANGED |
| Immunoglobulin heavy constant gamma 2 OS = *Homo sapiens* GN = IGHG2 PE = 1 SV = 2 | IGHG2_HUMAN | IGHG2 | 36 kDa | 11 | 31 | ↑ | 29 | 23 | ↓ | 39 | 26 | ↓ |

TABLE 27-continued

| Identified Proteins (635) | Accession Number | Alternate ID | Molecular Weight | N-plasma | N-plasma + pk | Effect | N-plasma + DNA | N-plasma + DNA + pK | Effect | Cancer | Cancer + pk | Effect |
|---|---|---|---|---|---|---|---|---|---|---|---|---|
| Plasminogen OS = Homo sapiens GN = PLG PE = 1 SV = 2 | PLMN_HUMAN | PLG | 91 kDa | 6 | 22 | ↑ | 19 | 18 | ↓ | 29 | 19 | ↓ |
| Cluster of Immunoglobulin heavy constant alpha 1 OS = Homo sapiens GN = IGHA1 PE = 1 SV = 2 (IGHA1_HUMAN) | IGHA1_HUMAN [2] | IGHA1 | 38 kDa | 28 | 36 | ↑ | 40 | 38 | ↓ | 39 | 31 | ↓ |
| Inter-alpha-trypsin inhibitor heavy chain H2 OS = Homo sapiens GN = ITIH2 PE = 1 SV = 2 | ITIH2_HUMAN (+1) | ITIH2 | 106 kDa | 9 | 24 | ↑ | 20 | 19 | ↓ | 26 | 19 | ↓ |
| Complement factor H-related protein 1 OS = Homo sapiens GN = CFHR1 PE = 1 SV = 1 | B1AKG0_HUMAN (+1) | | 31 kDa | 0 | 5 | | 4 | 6 | | 6 | 4 | |

The identification of Tetz-proteins allows for simultaneous evaluation of a large variety of different cancer biomarkers. Such simultaneous analysis can be useful for the diagnostics of neoplastic processes. Analysis of a correlation between Tetz-proteins also known as oncomarkers, and/or other Tetz-proteins, can be used for the development of algorithms for the specific evaluation of certain cancers. Moreover, a correlation between Tetz-protein profile of cancer and non-cancer patients can be studied.

Example 26: Identification of Tetz-Proteins which Amount is Altered Upon Treatment with Nucleic Acids in Cancer Patient Samples 0.5 ml of blood plasma of patient with breast cancer was used and treated with DNA up to the final concentration of nucleic acid up to 1 ng/ml and heated at 100° C. for 2 minutes. Proteins were analyzed with LC/MS analysis, which was conducted using nanoflow UPLC-MS/MS (Thermo Q Exactive HF Orbitrap), in which ultra high-performance liquid chromatography was coupled to tandem mass spectrometry according to the manufacturer's instructions.

Alterations of Tetz-proteins were found following DNA treatment. Moreover, among proteins which amount and coverage were altered, there was a large number of cancer biomarkers that are known to be associated with different cancers.

As a non-limiting example, Complement factor H-related protein is absent in normal patients, is present in cancer plasma and appears in normal plasma after processing with DNA.

Addition of nucleic acids to human fluids and then processing to identify Tetz-proteins allows for evaluating alteration of representation of proteins known an oncomarkers.

Example 27: Tetz-Proteins which Amount is Altered Under the Treatment with Proteases, Including the Alteration of the Cancer Markers Amount 0.5 ml of blood plasma of a patient with breast cancer was treated with protease (proteinase K) and heated at 100° C. for 60 minutes. Proteins were analyzed with LC/MS analysis using nanoflow UPLC-MS/MS (Thermo Q Exactive HF Orbitrap) in which ultra high performance liquid chromatography was coupled to tandem mass spectrometry according to the manufacturer's instructions.

Alterations of Tetz-proteins were found following the protease treatment. Moreover, among proteins whose amount and coverage were altered, there was a large number of cancer biomarkers that are known to be associated with different cancers.

Use of proteinases to identify Tetz-proteins allows for evaluating alteration of representation of proteins known an oncomarkers.

Example 28 Bacterial DNA Induces the Formation of Heat-Resistant Disease-Associated "Tetz-Proteins" in Human Plasma Methods
Plasma Samples Human plasma samples from 5 healthy donors (age: 57-64 years, 40% females) and 5 patients with clinically diagnosed pancreatic ductal adenocarcinoma (age: 56-69 years, 60% females) were obtained from Bioreclamation IVT (NY, USA) and Discovery Life Sciences (Los Osos, CA). All patients with pancreatic ductal adenocarcinoma had been diagnosed by histological examination and had not undergone surgical treatment, preoperative chemotherapy or radiotherapy. The basic demographic characteristics of the patients are shown in Table 32. All samples were obtained with prior informed consent at all facilities. Plasma samples were stored at −80° C. until use.

Extracellular DNA

Extracellular DNA was extracted from the matrix of *P. aeruginosa* ATCC 27853, *E. coli* ATCC 25922, and *Staphylococcus aureus* ATCC 29213. All bacterial strains were subcultured from freezer stocks onto Columbia agar plates (Oxoid Ltd., London, England) and incubated at 37° C. for 48 h. To extract the extracellular DNA, bacterial cells were separated from the matrix by centrifugation at 5000 g for 10 min at 4° C. The supernatant was aspirated and filtered through a 0.2-μm-pore-size cellulose acetate filter (Millipore Corporation, USA). eDNA was extracted by using a DNeasy kit (Qiagen), as described by the manufacturer, or by the phenol-chloroform method. Human genomic DNA (Roche Cat #11691112001) was purchased from Sigma (Sigma-Aldrich).

Plasma Exposure to eDNA

DNA was added to plasma samples at the final concentration of 1 μg/mL, incubated at 37° C. for 1 h, and boiled in a water bath at 100° C. for 15 min (by that time all the samples formed clod by coagulated proteins). Samples were cooled at room temperature for 30 min and centrifuged at 5000 g for 10 min at room temperature. The supernatant was aspirated and filtered through a 0.2-μm pore size cellulose acetate filter (Millipore Corporation, USA).

Protein Identification by LS-MS

The filtered protein-containing supernatant was diluted in a final volume of 100 μL using 100 mM ammonium bicarbonate, pH 8, and quantified using a Nanodrop OneC Spectrophotometer (Thermo Fisher Scientific). Cysteine residues were reduced using 5 mM dithiothreitol at room temperature for 1.5 h and alkylated with 10 mM iodoacetamide at room temperature for 45 min in the dark. Proteins were then digested using modified trypsin (Promega, P/N V5113) at a 1:20 (w/w) enzyme: protein ratio for 16 h at 22° C. room temperature. After digestion, peptides were acidified to pH 3 with formic acid and desalted using Pierce Peptide Desalting Spin Columns (P/N 89852), according to the manufacturer's protocol. Eluted, desalted peptides were dried down to completion using a Labconco speedvac concentrator, resuspended in 0.1% formic acid and quantified again using a Nanodrop OneC Spectrophotometer. For sample injection and mass analysis, peptides were diluted to a final concentration of 500 ng/μL using 0.1% formic acid in water to provide a total injection amount of 500 ng in a 1 μL of sample loop. Peptides were separated and their mass analysed using a Dionex UltiMate 3000 RSLCnano ultra-high performance liquid chromatograph (UPLC) coupled to a Thermo Scientific Q Exactive HF hybrid quadrupole-orbitrap mass spectrometer (MS). A 1.5 hr reversed-phase UPLC method was used to separate peptides using a nanoEASE m/z peptide BEH C18 analytical column (Waters, P/N 186008795). The MS method included top 15 data-dependent acquisition for interrogation of peptides by MS/MS using HCD fragmentation. All raw data were searched against the human Uniprot protein database (UP000005640, accessed Apr. 22, 2017) using the *Andromeda* search algorithm within the MaxQuant suite (v 1.6.0.1). The search results were filtered to a 1% FPR and visualized using Scaffold (v4, Proteome Software).

A cut-off of at least 5 spectral counts per probe was applied for protein selection. The obtained data were used to generate a heatmap. The abundance values were log converted (zero values were replaced with infinitely small number "1") and plotted with R-statistical computing (www.r-project.org/), using the "levelplot" package. The colour key indicates a range between the lowest (black) and the highest (yellow) values.

Principal components analysis was performed using the prcomp function with default parameters (zero values were replaced with 1) of the R software (www.r-project.org/).

Identification of Prion-Like Domains (PrDs) in Proteins

The presence of prion-like domains in the proteins was assessed using the PLAAC prion prediction algorithm, which establishes the prionogenic nature on the basis of the asparagine (Q) and glutamine (N) content, using the hidden Markov model (HMM). The output probabilities for the PrD states in PLAAC were estimated based on the amino acid frequencies in the PrDs of *Saccharomyces cerevisiae*. Here, Alpha=0.0 was used, representing species-independent scanning, to identify the PrDs.

Results eDNA-Induced Alteration of Protein Heat Resistance in the Plasma of Healthy Controls.

The effects of DNA on the thermal behaviour of proteins from the plasma of healthy individuals were first studied. Most proteins were aggregated after boiling, and the supernatant contained heat-resistant fractions of over 100 proteins. Treatment with bacterial and human buffy coat DNA altered the composition of the heat-resistant protein fraction. The levels of which plasma proteins was first verified, identified as heat-resistant before the treatment with DNA, and were increased following DNA exposure in at least one healthy control (Table 28).

TABLE 28

Heat-resistant proteins of healthy controls whose amount increased following treatment with different DNAs*.

| N | Accession No UniProt | Uniprot Accession | Protein name |
|---|---|---|---|
| eDNA of *P. aeruginosa* | | | |
| 1 | P02768 | ALBU_HUMAN | Serum albumin |
| 2 | P02751 | FINC_HUMAN | Fibronectin |
| 3 | B4E1Z4 | B4E1Z4_HUMA | CDNA FLJ55673, highly similar to Complement factor B |
| 4 | P02774 | VTDB_HUMAN | Vitamin D-binding protein |
| 5 | P01859 | IGHG2_HUMAN | Immunoglobulin heavy constant gamma 2 |
| 6 | P00747 | PLMN_HUMAN | Plasminogen |
| 8 | Q14624 | ITIH4_HUMAN | Inter-alpha-trypsin inhibitor heavy chain H4 |
| 9 | Q5T987 | ITIH2_HUMAN | Inter-alpha-trypsin inhibitor heavy chain H2 |
| 12 | P04114 | APOB_HUMAN | Apolipoprotein B-100 |
| 13 | O14791 | APOL1_HUMAN | Apolipoprotein L1 |
| 15 | P19652 | A1AG2_HUMAN | Alpha-1-acid glycoprotein 2 |
| 16 | P20851 | C4BPB_HUMAN | C4b-binding protein beta chain |
| 3 | P01857 | IGHG1_ HUMAN | Immunoglobulin heavy constant gamma 1 |
| eDNA of *S. aureus* | | | |
| 17 | P02652 | APOA2_HUMAN | Apolipoprotein A-II |
| eDNA of *E. coli* | | | |
| 18 | P19652 | A1AG2_HUMAN | Alpha-1-acid glycoprotein 2 |
| 19 | P04114 | APOB_HUMAN | Apolipoprotein B-100 |
| 20 | P20851 | C4BPB_HUMAN | C4b-binding protein beta chain |

*Significant fold change in the level of heat-resistant proteins between normal plasma and plasmatreated with eDNA for the proteins with spectrum counts < 200 and over 30% increase for the proteins with spectrum counts ≥ 200*.

The increase in heat-resistant protein fractions following the treatment of plasma with bacterial eDNA was next measured. The highest increase in heat-resistant fractions of different unrelated proteins was registered after the incubation with eDNA of *Pseudomonas aeruginosa*. Notably, eDNA from different bacteria produced distinct effects. Indeed, the exposure to eDNA from *Staphylococcus aureus* resulted in a selective increase in heat-resistant APOA2, which was not observed after treatment with eDNA from other bacteria. Under the same conditions, *E. coli* eDNA increased the heat-resistant fractions of A1AG2, APOB, and C4BP; however, the latter heat-resistant fractions were also increased after exposure to *P. aeruginosa* eDNA.

Intriguingly, specific proteins that did not exhibit a heat-resistant fraction in untreated plasma samples became heat-resistant following eDNA exposure. Table 29 lists the proteins that displayed such a behaviour in at least one of the plasma samples.

eDNA induced heat resistance of a broad spectrum of unrelated proteins, plasma exposure to human DNA only affected the thermal behaviour of a specific group of proteins, i.e., cytoskeletal keratins.

Since prion domains may be responsible for protein heat resistance, the inventors next employed the prion-prediction PLAAC algorithm to verify the presence of PrDs in proteins exhibiting changes in thermal behaviour following DNA treatment.

Only PrDs in CHD7 and K1C10 were found, which became heat-resistant following the exposure to *E. coli* eDNA and keratins (K2C1, K1C9, K1C10), which acquired heat resistance upon treatment with both *P. aeruginosa* eDNA and human DNA (Table 30). Notably, these were the

TABLE 29

Proteins that became heat-resistant following eDNA treatment but had no heat resistant fractions before.

| N | Accession No UniProt | Uniprot Accession | Protein name |
|---|---|---|---|
| | | eDNA of *P. aeruginosa* | |
| 1 | P69905 | HBA_HUMAN | Hemoglobin subunit alpha |
| 2 | Q03591 | FHR1_HUMAN | Complement factor H-related protein 1 |
| 3 | P01031 | CO5_HUMAN | Complement C5 |
| 4 | A0M8Q6 | IGLC7_HUMAN | Immunoglobulin lambda constant 7 |
| 5 | O43866 | CD5L_HUMAN | CD5 antigen-like |
| 6 | P49908 | SEPP1_HUMAN | Selenoprotein P |
| 7 | P0DOY3 | IGLC3_HUMAN | Immunoglobulin lambda constant 3 |
| 8 | P63241 | IF5A1_HUMAN | Eukaryotic translation initiation factor 5A-1 |
| 9 | P04264 | K2C1_HUMAN | Cluster of Keratin, type II cytoskeletal 1 |
| 10 | P35527 | K1C9_HUMAN | Keratin, type I cytoskeletal 9 |
| 11 | P13645 | K1C10_HUMAN | Keratin, type I cytoskeletal 10 |
| 12 | A0A075B6S5 | KV127_HUMAN | Immunoglobulin kappa variable 1-27 |
| | | eDNA of *E. coli* | |
| 1 | Q9P2D1 | CHD7_HUMAN | Chromodomain-helicase-DNA-binding protein 7 |
| 2 | Q9UGM5 | FETUB_HUMAN | Fetuin-B |
| 3 | P01857 | IGHG1_HUMAN | Immunoglobulin heavy constant gamma 1 |
| 4 | P01861 | IGHG4_HUMAN | Immunoglobulin heavy constant gamma 4 |
| 5 | P01718 | IGLV3-27 | Immunoglobulin lambda variable 3-27 |
| 6 | P20151 | KLK2 | Kallikrein-2 |
| 7 | Q8TBK2 | SETD6_HUMAN | N-lysine methyltransferase SETD6 |
| 8 | P18583 | SON_HUMAN | Protein SON |
| 9 | O95980 | RECK_HUMAN | Reversion-inducing cysteine-rich protein with Kazal motifs |
| 10 | P02787 | TRFE_HUMAN | Serotransferrin |
| 11 | P49908 | SEPP1_HUMAN | Selenoprotein P |
| 12 | P0DOY3 | IGLC3_HUMAN | Immunoglobulin lambda constant 3 |
| 13 | P63241 | IF5A1_HUMAN | Eukaryotic translation initiation factor 5A-1 |
| 14 | P13645 | K1C10_HUMAN | Keratin, type I cytoskeletal 10 |
| | | Human DNA | |
| 1 | P04264 | K2C1_HUMAN | Cluster of Keratin, type II cytoskeletal 1 |
| 2 | P35527 | K1C9_HUMAN | Keratin, type I cytoskeletal 9 |
| 3 | P13645 | K1C10_HUMAN | Keratin, type I cytoskeletal 10 |

Figure 24:
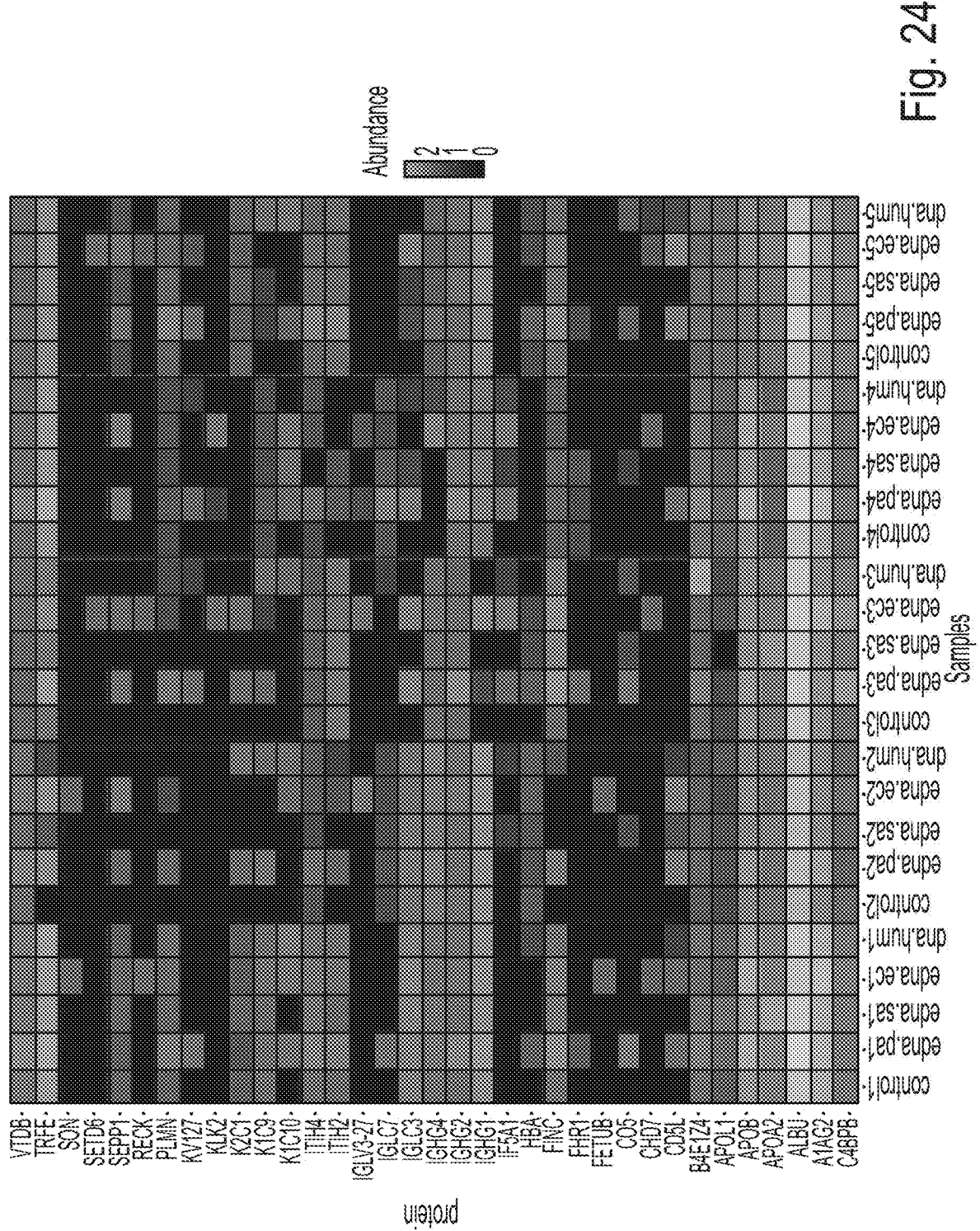

These findings clearly demonstrated that human DNA and eDNA from different bacteria had a distinct influence on the generation of heat-resistant protein fractions. To further analyse the correlation between DNA exposure and acquisition of heat resistance, a heat map was constructed summarizing the impact of different DNAs on the thermal behaviour of proteins (FIG. 24)

Plasma exposure to the eDNA of *P. aeruginosa* resulted in the formation of 12 heat-resistant proteins, while only some of these proteins, namely K1C10, SEPP1, IGLC3, and IF5A1 acquired heat resistance after treatment with the DNA of another gram-negative bacteria, *E. coli*. The latter, in turn, changed the heat resistance profile of distinct proteins in the same plasma samples. Notably, whereas bacterial only proteins undergoing thermal behaviour alterations following exposure to human DNA.

TABLE 30

Log-likelihood ratio (LLR) score for PrD predictions in plasma proteins that became heat-resistant following DNA treatment.

| Protein | LLR Score |
|---|---|
| CHD7 | 29.081 |
| K2C1 | 21.301 |
| K1C9 | 22.663 |
| K1C10 | 21.453 |

The association between DNA-induced changes in protein thermal behaviour and human diseases was next analysed. Surprisingly, the majority of these proteins had been found associated with cancer progression and some of them are used as a tumour markers (Table 31).

TABLE 31

Association between proteins exhibiting DNA-induced changes in thermal behaviour and human diseases

| Disease | Proteins | References |
|---|---|---|
| Pancreatic cancer | Serotransferrin<br>Complement factor H-related protein<br>Plasma protease C1 inhibitor<br>Fibronectin<br>Immunoglobulin lambda constant 7<br>C4b-binding protein alpha chain<br>Selenoprotein P | 37-47 |
| Colorectal cancer | APOB<br>SETD6<br>Reversion-inducing cysteine-rich protein with Kazal motifs (RECK) | 48-50 |
| Ovarian cancer | Hemoglobin-α<br>Eukaryotic translation initiation factor 5A-1<br>Fibronectin<br>Inter-α-trypsin inhibitor heavy chain H4 fragment | 51-54 |
| Breast cancer | Inter-α-trypsin inhibitor heavy chain H4 fragment | 54 |
| Lung Cancer | ITIH4<br>Complement Factor H<br>Plasma protease C1 inhibitor<br>Immunoglobulin lambda constant 7<br>CD5L | 55-59 |
| hairy cell leukemia. | Immunoglobulin kappa variable 1-27 | 60 |
| melanoma | CD5 antigen-like<br>Keratin, type I cytoskeletal 9 | 61, 62 |
| Prostatic cancer | Selenoprotein P<br>kallikrein 2<br>apolipoprotein A-Il | 63-67 |
| Bladder cancer | SETD6<br>Complement factor H-related protein | 68, 69 |
| Thalassemia | HBA | 70 |

Intriguingly, some of these cancer-related proteins are also known to be associated with other multifactorial diseases. For example, ITIH4 is associated with schizophrenia and CHD7 is known to be implicated in autism [71-73].
Comparison of Heat-Resistant Proteome Profile in Normal, DNA-Treated, and Pancreatic Cancer Plasma.

The changes in protein thermal behaviour induced by DNA in normal plasma were then examined and compared the resulting pattern with the heat-resistant proteome of patients with pancreatic cancer (Table 32).

TABLE 32

Characteristics of subjects and plasma samples

| Probe | Gender | Age | Tumour Stage | Tumour site | Tumour type |
|---|---|---|---|---|---|
| Control 1 | F | 64 | NA | NA | NA |
| Control 2 | F | 55 | NA | NA | NA |
| Control 3 | M | 57 | NA | NA | NA |
| Control 4 | M | 62 | NA | NA | NA |
| Control 5 | M | 58 | NA | NA | NA |
| Pancreatic cancer 1 | F | 63 | T3N1M1 | Head | Adenocarcinoma |
| Pancreatic cancer 2 | M | 57 | T3N1M1 | Head | Adenocarcinoma |
| Pancreatic cancer 3 | F | 56 | T3N1M1 | Head | Adenocarcinoma |
| Pancreatic cancer 4 | F | 69 | T3N1M1 | Head | Adenocarcinoma |
| Pancreatic cancer 5 | M | 61 | T3N1M1 | Head | Adenocarcinoma |

After boiling, the plasma samples of patients with pancreatic cancer were characterized for the presence of heat-resistant proteins. Notably, the majority of these proteins were the same that became heat-resistant in normal plasma exposed to DNA treatment. This might suggest that DNA exposure is responsible for cancer-related alterations in the thermal behaviour of specific proteins.

Figure 25A:
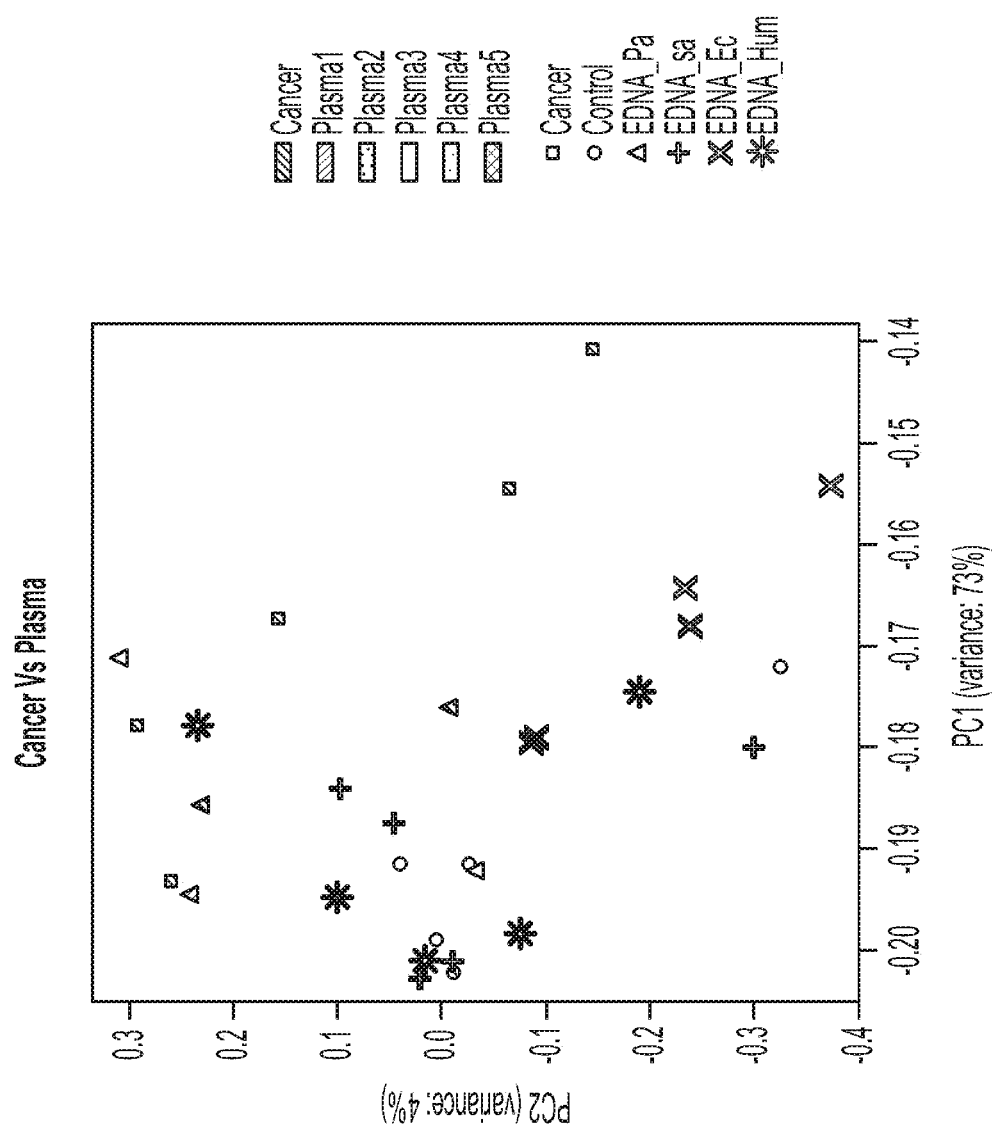

To further explore the relationship between the heat-resistant proteome of patients with pancreatic cancer and the proteome changes induced by DNA in the plasma of healthy individuals, the scaled spectral counts of the identified heat-resistant proteins of both groups were analysed by principal component analysis (PCA) (FIG. 25A).

The PCA projection demonstrated that the exposure to bacterial DNA (especially the eDNA of *P. aeruginosa*), induces, in the proteome of normal plasma, changes in thermal behaviour (FIG. 24).

Figure 25B:
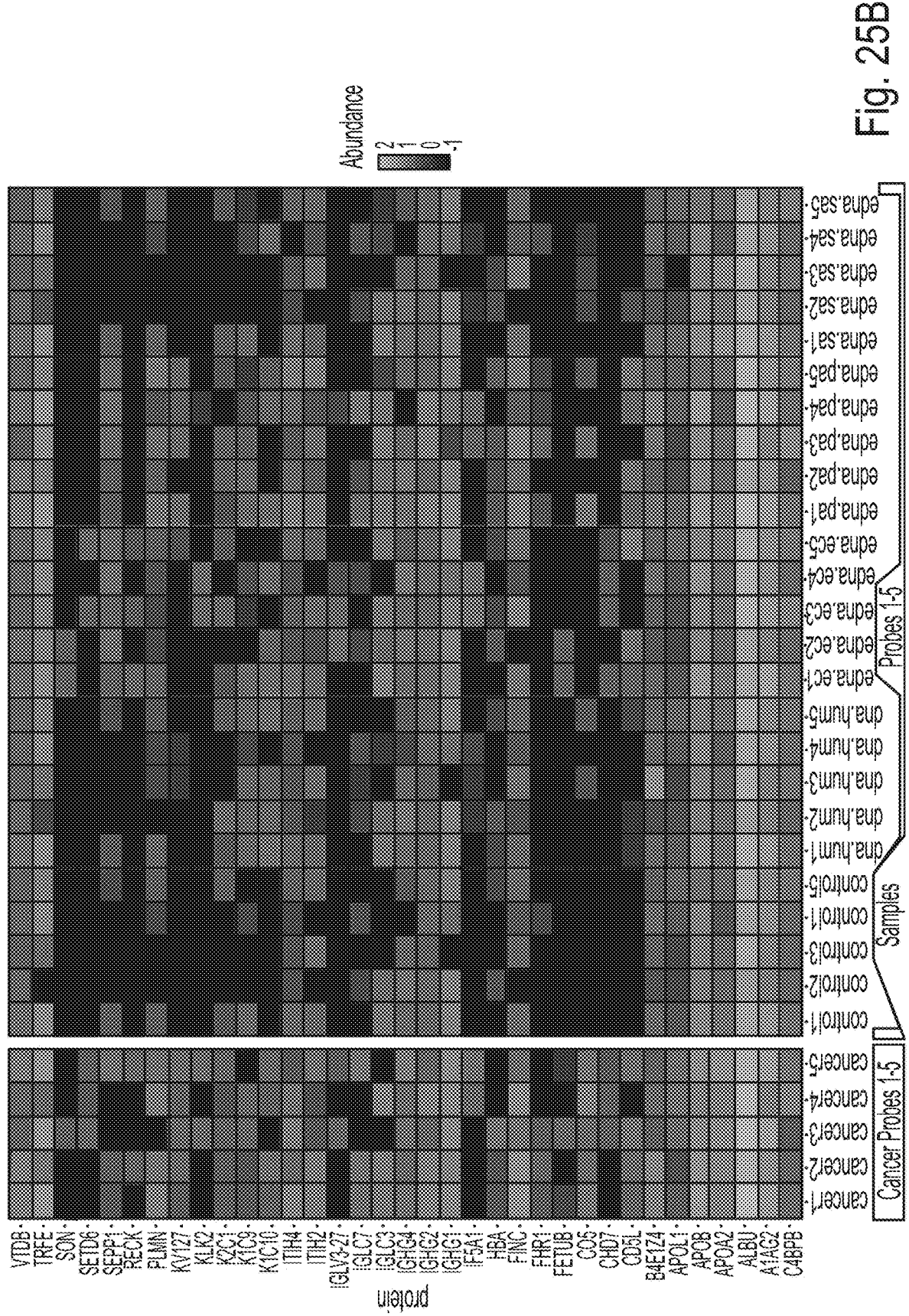

A heat map based on the highest spectral counts relative to heat-resistant proteins confirmed that treatment of normal plasma with eDNA of *P. aeruginosa* induced a heat-resistant proteome that had a trend (statistically insignificant) more similar to that of plasma from cancer patients than to untreated plasma (FIG. 25B). This study is the first to demonstrate that bacterial eDNA alters the thermal behaviour of specific proteins in human plasma, leading to an increase in the heat-resistant fraction, as well as to the acquisition of heat resistance by proteins that did not exhibit such property prior to DNA exposure.

Example 29 Microbial Proteases Induce the Formation of Heat-Resistant Disease-Associated "Tetz-Proteins" in Human Plasma Methods
Plasma Samples Human plasma samples from 5 healthy donors (age: 57-64 years, 40% females) and 5 patients with clinically diagnosed pancreatic ductal adenocarcinoma (age: 56-69 years, 60% females) were obtained from Bioreclamation IVT (NY, USA) and Discovery Life Sciences (Los Osos, CA). All patients with pancreatic ductal adenocarcinoma had been diagnosed by histological examination and had not undergone surgical treatment, preoperative chemotherapy or radiotherapy. The basic demographic characteristics of the patients are shown in Table 4. All samples were obtained with prior informed consent at all facilities. Plasma samples were stored at −80° C. until use.

Nucleases

Proteinase K was purchased from Sigma (Sigma-Aldrich, Cat #P2308).

Plasma Exposure to Proteinase K

Proteinase K was added to plasma samples, incubated at 37° C. for 1 h, and boiled in a water bath at 100° C. for 15 min (by that time all the samples formed clod by coagulated proteins). Samples were cooled at room temperature for 30 min and centrifuged at 5000 g for 10 min at room temperature. The supernatant was aspirated and filtered through a 0.2-μm pore size cellulose acetate filter (Millipore Corporation, USA).

Protein Identification by LS-MS

The filtered protein-containing supernatant was diluted in a final volume of 100 μL using 100 mM ammonium bicarbonate, pH 8, and quantified using a Nanodrop OneC Spectrophotometer (Thermo Fisher Scientific). Cysteine residues were reduced using 5 mM dithiothreitol at room temperature for 1.5 h and alkylated with 10 mM iodoacetamide at room temperature for 45 min in the dark. Proteins were then digested using modified trypsin (Promega, P/N V5113) at a 1:20 (w/w) enzyme: protein ratio for 16 h at 22° C. room temperature. After digestion, peptides were acidified to pH 3 with formic acid and desalted using Pierce Peptide Desalting Spin Columns (P/N 89852), according to the manufacturer's protocol. Eluted, desalted peptides were dried down to completion using a Labconco speedvac concentrator, resuspended in 0.1% formic acid and quantified again using a Nanodrop OneC Spectrophotometer. For sample injection and mass analysis, peptides were diluted to a final concentration of 500 ng/μL using 0.1% formic acid in water to provide a total injection amount of 500 ng in a 1 μL of sample loop. Peptides were separated and their mass analysed using a Dionex UltiMate 3000 RSLCnano ultra-high performance liquid chromatograph (UPLC) coupled to a Thermo Scientific Q Exactive HF hybrid quadrupole-orbitrap mass spectrometer (MS). A 1.5 hr reversed-phase UPLC method was used to separate peptides using a nanoEASE m/z peptide BEH C18 analytical column (Waters, P/N 186008795). The MS method included top 15 data-dependent acquisition for interrogation of peptides by MS/MS using HCD fragmentation. All raw data were searched against the human Uniprot protein database (UP000005640, accessed Apr. 22, 2017) using the *Andromeda* search algorithm within the MaxQuant suite (v 1.6.0.1). The search results were filtered to a 1% FPR and visualized using Scaffold (v4, Proteome Software).

A cut-off of at least 5 spectral counts per probe was applied for protein selection.

The obtained data were used to generate a heatmap. The abundance values were log converted (zero values were replaced with infinitely small number "1") and plotted with R-statistical computing (www.r-project.org/), using the "levelplot" package. The colour key indicates a range between the lowest (black) and the highest (yellow) values.

Principal components analysis was performed using the prcomp function with default parameters (zero values were replaced with 1) of the R software (www.r-project.org/).

Results

Proteinase Induced Alteration of Protein Heat Resistance in the Plasma of Healthy Controls Treatment with microbial proteases changes the composition of the heat-resistant protein fraction, resulting in an increase of certain heat-resistant protein fractions (Table 33).

TABLE 33

Association between proteins exhibiting PK-induced increase in heat-resistant fractions and human diseases

| Disease | Proteins | References |
|---|---|---|
| thyroid carcinoma | Serum albumin 69 kDa | 74 |
| melanoma | Serum albumin 69 kDa | 75 |
| Renal diseases | Fibronectin 263 kDa | 76 |
| Primary glomerular disease, | Complement factor H | |
| Atypical hemolytic-uremic syndrome, Primary membranoproliferative glomerulonephritis | Ceruloplasmin 122 kDa Apolipoprotein B-100 516 kDa | |
| Alzheimer's and other neurodegenerative diseases | Gelsolin Ceruloplasmin 122 kDa Complement factor H Apolipoprotein B-100 C4b-binding protein | 77-81 |
| Oral cancers | Gelsolin | 82 |
| Breast cancer | Fibronectin 263 kDa ITIH4 protein | 76, 83-88 |
| Colon cancer | Fibronectin 263 kDa | 83 |
| Acute leukemia | Fibronectin 263 kDa | 83 |
| Familial amyloidosis | Gelsolin | 89 |
| Prostate Cancer | CDNA FLJ55673 | 90, 91 |
| Renal cell carcinoma | Vitamin D-binding protein | 91 |
| Coronary Heart Disease | Vitamin D-binding protein Plasminogen Inter-alpha-trypsin inhibitor heavy chain | 92-94 |
| Thalassemia | Hemoglobin subunit alpha | 95 |
| Schizophrenia | ITIH4 protein | 96 |
| Amyotrophic lateral sclerosis | ITIH4 protein | 97 |
| Retinal dystrophy | ITIH4 protein Vitamin D-binding protein | 98, 99 |
| Rheumatoid arthritis | ITIH4 protein | 100 |
| Pancreatic Cancer | Serotransferrin | 101 |
| Enhance bacterial pathogenic potential glaucoma | C4b-binding protein Complement C5 | 102, 103 103 |

Example 30 Effect of Viral PrDs on Protein Misfolding

It was first examined whether viral proteins with prion-like domains can trigger protein in P53-PMCA by monitoring the levels of Thioflavin T (ThT) fluorescence overtime.

The HHV-8 ATCC strain was used. The average kinetics of aggregation of P53 under the treatment with HHV-8, with and without knockout of PrDs containing proteins, was assayed. The specific proteins knocked out were Human herpes simplex virus 8 RF1 (U5NM22), Human herpes simplex virus 8 LANA (E5LC01), and Human herpes simplex virus 8 ORF 73 (A0A0N9S3L8).

A solution of 0.1 mg/ml of monomeric recombinant full-length P53 was subjected to cycles of P53-PMCA either alone (control) or in the presence of 25 μl of various HHV-8 modifications. The experiment was performed at 37° C. in buffer 100 mM PIPES, pH 6.5, 0.5M NaCl. The cycles involved 29 minutes of incubation followed by 1 minute of shaking (500 rpm). The aggregation of the protein was monitored over time by recording thioflavin T (ThT) fluorescence. Each sample was run by duplicate and data shows the average of the two values.

Figure 26:

The data is shown in FIG. 26. Compound 10 is wild-type HHV-8, and compound 2 is modified HHV-8. The modified HHV-8 (as seen in compound 2) does not exhibit misfolded p53. The viral particle lost the ability to trigger the misfolding of p53 enzyme. The aggregation seen with compound 2 is comparable to the untreated control. From the data, it is clearly seen that wild-type HHV-8 leads to a significant misfolding of p53. Under the same conditions, the mutant HHV-8 strain had much lower proliferative ability, unexpectedly highlighting the role of viral prion-like domains in trans-kingdom misfolding of human proteins.

Example 31 Effect of Viral PrDs on Tau Protein Misfolding

It was examined whether HIV viral proteins with prion-like domains can trigger Tau protein aggregation in Tau-PMCA by monitoring the levels of Thioflavin T (ThT) fluorescence overtime. A solution of 0.1 mg/ml of monomeric recombinant full-length Tau was subjected to cycles of Tau-PMCA either alone (control) or in the presence of 25 µl of various HIV-1 modifications. The experiment was performed at 37° C. in buffer 100 mM PIPES, pH 6.5, 0.5M NaCl and doing cycles of 29 min incubation and 1 min shaking (500 rpm). The aggregation of the protein was monitored over time by recording thioflavin T (ThT) fluorescence. The HIV-1 ATCC strain was used. Each sample was tested in duplicate.

The data is shown in Table 34, which shows the average kinetics of aggregation of Tau under the treatment with HIV-1 with and without knockout of surface-located proteins containing PrDs. The quantities in Table 34 reflect ThT fluorescence, with the result of each experiment shown. In the "blank" columns, there is no protein aggregation; no tau protein misfolding was observed. In HIV-1 WT, significant misfolding is seen starting at 120 hours, as seen by the increase in ThT fluorescence.

TABLE 34

Effect of modification of HIV-1 on protein aggregation

| Hours | Blank | | HIV-1-modified | | HIV-1-WT | |
|---|---|---|---|---|---|---|
| 12 | 22.265 | 25.062 | 19.344 | 20.298 | 20.16 | 20.716 |
| 24 | 20.322 | 23.934 | 17.723 | 18.8 | 18.185 | 19.094 |
| 36 | 22.317 | 25.063 | 17.166 | 18.223 | 17.572 | 17.241 |
| 48 | 22.624 | 25.103 | 17.067 | 18.159 | 17.511 | 17.236 |
| 60 | 23.401 | 25.142 | 18.365 | 18.159 | 18.69 | 17.911 |
| 72 | 22.666 | 24.4 | 16.318 | 17.099 | 20.915 | 17.281 |
| 84 | 21.76 | 24.401 | 17.718 | 17.574 | 22.302 | 17.584 |
| 96 | 22.575 | 24.342 | 17.007 | 17.654 | 25.757 | 17.376 |
| 108 | 21.382 | 24.77 | 17.241 | 17.437 | 23.597 | 18.58 |
| 120 | 21.947 | 21.602 | 18.061 | 18.283 | 43.037 | 36.522 |
| 144 | 21.968 | 21.499 | 18.271 | 17.88 | 41.512 | 34.541 |
| 156 | 22.031 | 21.891 | 21.974 | 18.614 | 65.723 | 61.988 |
| 180 | 22.082 | 20.519 | 22.73 | 18.723 | 90.36 | 86.433 |
| 192 | 21.651 | 21.141 | 20.094 | 17.386 | 87.456 | 90.941 |
| 216 | 20.508 | 22.471 | 33.928 | 24.269 | 217.703 | 206.355 |
| 252 | 20.508 | 22.471 | 33.928 | 24.269 | 217.703 | 206.355 |
| 276 | 18.154 | 19.643 | 34.34 | 25.306 | 276.813 | 263.605 |
| 300 | 17.254 | 20.891 | 38.05 | 31.287 | 271.586 | 252.861 |
| 324 | 18.037 | 20.214 | 41.419 | 32.012 | 263.48 | 245.122 |
| 336 | 17.693 | 19.654 | 42.544 | 30.563 | 262.399 | 244.349 |
| 348 | 17.697 | 19.796 | 43.713 | 38.28 | 255.605 | 235.105 |
| 360 | 18.495 | 19.969 | 45.823 | 35.333 | 255.925 | 235.246 |

It is clearly seen that wild-type HIV-1 leads to a significant misfolding of Tau protein. Under the same conditions, the mutant HIV-1 strain had much lower proliferative ability, unexpectedly highlighting the role of viral prion-like domains in trans-kingdom misfolding of human proteins.

REFERENCES

1. Prusiner S. Nobel Lecture: Prions. Proceedings of the National Academy of Sciences (1998) 95:13363-13383. doi:10.1073/pnas.95.23.13363
2. Ma J. Neurotoxicity and Neurodegeneration When PrP Accumulates in the Cytosol. Science (2002) 298:1781-1785. doi:10.1126/science.1073725
3. Stefani M. Protein misfolding and aggregation: new examples in medicine and biology of the dark side of the protein world. Biochimica et Biophysica Acta (BBA)—Molecular Basis of Disease (2004) 1739:5-25. doi:10.1016/j.bbadis.2004.08.004
4. Prusiner S. Biology and Genetics of Prions Causing Neurodegeneration. Annual Review of Genetics (2013) 47:601-623. doi:10.1146/annurev-genet-110711-155524
5. Goedert M, Clavaguera F, Tolnay M. The propagation of prion-like protein inclusions in neurodegenerative diseases. Trends in Neurosciences (2010) 33:317-325. doi:10.1016/j.tins.2010.04.003
6. Furukawa Y, Nukina N. Functional diversity of protein fibrillar aggregates from physiology to RNA granules to neurodegenerative diseases. Biochimica et Biophysica Acta (BBA)—Molecular Basis of Disease (2013) 1832:1271-1278. doi:10.1016/j.bbadis.2013.04.011
7. Michelitsch M, Weissman J. A census of glutamine/asparagine-rich regions: Implications for their conserved function and the prediction of novel prions. Proceedings of the National Academy of Sciences (2000) 97:11910-11915. doi:10.1073/pnas.97.22.11910
8. Batlle C, Iglesias V, Navarro S, Ventura S. Prion-like proteins and their computational identification in proteomes. Expert Review of Proteomics (2017) 14:335-350. doi:10.1080/14789450.2017.1304214
9. Iglesias V, de Groot N, Ventura S. Computational analysis of candidate prion-like proteins in bacteria and their role. Frontiers in Microbiology (2015) 6: doi:10.3389/fmicb.2015.01123
10. Tetz G, Tetz V. Prion-Like Domains in Phagobiota. Frontiers in Microbiology (2017) 8: doi:10.3389/fmicb.2017.02239
11. Tetz G, Ruggles K, Zhou H, Heguy A, Tsirigos A, Tetz V. Bacteriophages as potential new mammalian pathogens. Scientific Reports (2017) 7: doi:10.1038/s41598-017-07278-6
12. Tetz G, Tetz V. Bacteriophage infections of microbiota can lead to leaky gut in an experimental rodent model. Gut Pathogens (2016) 8: doi:10.1186/s13099-016-0109-1
13. UniProt: a hub for protein information. Nucleic Acids Research (2014) 43: D204-D212. doi:10.1093/nar/gku989.
14. Ashburner M, Ball C, Blake J, Botstein D, Butler H, Cherry J, Davis A, Dolinski K, Dwight S, Eppig J et al. Gene Ontology: tool for the unification of biology. Nature Genetics (2000) 25:25-29. doi:10.1038/75556
15. Adams M, Lefkowitz E, King A, Harrach B, Harrison R, Knowles N, Kropinski A, Krupovic M, Kuhn J, Mushegian A et al. Changes to taxonomy and the International Code of Virus Classification and Nomenclature ratified by the International Committee on Taxonomy of Viruses (2017). Archives of Virology (2017) 162:2505-2538. doi:10.1007/s00705-017-3358-5
16. Colson P, De Lamballerie X, Yutin N, Asgari S, Bigot Y, Bideshi D, Cheng X, Federici B, Van Etten J, Koonin E et al. "Megavirales", a proposed new order for eukaryotic nucleocytoplasmic large DNA viruses. Archives of Virology (2013) 158:2517-2521. doi:10.1007/s00705-013-1768-6
17. De Clercq E. STRATEGIES IN THE DESIGN OF ANTIVIRAL DRUGS. Nature Reviews Drug Discovery (2002) 1:13-25. doi:10.1038/nrd703
18. Yost S, Marcotrigiano J. Viral precursor polyproteins: keys of regulation from replication to maturation. Current Opinion in Virology (2013) 3:137-142. doi:10.1016/j.coviro.2013.03.009
19. Bonavia A, Zelus B, Wentworth D, Talbot P, Holmes K. Identification of a Receptor-Binding Domain of the Spike Glycoprotein of Human Coronavirus HCoV-229E. Journal of Virology (2003) 77:2530-2538. doi:10.1128/jvi.77.4.2530-2538.2003
20. Kobiler O, Drayman N, Butin-Israeli V, Oppenheim A. Virus strategies for passing the nuclear envelope barrier. Nucleus (2012) 3:526-539. doi:10.4161/nucl.21979
21. Gastaldello S, Hildebrand S, Faridani O, Callegari S, Palmkvist M, Di Guglielmo C, Masucci M. A deneddylase encoded by Epstein-Barr virus promotes viral DNA replication by regulating the activity of cullin-RING ligases. Nature Cell Biology (2010) 12:351-361. doi: 10.1038/ncb2035
22. Menendez-Arias L, Andino R. Viral polymerases. Virus Research (2017) 234:1-3. doi:10.1016/j.virusres.2017.02.003
23. Swanstrom R, Wills J W. Synthesis, assembly, and processing of viral proteins. Cold Spring Harbor Laboratory Press, Cold Spring Harbor (NY), 1997.
24. Chen D, Jiang H, Lee M, Liu F, Zhou Z. Three-Dimensional Visualization of Tegument/Capsid Interactions in the Intact Human Cytomegalovirus. Virology (1999) 260:10-16. doi:10.1006/viro.1999.9791
25. Chiu W, Chang W. Vaccinia Virus J1R Protein: a Viral Membrane Protein That Is Essential for Virion Morphogenesis. Journal of Virology (2002) 76:9575-9587. doi: 10.1128/jvi.76.19.9575-9587.2002
26. Ostapchuk P, Hearing P. Pseudopackaging of Adenovirus Type 5 Genomes into Capsids Containing the Hexon Proteins of Adenovirus Serotypes B, D, or E. Journal of Virology (2001) 75:45-51. doi:10.1128/jvi.75.1.45-51.2001
27. Belshaw R, Pybus O, Rambaut A. The evolution of genome compression and genomic novelty in RNA viruses. Genome Research (2007) 17:1496-1504. doi: 10.1101/gr.6305707
28. Perera R, Kuhn R. Structural proteomics of dengue virus. Current Opinion in Microbiology (2008) 11:369-377. doi:10.1016/j.mib.2008.06.004
29. Chan S, Lee J, Narula M, Ou J. Suppression of Host Innate Immune Response by Hepatitis C Virus via Induction of Autophagic Degradation of TRAF6. Journal of Virology (2016) 90:10928-10935. doi:10.1128/jvi.01365-16
30. Varnum S, Streblow D, Monroe M, Smith P, Auberry K, Pasa-Tolic L, Wang D, Camp D, Rodland K, Wiley S et al. Identification of Proteins in Human Cytomegalovirus (HCMV) Particles: the HCMV Proteome. Journal of Virology (2004) 78:13395-13395. doi:10.1128/jvi.78.23.13395.2004
31. Benedict C, Norris P, Ware C. To kill or be killed: viral evasion of apoptosis. Nature Immunology (2002) 3:1013-1018. doi:10.1038/ni1102-1013
32. Wolf S, Lucas W, Deom C, Beachy R. Movement Protein of Tobacco Mosaic Virus Modifies Plasmodesmatal Size Exclusion Limit. Science (1989) 246:377-379. doi: 10.1126/science.246.4928.377
33. Ackermann H. Viral Pathogenesis in diagrams. [S.I.]: CRC press (2017).
34. Dasgupta R, Garcia B, Goodman R. Systemic spread of an RNA insect virus in plants expressing plant viral movement protein genes. Proceedings of the National Academy of Sciences (2001) 98:4910-4915. doi:10.1073/pnas.081288198
35. Bala, Shashi, et al. "Acute binge drinking increases serum endotoxin and bacterial DNA levels in healthy individuals." PloS one 9.5 (2014): e96864.
36. DiBiagio, J. R., S. G. Joshi, and H. B. Allen. "Alzheimer's disease: A Commentary on Biofilms, Beta Amyloid and their Locations." *J Infect Dis Preve Med* 4.140 (2016): 2.
37. Takata T, Ishigaki Y, Shimasaki T, Tsuchida H, Motoo Y, Hayashi A, Tomosugi N. Characterization of proteins secreted by pancreatic cancer cells with anticancer drug
38. treatment in vitro. Oncology reports. 2012 Dec. 1; 28(6):1968-76.
39. Bloomston M, Zhou J X, Rosemurgy A S, Frankel W, Muro-Cacho C A, Yeatman T J. Fibrinogen γ overexpression in pancreatic cancer identified by large-scale proteomic analysis of serum samples. Cancer research. 2006 Mar. 1; 66(5):2592-9.
40. Sogawa K, Takano S, Iida F. Satoh M, Tsuchida S, Kawashima Y, Yoshitomi H, Sanda A, Kodera Y, Takizawa H, Mikata R. Identification of a novel serum biomarker for pancreatic cancer, C4b-binding protein α-chain (C4BPA) by quantitative proteomic analysis using tandem mass tags. British journal of cancer. 2016 October; 115(8):949.
41. Maehara S I, Tanaka S, Shimada M, Shirabe K, Saito Y, Takahashi K, Maehara Y. Selenoprotein P, as a predictor for evaluating gemcitabine resistance in human pancreatic cancer cells. International journal of cancer. 2004 Nov. 1; 112(2):184-9.
42. Short S P, Williams C S. Selenoproteins in tumorigenesis and cancer progression. In Advances in cancer research 2017 Jan. 1 (Vol. 136, pp. 49-83). Academic Press.
43. Seldon C S, Colbert L E, Hall W A, Fisher S B, Yu D S, Landry J C. Chromodomain-helicase-DNA binding protein 5, 7 and pronecrotic mixed lineage kinase domain-like protein serve as potential prognostic biomarkers in patients with resected pancreatic adenocarcinomas. World journal of gastrointestinal oncology. 2016 Apr. 15; 8(4): 358.
44. Pan S, Chen R, Crispin D A, May D, Stevens T, McIntosh M W, Bronner M P, Ziogas A, Anton-Culver H, Brentnall T A. Protein alterations associated with pancreatic cancer and chronic pancreatitis found in human plasma using global quantitative proteomics profiling. Journal of proteome research. 2011 Mar. 28; 10(5):2359-76.
45. Crnogorac-Jurcevic T, Missiaglia E, Blaveri E, Gangeswaran R, Jones M, Terris B, Costello E, Neoptolemos J P, Lemoine N R. Molecular alterations in pancreatic carcinoma: expression profiling shows that dysregulated expression of S100 genes is highly prevalent. The Journal of Pathology: A Journal of the Pathological Society of Great Britain and Ireland. 2003 September; 201(1):63-74.
46. Zhao J, Simeone D M, Heidt D, Anderson M A, Lubman D M. Comparative serum glycoproteomics using lectin selected sialic acid glycoproteins with mass spectrometric analysis: application to pancreatic cancer serum. Journal of proteome research. 2006 Jul. 7; 5(7):1792-802.
47. Nie S, Yin H, Tan Z, Anderson M A, Ruffin M T, Simeone D M, Lubman D M. Quantitative analysis of single amino acid variant peptides associated with pancreatic cancer in serum by an isobaric labeling quantitative method. Journal of proteome research. 2014 Nov. 24; 13(12):6058-66.
48. Cecconi D, Palmieri M, Donadelli M. Proteomics in pancreatic cancer research. Proteomics. 2011 February; 11(4):816-28.
49. Martin-Morales L, Feldman M, Vershinin Z, Garre P, Caldes T, Levy D. SETD6 dominant negative mutation in familial colorectal cancer type X. Human molecular genetics. 2017 Aug. 30; 26(22):4481-93.
50. Oshima, T., Kunisaki, C., Yoshihara, K., Yamada, R., Yamamoto, N., Sato, T., Makino, H., Yamagishi, S., Nagano, Y., Fujii, S. and Shiozawa, M., 2008. Clinicopathological significance of the gene expression of matrix metalloproteinases and reversion-inducing cysteine-rich protein with Kazal motifs in patients with colorectal cancer: MMP-2 gene expression is a useful predictor of liver metastasis from colorectal cancer. Oncology reports, 19(5), pp. 1285-1291.
51. Borgquist S, Butt T, Almgren P, Shiffman D, Stocks T, Orho-Melander M, Manjer J, Melander O. Apolipoproteins, lipids and risk of cancer. International journal of cancer. 2016 Jun. 1; 138(11):2648-56.
52. Woong-Shick A, Sung-Pil P, Su-Mi B, Joon-Mo L, Sung-Eun N, Gye-Hyun N, Young-Lae C, Ho-Sun C, Heung-Jae J, Chong-Kook K, Young-Wan K. Identification of hemoglobin-α and -β subunits as potential serum biomarkers for the diagnosis and prognosis of ovarian cancer. Cancer science. 2005 March; 96(3):197-201.
53. Zhang, J., Li, X., Liu, X., Tian, F., Zeng, W., Xi, X., & Lin, Y. (2018). EIF5A1 promotes epithelial ovarian cancer proliferation and progression. Biomedicine & Pharmacotherapy, 100, 168-175.
54. Wang J P, Hielscher A. Fibronectin: how its aberrant expression in tumors may improve therapeutic targeting. Journal of Cancer. 2017; 8(4):674.
55. Mohamed E, Abdul-Rahman P S, Doustjalali S R, Chen Y, Lim B K, Omar S Z, Bustam A Z, Singh V A, Mohd-Taib N A, Yip C H, Hashim O H. Lectin-based electrophoretic analysis of the expression of the 35 kDa inter-a-trypsin inhibitor heavy chain H4 fragment in sera of patients with five different malignancies. Electrophoresis. 2008 June; 29(12):2645-50.
56. Heo S H, Lee S J, Ryoo H M, Park J Y, Cho J Y. Identification of putative serum glycoprotein biomarkers for human lung adenocarcinoma by multilectin affinity chromatography and L C-MS/MS. Proteomics. 2007 December; 7(23):4292-302.
57. Ajona D, Castano Z, Garayoa M, Zudaire E, Pajares M J, Martinez A, Cuttitta F, Montuenga L M, Pio R. Expression of complement factor H by lung cancer cells: effects on the activation of the alternative pathway of complement. Cancer Research. 2004 Sep. 1; 64(17):6310-8.
58. Sun Y, Liu S, Qiao Z, Shang Z, Xia Z, Niu X, Qian L, Zhang Y, Fan L, Cao C X, Xiao H. Systematic comparison of exosomal proteomes from human saliva and serum for the detection of lung cancer. Analytica chimica acta. 2017 Aug. 22; 982:84-95.
59. Zeng X, Hood B L, Zhao T, Conrads T P, Sun M, Gopalakrishnan V, Grover H, Day R S, Weissfeld J L, Wilson D O, Siegfried J M. Lung cancer serum biomarker discovery using label-free liquid chromatography-tandem mass spectrometry. Journal of Thoracic Oncology. 2011 Apr. 1; 6(4):725-34.
60. Li Y, Qu P, Wu L, Li B, Du H et al. (2011) Api6/AIM/Spα/CD5L Overexpression in alveolar type II epithelial cells induces spontaneous lung adenocarcinoma. Cancer Res 71(16):5488-5499
61. Forconi F, Sozzi E, Rossi D, Sahota S S, Amato T, Raspadori D, Trentin L, Leoncini L, Gaidano G, Lauria F. Selective influences in the expressed immunoglobulin heavy and light chain gene repertoire in hairy cell leukemia. haematologica. 2008 May 1; 93(5):697-705.
62. Darling V R, Hauke R J, Tarantolo S, Agrawal D K. Immunological effects and therapeutic role of C5a in cancer. Expert review of clinical immunology. 2015 Feb. 1; 11(2):255-63.
63. Chen N, Gong J, Chen X, Xu M, Huang Y, Wang L, Geng N, Zhou Q. Cytokeratin expression in malignant melanoma: potential application of in-situ hybridization analysis of mRNA. Melanoma research. 2009 Apr. 1; 19(2):87-93.
64. Cooper M L, Adami H O, Grönberg H, Wiklund F, Green F R, Rayman M P. Interaction between single nucleotide polymorphisms in selenoprotein P and mitochondrial superoxide dismutase determines prostate cancer risk. Cancer research. 2008 Dec. 15; 68(24):10171-7.
65. Persson-Moschos M E, Stavenow L, Åkesson B, Lindgärde F. Selenoprotein P in plasma in relation to cancer morbidity in middle-aged Swedish men. Nutrition and cancer. 2000 Jan. 1; 36(1):19-26.
66. Guerrico A G, Hillman D, Karnes J, Davis B, Gaston S, Klee G. Roles of kallikrein-2 biomarkers (free-hK2 and pro-hK2) for predicting prostate cancer progression-free survival. Journal of circulating biomarkers. 2017 Jul. 19; 6:1849454417720151.
67. Darson M F, Pacelli A, Roche P, Rittenhouse H G, Wolfert R L, Young C Y, Klee G G, Tindall D J, Bostwick D G. Human glandular kallikrein 2 (hK2) expression in prostatic intraepithelial neoplasia and adenocarcinoma: a novel prostate cancer marker. Urology. 1997 Jun. 1; 49(6):857-62.
68. Malik G, Ward M D, Gupta S K, Trosset M W, Grizzle W E, Adam B L, Diaz J I, Semmes O J. Serum levels of an isoform of apolipoprotein A-II as a potential marker for prostate cancer. Clinical Cancer Research. 2005 Feb. 1; 11(3):1073-85.
69. Raitanen M P, Marttila T, Nurmi M, Ala-opas M, Nieminen P, Aine R, Tammela T L, Finnbladder Group. Human complement factor H related protein test for monitoring bladder cancer. The Journal of urology. 2001 Feb. 1; 165(2):374-7.
70. Origa, Raffaella, and Paolo Moi. "Alpha-thalassemia." (2016).
71. Crawley J N, Heyer W D, LaSalle J M. Autism and cancer share risk genes, pathways, and drug targets. Trends in Genetics. 2016 Mar. 1; 32(3):139-46.
72. Cooper J D, Han S Y, Tomasik J, Ozcan S, Rustogi N, van Beveren N J, Leweke F M, Bahn S. Multimodel inference for biomarker development: an application to schizophrenia. Translational Psychiatry. 2019 Feb. 11; 9(1):83.
73. La Y J, Wan C L, Zhu H, Yang Y F, Chen Y S, Pan Y X, Feng G Y, He L. Decreased levels of apolipoprotein Al in plasma of schizophrenic patients. Journal of neural transmission. 2007 May 1; 114(5):657-63.
74. Li N, Fu S, Cui M M, Niu Y, Li B, Liu Z P, Liu T, Wang R T. Platelet distribution width and serum albumin levels for discrimination of thyroid cancer from benign thyroid nodules. Asian Pacific journal of cancer prevention: APJCP. 2017; 18(7):1773.
75. Datta M, Savage P, Lovato J, Schwartz G G. Serum calcium, albumin and tumor stage in cutaneous malignant melanoma. Future Oncology. 2016 October; 12(19):2205-14.
76. Privalov, P. L. "Microcalorimetry of macromolecules: protein folding, multidomain proteins." (2012): 225-72.
77. Khatri N, Garg V. Reviewing biomedical role of Plasma Gelsolin. The Pharma Innovation. 2014 Dec. 1; 3(10, Part A): 16.

78. Kane S J, Farley T K, Gordon E O, Estep J, Bender H R, Moreno J A, Bartz J, Telling G C, Pickering M C, Zabel M D. Complement regulatory protein factor H is a soluble prion receptor that potentiates peripheral prion pathogenesis. The Journal of Immunology. 2017 Dec. 1; 199(11): 3821-7.

79. Vassiliev V, Harris Z L, Zatta P. Ceruloplasmin in neurodegenerative diseases. Brain Research Reviews. 2005 Nov. 1; 49(3):633-40.

80. Bereczki E, Bernát G, Csont T, Ferdinandy P, Scheich H, Sántha M. Overexpression of human apolipoprotein B-100 induces severe neurodegeneration in transgenic mice. Journal of proteome research. 2008 May 13; 7(6): 2246-52.

81. Trouw L A, Nielsen H M, Minthon L, Londos E, Landberg G, Veerhuis R, Janciauskiene S, Blom A M. C4b-binding protein in Alzheimer's disease: Binding to Aβ1-42 and to dead cells. Molecular immunology. 2008 Aug. 1; 45(13):3649-60.

82. Deng R, Hao J, Han W, Ni Y, Huang X, Hu Q. Gelsolin regulates proliferation, apoptosis, migration and invasion in human oral carcinoma cells. Oncol Lett. 2015; 9:2129-2134.

83. Choate J J, Mosher D F. Fibronectin concentration in plasma of patients with breast cancer, colon cancer, and acute leukemia. Cancer. 1983 Mar. 15; 51(6):1142-7.

84. Guttery D S, Hancox R A, Mulligan K T, Hughes S, Lambe S M, Pringle J H, Walker R A, Jones J L, Shaw J A. Association of invasion-promoting tenascin-C additional domains with breast cancers in young women. Breast Cancer Research. 2010 August; 12(4):R57.

85. Brellier F, Martina E, Degen M, Heuzé-Vourc'h N, Petit A, Kryza T, Courty Y, Terracciano L, Ruiz C, Chiquet-Ehrismann R. Tenascin-W is a better cancer biomarker than tenascin-C for most human solid tumors. BMC clinical pathology. 2012 December; 12(1):14.

86. Guttery D S, Hancox R A, Mulligan K T, Hughes S, Lambe S M, Pringle J H, Walker R A, Jones J L, Shaw J A. Association of invasion-promoting tenascin-C additional domains with breast cancers in young women. Breast Cancer Research. 2010 August; 12(4): R57.

87. Brellier F, Martina E, Degen M, Heuzé-Vourc'h N, Petit A, Kryza T, Courty Y, Terracciano L, Ruiz C, Chiquet-Ehrismann R. Tenascin-W is a better cancer biomarker than tenascin-C for most human solid tumors. BMC clinical pathology. 2012 December; 12(1):14.

88. van den Broek, I., Sparidans, R. W., van Winden, A. W., Gast, M. C. W., van Dulken, E. J., Schellens, J. H. and Beijnen, J. H., 2010. The absolute quantification of eight inter-a-trypsin inhibitor heavy chain 4 (ITIH4)-derived peptides in serum from breast cancer patients. PROTEOMICS-Clinical Applications, 4(12), pp. 931-939.

89. Solomon J P, Yonemoto I T, Murray A N, Price J L, Powers E T, Balch W E, Kelly J W. The 8 and 5 kDa fragments of plasma gelsolin form amyloid fibrils by a nucleated polymerization mechanism, while the 68 kDa fragment is not amyloidogenic. Biochemistry. 2009 Nov. 11; 48(48):11370-80.

90. Rehman I, Evans C A, Glen A, Cross S S, Eaton C L, Down J, Pesce G, Phillips J T, Yen O S, Thalmann G N, Wright P C. iTRAQ identification of candidate serum biomarkers associated with metastatic progression of human prostate cancer. PloS one. 2012 Feb. 15; 7(2): e30885.

91. Achermann J C, Ozisik G, Meeks J J, Jameson J L. Genetic causes of human reproductive disease. The Journal of Clinical Endocrinology & Metabolism. 2002 Jun. 1; 87(6):2447-54.

92. Robinson-Cohen C, Zelnick L R, Hoofnagle A N, Lutsey P L, Burke G, Michos E D, Shea S J, Tracy R, Siscovick D S, Psaty B, Kestenbaum B. Associations of Vitamin D-Binding Globulin and Bioavailable Vitamin D Concentrations With Coronary Heart Disease Events: The Multi-Ethnic Study of Atherosclerosis (MESA). The Journal of Clinical Endocrinology & Metabolism. 2017 May 3; 102(8):3075-84.

93. Drinane M C, Sherman J A, Hall A E, Simons M, Mulligan-Kehoe M J. Plasminogen and plasmin activity in patients with coronary artery disease. Journal of Thrombosis and Haemostasis. 2006 June; 4(6):1288-95.

94. Kashyap R S, Nayak A R, Deshpande P S, Kabra D, Purohit H J, Taori G M, Daginawala H F. Inter-a-trypsin inhibitor heavy chain 4 is a novel marker of acute ischemic stroke. Clinica Chimica Acta. 2009 Apr. 1; 402(1-2):160-3.

95. Kong Y I, Zhou S, Kihm A J, Katein A M, Yu X, Gell D A, Mackay J P, Adachi K, Foster-Brown L, Louden C S, Gow A J. Loss of α-hemoglobin-stabilizing protein impairs erythropoiesis and exacerbates β-thalassemia. The Journal of clinical investigation. 2004 Nov. 15; 114(10):1457-66.

96. Ohi K, Shimada T, Nitta Y, Kihara H, Okubo H, Uehara T, Kawasaki Y. Schizophrenia risk variants in ITIH4 and CALN1 regulate gene expression in the dorsolateral prefrontal cortex. Psychiatric genetics. 2016 Jun. 1; 26(3): 142-3.

97. Tanaka H, Shimazawa M, Takata M, Kaneko H, Tsuruma K, Ikeda T, Warita H, Aoki M, Yamada M, Takahashi H, Hozumi I. ITIH4 and Gpx3 are potential biomarkers for amyotrophic lateral sclerosis. Journal of neurology. 2013 Jul. 1; 260(7):1782-97.

98. Obermann J, Priglinger C S, Merl-Pham J, Geerlof A, Priglinger S, Götz M, Hauck S M. Proteome-wide identification of glycosylation-dependent interactors of galectin-1 and Galectin-3 on mesenchymal Retinal Pigment Epithelial (RPE) cells. Molecular & Cellular Proteomics. 2017 Aug. 1; 16(8):1528-46.

99. Boon C J, Klevering B J, Hoyng C B, Zonneveld-Vrieling M N, Nabuurs S B, Blokland E, Cremers F P, den Hollander A I. Basal laminar drusen caused by compound heterozygous variants in the CFH gene. The American Journal of Human Genetics. 2008 Feb. 8; 82(2):516-23.

100. Kawaguchi H, Matsumoto I, Osada A, Kurata I, Ebe H, Tanaka Y, Inoue A, Umeda N, Kondo Y, Tsuboi H, Shinkai Y. Identification of novel biomarker as citrullinated inter-alpha-trypsin inhibitor heavy chain 4, specifically increased in sera with experimental and rheumatoid arthritis. Arthritis research & therapy. 2018 December; 20(1):66.

101. Nie S, Yin H, Tan Z, Anderson M A, Ruffin M T, Simeone D M, Lubman D M. Quantitative analysis of single amino acid variant peptides associated with pancreatic cancer in serum by an isobaric labeling quantitative method. Journal of proteome research. 2014 Nov. 24; 13(12):6058-66.

102. Ngampasutadol J, Ram S, Blom A M, Jarva H, Jerse A E, Lien E, Goguen J, Gulati S, Rice P A. Human C4b-binding protein selectively interacts with *Neisseria gonorrhoeae* and results in species-specific infection. Proceedings of the National Academy of Sciences. 2005 Nov. 22; 102(47):17142-7.

103. Howell G R, Soto I, Ryan M, Graham L C, Smith R S, John S W. Deficiency of complement component 5 ameliorates glaucoma in DBA/2J mice. Journal of neuroinflammation. 2013 December; 10(1):851.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims. It is further to be understood that all values are approximate, and are provided for description.

Patents, patent applications, publications, product descriptions, and protocols are cited throughout this application, the disclosures of which are incorporated herein by reference in their entireties for all purposes.

The invention claimed is:

1. A vaccine comprising
   i) protein-targeted DNA (ptDNA), wherein said ptDNA is extracellular DNA isolated from the matrix of *Pseudomonas aeruginosa, Escherichia coli*, and/or *Staphylococcus aureus* matrix which promotes generation and/or enrichment of heat-resistant soluble proteins upon exposure to a bodily fluid, and wherein said ptDNA-comprising vaccine triggers the development of antibodies against said ptDNA, which antibodies prevent interaction of said ptDNA with extracellular proteins in bodily fluid(s), and/or
   ii) a heat-resistant soluble protein obtained by (a) contacting a bodily fluid sample with ptDNA, wherein said ptDNA is extracellular DNA isolated from the matrix of *Pseudomonas aeruginosa, Escherichia coli*, and/or *Staphylococcus aureus*, followed by (b) heating said bodily fluid sample for 5 seconds to 48 hours at a temperature from 43° C. to 200° C., followed by (c) isolating a soluble protein fraction.

2. The vaccine of claim 1, wherein the bodily fluid is whole blood, plasma or serum.

3. The vaccine of claim 1, wherein the vaccine further comprises an adjuvant.

4. A method for reducing the likelihood of and/or treating a cancer in a subject in need thereof comprising administering to the subject an effective amount of the vaccine of claim 1.

* * * * *

SEQUENCE LISTING

<160> NUMBER OF SEQ ID NOS: 5

<210> SEQ ID NO 1
<211> LENGTH: 920
<212> TYPE: PRT
<213> ORGANISM: Human herpes virus 8

<400> SEQUENCE: 1

```
Met Arg Val Lys Glu Met Arg Lys His Trp Gln His Leu Trp Thr Gly
1               5                   10                  15

Gly Ile Leu Leu Leu Gly Met Leu Met Ile Cys Ser Thr Ala Gln Asp
                20                  25                  30

Ala Trp Val Thr Val Tyr Tyr Gly Val Pro Val Trp Lys Glu Ala Thr
            35                  40                  45

Thr Thr Leu Phe Cys Ala Ser Asp Ala Lys Ala Tyr Lys Thr Glu Val
50                  55                  60

His Asn Val Trp Ala Thr His Ala Cys Val Pro Thr Asp Pro Asn Pro
65                  70                  75                  80

Gln Glu Val Val Leu Glu Asn Val Thr Glu Asn Phe Asn Met Trp Lys
                85                  90                  95

Asn Asn Met Val Glu Gln Met His Glu Asp Ile Ile Ser Leu Trp Asp
                100                 105                 110

Glu Ser Leu Lys Pro Cys Val Lys Leu Thr Pro Leu Cys Val Thr Leu
            115                 120                 125

Asn Cys Thr Asp Glu Leu Ile Val Thr Asn Ser Thr Asn Gly Asn Asn
130                 135                 140

Thr Asn Ser His Ser Thr Arg Gly Asn Asp Thr Ile Gly Asn Ser Thr
145                 150                 155                 160

Ser Trp Lys Glu Met Lys Gly Glu Ile Lys Asn Cys Ser Phe Asn Ile
                165                 170                 175

Pro Thr Ser Val Lys Asp Lys Met Gln Lys Gln Tyr Ala Leu Phe Tyr
            180                 185                 190

Lys Leu Asp Val Val Ala Ile Asn Asp Asp Asn Asn Lys Asn Ser Ser
        195                 200                 205

Asn Tyr Asn Ser Ser Lys Leu Ser Ser Ser Asn Ser Asn Cys Gly Lys
    210                 215                 220

Ser Asp Asn Ser Ser Cys Asn Cys Ser Ser Ser Asn Asn Cys
225                 230                 235                 240

Ser Ser Ser Asn His Ser Ser Asn Tyr Ser Ser Tyr Ile Leu Ile Ser
                245                 250                 255

Cys Asn Thr Ser Thr Leu Thr Gln Ala Cys Pro Lys Val Ser Phe Glu
            260                 265                 270

Pro Ile Pro Ile His Tyr Cys Thr Pro Ala Gly Phe Ala Ile Leu Lys
        275                 280                 285

Cys Asn Asp Lys Arg Phe Asn Gly Thr Gly Pro Cys Lys Asn Val Ser
    290                 295                 300

Thr Val Gln Cys Thr His Gly Ile Arg Pro Val Val Ser Thr Gln Leu
```

```
            305                 310                 315                 320
Leu Leu Asn Gly Ser Leu Ala Glu Glu Val Val Ile Arg Ser Glu
                325                 330                 335
Asn Ile Ser Asn Asn Ala Lys Thr Ile Ile Val Gln Leu Asn Glu Ser
                340                 345                 350
Val Ala Ile Asn Cys Thr Arg Pro Asn Asn Asn Thr Arg Lys Gly Ile
                355                 360                 365
Arg Ile Gly Pro Gly Arg Thr Phe Tyr Ala Ala Glu Lys Ile Ile Gly
                370                 375                 380
Asp Ile Arg Lys Ala Tyr Cys Ile Ile Asn Gly Thr Lys Trp Asn Glu
385                 390                 395                 400
Thr Leu Arg Leu Ile Val Ala Lys Leu Arg Glu Gln Glu Gln Ile Gly
                405                 410                 415
Glu Asn Thr Thr Ile Ile Phe Lys Pro Ser Ser Gly Gly Asp Pro Glu
                420                 425                 430
Ile Glu Asn His Ile Phe Asn Cys Arg Gly Glu Phe Phe Tyr Cys Asn
                435                 440                 445
Thr Thr Gln Leu Phe Asn Ser Thr Trp Tyr Ser Asn Gly Thr Trp Ile
                450                 455                 460
Gly Lys Asn Phe Thr Gly Ser Asn Ile Thr Leu Pro Cys Arg Ile Lys
465                 470                 475                 480
Gln Ile Val Asn Met Trp Gln Glu Val Gly Lys Ala Met Tyr Ala Pro
                485                 490                 495
Pro Ile Arg Gly Gln Ile Asn Cys Ile Ser Asn Ile Thr Gly Leu Leu
                500                 505                 510
Leu Thr Ser Asp Gly Gly Phe Arg Lys Thr Asn Glu Thr Thr Asn Met
                515                 520                 525
Thr Glu Thr Leu Arg Pro Gly Gly Gly Asp Met Arg Asp Asn Trp Arg
                530                 535                 540
Ser Glu Leu Tyr Lys Tyr Lys Val Val Arg Ile Glu Pro Leu Gly Ile
545                 550                 555                 560
Ala Pro Thr Gln Ala Lys Arg Arg Val Val Gln Arg Glu Lys Arg Ala
                565                 570                 575
Val Gly Ile Ile Gly Ala Val Phe Leu Gly Phe Leu Gly Ala Ala Gly
                580                 585                 590
Ser Thr Met Gly Ala Ala Ala Leu Thr Leu Thr Val Gln Ala Arg Gln
                595                 600                 605
Leu Leu Ser Gly Ile Val Gln Gln Gln Asn Asn Leu Leu Arg Ala Ile
                610                 615                 620
Glu Ala Gln His Gln Leu Leu Gln Leu Thr Val Trp Gly Ile Lys Gln
625                 630                 635                 640
Leu Gln Ala Arg Ile Leu Ala Val Glu Arg Tyr Leu Arg Asp Gln Gln
                645                 650                 655
Leu Leu Gly Ile Trp Cys Ser Gly Lys Leu Ile Cys Thr Thr Thr Val
                660                 665                 670
Pro Trp Asn Thr Ser Trp Ser Asn Lys Ser Leu Thr Glu Ile Trp Asn
                675                 680                 685
Asn Met Thr Trp Met Glu Trp Glu Arg Glu Ile Glu Asn Tyr Thr Gly
                690                 695                 700
Leu Ile Tyr Asn Leu Leu Glu Lys Ser Gln Asn Gln Gln Glu Lys Asn
705                 710                 715                 720
Glu Gln Glu Leu Leu Glu Leu Asp Lys Trp Ala Asn Leu Trp Asn Trp
                725                 730                 735
```

```
Phe Asp Ile Thr Asn Trp Leu Trp Tyr Ile Arg Ile Phe Ile Met Ile
                740                 745                 750

Val Gly Gly Leu Ile Gly Leu Arg Ile Val Phe Ala Val Leu Ser Ile
                755                 760                 765

Val Asn Arg Val Arg Gln Gly Tyr Ser Pro Ile Ser Leu Gln Thr His
                770                 775                 780

Leu Pro Val Pro Arg Gly Pro Asp Arg Pro Glu Gly Ile Glu Gly Glu
785                 790                 795                 800

Gly Gly Glu Arg Asp Gly Asp Thr Ser Arg Arg Leu Val Ile Gly Leu
                805                 810                 815

Leu Pro Leu Ile Trp Asp Asp Leu Arg Ser Leu Cys Leu Phe Ser Tyr
                820                 825                 830

His Arg Leu Arg Asp Leu Leu Leu Ile Val Ala Arg Ile Val Glu Leu
                835                 840                 845

Leu Gly Arg Arg Gly Trp Glu Ile Leu Lys Tyr Trp Trp Asn Leu Leu
                850                 855                 860

Gln Tyr Trp Ser Gln Glu Leu Lys Asn Ser Ala Val Ser Leu Leu Asn
865                 870                 875                 880

Ala Thr Ala Ile Ala Val Ala Glu Gly Thr Asp Arg Ile Ile Glu Ile
                885                 890                 895

Ala Arg Thr Ile Phe Arg Ala Phe His Ile Pro Arg Arg Ile Arg
                900                 905                 910

Gln Gly Phe Glu Arg Ala Leu Leu
                915                 920

<210> SEQ ID NO 2
<211> LENGTH: 152
<212> TYPE: PRT
<213> ORGANISM: Human herpes virus 3

<400> SEQUENCE: 2

Met Gln Lys Gly Ser Ser Phe Lys Cys Tyr Met Cys Val Leu Phe Ser
1               5                   10                  15

Cys Phe Ile Ile Gly Ala Gly Ser Asn Asn Thr Ser Thr Gln Pro Pro
                20                  25                  30

Thr Thr Thr Asn Ser Met Ser Thr Thr Asn Gln Ala Thr Leu Gly Gln
                35                  40                  45

Thr Cys Phe Gln Cys Ala Phe Gln Ile Val Asn Asn Ser Thr Gln Asn
                50                  55                  60

Phe Thr Val Thr Phe Ala Tyr His Glu Asn Cys His Leu Ser Phe Arg
65                  70                  75                  80

Thr His Thr Glu Ala Leu Ser Val Ser Thr Ile Ser His Tyr His His
                85                  90                  95

His Asp Cys Trp Val Ser Ala Leu Arg Ala Val Tyr Gln Gly Tyr Asn
                100                 105                 110

Val Thr Ile Asn Gln Thr His Tyr Cys Tyr Leu Pro Asn Val Glu Thr
                115                 120                 125

Gly Ile Asn Pro Ala Val Val Arg Leu Ala Cys Ala Val Val Leu Leu
                130                 135                 140

Val Lys Leu Ala Gln Phe Trp Thr
145                 150

<210> SEQ ID NO 3
<211> LENGTH: 450
<212> TYPE: PRT
```

<213> ORGANISM: Artificial sequence
<220> FEATURE:
<223> OTHER INFORMATION: Synthetic peptide (heavy chain of Rituximab chimeric antibody)

<400> SEQUENCE: 3

```
Val Gln Leu Gln Gln Pro Gly Ala Glu Leu Val Lys Pro Gly Ala Ser
1               5                   10                  15

Val Lys Met Ser Cys Lys Ala Ser Gly Tyr Thr Phe Thr Ser Tyr Asn
            20                  25                  30

Met His Trp Val Lys Gln Thr Pro Gly Arg Gly Leu Glu Trp Ile Gly
        35                  40                  45

Ala Ile Tyr Pro Gly Asn Gly Asp Thr Ser Tyr Asn Gln Lys Phe Lys
    50                  55                  60

Gly Lys Ala Thr Leu Thr Ala Asp Lys Ser Ser Ser Thr Ala Tyr Met
65                  70                  75                  80

Gln Leu Ser Ser Leu Thr Ser Glu Asp Ser Ala Val Tyr Tyr Cys Ala
                85                  90                  95

Arg Ser Thr Tyr Tyr Gly Gly Asp Trp Tyr Phe Asn Val Trp Gly Ala
            100                 105                 110

Gly Thr Thr Val Thr Val Ser Ala Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Ala Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Asp Glu Leu Thr Lys Asn Gln Val Ser Leu
        355                 360                 365

Thr Cys Leu Val Lys Gly Phe Tyr Pro Ser Asp Ile Ala Val Glu Trp
    370                 375                 380
```

```
Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
                420                 425                 430

Glu Ala Leu His Asn His Tyr Thr Gln Lys Ser Leu Ser Leu Ser Pro
            435                 440                 445

Gly Lys
    450

<210> SEQ ID NO 4
<211> LENGTH: 213
<212> TYPE: PRT
<213> ORGANISM: Artificial sequence
<220> FEATURE:
<223> OTHER INFORMATION: Synthetic peptide (light chain of Rituximab
      chimeric antibody)

<400> SEQUENCE: 4

Gln Ile Val Leu Ser Gln Ser Pro Ala Ile Leu Ser Ala Ser Pro Gly
1               5                   10                  15

Glu Lys Val Thr Met Thr Cys Arg Ala Ser Ser Ser Val Ser Tyr Ile
                20                  25                  30

His Trp Phe Gln Gln Lys Pro Gly Ser Ser Pro Lys Pro Trp Ile Tyr
            35                  40                  45

Ala Thr Ser Asn Leu Ala Ser Gly Val Pro Val Arg Phe Ser Gly Ser
        50                  55                  60

Gly Ser Gly Thr Ser Tyr Ser Leu Thr Ile Ser Arg Val Glu Ala Glu
65                  70                  75                  80

Asp Ala Ala Thr Tyr Tyr Cys Gln Gln Trp Thr Ser Asn Pro Pro Thr
                85                  90                  95

Phe Gly Gly Gly Thr Lys Leu Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210

<210> SEQ ID NO 5
<211> LENGTH: 478
<212> TYPE: PRT
<213> ORGANISM: Artificial sequence
<220> FEATURE:
<223> OTHER INFORMATION: Synthetic peptide (Rituximab-Mod)

<400> SEQUENCE: 5

Val Gln Leu Gln Gln Pro Gly Ala Glu Leu Val Lys Pro Gly Ala Ser
```

-continued

```
1               5                   10                  15
Val Lys Met Ser Cys Lys Ala Ser Gly Tyr Thr Phe Thr Ser Tyr Asn
                20                  25                  30

Met His Trp Val Lys Gln Thr Pro Gly Arg Gly Leu Glu Trp Ile Gly
            35                  40                  45

Ala Ile Tyr Pro Gly Asn Gly Asp Thr Ser Tyr Asn Gln Lys Phe Lys
        50                  55                  60

Gly Lys Ala Thr Leu Thr Ala Asp Lys Ser Ser Ser Thr Ala Tyr Met
65                  70                  75                  80

Gln Leu Ser Ser Leu Thr Ser Glu Asp Ser Ala Val Tyr Tyr Cys Ala
                85                  90                  95

Arg Ser Thr Tyr Tyr Gly Gly Asp Trp Tyr Phe Asn Val Trp Gly Ala
            100                 105                 110

Gly Thr Thr Val Thr Val Ser Ala Ala Ser Thr Lys Gly Pro Ser Val
        115                 120                 125

Phe Pro Leu Ala Pro Ser Ser Lys Ser Thr Ser Gly Gly Thr Ala Ala
        130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Gln Asn Gln Asn Gln Asn Gln Asn Gln Asn Gln Asn Gln Asn Ser
210                 215                 220

Asn Thr Lys Val Asp Lys Lys Ala Glu Pro Lys Ser Cys Asp Lys Thr
225                 230                 235                 240

His Thr Cys Pro Pro Cys Pro Ala Pro Glu Leu Leu Gly Gly Pro Ser
                245                 250                 255

Val Phe Leu Phe Pro Pro Lys Pro Lys Asp Thr Leu Met Ile Ser Arg
            260                 265                 270

Thr Pro Glu Val Thr Cys Val Val Val Asp Val Ser His Glu Asp Pro
        275                 280                 285

Glu Val Lys Phe Asn Trp Tyr Val Asp Gly Val Glu Val His Asn Ala
        290                 295                 300

Lys Thr Lys Pro Arg Glu Glu Gln Tyr Asn Ser Thr Tyr Arg Val Val
305                 310                 315                 320

Ser Val Leu Thr Val Leu His Gln Asp Trp Leu Asn Gly Lys Glu Tyr
                325                 330                 335

Lys Cys Lys Val Ser Asn Lys Ala Leu Pro Ala Pro Ile Glu Lys Thr
            340                 345                 350

Ile Ser Lys Ala Lys Gly Gln Pro Arg Glu Pro Gln Val Tyr Thr Leu
        355                 360                 365

Pro Pro Ser Arg Asp Glu Leu Thr Lys Asn Gln Val Ser Leu Thr Cys
        370                 375                 380

Leu Val Lys Gly Phe Tyr Pro Ser Asp Ile Ala Val Glu Trp Glu Ser
385                 390                 395                 400

Asn Gly Gln Pro Glu Asn Asn Tyr Lys Thr Thr Pro Pro Val Leu Asp
                405                 410                 415

Ser Asp Gly Ser Phe Phe Leu Tyr Ser Lys Leu Thr Val Asp Lys Ser
            420                 425                 430
```

-continued

```
Arg Trp Gln Gln Gly Asn Val Phe Ser Cys Ser Val Met His Glu Ala
        435                 440                 445

Leu His Asn His Tyr Thr Gln Lys Ser Leu Ser Leu Ser Pro Gly Lys
    450                 455                 460

Gln Asn Gln Asn Gln Asn Gln Asn Gln Asn Gln Asn Gln Asn
465                 470                 475
```